US010007802B2

(12) United States Patent
Dellinger et al.

(10) Patent No.: US 10,007,802 B2
(45) Date of Patent: Jun. 26, 2018

(54) DEVICE, METHOD, AND GRAPHICAL USER INTERFACE FOR ACCESSING AN APPLICATION IN A LOCKED DEVICE

(71) Applicant: Apple Inc., Cupertino, CA (US)

(72) Inventors: Richard R. Dellinger, San Jose, CA (US); Imran Chaudhri, San Fracisco, CA (US); Gregory Christie, San Jose, CA (US); Scott Forstall, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 15/187,463

(22) Filed: Jun. 20, 2016

(65) Prior Publication Data

US 2016/0300072 A1 Oct. 13, 2016

Related U.S. Application Data

(63) Continuation of application No. 13/744,343, filed on Jan. 17, 2013, now Pat. No. 9,372,978.
(Continued)

(51) Int. Cl.
*G06F 7/04* (2006.01)
*G06F 12/00* (2006.01)
(Continued)

(52) U.S. Cl.
CPC ........ *G06F 21/6218* (2013.01); *G06F 3/0481* (2013.01); *G06F 3/0484* (2013.01);
(Continued)

(58) Field of Classification Search
None
See application file for complete search history.

(56) References Cited

U.S. PATENT DOCUMENTS 5,465,084 A 11/1995 Cottrell
5,559,961 A 9/1996 Blonder
(Continued)

FOREIGN PATENT DOCUMENTS

AU 2006330724 A1 7/2007
CN 101371258 A 2/2009
(Continued)

OTHER PUBLICATIONS

Notice of Allowance received for Japanese Patent Application No. 2014-553464, dated Sep. 16, 2016, 3 pages (Official Copy Only) (See Communication under 37 CFR § 1.98(a) (3)).
(Continued)

*Primary Examiner* — Christopher Revak
*Assistant Examiner* — Vadim Savenkov
(74) *Attorney, Agent, or Firm* — Dentons US LLP

(57) ABSTRACT

A device with a touch sensitive display and a plurality of applications, including a camera application, while the device is in a locked, passcode-protected state: displays a lock screen interface, the lock screen interface including a camera access indicia; detects a gesture; in response to a determination that the gesture starts on the camera access indicia: ceases to display the lock screen interface; starts a restricted session for the camera application; displays an interface for the camera application, without displaying a passcode entry interface; and maintains the device in the locked, passcode-protected state for the applications other than the camera application; and in response to a determination that the gesture starts at a location other than the camera access indicia: displays a passcode entry interface, wherein in response to entry of a correct passcode in the passcode entry interface, the device enters an unlocked state.

27 Claims, 90 Drawing Sheets

Related U.S. Application Data

(60) Provisional application No. 61/745,189, filed on Dec. 21, 2012, provisional application No. 61/589,239, filed on Jan. 20, 2012.

(51) Int. Cl.

| | | |
|---|---|---|
| *G06F 12/14* | (2006.01) | |
| *G06F 13/00* | (2006.01) | |
| *G06F 17/30* | (2006.01) | |
| *G06F 21/62* | (2013.01) | |
| *G06F 21/36* | (2013.01) | |
| *G06F 3/0488* | (2013.01) | |
| *G06F 3/0481* | (2013.01) | |
| *G06F 3/0484* | (2013.01) | |

(52) U.S. Cl.
CPC ........ *G06F 3/0488* (2013.01); *G06F 3/04883* (2013.01); *G06F 21/36* (2013.01)

(56) References Cited

U.S. PATENT DOCUMENTS

| | | | |
|---|---|---|---|
| 5,677,710 | A | 10/1997 | Thompson-Rohrlich |
| 5,821,933 | A | 10/1998 | Keller et al. |
| 5,907,327 | A | 5/1999 | Ogura et al. |
| 6,151,208 | A | 11/2000 | Bartlett |
| 6,160,555 | A | 12/2000 | Kang et al. |
| 6,192,478 | B1 | 2/2001 | Elledge |
| 6,249,606 | B1 | 6/2001 | Kiraly et al. |
| 6,323,846 | B1 | 11/2001 | Westerman et al. |
| 6,347,290 | B1 | 2/2002 | Bartlett |
| 6,421,453 | B1 | 7/2002 | Kanevsky |
| 6,424,711 | B1 | 7/2002 | Bayless et al. |
| 6,570,557 | B1 | 5/2003 | Westerman et al. |
| 6,573,883 | B1 | 6/2003 | Bartlett |
| 6,633,310 | B1 | 10/2003 | Andrew et al. |
| 6,677,932 | B1 | 1/2004 | Westerman |
| 6,720,860 | B1 | 4/2004 | Narayanaswami |
| 6,735,695 | B1 | 5/2004 | Gopalakrishnan et al. |
| 7,124,433 | B2 | 10/2006 | Little |
| 7,151,843 | B2 | 12/2006 | Rui et al. |
| 7,174,462 | B2 | 2/2007 | Pering et al. |
| 7,236,576 | B2 | 6/2007 | Schnarel et al. |
| 7,263,670 | B2 | 8/2007 | Rekimoto |
| 7,286,063 | B2 | 10/2007 | Gauthey et al. |
| 7,289,063 | B2 | 10/2007 | Zaghloul |
| 7,392,330 | B2 | 6/2008 | Weatherspoon |
| 7,395,506 | B2 | 7/2008 | Tan et al. |
| 7,414,613 | B2 | 8/2008 | Simelius |
| 7,480,870 | B2 | 1/2009 | Anzures et al. |
| 7,627,904 | B2 | 12/2009 | Tokkonen |
| 7,657,849 | B2 | 2/2010 | Chaudhri et al. |
| 7,810,105 | B2 | 10/2010 | Prabandham et al. |
| 8,006,299 | B2 | 8/2011 | Suominen |
| 8,046,721 | B2 | 10/2011 | Chaudhri et al. |
| 8,095,879 | B2 | 1/2012 | Goertz |
| 8,209,637 | B2 | 6/2012 | Chaudhri et al. |
| 8,286,103 | B2 | 10/2012 | Chaudhri et al. |
| 8,341,557 | B2 | 12/2012 | Pisula et al. |
| 8,352,745 | B2 | 1/2013 | McKeeth |
| 8,355,698 | B2 | 1/2013 | Teng et al. |
| 8,527,903 | B2 | 9/2013 | Chaudhri et al. |
| 8,581,877 | B2 * | 11/2013 | Yoo ........................ G06F 3/0488 345/173 |
| 8,627,237 | B2 | 1/2014 | Chaudhri et al. |
| 8,638,385 | B2 | 1/2014 | Bhogal |
| 8,640,057 | B2 | 1/2014 | Chaudhri et al. |
| 8,676,273 | B1 | 3/2014 | Fujisaki |
| 8,694,923 | B2 | 4/2014 | Chaudhri et al. |
| 8,745,544 | B2 | 6/2014 | Chaudhri et al. |
| 8,811,948 | B2 | 8/2014 | Bandyopadhyay et al. |
| 9,083,814 | B2 | 7/2015 | Lee et al. |
| 9,213,822 | B2 | 12/2015 | Dellinger et al. |
| 9,372,978 | B2 | 6/2016 | Dellinger et al. |
| 2001/0011308 | A1 | 8/2001 | Clark et al. |
| 2001/0012022 | A1 | 8/2001 | Smith |
| 2002/0015024 | A1 | 2/2002 | Westerman et al. |
| 2002/0191029 | A1 | 12/2002 | Gillespie et al. |
| 2002/0196274 | A1 | 12/2002 | Comfort et al. |
| 2003/0142138 | A1 | 7/2003 | Brown et al. |
| 2003/0206202 | A1 | 11/2003 | Moriya |
| 2003/0222913 | A1 | 12/2003 | Mattila et al. |
| 2004/0030934 | A1 | 2/2004 | Mizoguchi et al. |
| 2004/0034801 | A1 | 2/2004 | Jaeger |
| 2004/0085351 | A1 | 5/2004 | Tokkonen |
| 2004/0088564 | A1 | 5/2004 | Norman |
| 2004/0088568 | A1 | 5/2004 | Tokkonen |
| 2004/0101297 | A1 | 5/2004 | Nonaka |
| 2004/0113819 | A1 | 6/2004 | Gauthey et al. |
| 2004/0230843 | A1 | 11/2004 | Jansen |
| 2004/0250138 | A1 | 12/2004 | Schneider |
| 2004/0260955 | A1 | 12/2004 | Mantyla |
| 2004/0268267 | A1 | 12/2004 | Moravcsik |
| 2005/0050477 | A1 | 3/2005 | Robertson et al. |
| 2005/0060554 | A1 | 3/2005 | O'Donoghue |
| 2005/0079896 | A1 | 4/2005 | Kokko et al. |
| 2005/0212760 | A1 | 9/2005 | Marvit et al. |
| 2005/0216862 | A1 | 9/2005 | Shinohara et al. |
| 2005/0216867 | A1 | 9/2005 | Marvit et al. |
| 2005/0248542 | A1 | 11/2005 | Sawanobori |
| 2005/0253817 | A1 | 11/2005 | Rytivaara et al. |
| 2005/0264833 | A1 | 12/2005 | Hiraoka et al. |
| 2005/0289476 | A1 | 12/2005 | Tokkonen |
| 2006/0031776 | A1 | 2/2006 | Glein et al. |
| 2006/0136087 | A1 | 6/2006 | Higashiura |
| 2006/0161870 | A1 | 7/2006 | Hotelling et al. |
| 2006/0174339 | A1 | 8/2006 | Tao |
| 2006/0267955 | A1 | 11/2006 | Hino |
| 2007/0150826 | A1 | 6/2007 | Anzures et al. |
| 2007/0150842 | A1 | 6/2007 | Chaudhri et al. |
| 2008/0034292 | A1 | 2/2008 | Brunner et al. |
| 2008/0034307 | A1 | 2/2008 | Cisler et al. |
| 2008/0055263 | A1 | 3/2008 | Lemay et al. |
| 2008/0055269 | A1 | 3/2008 | Lemay et al. |
| 2008/0072172 | A1 | 3/2008 | Shinohara et al. |
| 2008/0082934 | A1 | 4/2008 | Kocienda et al. |
| 2008/0094371 | A1 | 4/2008 | Forstall et al. |
| 2008/0122796 | A1 | 5/2008 | Jobs et al. |
| 2008/0134170 | A1 | 6/2008 | Astheimer |
| 2008/0168290 | A1 | 7/2008 | Jobs et al. |
| 2009/0005165 | A1 | 1/2009 | Arezina et al. |
| 2009/0006991 | A1 | 1/2009 | Lindberg et al. |
| 2009/0061837 | A1 | 3/2009 | Chaudhrit et al. |
| 2009/0128581 | A1 | 5/2009 | Brid et al. |
| 2009/0215497 | A1 | 8/2009 | Louch |
| 2009/0241072 | A1 | 9/2009 | Chaudhri et al. |
| 2009/0284482 | A1 | 11/2009 | Chin |
| 2009/0328162 | A1 | 12/2009 | Kokumai et al. |
| 2010/0001967 | A1 | 1/2010 | Yoo |
| 2010/0079380 | A1 | 4/2010 | Nurmi |
| 2010/0146384 | A1 | 6/2010 | Peev et al. |
| 2010/0151903 | A1 | 6/2010 | Yamamoto |
| 2010/0159995 | A1 | 6/2010 | Stallings et al. |
| 2010/0162180 | A1 | 6/2010 | Dunnam et al. |
| 2010/0164684 | A1 | 7/2010 | Sasa et al. |
| 2010/0235732 | A1 | 9/2010 | Bergman |
| 2010/0257490 | A1 | 10/2010 | Lyon et al. |
| 2010/0269040 | A1 | 10/2010 | Lee |
| 2010/0306705 | A1 | 12/2010 | Nilsson |
| 2010/0306718 | A1 | 12/2010 | Shim et al. |
| 2011/0010672 | A1 | 1/2011 | Hope |
| 2011/0047368 | A1 | 2/2011 | Sundaramurthy et al. |
| 2011/0105193 | A1 | 5/2011 | Lee et al. |
| 2011/0126094 | A1 | 5/2011 | Horodezky et al. |
| 2011/0163972 | A1 | 7/2011 | Anzures et al. |
| 2011/0247065 | A1 | 10/2011 | Melnyk |
| 2011/0260829 | A1 | 10/2011 | Lee |
| 2011/0283241 | A1 | 11/2011 | Miller et al. |
| 2011/0296356 | A1 | 12/2011 | Chaudhri et al. |
| 2012/0009896 | A1 | 1/2012 | Bandyopadhyay et al. |
| 2012/0021724 | A1 | 1/2012 | Olsen et al. |
| 2012/0023458 | A1 | 1/2012 | Chaudhri et al. |
| 2012/0084691 | A1 | 4/2012 | Yun |

(56) References Cited

U.S. PATENT DOCUMENTS

| | | |
|---|---|---|
| 2012/0144338 A1 | 6/2012 | Hymel |
| 2012/0174042 A1* | 7/2012 | Chang .................. G06F 3/0488 715/863 |
| 2012/0182226 A1 | 7/2012 | Tuli |
| 2012/0188206 A1 | 7/2012 | Sparf et al. |
| 2012/0269040 A1 | 10/2012 | Wei et al. |
| 2012/0284297 A1 | 11/2012 | Aguera-Arcas et al. |
| 2012/0291103 A1 | 11/2012 | Cohen |
| 2012/0293438 A1 | 11/2012 | Chaudhri et al. |
| 2012/0311499 A1 | 12/2012 | Dellinger et al. |
| 2013/0174094 A1* | 7/2013 | Heo .................... G06F 3/04883 715/835 |
| 2013/0185677 A1 | 7/2013 | Chaudhri et al. |
| 2013/0185678 A1 | 7/2013 | Chaudhri et al. |
| 2013/0185680 A1 | 7/2013 | Chaudhri et al. |
| 2013/0190056 A1 | 7/2013 | Chaudhri et al. |
| 2014/0237378 A1* | 8/2014 | Gonen .............. H04M 1/72519 715/745 |
| 2015/0082252 A1 | 3/2015 | Chaudhri et al. |

FOREIGN PATENT DOCUMENTS

| | | |
|---|---|---|
| CN | 101625620 A | 1/2010 |
| CN | 101753656 A | 6/2010 |
| CN | 101882046 A | 11/2010 |
| CN | 102043587 A | 5/2011 |
| CN | 102130998 A | 7/2011 |
| DE | 212006000081 U1 | 8/2008 |
| EP | 1284450 A2 | 2/2003 |
| EP | 2060970 A1 | 5/2009 |
| EP | 2144148 A2 | 1/2010 |
| EP | 1964022 B1 | 3/2010 |
| EP | 2200306 A2 | 6/2010 |
| GB | 2313460 A | 11/1997 |
| JP | 60171560 A | 9/1985 |
| JP | 2249062 A | 10/1990 |
| JP | 5127819 A | 5/1993 |
| JP | 6214954 A | 8/1994 |
| JP | 784661 A | 3/1995 |
| JP | 8263214 A | 10/1996 |
| JP | 8263215 A | 10/1996 |
| JP | 918566 A | 1/1997 |
| JP | 9128208 A | 5/1997 |
| JP | 9221950 A | 8/1997 |
| JP | 11203045 A | 7/1999 |
| JP | 2000322199 A | 11/2000 |
| JP | 2000349886 A | 12/2000 |
| JP | 2003091370 A | 3/2003 |
| JP | 2004252720 A | 9/2004 |
| JP | 2004348599 A | 12/2004 |
| JP | 2005071008 A | 3/2005 |
| JP | 2005167455 A | 6/2005 |
| JP | 2007071008 A | 3/2007 |
| JP | 2009-123208 A | 6/2009 |
| JP | 2009521753 A | 6/2009 |
| JP | 2010147717 A | 7/2010 |
| JP | 2011-199637 A | 10/2011 |
| JP | 2013-025357 A | 2/2013 |
| KR | 1020080079333 A | 8/2008 |
| KR | 1020100005438 A | 1/2010 |
| KR | 10-2011-0114873 A | 10/2011 |
| TW | I339344 B | 3/2011 |
| TW | I355957 B | 1/2012 |
| WO | 31560 A2 | 6/2000 |
| WO | 177792 A2 | 10/2001 |
| WO | 233882 A1 | 4/2002 |
| WO | 2093542 A1 | 11/2002 |
| WO | 3038569 A2 | 5/2003 |
| WO | 2004001560 A1 | 12/2003 |
| WO | 2004021108 A2 | 3/2004 |
| WO | 2005041020 A1 | 5/2005 |
| WO | 2007076210 A1 | 7/2007 |
| WO | 2010/065752 A2 | 6/2010 |
| WO | 2011/149231 A2 | 12/2011 |
| WO | 2012/006480 A2 | 1/2012 |

OTHER PUBLICATIONS

Color Image Pipeline, Wikipedia, The Free Encyclopedia, updated May 24, 2010, 2 pages.
*Samsung Electronics GmbH* vs. *Apple Inc.*, Supplement to the Cancellation Request against utility model DE 212006000081 U1, Exhibits D26-D32, Mar. 1, 2013, 211 pages.
*Samsung Electronics GmbH* vs. *Apple, Inc.*, Nullity action against European Patent EP 1964022 B1 granted with effect in the Federal Republic of Germany, Nov. 19, 2012, 269 pages.
Samsung Response to the Court's Notification in the Matter of *Samsung Electronics GmbH* vs *Apple, Inc.*, filed on Feb. 21, 2013, 6 pages.
Statement on the Preliminary Opinion in the Matter of *Motorola Mobility Germany GmbH* vs *Apple Inc.*, Feb. 21, 2013, 156 pages.
Decision to Grant Received for European Patent Application No. 06846405.6, dated Feb. 11, 2010, 2 pages.
Intention to Grant received for European Patent Application No. 06846405.6, dated Aug. 28, 2009, 4 pages.
Office Action received for European Patent Application No. 06846405.6, dated Mar. 25, 2009, 6 pages.
Extended European Search Report and Search opinion received for European Patent Application No. 09170574.9, dated Oct. 13, 2009, 8 pages.
Office Action received for European Patent Application No. 09170574.9, dated Aug. 18, 2015, 6 pages.
Office Action Received for European Patent Application No. 09170574.9, dated May 26, 2010, 1 page.
Extended European Search Report and Search Opinion received for European Patent Application No. 10194359.5, dated Feb. 7, 2011, 9 pages.
Office Action received for European Patent Application No. 10194359.5, dated Aug. 18, 2015, 6 pages.
Office Action received for Korean Patent Application No. 10-2008-7018109, dated Mar. 5, 2010, 5 pages.
Notice of Allowance received for Korean Patent Application No. 1020097011994, dated Nov. 27, 2015, 4 pages.
Office Action received for Korean Patent Application No. 10-2009-7011994, dated Aug. 8, 2013, 1 page.
Office Action received for Korean Patent Application No. 10-2009-7011994, dated Feb. 25, 2015, 8 pages.
Office Action received for Korean Patent Application No. 10-2014-7023252, dated Sep. 3, 2015, 9 pages.
Office Action received for Korean Patent Application No. 10-2014-7028441, dated Feb. 3, 2015, 7 pages.
Office Action received for Korean Patent Application No. 10-2014-7033017, dated Jun. 24, 2015, 8 pages.
Office Action received for Taiwan Patent Application No. 102102267, dated Dec. 8, 2014, 10 pages.
Office Action received for Taiwan Patent Application No. 102102267, dated May 7, 2015, 6 pages.
Office Action received for Taiwanese Patent Application No. 102102267, dated Feb. 26, 2016, 7 pages.
Final Office Action received for U.S. Appl. No. 11/322,549, dated Sep. 26, 2008, 30 pages.
Final Office Action received for U.S. Appl. No. 11/322,549, dated Mar. 23, 2009, 39 pages.
Non Final Office Action received for U.S. Appl. No. 11/322,549, dated Feb. 7, 2008, 28 pages.
Notice of Allowance received for U.S. Appl. No. 11/322,549, dated Aug. 10, 2009, 9 pages.
Non-Final Office Action received for U.S. Appl. No. 11/322,550, dated Apr. 21, 2008, 22 pages.
Non-Final Office Action received for U.S. Appl. No. 11/322,550, dated Oct. 31, 2007, 23 pages.
Notice of Allowance received for U.S. Appl. No. 11/322,550, dated Sep. 19, 2008, 12 pages.

(56) References Cited

OTHER PUBLICATIONS

Office Action received for German Patent Application No. 112006003515.0, dated Dec. 7, 2009, 4 pages.
Office Action received for German Patent Application No. 112006003515.0, dated Feb. 4, 2009, 6 pages.
Non-Final Office Action received for U.S. Appl. No. 12/207,370, dated Oct. 17, 2013, 17 pages.
Non Final Office Action received for U.S. Appl. No. 12/345,584, dated Jul. 24, 2009, 6 pages.
Non Final Office Action received for U.S. Appl. No. 12/345,584, dated Nov. 16, 2009, 17 pages.
Notice of Allowance received for U.S. Appl. No. 12/345,584, dated Jun. 3, 2010, 6 pages.
Final Office Action received for U.S. Appl. No. 12/477,075, dated Sep. 17, 2010, 9 pages.
Non Final Office Action received for U.S. Appl. No. 12/477,075, dated Feb. 7, 2011, 10 pages.
Non-Final Office Action received for U.S. Appl. No. 12/477,075, dated Jan. 29, 2010, 13 pages.
Notice of Allowance received for U.S. Appl. No. 12/477,075, dated Aug. 10, 2011, 9 pages.
Notice of Allowance received for U.S. Appl. No. 12/842,899, dated May 2, 2013, 6 pages.
Non Final Office Action received for U.S. Appl. No. 13/204,572, dated Jan. 6, 2012, 10 pages.
Notice of Allowance received for U.S. Appl. No. 13/204,572, dated Jun. 12, 2012, 8 pages.
Final Office Action received for U.S. Appl. No. 13/243,045, dated Aug. 5, 2015, 10 pages.
Non-Final Office Action received for U.S. Appl. No. 13/243,045, dated Mar. 17, 2015, 9 pages.
Non-Final Office Action received for U.S. Appl. No. 13/243,326, dated Feb. 14, 2013, 13 pages.
Notice of Allowance received for U.S. Appl. No. 13/243,326, dated Sep. 23, 2013, 11 pages.
Non Final Office Action received for U.S. Appl. No. 13/250,659, dated Nov. 25, 2011, 11 pages.
Notice of Allowance received for U.S. Appl. No. 13/250,659, dated May 11, 2012, 9 pages.
Non Final Office Action received for U.S. Appl. No. 13/563,663, dated Nov. 19, 2012, 10 pages.
Notice of Allowance received for U.S. Appl. No. 13/563,663, dated Dec. 13, 2013, 11 pages.
Notice of Allowance received for U.S. Appl. No. 13/563,663, dated Aug. 15, 2013, 11 pages.
Non-Final Office Action received for U.S. Appl. No. 13/744,349, dated Apr. 9, 2014, 31 pages.
Notice of Allowance received for U.S. Appl. No. 13/744,349, dated Aug. 12, 2015, 9 pages.
Notice of Allowance received for U.S. Appl. No. 13/744,349, dated Oct. 17, 2014, 10 pages.
Notice of Allowance received for U.S. Appl. No. 13/787,712, dated Jun. 25, 2013, 10 pages.
Notice of Allowance received for U.S. Appl. No. 13/787,716, dated Sep. 5, 2013, 10 pages.
Notice of Allowance received for U.S. Appl. No. 13/791,799, dated Apr. 1, 2014, 9 pages.
Notice of Allowance received for U.S. Appl. No. 13/791,799, dated Jan. 21, 2014, 9 pages.
Notice of Allowance received for U.S. Appl. No. 13/791,799, dated Jun. 17, 2013, 10 pages.
Notice of Allowance received for U.S. Appl. No. 13/791,799, dated Oct. 30, 2013, 11 pages.
Non Final Office Action received for U.S. Appl. No. 13/791,808, dated Sep. 11, 2013, 13 pages.
Notice of Allowance received for U.S. Appl. No. 13/791,808, dated Feb. 3, 2014, 9 pages.
*HTC Europe Co. Ltd.* vs *Apple Inc.*, Nullity Reply Brief filed on Nov. 8, 2012, 17 pages.

Translation of German Nullity Action Complaint against European Patent Application No. 1964022 (DE No. 602006012876.2), filed on Dec. 15, 2010, 37 pages.
1TapVideo, available at <http://www.1tapps.com/app/1tapvideo_one_tap_video/>, retrieved on Nov. 20, 2014, 3 pages.
New App Launch: 1TapVideo—Instant Video Recording for iOS—Quick-Start Video Camera, available at http://www.1tapps.com/2011/10/10/new-app-launch-1tapvideo-instant-video-recording-for-ios-quick-start-video-camera/, Oct. 10, 2011, 2 pages.
Office Action received for Chinese Patent Application No. 200680052770.4, dated Feb. 5, 2010, 4 pages.
Office Action received for Japanese Patent Application No. 2008-547675, dated Nov. 4, 2011, 6 pages.
Office Action received for Japanese Patent Application No. 2008-547675, dated Sep. 18, 2012, 4 pages.
Office Action received for Japanese Patent Application No. 2008-547675, dated Mar. 22, 2011, 5 pages.
Office Action received for Chinese Patent Application No. 200910175855.7, dated Jul. 26, 2011, 13 pages.
Office Action received for Chinese Patent Application No. 200910175855.7, dated Jul. 4, 2012, 15 pages.
Office Action received for Chinese Patent Application No. 200910175855.7, dated Aug. 5, 2015, 18 pages.
Notice of Acceptance received for Australian Patent Application No. 2010200661, dated Aug. 2, 2012, 3 pages.
Office Action received for Australian Patent Application No. 2010200661, dated Jul. 20, 2011, 2 pages.
Certificate of Grant received for Australian Patent Application No. 2011101192, dated Apr. 12, 2012, 1 page.
Office Action received for Australian Patent Application No. 2011101192, dated Oct. 26, 2011, 2 pages.
Certificate of Grant received for Australian Patent Application No. 2011101193, dated Apr. 23, 2012, 1 page.
Office Action received for Australian Patent Application No. 2011101193, dated Oct. 26, 2011, 2 pages.
Notice of Allowance received for Japanese Patent Application No. 2012-091352, dated May 24, 2013, 3 pages.
Notice of Acceptance received for Australian Patent Application No. 2012254900, dated Jul. 30, 2015, 2 pages.
Office Action received for Australian Patent Application No. 2012254900, dated Nov. 28, 2013, 3 pages.
Office Action received for Australian Patent Application No. 2012254900, dated May 29, 2015, 4 pages.
Notice of Allowance received for Japanese Patent Application No. 2013-007818, dated May 31, 2013, 4 pages.
Office Action received for Japanese Patent Application No. 2013-007818 dated Mar. 11, 2013, 5 pages.
Notice of Allowance received for Japanese Patent Application No. 2013-101691, dated Jul. 5, 2013, 4 pages.
Notice of Acceptance received for Australian Patent Application No. 2013209538, dated Mar. 2, 2016, 3 pages.
Office Action received for Australian Patent Application No. 2013209538, dated Apr. 21, 2015, 5 pages.
Office Action received for Japanese Patent Application No. 2014-553464, dated Oct. 2, 2015, 10 pages.
Office Action received for Indian Patent Application No. 3347/CHENP/2008, dated Aug. 5, 2013, 2 pages.
Mac OS X 10.7 Lion: New Multitouch Gestures, Dock Integration for Exposé, Launchpad, Mission Control, available at http://appleinsider.com/articles/11/04/14/mac_os_x_10_7_lion_new_multitouch_gestures_dock_integration_for_expos_launchpad_mission_control, Apr. 14, 2011, 11 pages.
Bardram, Jakob E.. "The Trouble with Login: on Usability and Computer Security in Ubiquitous Computing, Journal Personal and Ubiquitous Computing", Journal Personal and Ubiquitous Computing, vol. 9, Jul. 23, 2005, pp. 357-367.
Baudisch, et al., "Phosphor: Explaining Transitions in the User Interface Using Afterglow Effects", Proceedings of the 19th Annual ACM Symposium on User Interface Software and Technology, Oct. 15-18, 2006, pp. 169-178.

(56) References Cited

OTHER PUBLICATIONS

DailyTech, "Analysis: Neonode Patented Swipe-to-Unlock 3 Years Before Apple", available at http://www.dailytech.com/Analysis+Neonode+Patented+SwipetoUnlock+3+Years+Before+Apple/article24046.htm, Feb. 20, 2012, 4 pages.
Tip: Quick Access to Camera from Lock Screen!, Microsoft Community, available at http://answers.microsoft.com/en-us/winphone/forum/wp7-wptips/tip-quick-access-to-camera-from-lock-screen/3ce6b2ac-da6e-4f2e-a98f-8f8ff41f5194, Nov. 11, 2010, 1 page.
Feng et al., "Continuous Remote Mobile Identity Management Using Biometric Integrated Touch-Display", 45th Annual IEEE/ACM International Symposium on Microarchitecture Workshops (MICROW), 2012, pp. 55-62.
Fitzpatrick et al., "Method for Access Control via Gestural Verification", IBM Technical Disclosure Bulletin, vol. 36, No. 9B, Sep. 1993, pp. 487-488.
GridLock 1.32, "Graphical Security System for your Palm", available at http://gridlock.en.softonic.com/palm, Oct. 8, 2003, 2 pages.
Horry et al., "A Passive-Style Buttonless Mobile Terminal", IEEE Transactions on Consumer Electronics; vol. 49; No. 3, Aug. 2003, pp. 530-535.
IBM, "Touch Pad Authentication", Sep. 21, 2004, 2 pages.
Itachio, "Camera Icon Lock Screen & Easier Way to Organize Folders", available athttps://getsatisfaction.com/apple/topics/camera_icon_lock_screen_easier_way_to_organize_folders, 2010, 2 pages.
Jansen, Wayne A., "Authenticating Users on Handheld Devices", Contribution of the National Institute of Standards and Technology, 2003, 13 pages.
Jermyn et al., "The Design and Analysis of Graphical Password", Proceedings of the 8th USENIX Security Symposium, Aug. 23-26 1999, 15 pages.
JGUI Professional, "Touch Password Protection", available at <http://www.jgui.net/touch/index.html>, retrieved on Dec. 30, 2005, 4 pages.
Launch Apps from Lockscreen?, available at http://forums.macrumors.com/showthread.php?t=983261, Aug. 2, 2010, 3 pages.
Snappy, iPhone Camera App that Launches W/O Exiting Running App, available at https://www.youtube.com/watch?v=67af4R5J5yY, Nov. 14, 2009, 2 pages.
McLean et al., "Access/Control Icons (Icon Keys)", version 0.5, Apr. 1995, pp. 407-409.
Mei, Pu-Hua, "An Introduction to Digital Camera Signal Processor", available at http://www.slideserve.com/lacey/an-introduction-to-digital-camera-signal-processor, Jan. 2012, 36 pages.
Miniman, Brandon, "Windows Phone 7 Digital Photography Features (Video)", available at http://pocketnow.com/windows-phone/windows-phone-7-digital-photography-features-video, Aug. 28, 2010, 3 pages.
Molen, Brad, "Android 4.0 Ice Cream Sandwich Review", available at <http://www.engadget.com/2011/12/01/android-4-0-ice-cream-sandwich-review/>, retrieved on Aug. 25, 2014, 45 pages.
Monrose, Newman Fabian., "Towards Stronger User Authentication", A Dissertation Submitted in Partial Fulfilment of the Requirements for the Degree of Doctor of Philosophy Department of Computer Science, New York University, May 1999, 130 pages.
Nagy, Anton D., "HTC HD2 Camera Launch While Locked", available at http://pocketnow.com/windows-phone/htc-hd2-camera-launch-while-locked, Sep. 9, 2010, 3 pages.
Najjar, Lawrence J., "Graphical Passwords", International Technology Disclosures, vol. 10, No. 1, Jan. 25, 1992, 1 page.
Nakamura, Asami, "iPhone 4S & iOS 5 Start Guide", Mynavi Corporation, MacFan, Special Supplement, Dec. 2011, pp. 26, 54, 77 and 114-115.
Neonode Inc., "Welcome to the N1 Guide", available at http://www.ebookspdf.com/gadget/2818/neonode-n1m-manual/, Jul. 2004, pp. 1-42.
Neonode.com, "N1 Quick Start Guide", Version 0.5, Apr. 5, 2005, pp. 1-24.

Ni et al., "DiffUser: Differentiated User Access Control on Smartphones", IEEE 6th International Conference on Mobile Adhoc and Sensor Systems, 2009, pp. 1012-1017.
Nozawa, Naoki, "iPad Perfect Manual for iOS 4", First Edition Second Issue, Sotechsha Co., Ltd, Jun-Ichi Yanagisawa, Jan. 31, 2011, 5 pages.
Numata, Satoshi, "Advanced Guide to iOS 5 Programming", "Answer Book iOS Programming First Edition, Shuwa System Co., Ltd., First Edition First Issue", Jan. 1, 2012, 5 pages.
Partizann, "Thread: Launch Native Camera App in Video Mode", available at http://developer.nokia.com/community/discussion/showthread.php/229643-Launch-native-camera-app-in-video-mode, Oct. 18, 2011, 2 pages.
International Preliminary Report on Patentability received for PCT Patent Application No. PCT/US2006/061370, dated Jun. 24, 2008, 7 pages.
International Search Report and Written Opinion received for PCT Application No. PCT/US2006/061370, dated May 25, 2007, 9 pages.
International Search Report and Written Opinion received for PCT Application No. PCT/US2006/061380, dated Apr. 23, 2007, 7 pages.
International Preliminary Report on Patentability received for PCT Patent Application No. PCT/US2013/022197, dated Jul. 31, 2014, 11 pages.
International Search Report and Written Opinion received for PCT Patent Application No. PCT/US2013/022197, dated Jul. 9, 2013, 15 pages.
Plaisant, et al., "Touchscreen Toggle Design ", CHI'92, May 3-7, 1992, pp. 667-668.
Qt Creator, "Launching the Debugger", available at <http://doc.qt.digia.com/qtcreator-2.4/creator-debugger-operating-modes.html>, retrieved on Aug. 25, 2014, 2 pages.
Renaud, et al., "My Password is Here! An Investigation into Visuo-Spatial Authentication Mechanisms", Interacting with Computers, vol. 16, 2004, pp. 1017-1041.
Shima, Toru, "Galaxy Nexus" with Android 4.0 Released!, Ascii Media Works Co., Ltd., vol. 23, No. 860, Dec. 6, 2011, 5 pages.
Wiedenbeck, et al., "PassPoints: Design and Longitudinal Evaluation of a Graphical Password System", International Journal of Human-Computer Studies, vol. 63, 2005, pp. 102-127.
Windows Phone, "Locked Phone: Things You Can Still Do", "available at <http://www.windowsphone.com/en-us/how-to/wp7/basics/locked-phone-things-you-can-still-do>, retrieved on Jun. 18, 2013", 3 pages.
XDAdevelopers, "Launch Android Camera in Video Mode", available at http://forum.xda-developers.com/showthread.php?t=1463070, Jan. 25, 2012, 2 pages.
Xiao et al., "A Facial Presence Monitoring System for Information Security", IEEE Workshop on Computational Intelligence in Biometrics: Theory, Algorithms, and Applications, 2009, 8 pages.
Advisory Action received for U.S. Appl. No. 13/744,343, dated Jul. 30, 2015, 5 pages.
Final Office Action received for U.S. Appl. No. 13/744,343, dated Mar. 27, 2015, 27 pages.
Non-Final Office Action received for U.S. Appl. No. 13/744,343, dated May 29, 2014, 31 pages.
Notice of Allowance received for U.S. Appl. No. 13/744,343, dated Oct. 1, 2015, 13 pages.
Notice of Allowance received for U.S. Appl. No. 13/744,343, dated Aug. 28, 2015, 16 pages.
Notice of Allowance received for U.S. Appl. No. 13/744,343, dated Feb. 17, 2016, 7 pages.
Neonode N1m, available online at : http://www.gsmarena.com/neonode_n1m-pictures-1137.php, May 18, 2005, 4 pages.
Office Action received for European Patent Application No. 09170574.9, dated May 3, 2016, 6 pages.
Office Action received for Japanese Patent Application No. 2014-553464, dated Apr. 22, 2016, 6 pages (3 pages of English Translation and 3 pages of Official copy).
Office Action received for Korean Patent Application No. 10-2014-7023252, dated Apr. 29, 2016, 9 pages (4 pages of English Translation and 5 pages of Official Copy).

(56) References Cited

OTHER PUBLICATIONS

Office Action received for Korean Patent Application No. 10-2016-7005576, dated May 20, 2016, 9 pages (4 pages of English Translation and 5 pages of Official Copy).
Notice of Allowance received for Korean Patent Application No. 10-2014-7028441, dated Dec. 23, 2015, 4 pages (1 page of English Translation and 3 pages of Official Copy).
Notice of allowance received for Korean Patent Application No. 10-2014-7033017, dated Dec. 23, 2015, 4 pages (1 page of English Translation and 3 pages of Official Copy).
Heath, Alex, "Weird iOS 5 Bug Lets Prying Eyes View Saved Photos on a Locked iPhone", available at http://www.cultofmac.com/137827/weird-ios-5-bug-lets-preying-eyes-view-saved-photos-on-a-locked-iphone/, Jan. 3, 2013, 7 pages.
Kotov, Anton, "Review GSM phone Neonode N1m", available at http://web.archive.org/web/20050730004341/http://www.mobile-review.com/review/neonode-n1m-en.shtml, Jul. 30, 2005, 18 pages.
Plaisant, et al., "Touchscreen Toggle Switches: Push or Slide? Design Issues and Usability Study", available online at : http://hcil2.cs.umd.edu/trs/90-08/90-08.pdf, Nov. 1990, 11 pages.
Notice of Allowance received for Korean Patent Application No. 10-2016-7005576, dated Mar. 29, 2017, 5 pages (2 pages of English Translation and 3 pages of Offical Copy).
Office Action received for Australian Patent Application No. 2016203731, dated Mar. 23, 2017, 4 pages.
Office Action received for Korean Patent Application No. 10-2014-7023252, dated Mar. 15, 2017, 10 pages (5 pages of English Translation and 5 pages of Official Copy).
Office Action received for Chinese Patent Application No. 2009101758557, dated Sep. 26, 2016, 6 pages (3 pages of English Translation and 3 pages of Official Copy).
Office Action received for Chinese Patent Application No. 201380015521.8, dated Jul. 27, 2016, 16 pages (3 pages of English Translation and 13 pages of Official copy).
Office Action received for Australian Patent Application No. 2015255304, dated Dec. 2, 2016, 2 pages.
Office Action received for European Patent Application No. 13702856.9, dated Dec. 14, 2016, 9 pages.
Office Action received for Korean Patent Application No. 10-2014-7023252, dated Nov. 24, 2016, 8 pages (3 pages of English Translation and 5 pages of Official Copy).
Summons to attend Oral proceedings received for European Patent Application No. 09170574.9, dated Dec. 23, 2016, 10 pages.
"N1 Quick Start Guide", Version 0.5, Available at <http://www.instructionsmanuals.com/download/telefonos_movii/Neonode-N1-en.pdf>, Jul. 29, 2004, pp. 9 and 11.
Office Action received for Chinese Patent Application No. 2009101758557, dated Apr. 10, 2017, 12 pages (5 pages of English translation and 7 pages of Official Copy).
Office Action received for Chinese Patent Application No. 201380015521.8, dated Apr. 1, 2017, 14 pages (3 pages of English Translation and 11 pages of Official Copy).
"N1 Quick Start Guide", Available at <URL:http://www.instructionsmanuals.com/download/telefonos_movii/Neonode-N1-en.pdf>, 24 pages.
Notice of Acceptance received for Australian Patent Application No. 2015255304, dated Jan. 27, 2017, 3 pages.
Summons to Attend Oral Proceedings received for European Patent Application No. 10194359.5, dated Feb. 2, 2017, 8 pages.
Notice of Allowance received for Korean Patent Application No. 10-2017-7018196 dated Sep. 29, 2017, 2 pages (Official Copy only) (see attached 37 CFR § 1.98(a) (3)).
Notice of Allowance received for Chinese Patent Application No. 200910175855.7, dated Dec. 6, 2017, 2 pages (1 page of English Translation and 1 page of Official Copy).
Notice of Allowance received for Chinese Patent Application No. 201380015521.8, dated Dec. 1, 2017, 2 pages (1 page of English Translation and 1 page of official copy).
Intention to Grant received for European Patent Application No. 09170574.9, dated Jun. 20, 2017, 7 pages.
Supplemental to the Summons for Oral Proceedings received for German Patent Application No. 112006003515.0, dated Jun. 8, 2017, 15 pages (7 pages of English Translation and 8 pages of Official Copy).
Decision to Refuse received for European Patent Application No. 10194359.5, dated Jul. 19, 2017, 35 pages.
Office Action received for Japanese Patent Application No. 2016-160214, dated Jul. 3, 2017, 7 pages (3 pages of English Translation and 4 pages of Official Copy).
Intention to Grant received for European Patent Application No. 09170574.9, dated Oct. 5, 2017, 9 pages.
Non-Final Office Action received for U.S. Appl. No. 14/248,255, dated Aug. 10, 2017, 32 pages.
Office Action received for Taiwanese Patent Application No. 102102267, dated Aug. 23. 2017, 6 Pages (3 pages of English Translation and 3 pages of Official Copy).
Office Action received for Chinese Patent Application No. 201380015521.8, dated Aug. 1, 2017, 6 pages (3 pages of English Translation and 3 pages of Official Copy).
Notice of Allowance received for Japanese Patent Application No. 2016-160214, dated Mar. 30, 2018, 4 pages (1 page of English Translation and 3 pages of Official copy).
Office Action received for Korean Patent Application No. 10-2017-7010440, dated Feb. 20, 2018, 10 pages (4 pages of English Translation and 6 pages of Official Copy).
Notice of Allowance received for Taiwanese Patent Application No. 102102267, dated Mar. 13, 2018, 5 pages (2 pages of English Translation and 3 pages of Official Copy).

\* cited by examiner

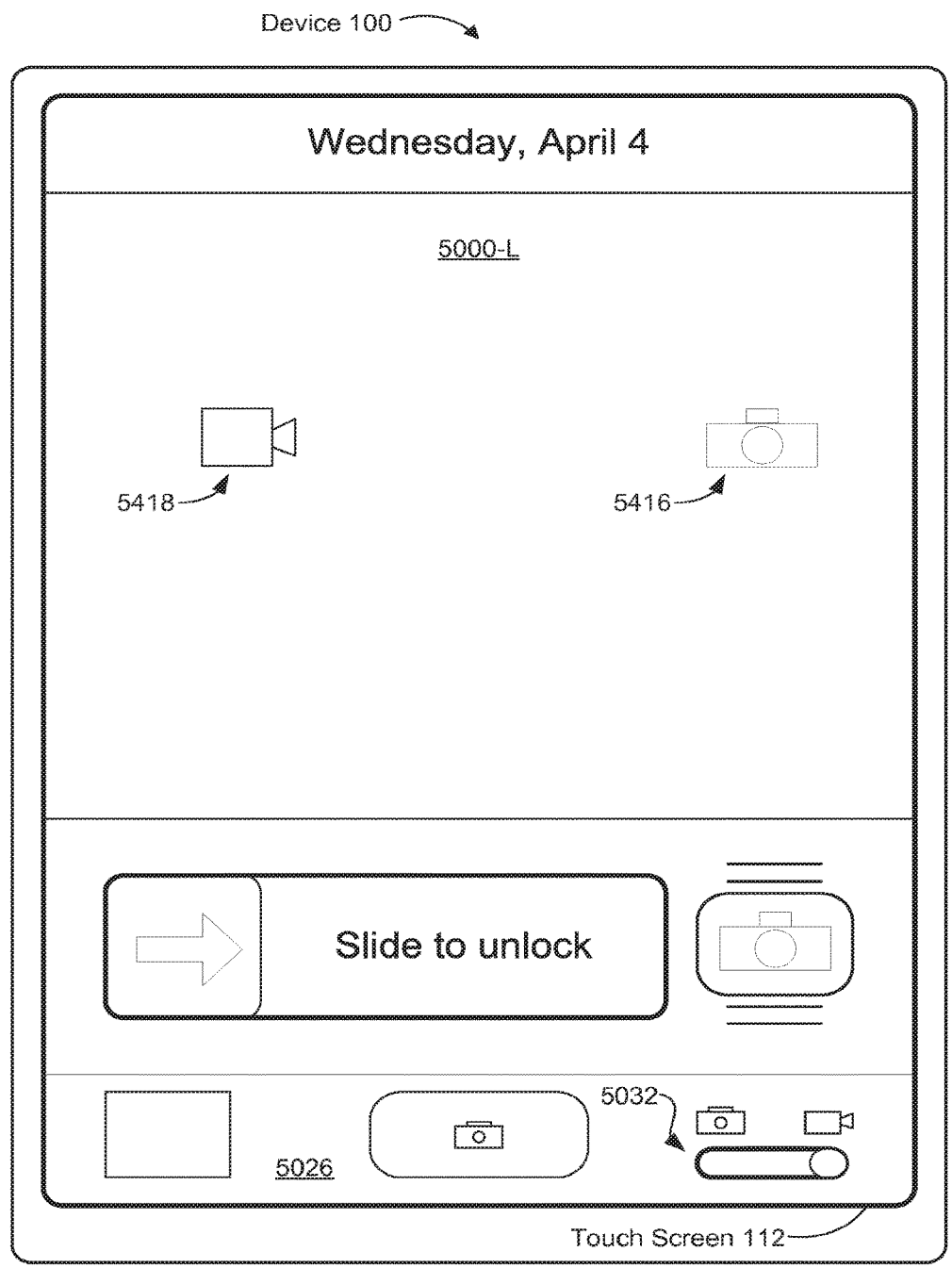
Figure 5AAA

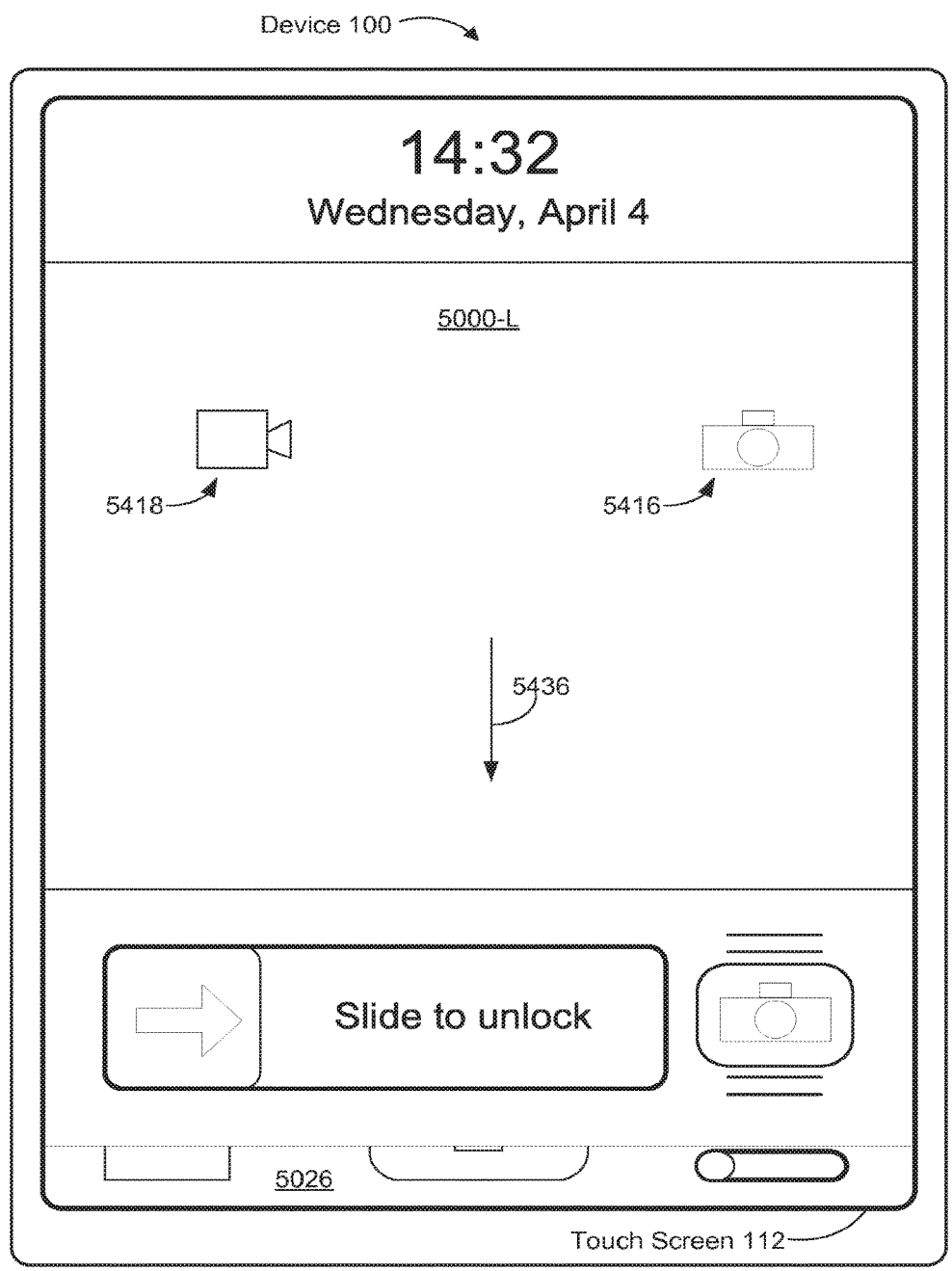
Figure 5BBB

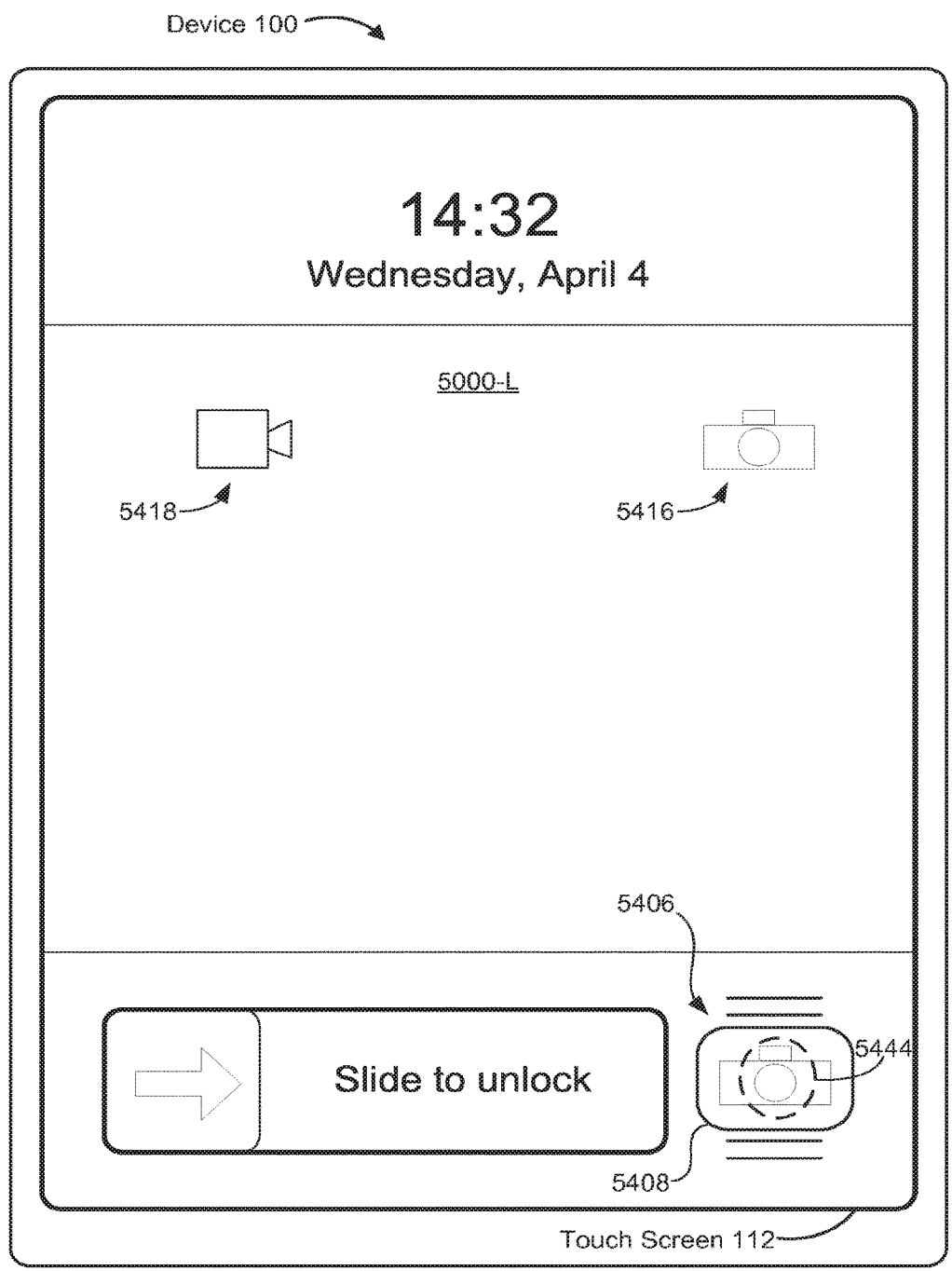
Figure 5CCC

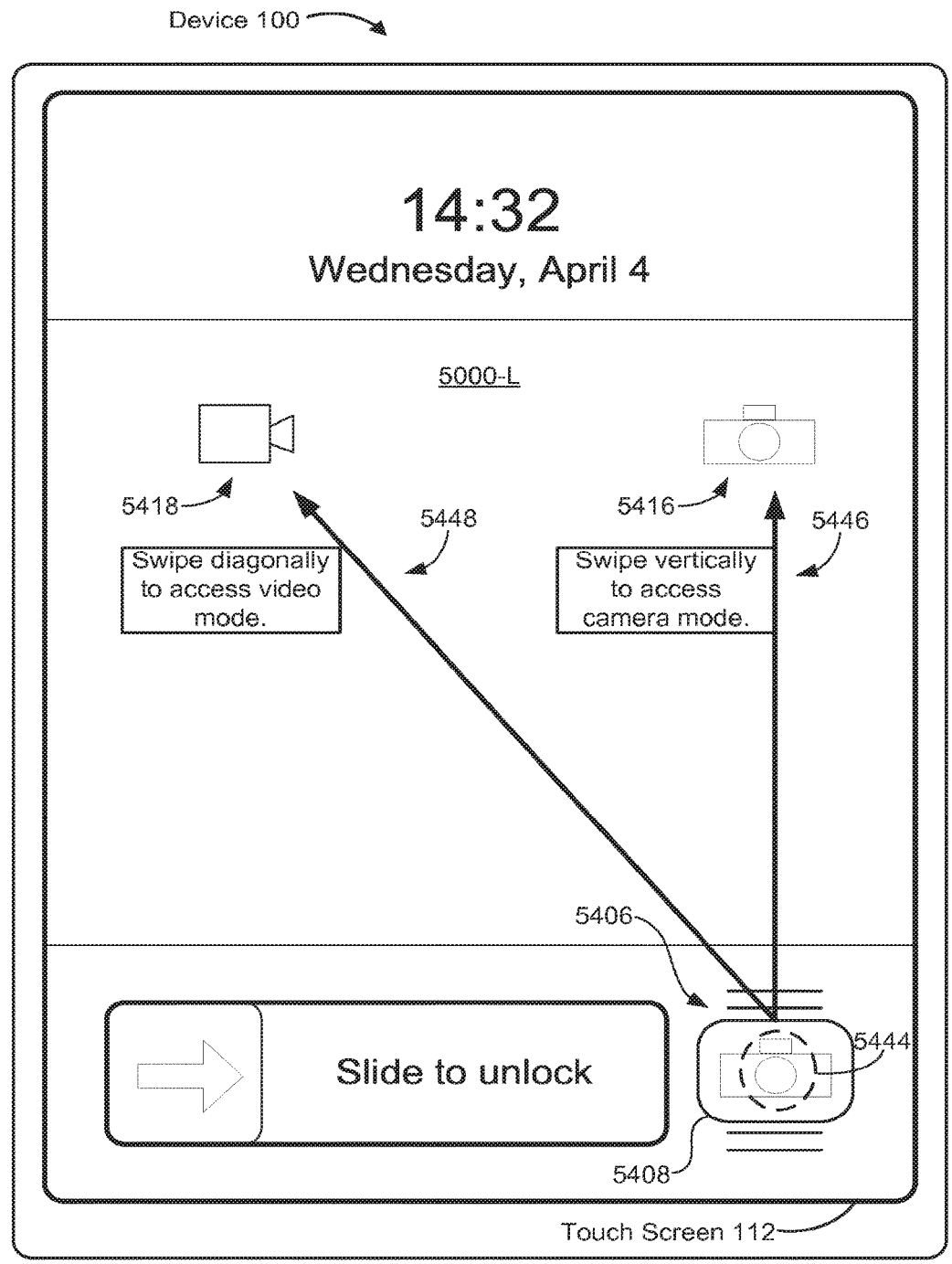
Figure 5DDD

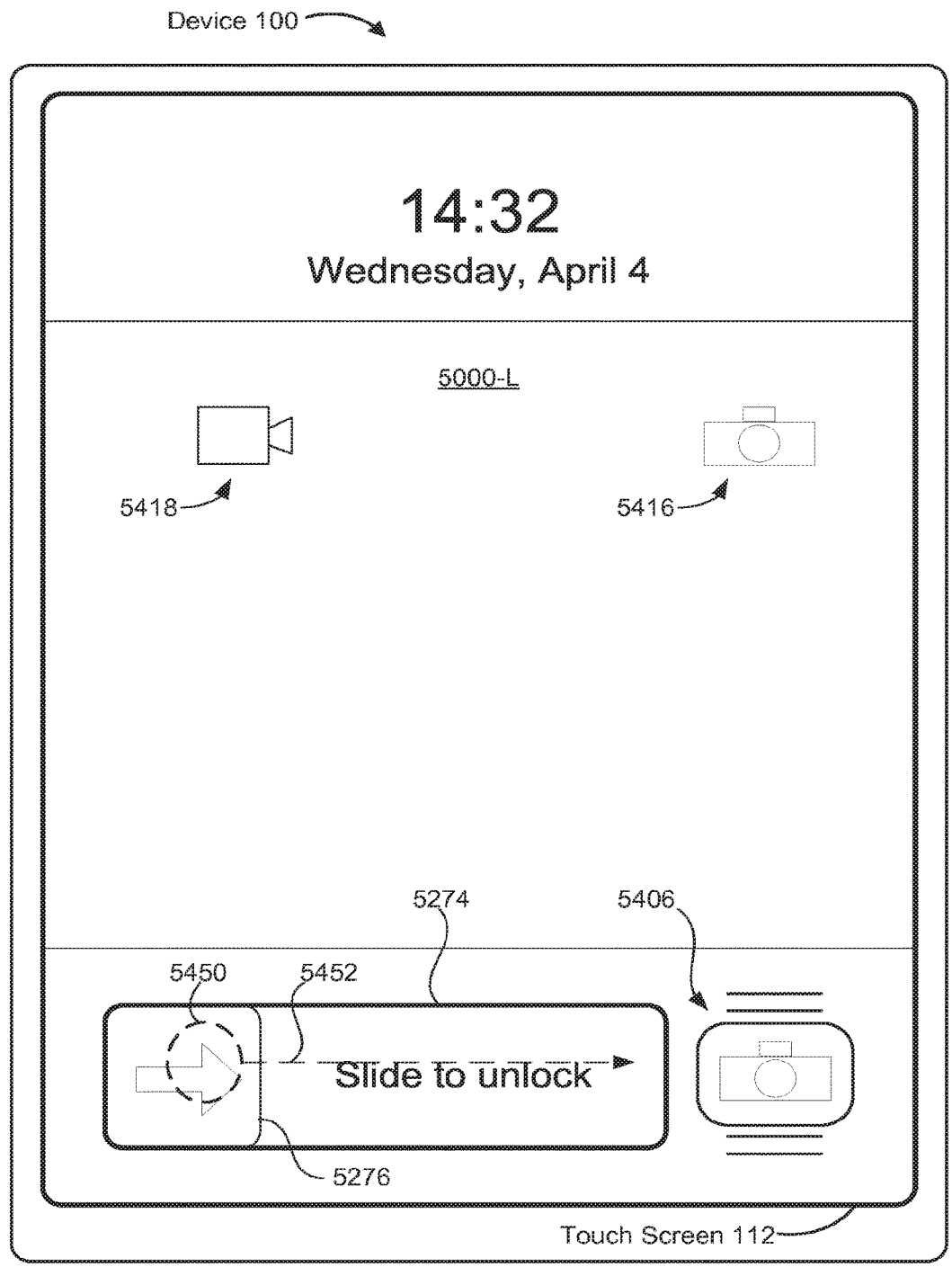
Figure 5EEE

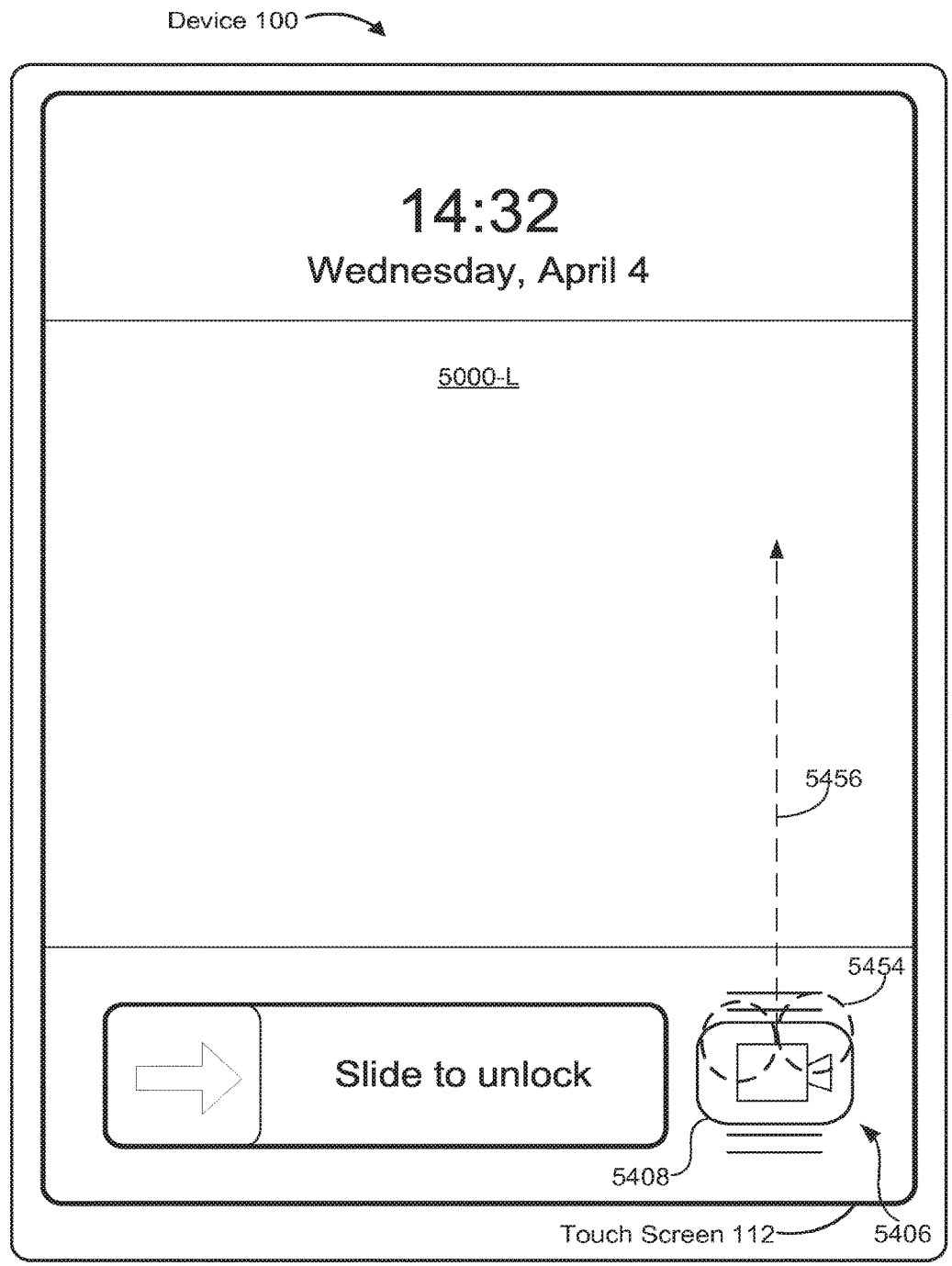
Figure 5FFF

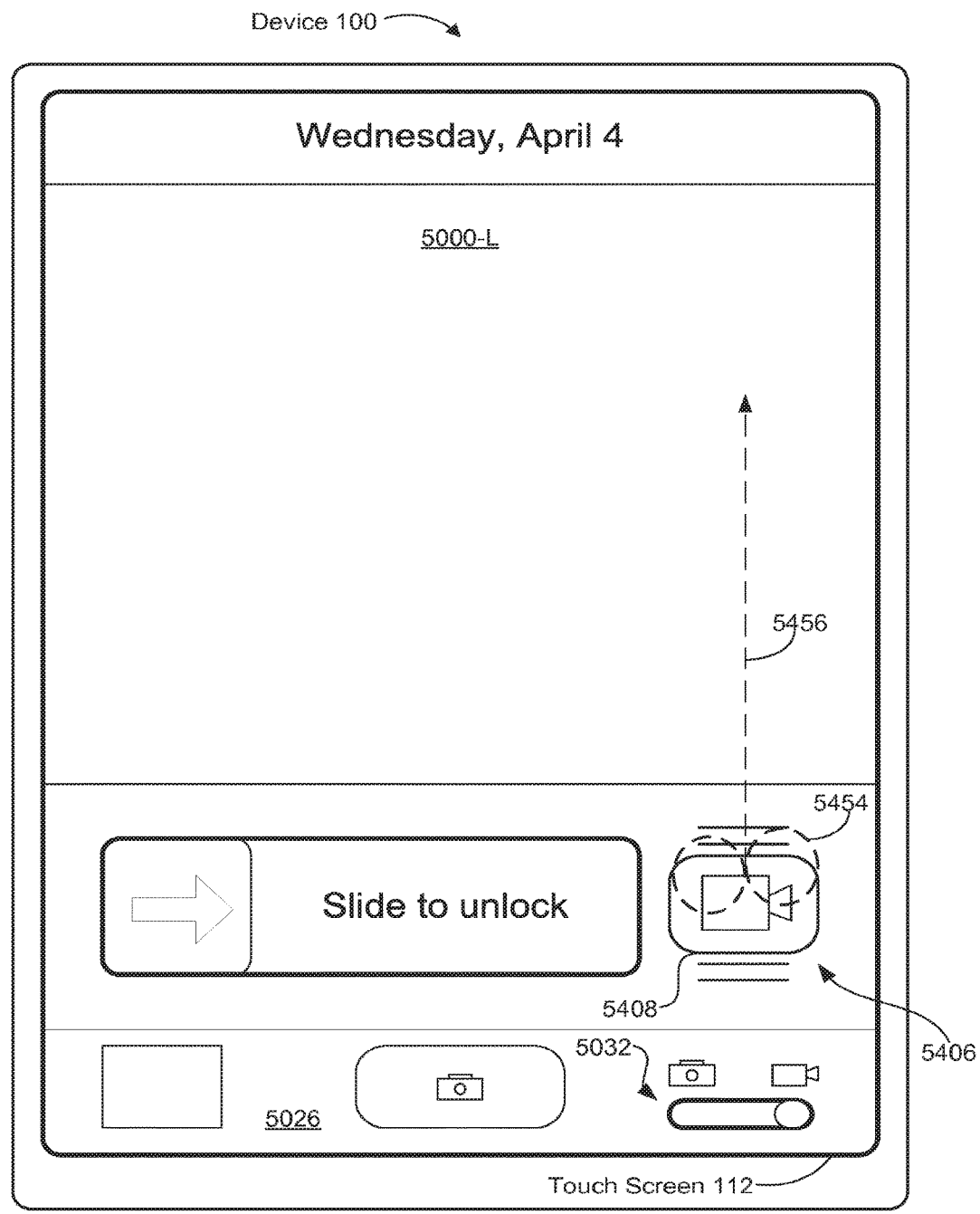
Figure 5GGG

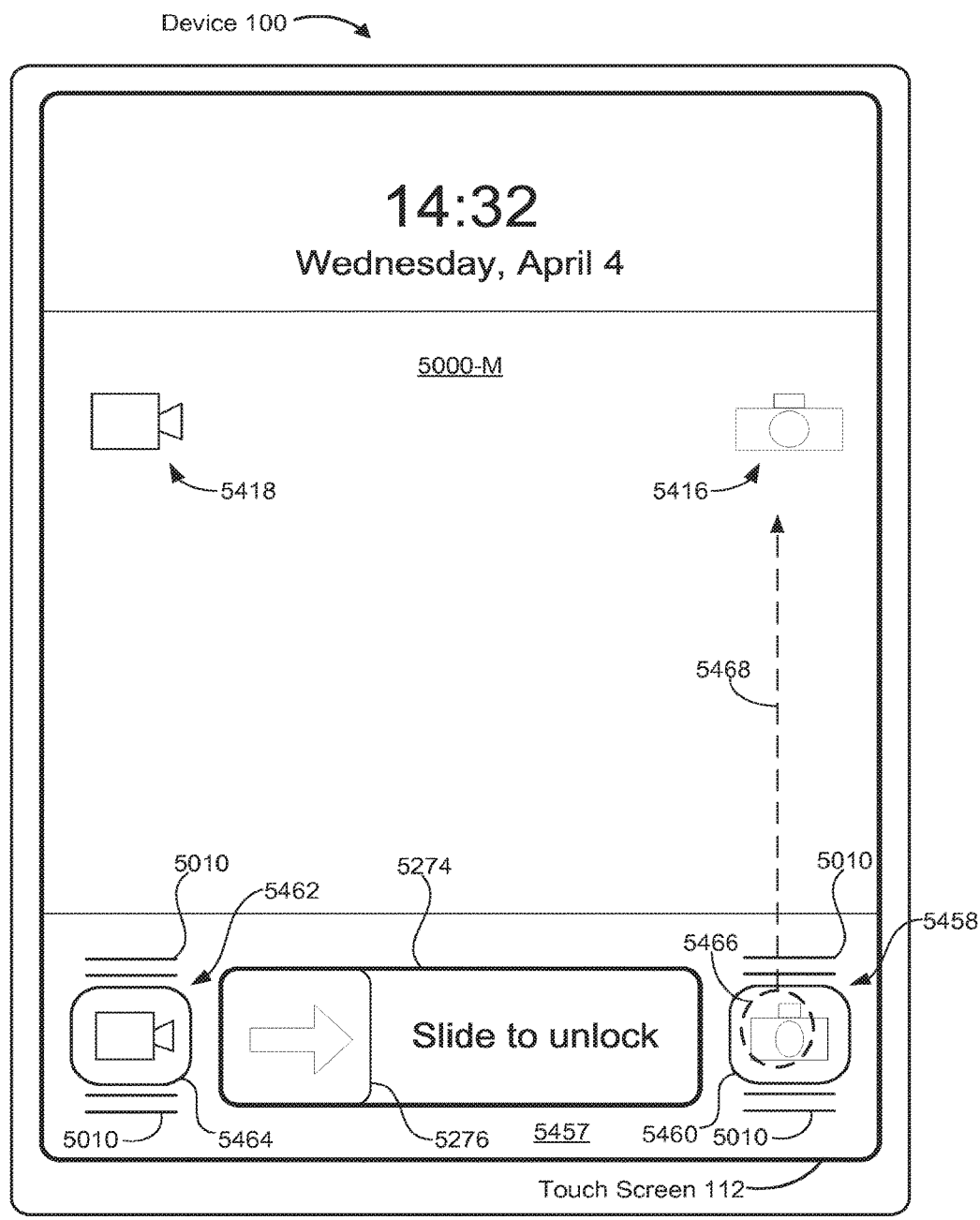
Figure 5HHH

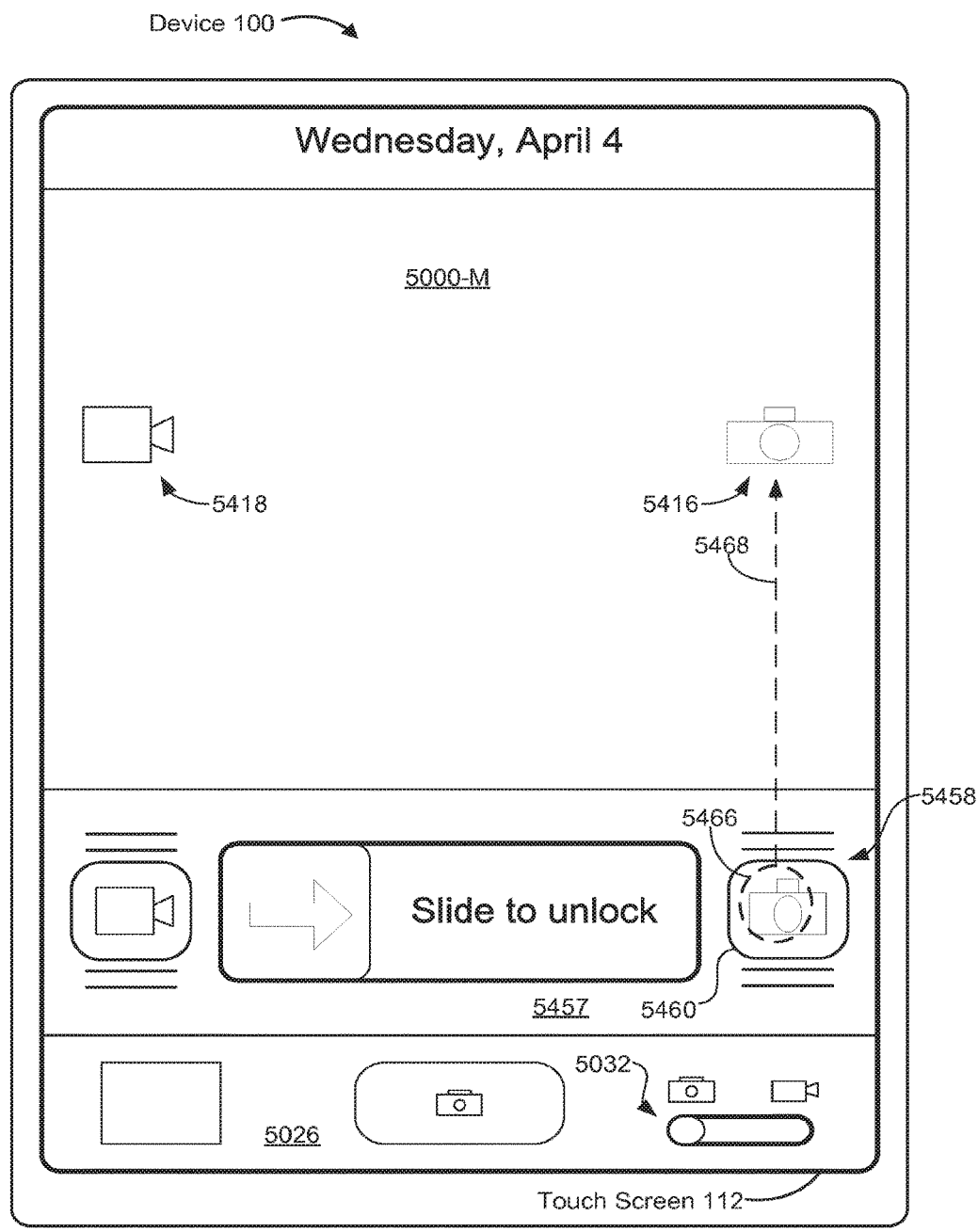
Figure 5III

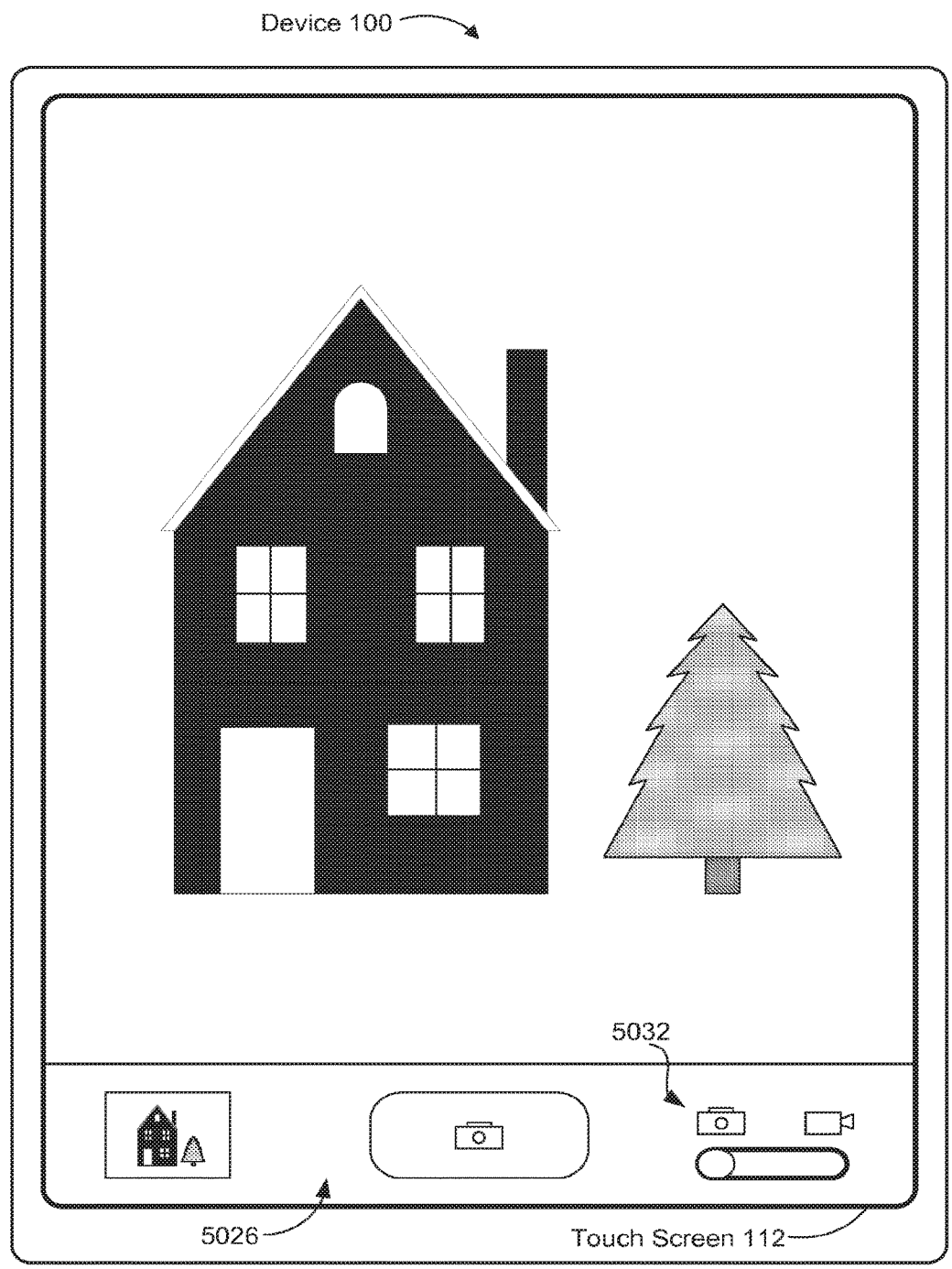
Figure 5JJJ

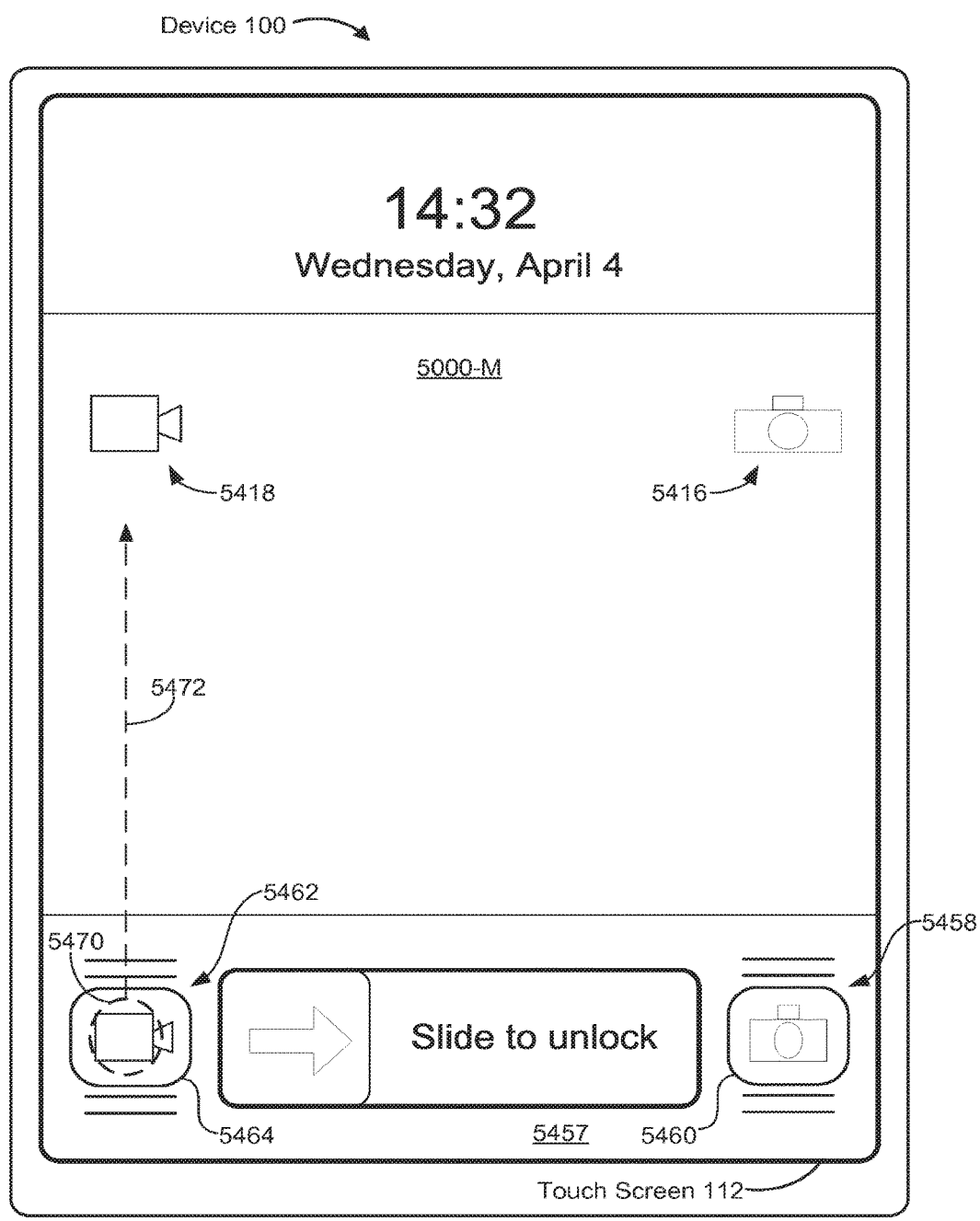
Figure 5KKK

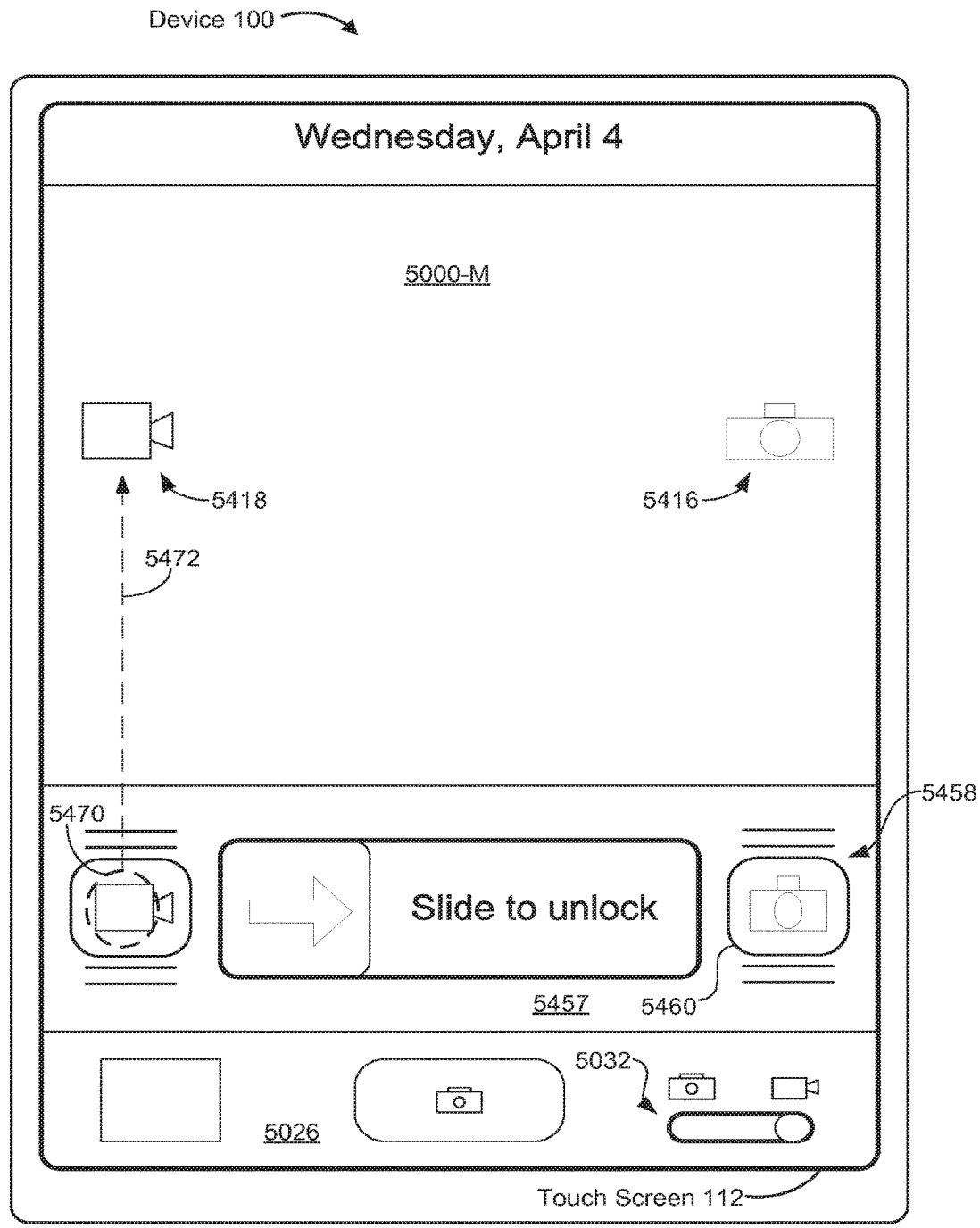
Figure 5LLL

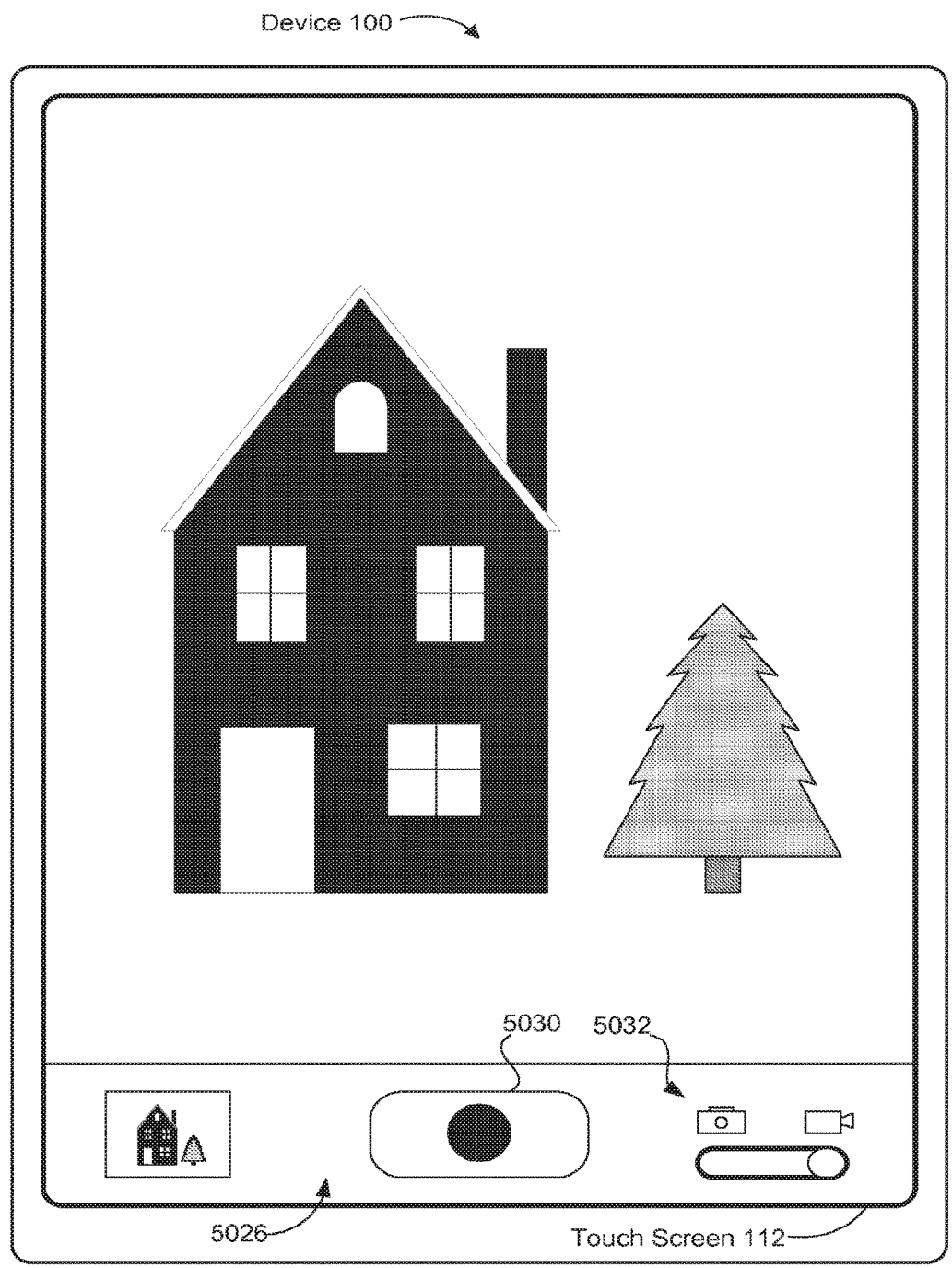
Figure 5MMM

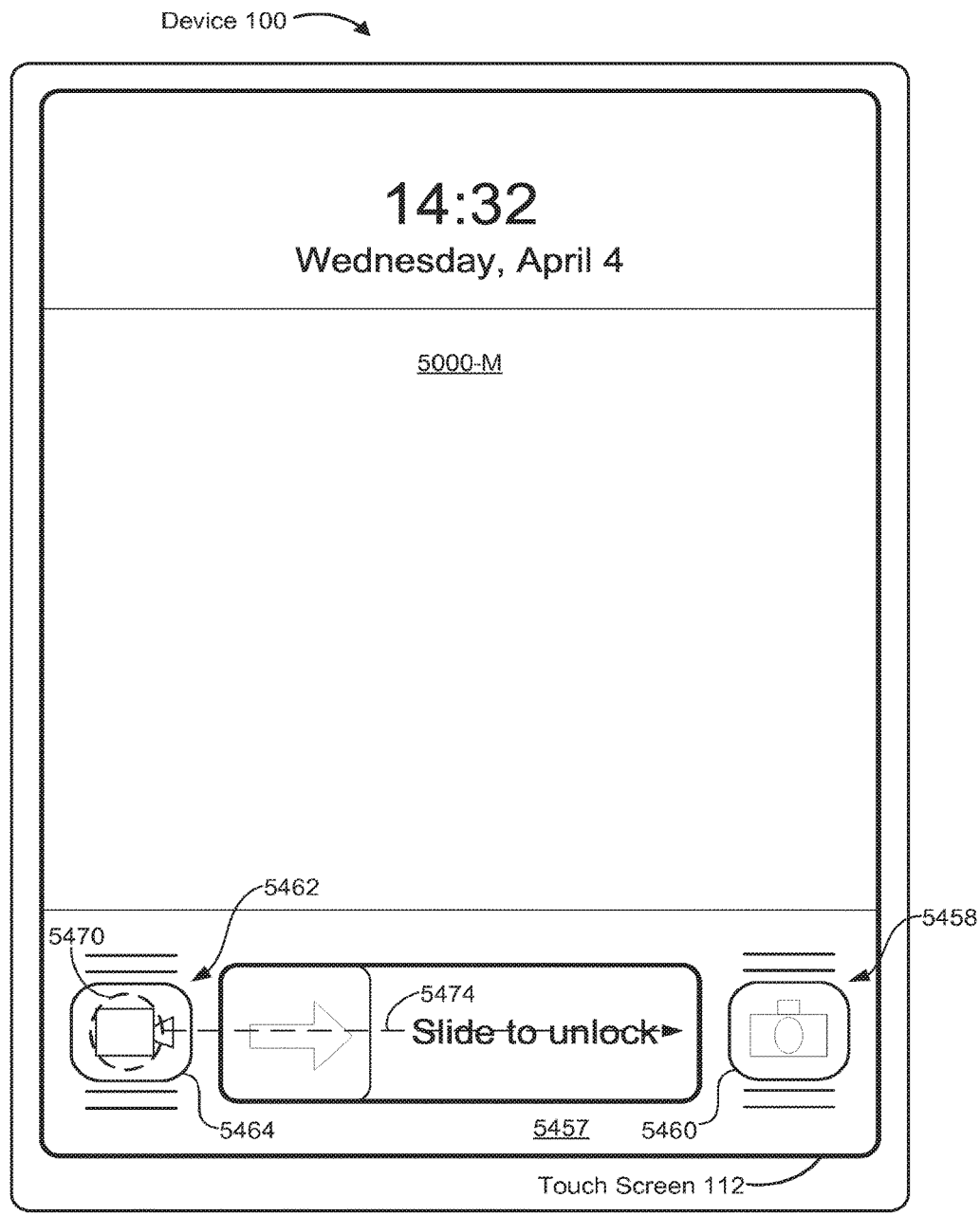
Figure 5NNN

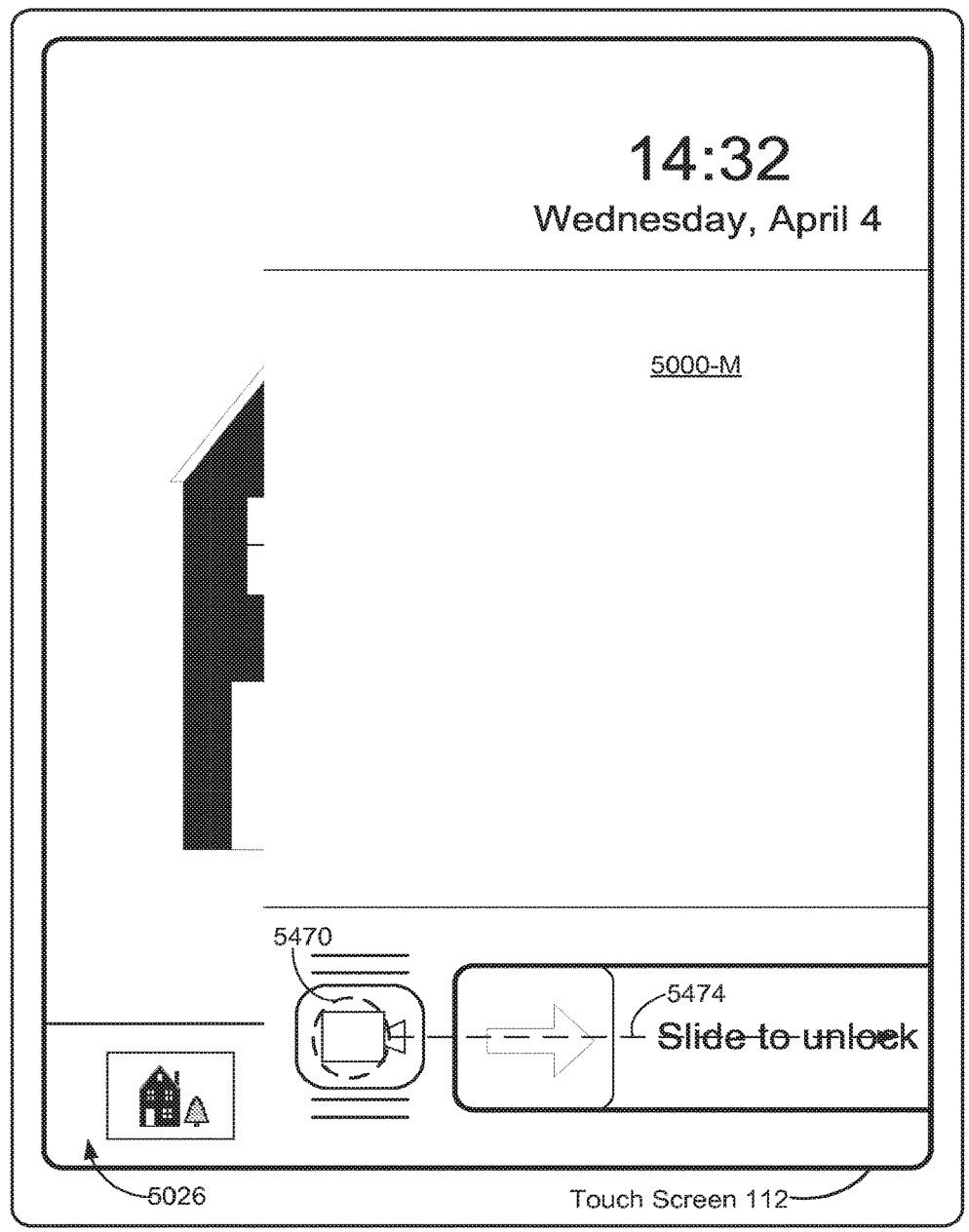
Figure 5OOO

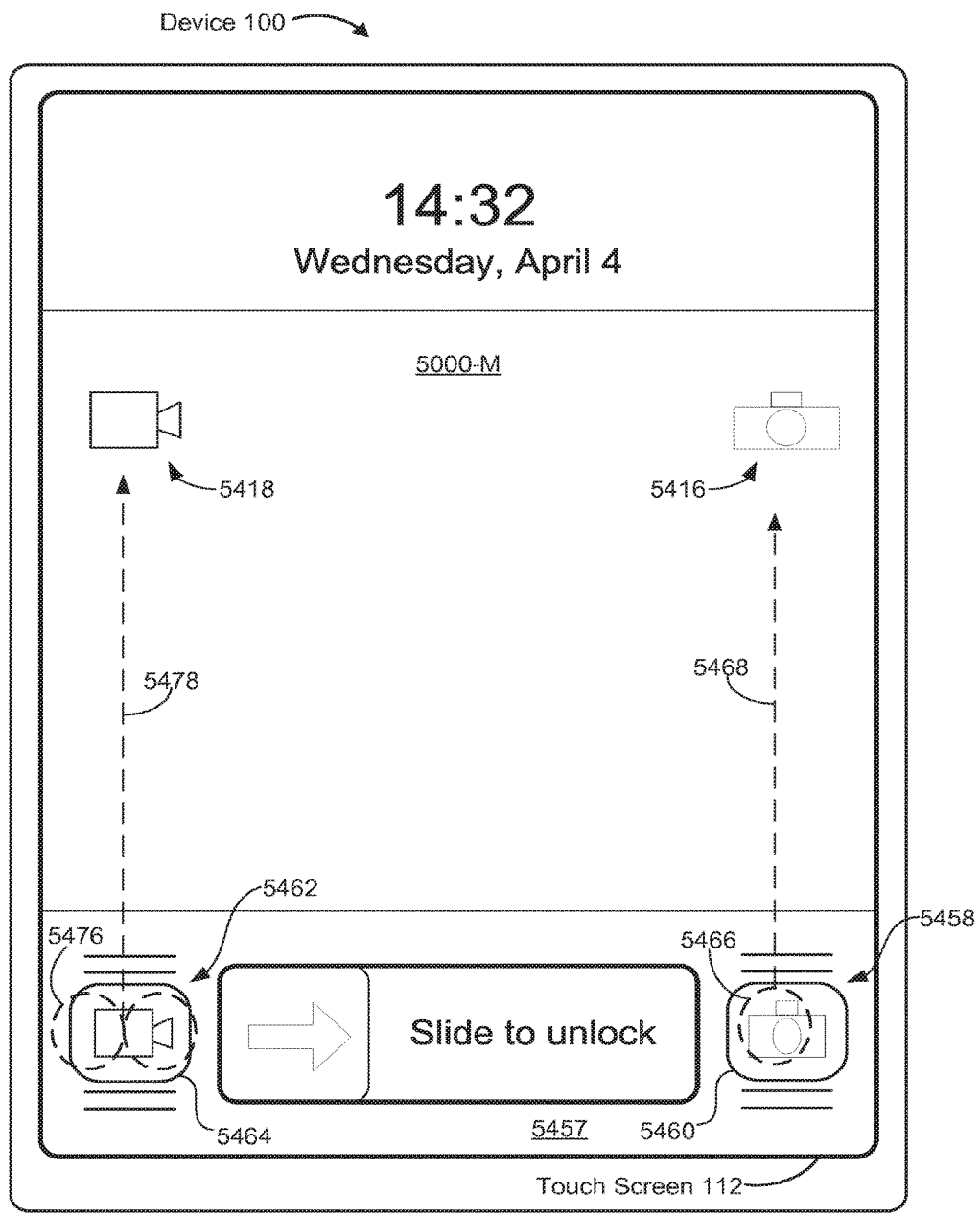
Figure 5PPP

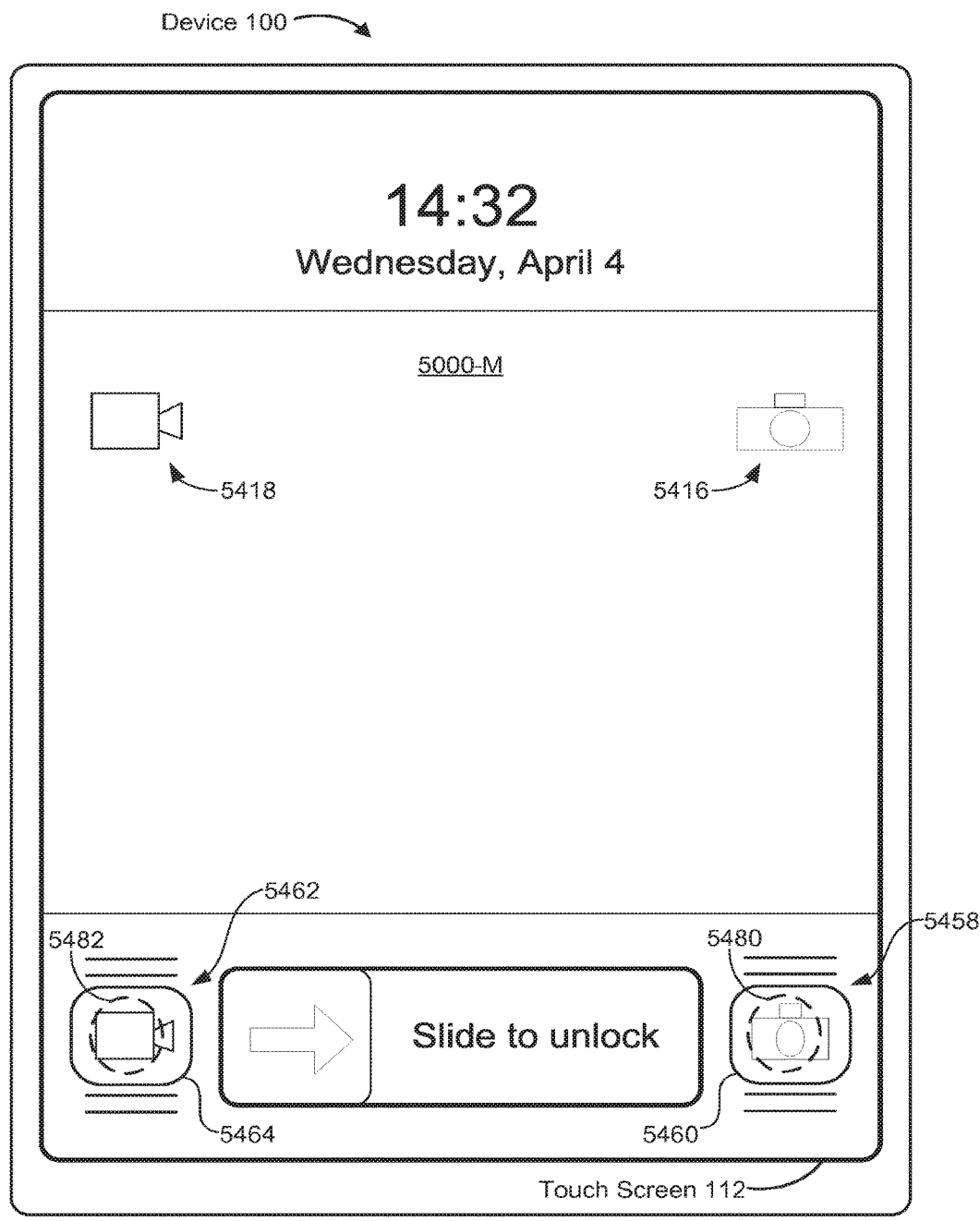
Figure 5QQQ

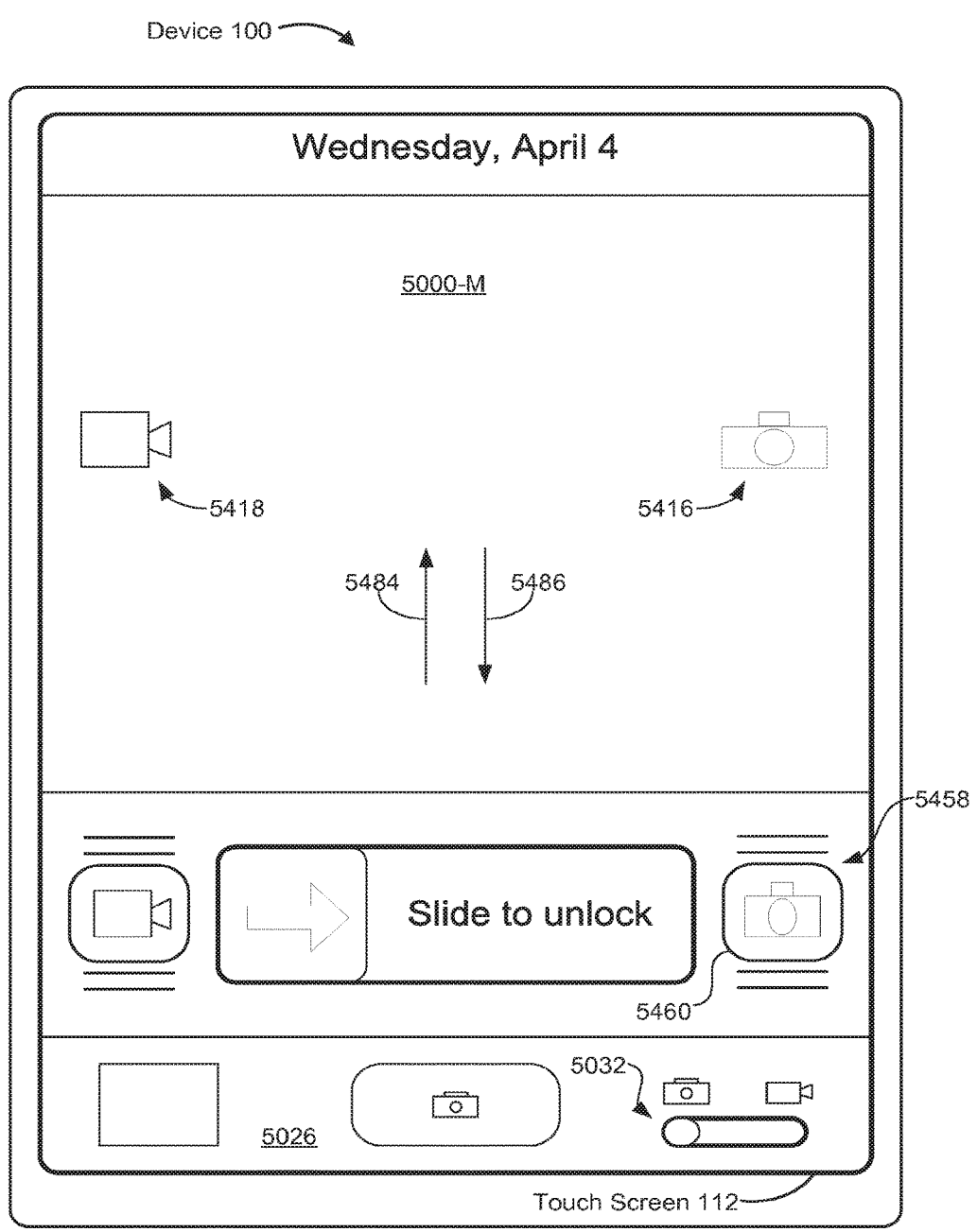
Figure 5RRR

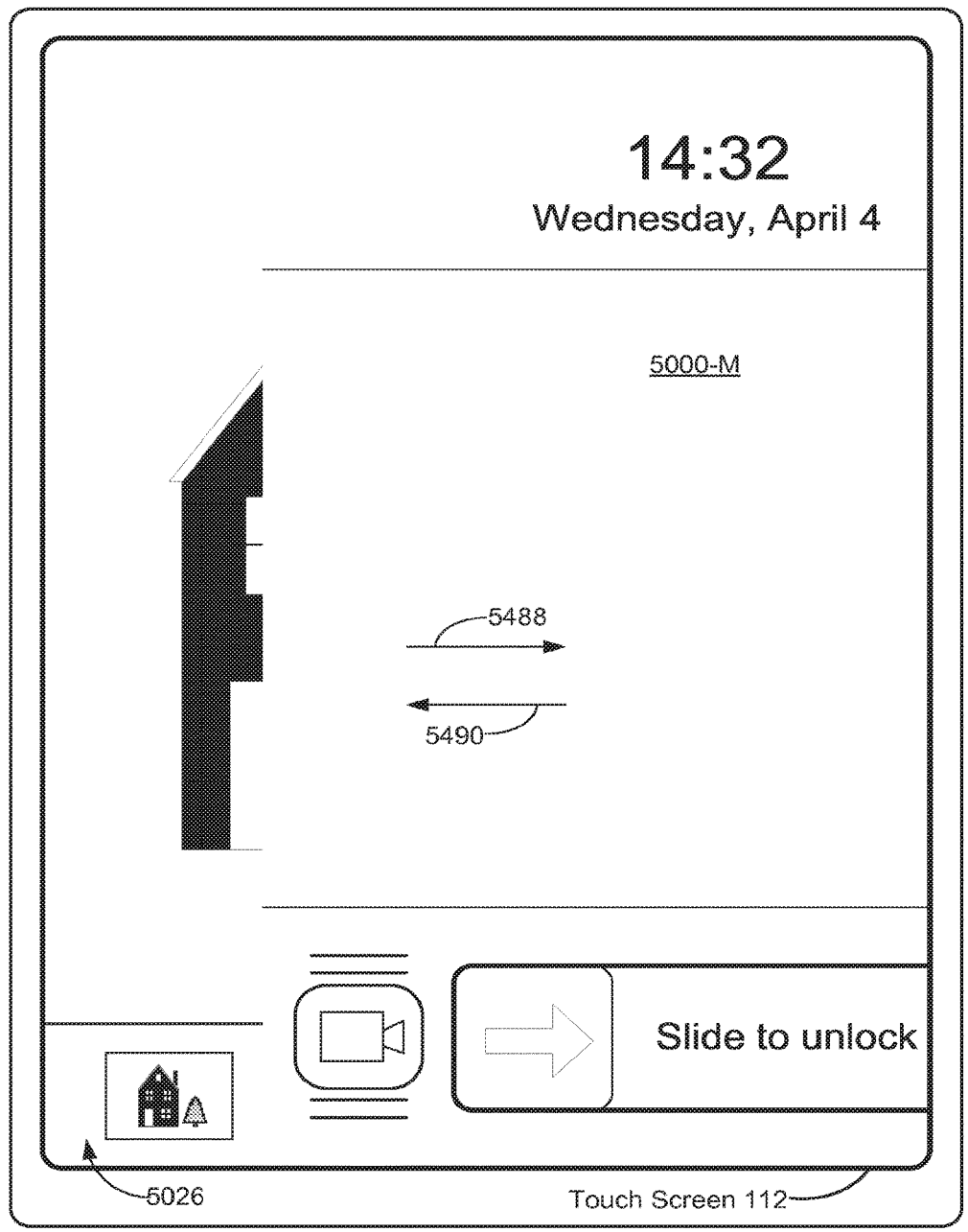
Figure 5SSS

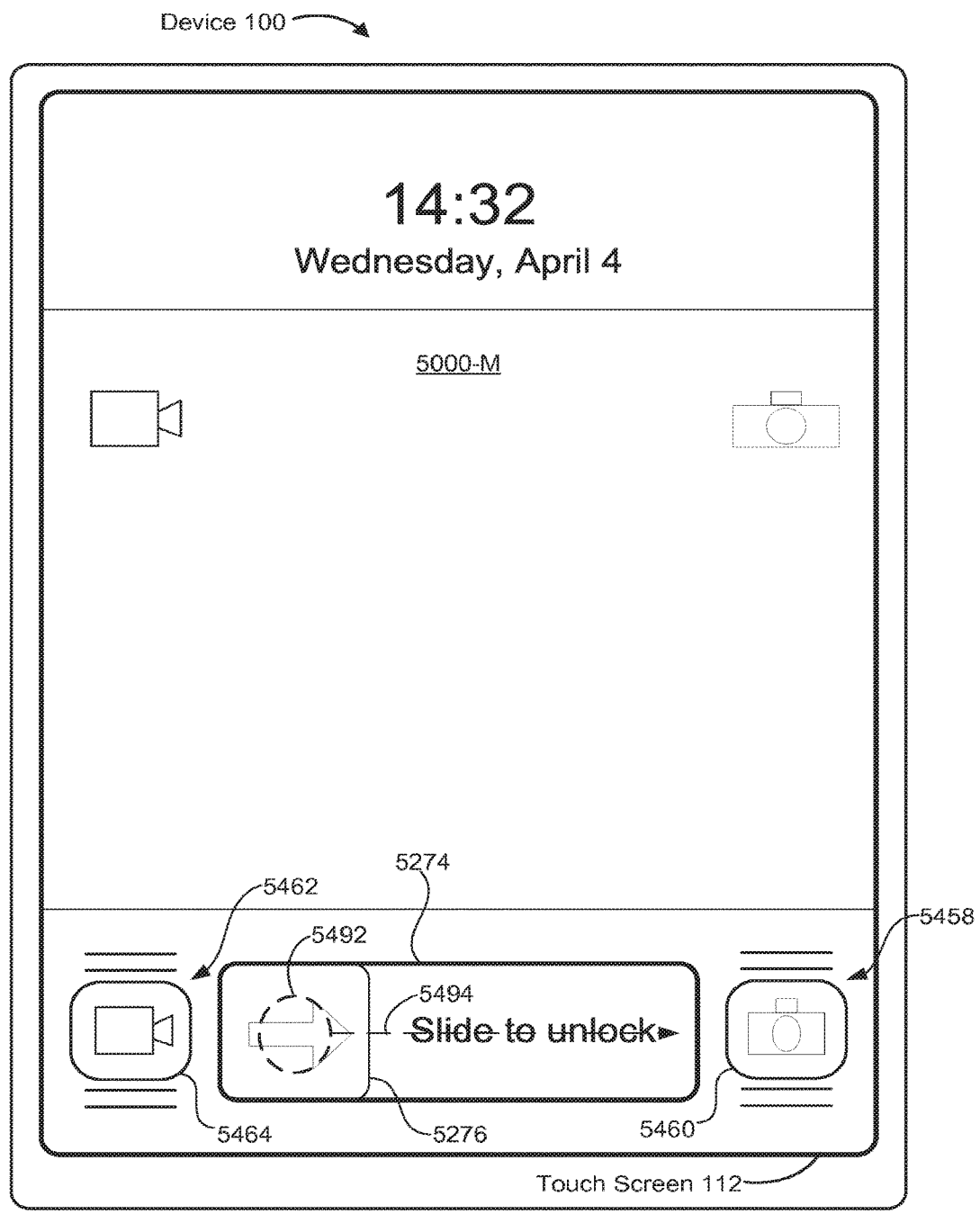
Figure 5TTT

DEVICE, METHOD, AND GRAPHICAL USER INTERFACE FOR ACCESSING AN APPLICATION IN A LOCKED DEVICE

RELATED APPLICATIONS

This application is a continuation of U.S. patent application Ser. No. 13/744,343 (now U.S. Pat. No. 9,372,978), filed on Jan. 17, 2013, entitled "Device, Method, and Graphical User Interface for Accessing an Application in a Locked Device," which claims priority to U.S. Provisional Application Ser. No. 61/589,239, filed Jan. 20, 2012, entitled "Device, Method, and Graphical User Interface for Accessing a Camera Application While the Device is Locked," and U.S. Provisional Application Ser. No. 61/745,189, filed Dec. 21, 2012, entitled "Device, Method, and Graphical User Interface for Accessing an Application in a Locked Device," which are incorporated by reference herein in their entireties.

This application is related to U.S. application Ser. No. 13/243,045, filed Sep. 23, 2011, entitled "Device, Method, and Graphical User Interface for Accessing an Application in a Locked Device," which is incorporated by reference herein in its entirety.

TECHNICAL FIELD

This relates generally to electronic devices with touch-sensitive surfaces, including but not limited to electronic devices with touch-sensitive surfaces that enable access to an application while the device is locked.

BACKGROUND

The use of portable devices with touch-sensitive surfaces as input devices has increased significantly in recent years. Such portable devices have greatly increased the number of applications, or "apps," for various situations. For example, image and video camera applications open up content generation opportunities for users, such as taking pictures or recording videos. A notes application allows a user to read or write notes on the fly. Time may be critical in such content generation opportunities. For example, a user may have only a brief moment to capture an image or a video of an event as it is happening.

But existing methods for accessing applications are slow and a hindrance to quick usage, particularly when the device is in a locked, passcode-protected state. Accessing an application on a device, including accessing different modes of the application, while the device is locked requires multiple steps, which prevent immediate or quick access to the application in situations when immediate or quick access is beneficial or desired.

SUMMARY

Accordingly, there is a need for electronic devices with faster, more efficient methods and interfaces for accessing an application while the device is locked. Such methods and interlaces may complement or replace conventional methods for accessing an application while the device is locked. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method is performed at a portable multifunction device with a touch-sensitive display and a plurality of applications, including a camera application. The method includes: while the device is in a locked, passcode-protected state: displaying a lock screen interface on the touch-sensitive display, the lock screen interface including a camera access indicia; detecting a gesture on the touch-sensitive display; in response to a determination that the gesture starts on the camera access indicia: ceasing to display the lock screen interface, starting a restricted session for the camera application, displaying an interface for the camera application, without displaying a passcode entry interface, and maintaining the device in the locked, passcode-protected state for applications in the device other than the camera application; and in response to a determination that the gesture starts at a location on the touch-sensitive display other than the camera access indicia, displaying a passcode entry interface, wherein in response to entry of a correct passcode in the passcode entry interface, the passcode entry interface ceases to be displayed and the device enters an unlocked state with access to the plurality of applications.

In accordance with some embodiments, a method is performed at a portable multifunction device with a touch-sensitive display and a plurality of applications, including a camera application. The method includes: while the device is in a locked, passcode-protected state: displaying a lock screen interface on the touch-sensitive display, the lock screen interface including a camera access indicia and an unlock indicia; in response to detecting a gesture that starts and ends on the camera access indicia: ceasing to display the lock screen interface, starting a restricted session for the camera application, displaying an interface for the camera application, without displaying a passcode entry interface, and maintaining the device in the locked, passcode-protected state for applications in the device other than the camera application; and in response to detecting a gesture that starts at a location on the touch-sensitive display associated with the unlock indicia, displaying a passcode entry interface, wherein in response to entry of a correct passcode in the passcode entry interface, the passcode entry interface ceases to be displayed and the device enters an unlocked state with access to the plurality of applications.

In accordance with some embodiments, a method is performed at a portable multifunction device with a touch-sensitive display and a plurality of applications, including a camera application. The method includes: while the device is in a locked, passcode-protected state: displaying a lock screen interface on the touch-sensitive display, the lock screen interface including an unlock indicia and a camera access indicia; in response to detecting a gesture that ends on the camera access indicia: ceasing to display the lock screen interface, starting a restricted session for the camera application, displaying an interface for the camera application, without displaying a passcode entry interface, and maintaining the device in the locked, passcode-protected state for applications in the device other than the camera application; and in response to detecting a gesture that ends at a location on the touch-sensitive display associated with the unlock indicia, displaying a passcode entry interface, wherein in response to entry of a correct passcode in the passcode entry interface, the passcode entry interface ceases to be displayed and the device enters an unlocked state with access to the plurality of applications.

In accordance with some embodiments, a method is performed at a portable multifunction device with a touch-sensitive display and a plurality of applications, including a camera application. The method includes: while the device is in a locked, passcode-protected state: displaying a lock screen interface on the touch-sensitive display, the lock screen interface including a camera access indicia; detecting a gesture on the touch-sensitive display; in response to a determination that the gesture starts on the camera access indicia and is of a first type, partially revealing an interface for the camera application; in response to a determination that the gesture starts on the camera access indicia and is of a second type different from the first type, ceasing to display the lock screen interface, starting a restricted session for the camera application, displaying an interface for the camera application, without displaying a passcode entry interface, and maintaining the device in the locked, passcode-protected state for applications in the device other than the camera application; and in response to a determination that the gesture starts at a location on the touch-sensitive display other than the camera access indicia, displaying a passcode entry interface, wherein in response to entry of a correct passcode in the passcode entry interface, the passcode entry interface ceases to be displayed and the device enters an unlocked state with access to the plurality of applications.

In accordance with some embodiments, a portable multifunction device includes a touch-sensitive display, one or more processors, memory, a plurality of applications, including a camera applications, and one or more programs; the one or more programs are stored in the memory and configured to be executed by the one or more processors and the one or more programs include instructions for performing the operations of any of the methods described above. In accordance with some embodiments, a graphical user interface on a portable multifunction device with a touch-sensitive display, a memory, a plurality of applications, including a camera application, and one or more processors to execute one or more programs stored in the memory includes one or more of the elements displayed in any of the methods described above, which are updated in response to inputs, as described in any of the methods above. In accordance with some embodiments, a computer readable storage medium has stored therein instructions which when executed by a portable multifunction device with a touch-sensitive display and a plurality of applications including a camera application, cause the device to perform the operations of any of the methods described above. In accordance with some embodiments, a portable multifunction device includes: a touch-sensitive display; a plurality of applications, including a camera application; and means for performing the operations of any of the methods described above. In accordance with some embodiments, an information processing apparatus, for use in a portable multifunction device with a touch-sensitive display and a plurality of applications, including a camera application, includes means for performing the operations of any of the methods described above.

In accordance with some embodiments, an electronic device includes a touch-sensitive display unit configured to display, while the device is in a locked, passcode-protected state, a lock screen interface, the lock screen interface including a camera access indicia, and receive gestures; a plurality of applications, including a camera application; and a processing unit coupled to the touch-sensitive display unit and the plurality of applications. The processing unit is configured to: while the device is in the locked, passcode-protected state: detect a gesture on the touch-sensitive display unit; in response to a determination that the gesture starts on the camera access indicia: cease to display the lock screen interface, start a restricted session for the camera application, enable display of an interface for the camera application, without displaying a passcode entry interface, and maintain the device in the locked, passcode-protected state for applications in the device other than the camera application; and in response to a determination that the gesture starts at a location on the touch-sensitive display unit other than the camera access indicia, enable display of a passcode entry interface, wherein in response to entry of a correct passcode in the passcode entry interface, the passcode entry interface ceases to be displayed and the device enters an unlocked state with access to the plurality of applications.

In accordance with some embodiments, an electronic device includes a touch-sensitive display unit configured to display, while the device is in a locked, passcode-protected state, a lock screen interface, the lock screen interface including a camera access indicia and an unlock indicia, and receive gestures; a plurality of applications, including a camera application; and a processing unit coupled to the touch-sensitive display unit and the plurality of applications. The processing unit is configured to: while the device is in the locked, passcode-protected state: in response to detecting a gesture that starts and ends on the camera access indicia, cease to display the lock screen interface, start a restricted session for the camera application, enable display of an interface for the camera application, without displaying a passcode entry interface, and maintain the device in the locked, passcode-protected state for applications in the device other than the camera application; and in response to detecting a gesture that starts at a location on the touch-sensitive display unit associated with the unlock indicia, display a passcode entry interface, wherein in response to entry of a correct passcode in the passcode entry interface, the passcode entry interface ceases to be displayed and the device enters an unlocked state with access to the plurality of applications.

In accordance with some embodiments, an electronic device includes a touch-sensitive display unit configured to display, while the device is in a locked, passcode-protected state, a lock screen interface, the lock screen interface including a camera access indicia and an unlock indicia, and receive gestures; a plurality of applications, including a camera application; and a processing unit coupled to the touch-sensitive display unit and the plurality of applications. The processing unit is configured to: while the device is in the locked, passcode-protected state: in response to detecting a gesture that ends on the camera access indicia: cease to display the lock screen interface, start a restricted session for the camera application, enable display of an interface for the camera application, without displaying a passcode entry interface, and maintain the device in the locked, passcode-protected state for applications in the device other than the camera application; and in response to detecting a gesture that ends at a location on the touch-sensitive display unit associated with the unlock indicia, display a passcode entry interface, wherein in response to entry of a correct passcode in the passcode entry interface, the passcode entry interface ceases to be displayed and the device enters an unlocked state with access to the plurality of applications.

In accordance with some embodiments, an electronic device includes a touch-sensitive display unit configured to display, while the device is in a locked, passcode-protected state, a lock screen interface, the lock screen interface including a camera access indicia, and receive gestures; a plurality of applications, including a camera application; and a processing unit coupled to the touch-sensitive display unit and the plurality of applications. The processing unit is configured to: while the device is in the locked, passcode-protected state: detect a gesture on the touch-sensitive display unit; in response to a determination that the gesture starts on the camera access indicia and is of a first type, partially reveal an interface for the camera application; in response to a determination that the gesture starts on the camera access indicia and is of a second type different from the first type, cease to display the lock screen interface, start a restricted session for the camera application, enable display of an interface for the camera application, without displaying a passcode entry interface, and maintain the device in the locked, passcode-protected state for applications in the device other than the camera application; and in response to a determination that the gesture starts at a location on the touch-sensitive display unit other than the camera access indicia, enable display of a passcode entry interface, wherein in response to entry of a correct passcode in the passcode entry interface, the passcode entry interface ceases to be displayed and the device enters an unlocked state with access to the plurality of applications.

In accordance with some embodiments, a method is performed at a portable device with a touch-sensitive display and a plurality of applications, including a first application. The method includes: while the device is in a locked, passcode-protected state: displaying a lock screen interface on the touch-sensitive display, the lock screen interface including a first application access indicia; detecting a gesture on the touch-sensitive display; in response to a determination that the gesture starts on the first application access indicia and is a first type of gesture: ceasing to display the lock screen interface; starting a restricted session for the first application in a first mode of the first application; displaying an interface for the first application in the first mode, without displaying a passcode entry interface; and maintaining the device in the locked, passcode-protected state for applications in the device other than the first application; and in response to a determination that the gesture starts on the first application access indicia and is a second type of gesture, distinct from the first type of gesture: ceasing to display the lock screen interface; starting a restricted session for the first application in a second mode of the first application, distinct from the first mode of the first application; displaying an interface for the first application in the second mode, without displaying a passcode entry interface; and maintaining the device in the locked, passcode-protected state for applications in the device other than the first application.

In accordance with some embodiments, a method is performed at a portable device with a touch-sensitive display and a plurality of applications, including a first application. The method includes: while the device is in a locked, passcode-protected state: displaying a lock screen interface on the touch-sensitive display, the lock screen interface including a first access indicia for a first mode in a first application and a second access indicia, distinct from the first access indicia for a second mode in the first application; detecting a gesture on the touch-sensitive display; in response to a determination that the gesture starts on the first access indicia and is a first type of gesture: ceasing to display the lock screen interface; starting a restricted session for the first application in a first mode of the first application; displaying an interface for the first application in the first mode, without displaying a passcode entry interface; and maintaining the device in the locked, passcode-protected state for applications in the device other than the first application; and in response to a determination that the gesture starts on the second access indicia and is a second type of gesture: ceasing to display the lock screen interface; starting a restricted session for the first application in a second mode of the first application, distinct from the first mode of the first application; displaying an interface for the first application in the second mode, without displaying a passcode entry interface; and maintaining the device in the locked, passcode-protected state for applications in the device other than the first application.

In accordance with some embodiments, a portable device includes a touch-sensitive display, one or more processors, memory, a plurality of applications, including a first application, and one or more programs; the one or more programs are stored in the memory and configured to be executed by the one or more processors and the one or more programs include instructions for performing the operations of any of the methods described above. In accordance with some embodiments, a graphical user interface on a portable device with a touch-sensitive display, a memory, a plurality of applications, including a first application, and one or more processors to execute one or more programs stored in the memory includes one or more of the elements displayed in any of the methods described above, which are updated in response to inputs, as described in any of the methods above. In accordance with some embodiments, a computer readable storage medium has stored therein instructions which when executed by a portable device with a touch-sensitive display and a plurality of applications, including a first application, cause the device to perform the operations of any of the methods described above. In accordance with some embodiments, a portable device includes: a touch-sensitive display, a plurality of applications, including a first application; and means for performing the operations of any of the methods described above. In accordance with some embodiments, an information processing apparatus, for use in a portable device with a touch-sensitive display and a plurality of applications, including a first application, includes means for performing the operations of any of the methods described above.

In accordance with some embodiments, a portable device includes a touch-sensitive display unit configured to display, while the device is in a locked, passcode-protected state, a lock screen interface, the lock screen interface including a first application access indicia, and receive gestures; a plurality of applications, including a first application; and a processing unit coupled to the touch-sensitive display unit and the plurality of applications. The processing unit is configured to, while the device is in a locked, passcode-protected state: detect a gesture on the touch-sensitive display unit; in response to a determination that the gesture starts on the first application access indicia and is a first type of gesture: cease display of the lock screen interface, start a restricted session for the first application in a first mode of the first application, enable display of an interface for the first application in the first mode, without displaying a passcode entry interface, and maintain the device in the locked, passcode-protected state for applications in the device other than the first application; and in response to a determination that the gesture starts on the first application access indicia and is a second type of gesture, distinct from the first type of gesture: cease display of the lock screen interface, start a restricted session for the first application in a second mode of the first application, distinct from the first mode of the first application, enable display of an interface for the first application in the second mode, without displaying a passcode entry interface, and maintain the device in the locked, passcode-protected state for applications in the device other than the first application.

In accordance with some embodiments, a portable device includes a touch-sensitive display unit configured to display, while the device is in a locked, passcode-protected state, a lock screen interface, the lock screen interface including a first access indicia for a first mode in a first application and a second access indicia, distinct from the first access indicia, for a second mode in the first application, and receive gestures; a plurality of applications, including a first application; and a processing unit coupled to the touch-sensitive display unit and the plurality of applications. The processing unit is configured to, while the device is in a locked, passcode-protected state: detect a gesture on the touch-sensitive display; in response to a determination that the gesture starts on the first access indicia and is a first type of gesture: cease to display the lock screen interface, start a restricted session for the first application in a first mode of the first application, enable display of an interface for the first application in the first mode, without displaying a passcode entry interface, and maintain the device in the locked, passcode-protected state for applications in the device other than the first application; and in response to a determination that the gesture starts on the second access indicia and is a second type of gesture: cease to display the lock screen interface, start a restricted session for the first application in a second mode of the first application, distinct from the first mode of the first application, enable display of an interface for the first application in the second mode, without displaying a passcode entry interface, and maintain the device in the locked, passcode-protected state for applications in the device other than the first application.

Thus, portable multifunction devices with touch-sensitive displays are provided with faster, more efficient methods and interfaces for accessing an application in a locked device, thereby increasing the effectiveness, efficiency, and user satisfaction with such devices. Such methods and interfaces may complement or replace conventional methods for accessing an application in a locked device.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
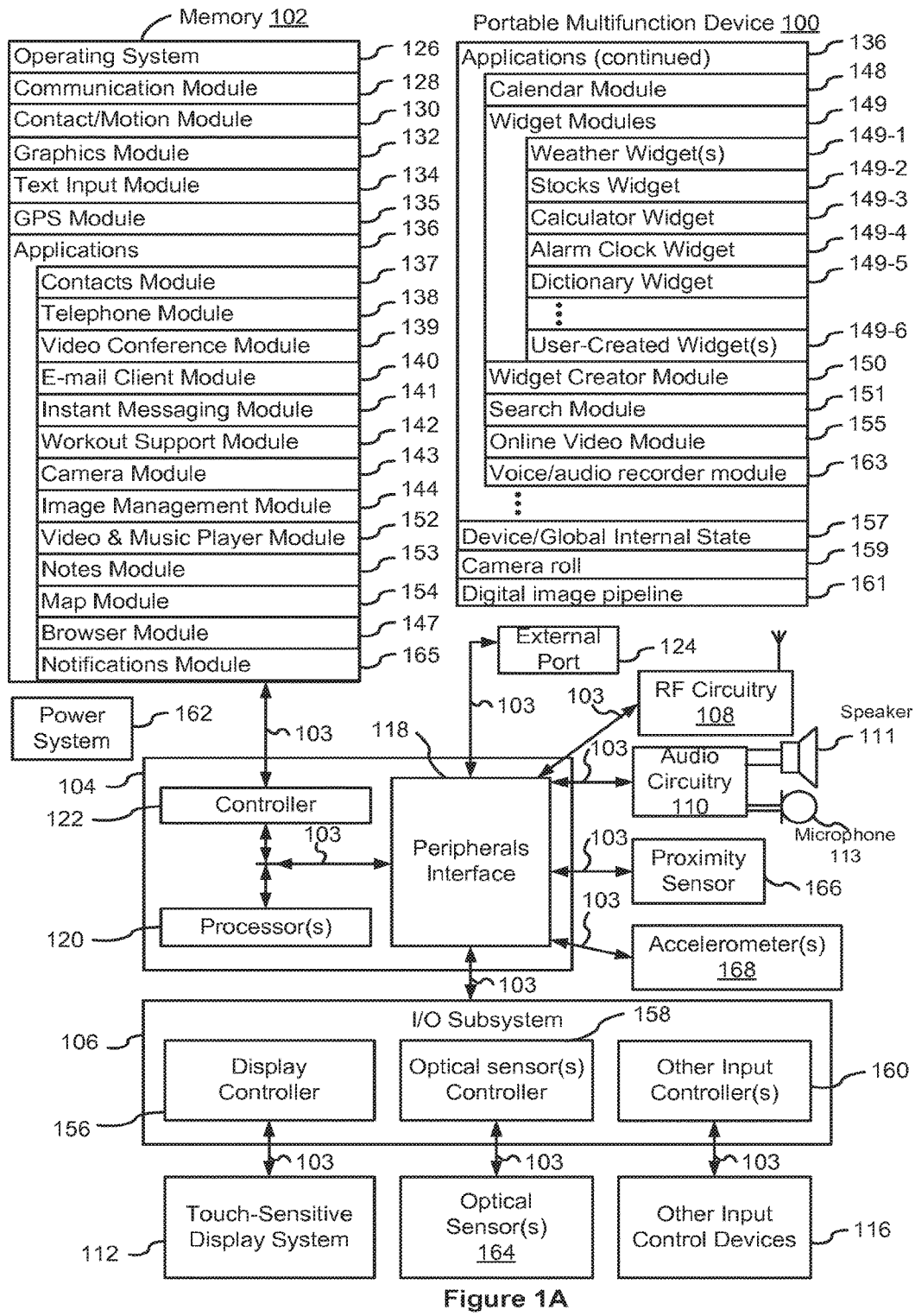
FIG. 1A is a block diagram illustrating a portable multifunction device with a touch-sensitive display in accordance with some embodiments.

Typically, accessing an application in a locked device takes several steps and corresponding user inputs. For example, the steps may include unlocking the device with a passcode, navigating to an icon corresponding to the application, and activating the icon. While having to unlock the device with a passcode first provides device security, there are times when having to unlock the device first to access an application is a hindrance, such as when trying to capture fleeting moments in a still image or video with a camera application. The embodiments described below enable a user to access a first application (e.g., a camera application), including different modes of the first application, without the user entering the passcode; the passcode protection is bypassed. In some embodiments, while the device is locked, an interface with a camera access indicia is displayed. In some embodiments, when a gesture starts on the camera access indicia, a camera application is started in a restricted session, whereas when the same gesture starts away the camera access indicia, a passcode entry interface is displayed. In some embodiments, when a gesture ends on the camera access indicia, a camera application is started in a restricted session, whereas when the gesture ends on an unlock indicia, a passcode entry interface is displayed. The gesture on the camera access indicia provides for rapid access to the camera (e.g., by bypassing passcode input) and also maintains device security in view of the bypassing of the passcode input (e.g., by placing restrictions on use of the camera application and maintaining the device in a locked state with respect to other applications). Quick camera application access when the device is in a locked, passcode-protected state is particularly useful for portable devices (e.g., smart phones, tablet computers, laptop computers), but can also be used with other devices (e.g., desktop computers).

In some other embodiments, while the device is locked, an interface with an application access indicia is displayed. When a gesture starts on the application access indicia, depending on the type of gesture, an application associated with the application access indicia is started in a restricted session in one of multiple modes. In some other embodiments, while the device is locked, an interface with both a first access indicia and a second access indicia is displayed. The first and second access indicia are associated with an application. When a gesture starts on the first access indicia, the application is started in a restricted session in a first mode of the application. When a gesture starts on the second access indicia, the application is started in a restricted session in a second mode of the application. The gesture on the access indicia provides for rapid access to different modes of an application (e.g., by bypassing passcode input) and also maintains device security in view of the bypassing of the passcode input (e.g., by placing restrictions on use of the started application and maintaining the device in a locked state with respect to other applications).

Figure 2:
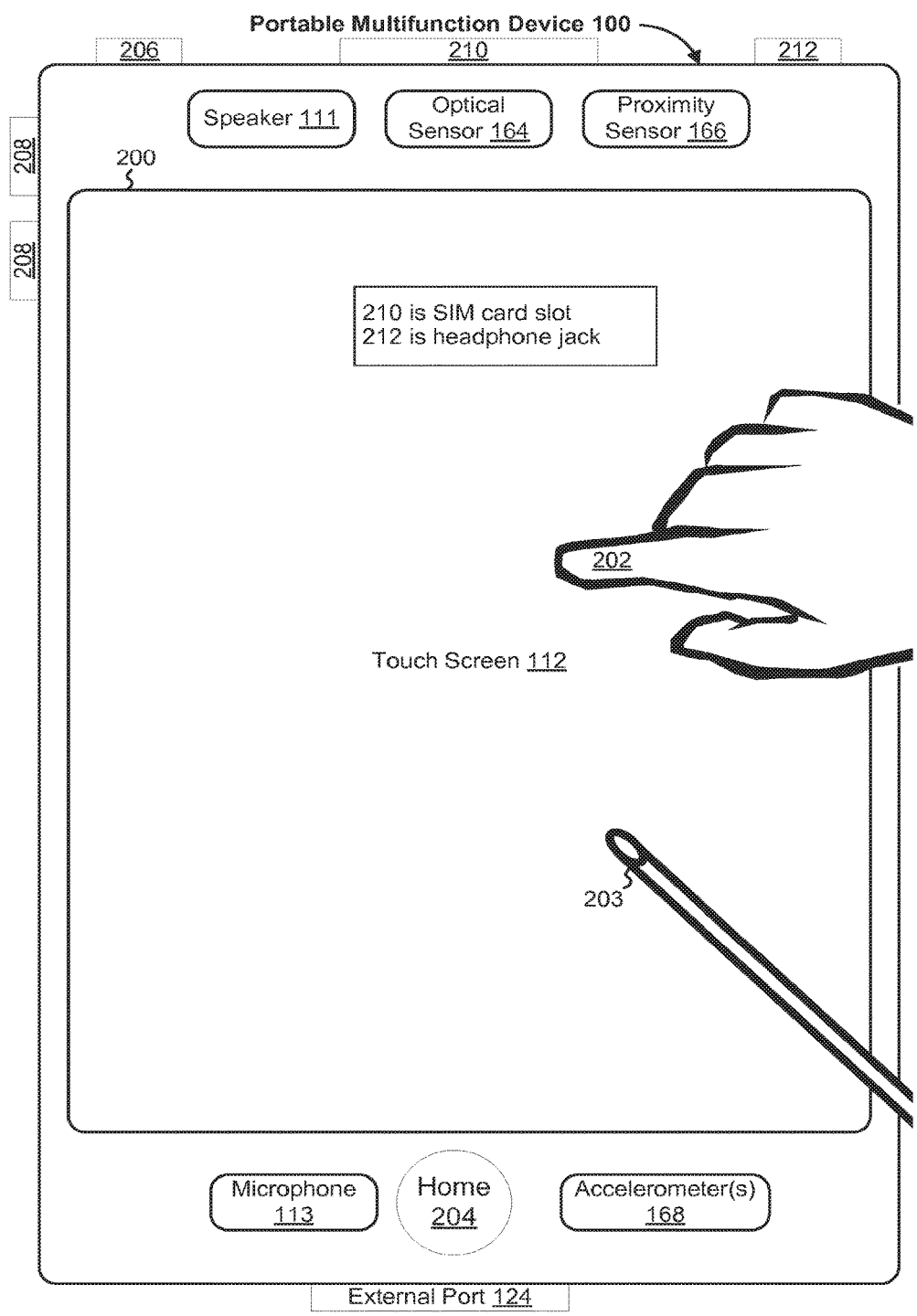
FIG. 2 illustrates a portable multifunction device having a touch screen in accordance with some embodiments.
Figure 3:
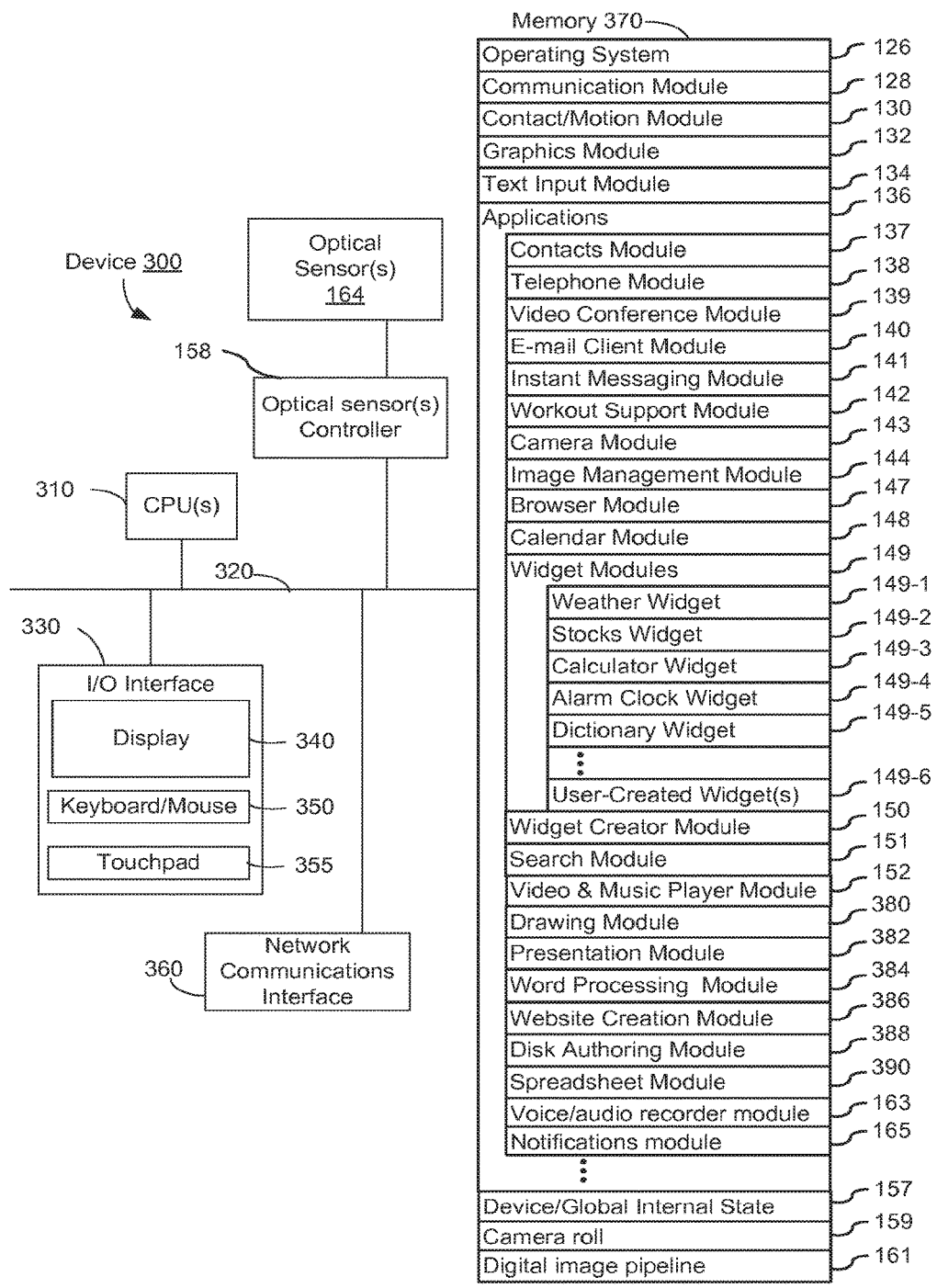
FIG. 3 is a block diagram of an exemplary multifunction device with a display and a touch-sensitive surface in accordance with some embodiments.
Figure 4:
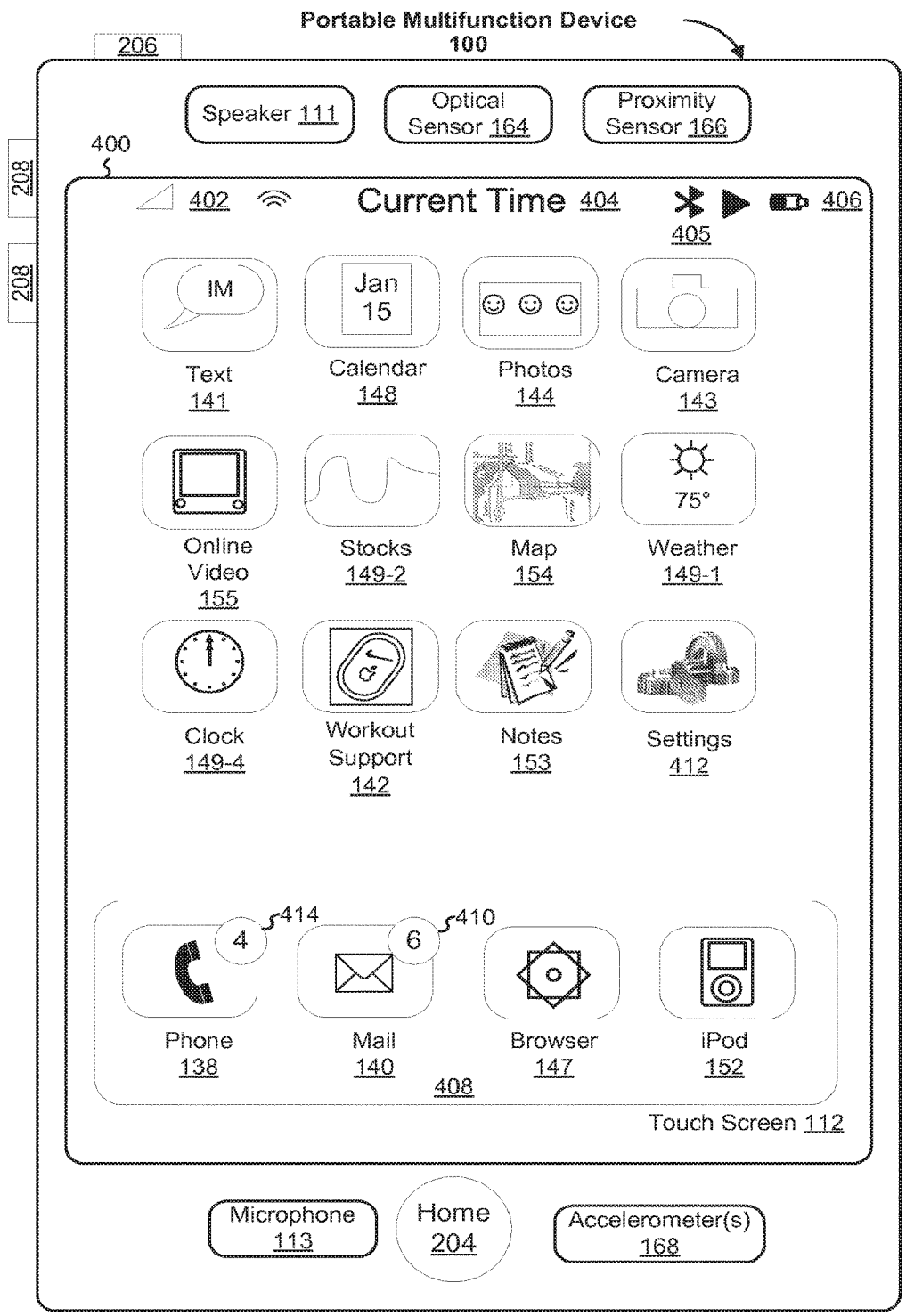
FIG. 4 illustrates an exemplary user interface for a menu of applications on a portable multifunction device in accordance with some embodiments.
Figure 5A:
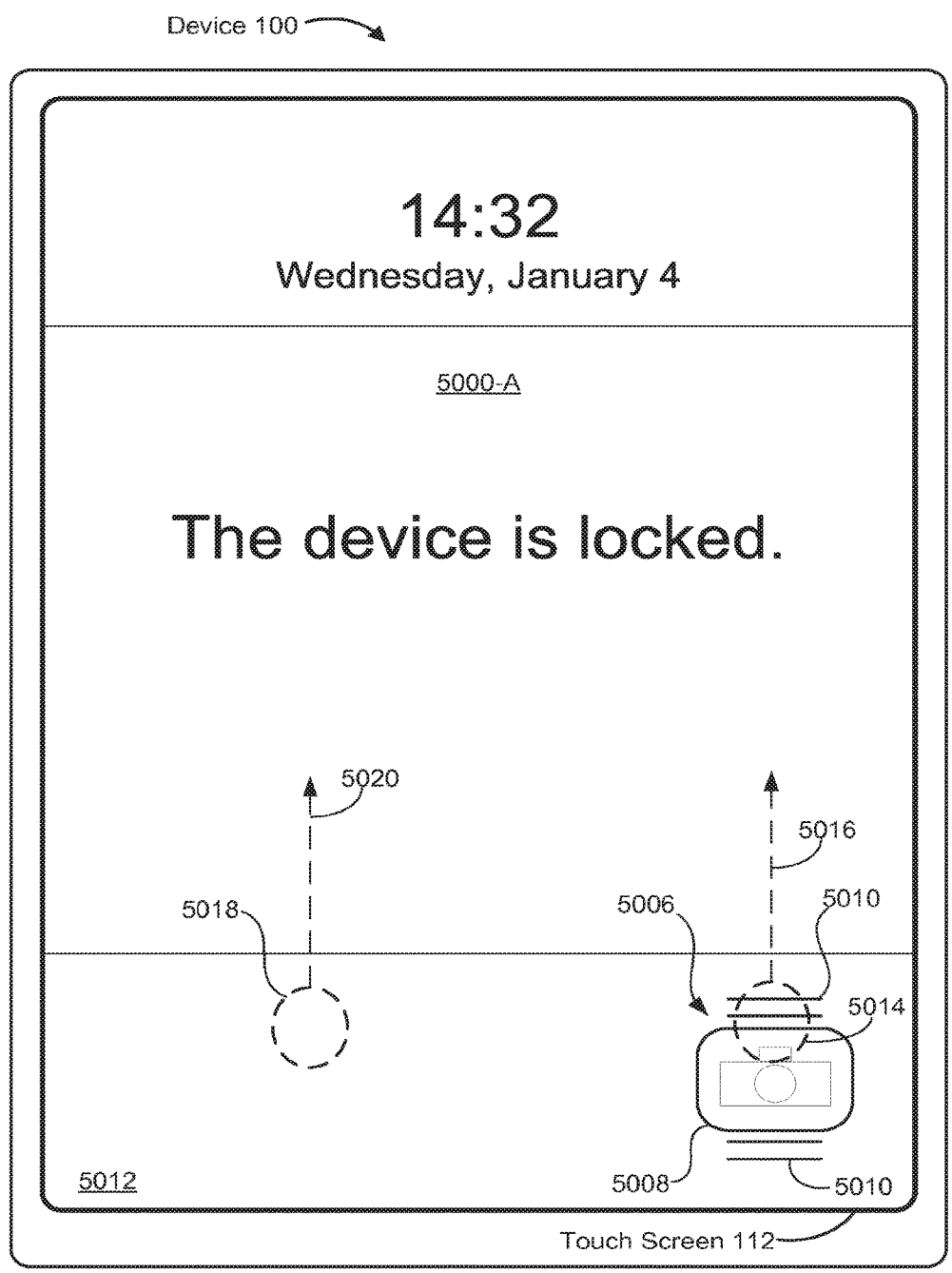
FIGS. 5A-5TTT illustrate exemplary user interfaces for accessing a camera application in a locked device in accordance with some embodiments.

Below, FIGS. 1A-1B, 2, 3 provide a description of exemplary devices. FIGS. 4 and 5A-5TTT illustrate exemplary user interfaces for accessing an application in a locked device. FIGS. 6A-6B, 7-9, 10A-10C, and 11A-11C are flow diagrams illustrating methods of accessing an application in a locked device. The user interfaces in FIGS. 5A-5TTT are used to illustrate the processes in FIGS. 6A-6B, 7, 8, 9, 10A-10C, and 11A-11C.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an c-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, the one or more processors 120 include an image signal processor and a dual-core or multi-core processor.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112.

In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components. Further, in some embodiments, memory 102 stores camera roll 159 and digital image pipeline 161.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which may be made up of a video player module and a music player module;
  notes module 153;
  map module 154;
  online video module 155;
  voice/audio recorder module 163; and/or
  notifications module 165.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, digital image pipeline 161 (which converts raw data from the optical sensor into a final image or video), and image management module 144, camera module 143 includes executable instructions to capture still images or video (including a video stream) and store them into memory 102 (e.g., in camera roll 159), modify characteristics of a still image or video, or delete a still image or video from memory 102 (e.g., from camera roll 159).

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images, including still and/or video images stored in camera roll 159.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

In conjunction with touch screen 112, display system controller 156, contact module 130, graphics module 132, audio circuitry 110, speaker 111, and microphone 113, voice/audio recorder module 163 includes executable instructions that allow the user to record audio (e.g., voice) in one or more file formats, such as MP3 or AAC files, and executable instructions to present or otherwise play back the recorded audio files.

In conjunction with touch screen 112, display system controller 156, contact module 130, and graphics module 132, notifications module 165 includes executable instructions that display notifications or alerts, such as incoming messages or phone calls, calendar event reminders, application events, and so on, on touch screen 112.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
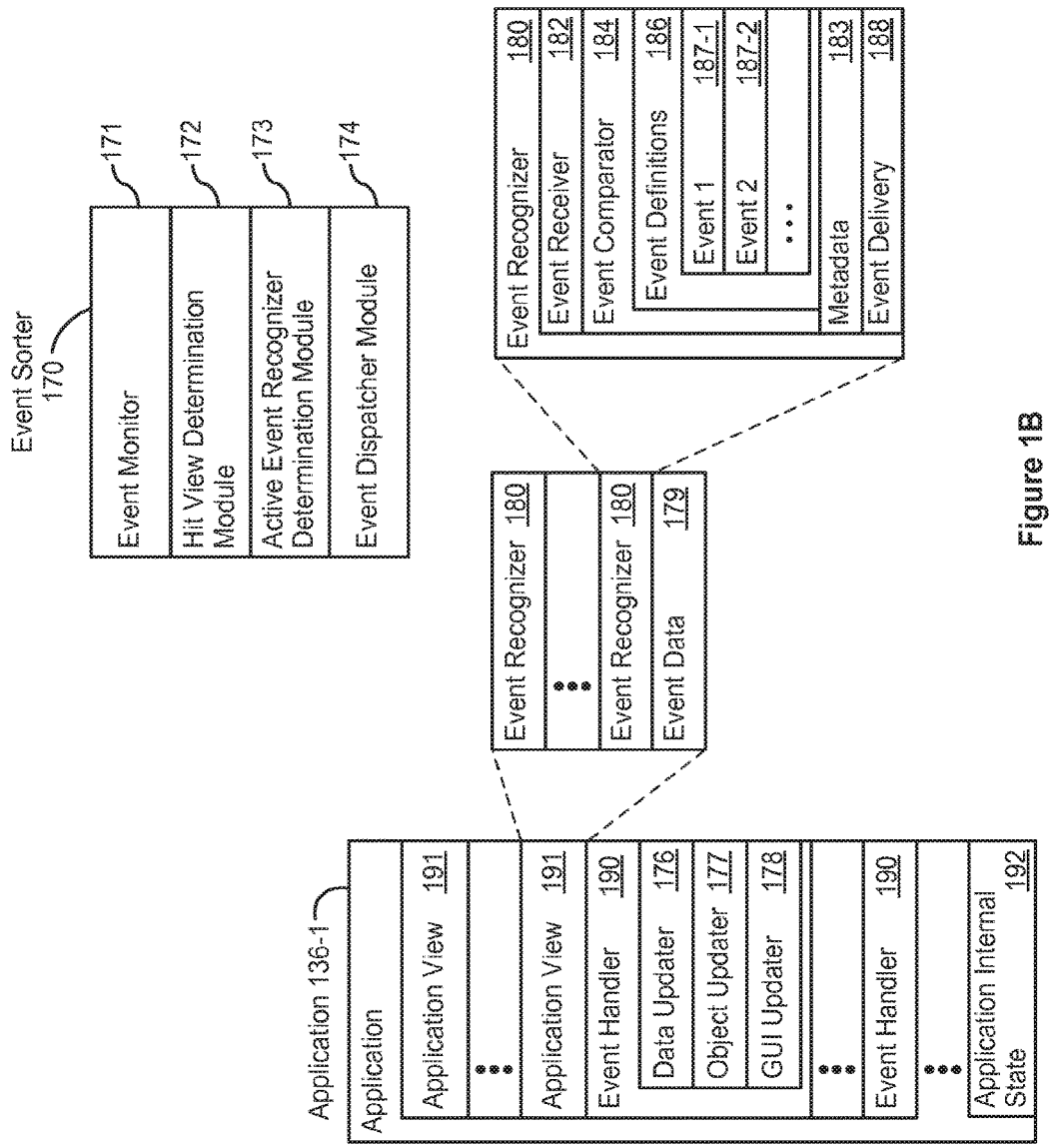
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. In some embodiments, processing unit(s) 310 include an image signal processor and a dual-core or multi-core processor. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Device 300 also includes optical sensor(s) 164 and optical sensor(s) controller 158. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Phone 138, which may include an indicator 414 of the number of missed calls or voicemail messages;
E-mail client 140, which may include an indicator 410 of the number of unread e-mails;
Browser 147; and
Video and music player 152, also referred to as iPod (trademark of Apple Inc.) module 152; and
Icons for other applications, such as:
IM 141;
Image management 144;
Camera 143;
Weather 149-1;
Stocks 149-2;
Workout support 142;
Calendar 148;
Alarm clock 149-4;
Map 154;
Notes 153;
Settings 412, which provides access to settings for device 100 and its various applications 136; and
Online video module 155, also referred to as YouTube (trademark of Google Inc.) module 155.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., stylus input).

User Interfaces and Associated Processes

Attention is now directed towards embodiments of user interfaces ("UI") and associated processes that may be implemented on an electronic device with a display and a touch-sensitive surface, such as device 300 or portable multifunction device 100.

FIGS. 5A-5TTT illustrate exemplary user interfaces for accessing an application in a locked device in accordance with some embodiments. The user interfaces in these figures are used to illustrate the processes described below, including the processes in FIGS. 6A-6B, 7, 8, 9, 10A-10C, 11A-11C.

FIG. 5A illustrates locked device interface 5000-A displayed on touch screen 112 of device 100. Locked device interface 5000-A may be displayed when a physical button (e.g., push button 206, home or menu button 204) on device 100 is activated by a user while device 100 is in a locked state. Locked device interface 5000-A may include a message informing the user that the device is locked, as well as other information (e.g., current time and date).

Device 100 may be in a locked, passcode-protected state or in a locked, not-passcode-protected state. When device 100 is in the locked, passcode-protected state, a passcode is required to unlock device 100. When device 100 is in the locked, not-passcode-protected state, a passcode is not required to unlock device 100.

Locked device interface 5000-A includes camera access indicia 5006. In some embodiments, camera access indicia includes icon 5008 indicating a camera application and "grabbing handle" icon(s) 5010 indicating that camera access indicia 5006 may be interacted with by the user (e.g., "grabbed" in a dragging or sliding gesture). In some embodiments, camera access indicia 5006 is displayed in a predefined region (e.g., region 5012) of locked device interface 5000-A.

A gesture may be detected on touch screen 112 as starting at some location in region 5012 on touch screen 112. In FIG. 5A, the gesture may start on camera access indicia 5006 or at a location in region 5012 other than camera access indicia 5006, and move in some direction. For example, gesture 5014 starts on camera access indicia 5006 and moves with movement 5016. Gesture 5018 starts at a location in region 5012 other than on camera access indicia 5006 and moves with movement 5020.

Figure 5B:
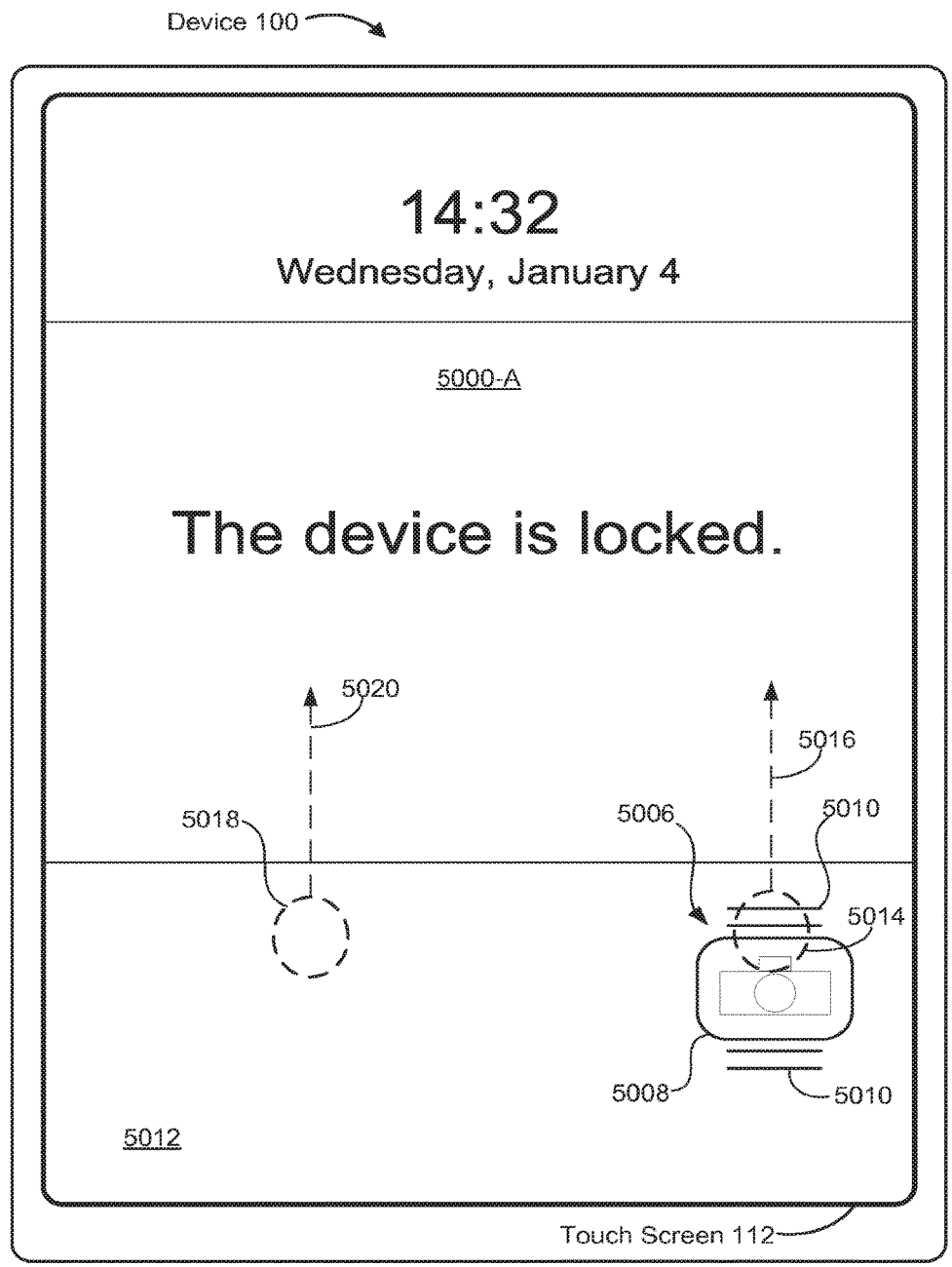
Figure 5C:
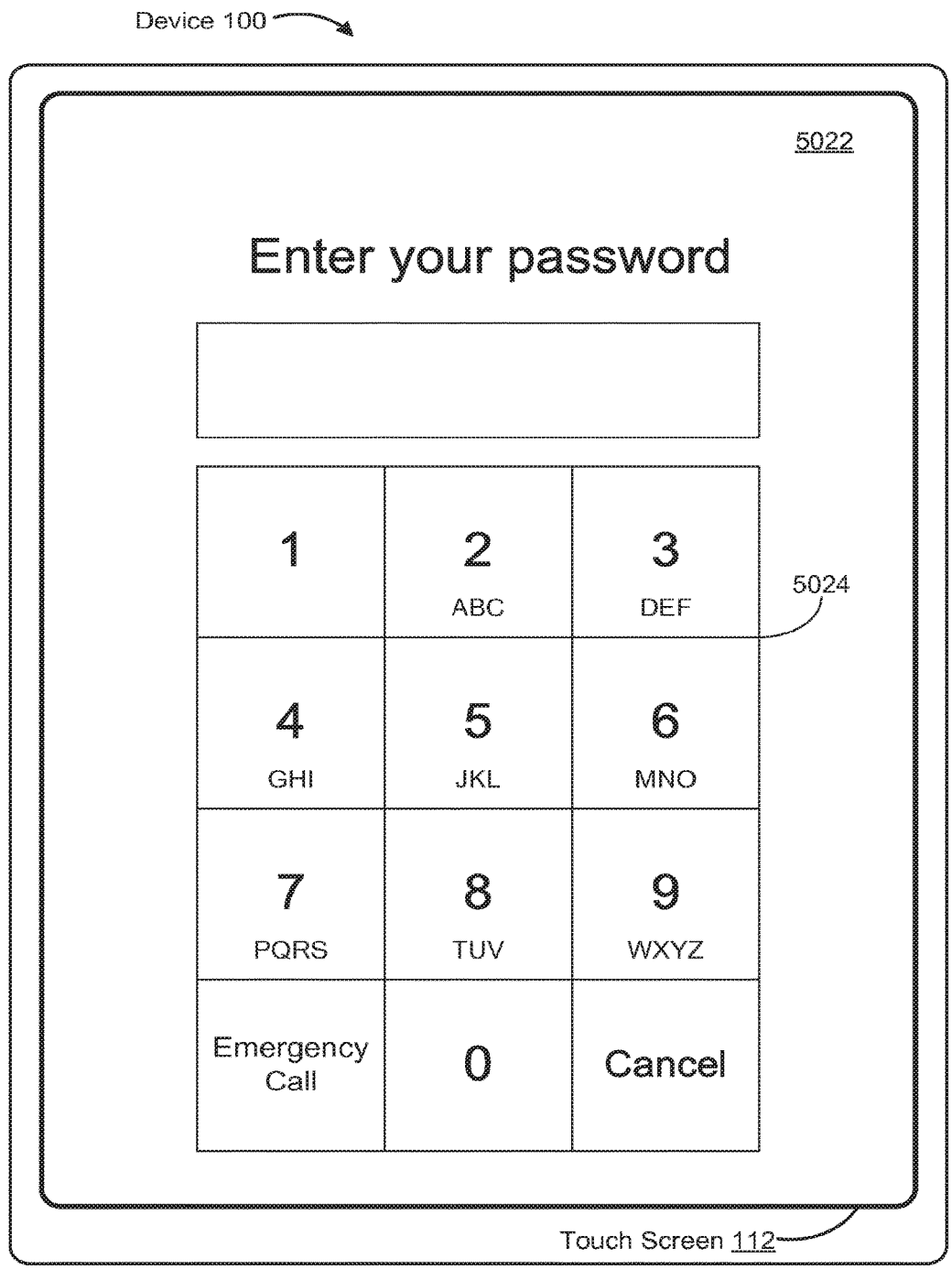

In response to the detection of gesture 5018 and a determination that gesture 5018 starts at a location in region 5012 other than camera access indicia 5006, region 5012 expands in accordance with the direction of movement 5020, as shown in FIG. 5B, and transitions into passcode entry user interface 5022 (FIG. 5C) if device 100 was in a locked, passcode-protected state. When movement 5020 is complete (e.g., reaches the top of touch screen 112), locked device interface 5000-A ceases to be displayed, and passcode entry user interface 5022 is displayed on touch screen 112 (as shown in FIG. 5C). If device 100 was in a locked, not-passcode-protected state, device 100 is unlocked when movement 5020 is complete.

In response to the detection of gesture 5014 and a determination that gesture 5014 starts on camera access indicia 5006, if device 100 was in a locked, passcode-protected state, region 5012 expands (e.g., in an animation) in accordance with the direction of movement 5016, as shown in FIG. 5B, and transitions into camera interface 5026 (FIG. 5D) of camera application 143 in a restricted session. When movement 5016 is complete (e.g., reaches the top of touch screen 112) and gesture 5014 is released, locked device interface 5000-A ceases to be displayed, and camera interface 5026 is displayed on touch screen 112. If device 100 is in a locked, passcode-protected state when gesture 5014 is released, the locked, passcode-protected state is maintained for applications on device 100 other than camera application 143, while camera application 143 is in a restricted session. Thus, camera application 143 is started in a restricted session in response to the detection of gesture 5014.

In some embodiments, while device 100 is in the locked, passcode-protected state, in response to the detection, on touch screen 112, of gestures not similar to gesture 5018 or 5014, device 100 is prevented from performing a predefined set of actions in response to the detection of those contacts. The predefined set of actions include, for example, displaying passcode entry user interface 5022 and unlocking device 100.

If device 100 was in a locked, not-passcode-protected state, in response to the detection of gesture 5014 and a determination that gesture 5014 starts on camera access indicia 5006, region 5012 expands (e.g., in an animation) in accordance with the direction of movement 5016, as shown in FIG. 5B, and transitions into camera interface 5026 (FIG. 5D) of camera application 143 in an unrestricted session. When movement 5016 is complete (e.g., reaches the top of touch screen 112) and gesture 5014 is released, locked device interface 5000-A ceases to be displayed, camera interface 5026 is displayed on touch screen 112, and device 100 is unlocked (i.e., camera application 143 is fully functional, and other applications on device 100 are accessible and fully functional).

Figure 5D:
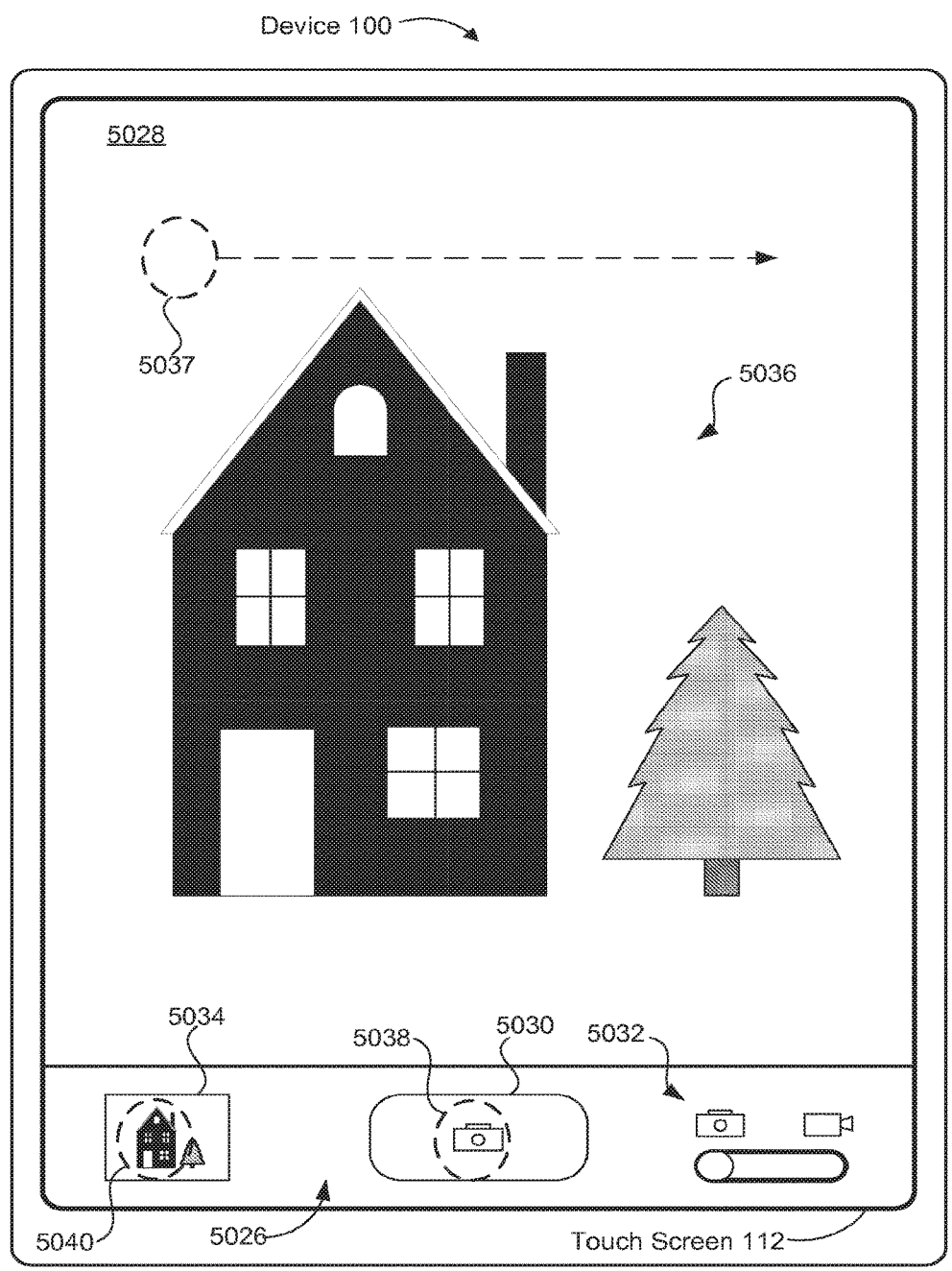

FIG. 5D shows camera interface 5026 of camera application 143 displayed on touch screen 112. Camera interface 5026 includes viewfinder area 5028, shutter icon 5030, still-image/video mode toggle switch 5032, and camera roll icon 5034. A live image preview 5036 may be displayed in viewfinder area 5028. In response to the detection of a gesture (e.g., tap gesture 5038) on shutter icon 5030, a still image is captured and saved into camera roll 159, and a thumbnail preview of the just-captured image is displayed in camera roll icon 5034. In response to activation of toggle switch 5032, camera application 143 switches between still image capture mode and video capture mode (while remaining in the restricted session, if camera application 143 was started in a restricted session).

Figure 5E:
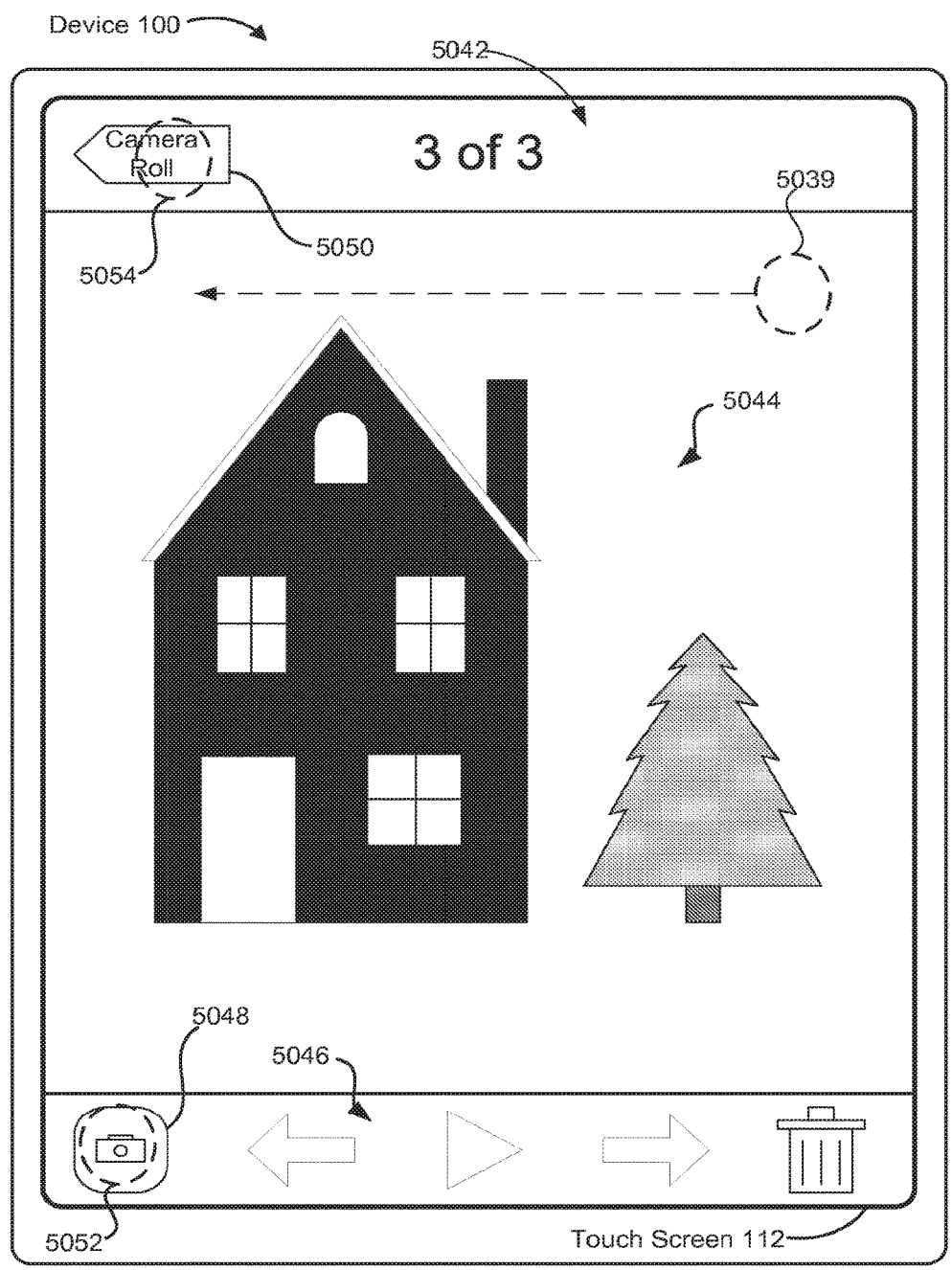

In response to the detection of a gesture (e.g., tap gesture 5040) on camera roll icon 5034, camera roll image viewer interface 5042 of camera application 143 is displayed along with the image(s) 5044 in camera roll 159 that satisfy one or more predefined presentation criteria, as shown in FIG. 5E. Camera roll image viewer interface 5042 includes controls 5046 for, for example, browsing through images and videos in camera roll 159 that satisfy the presentation criteria, starting a slideshow of said images, or deleting a currently displayed image. Camera roll image viewer interface 5042 also includes camera interface icon 5048 and navigation icon 5050. In response to the detection of a gesture (e.g., tap gesture 5052) on camera interface icon 5048, display of camera roll image viewer interface 5042 is replaced by display of camera interface 5026 (FIG. 5D), and camera application 143 remains in the restricted session if camera application 143 was started in a restricted session. In response to the detection of a gesture (e.g., tap gesture 5054) on navigation icon 5050, display of camera roll image viewer interface 5042 is replaced by display of camera roll thumbnails interface 5056 of camera application 143, as shown in FIG. 5F.

Figure 5F:
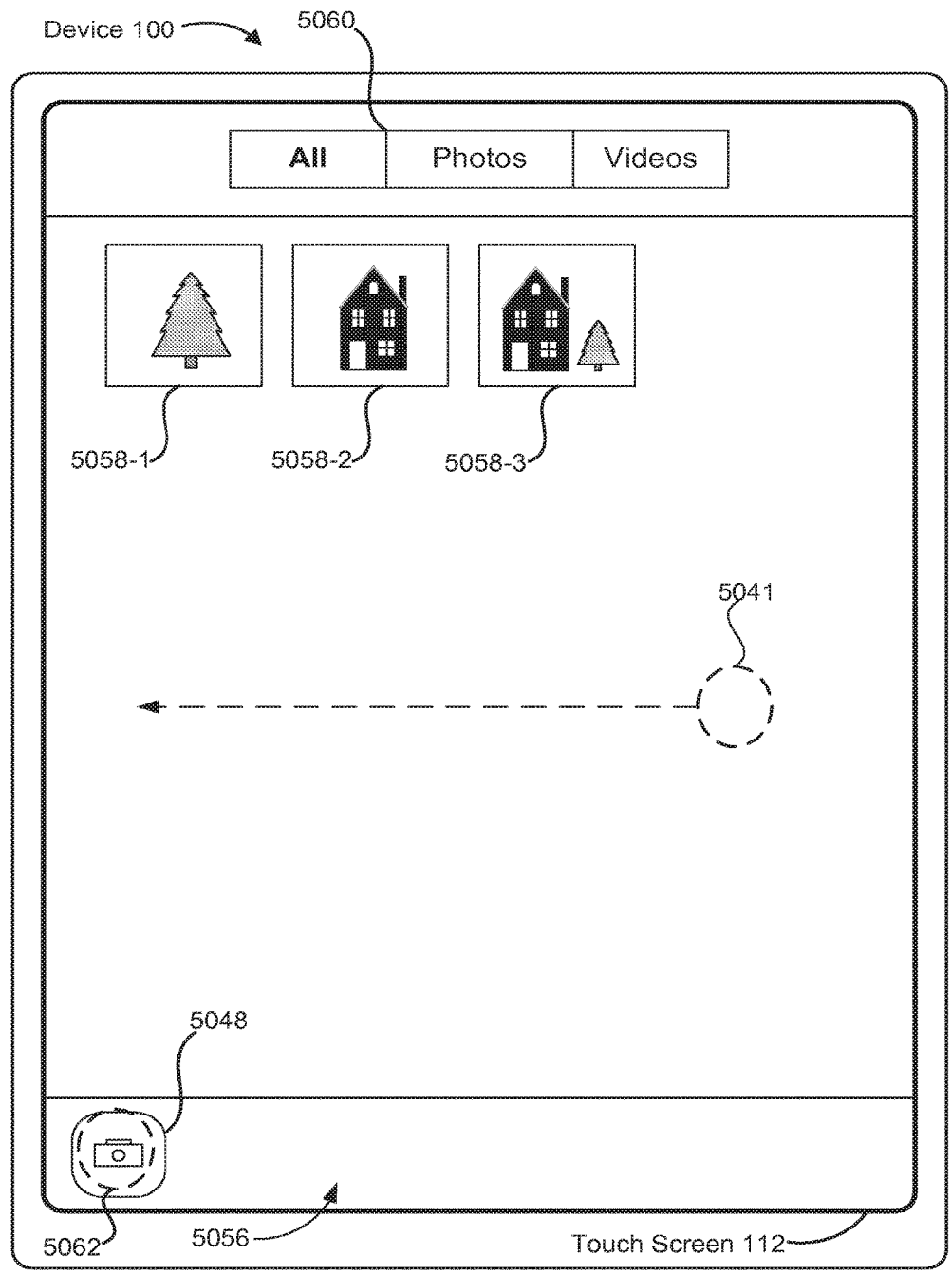

In FIG. 5F, camera roll thumbnails interface 5056 includes zero or more thumbnails 5058 of images (i.e., still images and/or videos) in camera roll 159 that are captured by camera application 143 and which satisfy the one or more predefined presentation criteria. In response to selection of a thumbnail 5058 (e.g., by performing a gesture on the respective thumbnail 5058 in thumbnails interface 5056), camera roll image viewer interface 5042 is displayed, as in FIG. 5E, and the image corresponding to the selected thumbnail 5058 is displayed in camera roll image viewer interface 5042. Also included in thumbnails interface 5056 are camera interface icon 5048 and type selection icons 5060. In response to the detection of a gesture (e.g., tap gesture 5062) on camera interface icon 5048, camera interface 5026 is displayed, as in FIG. 5D, and camera application 143 remains in the restricted session. In response to selection of a type selection icon ("all," "photos," "videos"), thumbnails 5058 displayed in thumbnails interface 5056 may be switched amongst both photos (still images) and videos, just photos, or just videos.

The images and videos (e.g., image 5044) and thumbnails 5058 that are displayed or presented in image viewer interface 5042 and thumbnails interface 5056, respectively, satisfy one or more predefined presentation criteria. In some embodiments, the presentation criterion is that an image or video (or for a thumbnail, the image or video corresponding to the thumbnail), in order to be presented in image viewer interface 5042 and thumbnails interface 5056 while in the restricted session, must be generated (captured) by camera application 143 while in a restricted session (and, in some embodiments, while in the current restricted session). In other words, only images and videos captured in camera application 143 in a restricted session and corresponding thumbnails are presented in image viewer interface 5042 and thumbnails interface 5056, respectively, while in the restricted session, and images and videos generated in camera application 143 while device 100 is unlocked and corresponding thumbnails are not presented in image viewer interface 5042 and thumbnails interface 5056, and thus are inaccessible for viewing while in a restricted session. Images captured in any restricted session, and corresponding thumbnails, are accessible for viewing in camera application 143 while device 100 is unlocked. The presentation criteria are further described in U.S. application Ser. No. 13/243,045, filed Sep. 23, 2011, entitled "Device, Method, and Graphical User Interface for Accessing an Application in a Locked Device," which is incorporated herein by reference in its entirety.

Camera application 143 may be deactivated, and the restricted session ended, by activating, for example, push button 206 or home/menu button 204 while camera interface 5026, camera roll image viewer interface 5042, or thumbnails interface 5056 is displayed on touch screen 112 while camera application 143 is active in the restricted session. In response to activation of push button 206 or home/menu button 204, the restricted session is ended and camera interface 5026, camera roll image viewer interface 5042, and thumbnails interface 5056 cease to be displayed.

In some embodiments, while camera interface 5026 is displayed, in response to the detection of a swipe gesture in one direction (e.g., substantially horizontal and rightward, as in gesture 5037 (FIG. 5D)) on touch screen 112, display of camera interface 5026 is replaced by display of camera roll image viewer interface 5042. While camera roll image viewer interface 5042 or camera roll thumbnails interface 5056 is displayed, in response to the detection of a swipe gesture in the opposite direction (e.g., substantially horizontal and leftward, as in gesture 5039 (FIG. 5E) or gesture 5041 (FIG. 5F)) on touch screen 112, display of camera roll image viewer interface 5042 is replaced by display of camera interface 5026.

It should be appreciated that while FIGS. 5D thru 5F are described above with respect to a still image capture mode for camera application 143, the description of these figures apply analogously to a video capture mode for camera application 143.

In some embodiments, when gesture 5014 is detected on camera access indicia 5006, one or more hardware components related to the operation of camera application 143 are initialized. For example, as gesture 5014 moves with movement 5016, optical sensor(s) 164 and optical sensor(s) controller 158 are initialized. In some embodiments, one or more software and memory components related to the operation of camera application 143 are also initialized or pre-loaded when gesture 5014 is detected on camera access indicia 5006. For example, as gesture 5014 moves with movement 5016, camera roll 159 and digital image pipeline 161 may be pre-loaded. Further details and examples of the initialization or pre-loading of hardware and software components related to the operation of camera application 143 are described in U.S. application Ser. No. 13/243,045, filed Sep. 23, 2011, entitled "Device, Method, and Graphical User Interface for Accessing an Application in a Locked Device," which is incorporated herein by reference in its entirety.

Figure 5G:
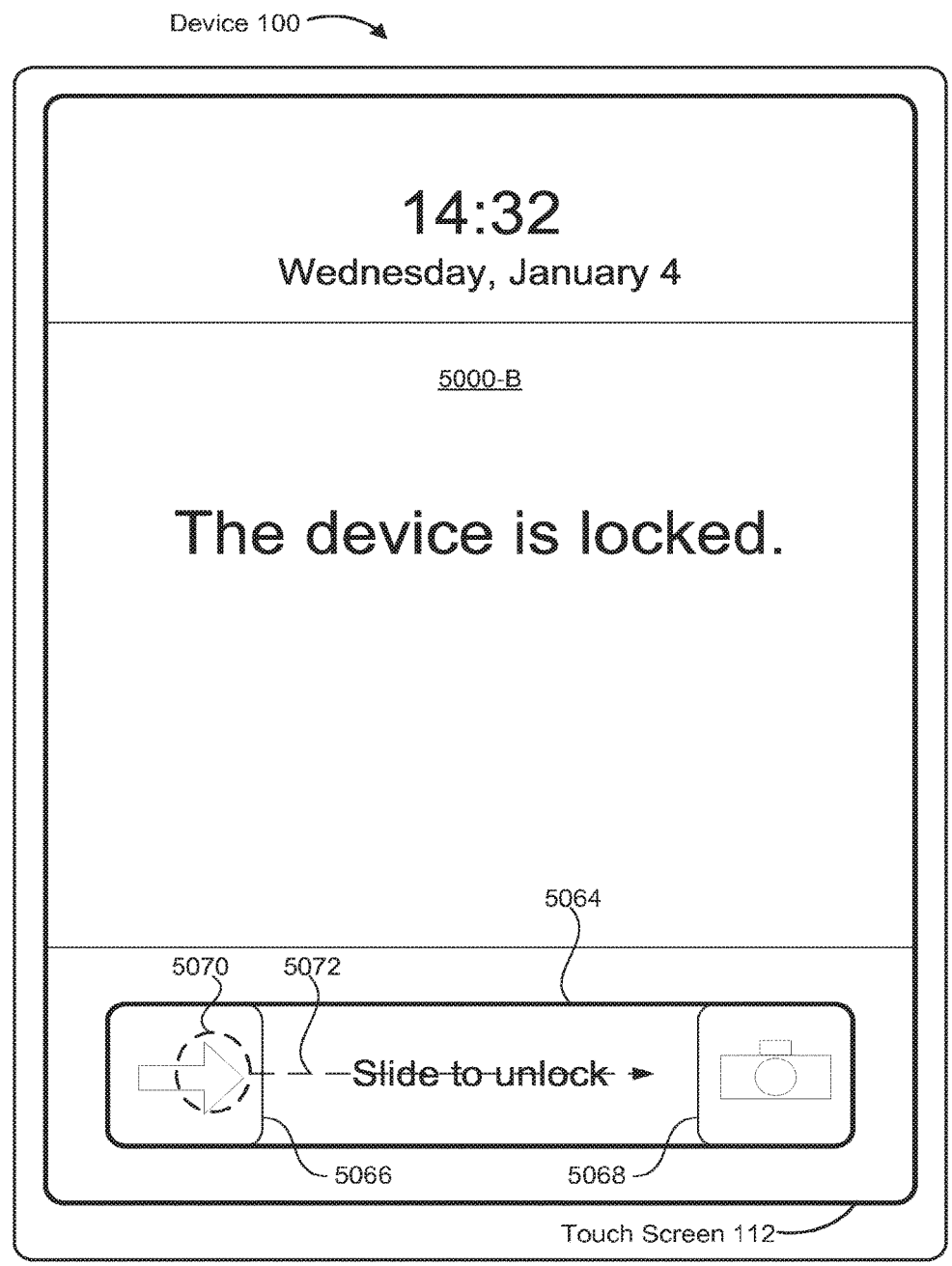
Figure 5H:
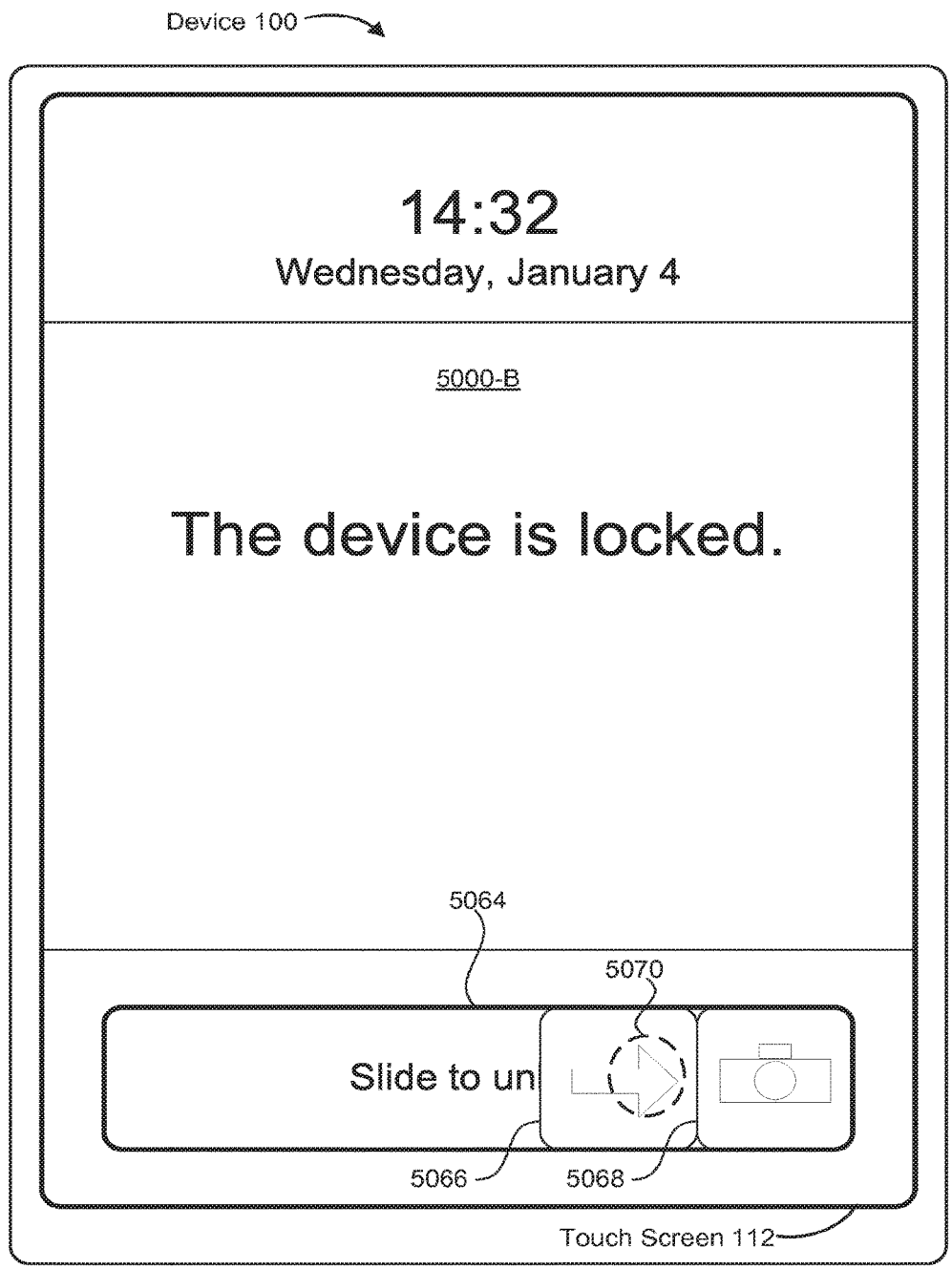

FIG. 5G illustrates locked device interface 5000-B displayed on touch screen 112 while device 100 is in a locked state. In locked device interface 5000-B, virtual channel 5064 is displayed with unlock object 5066 (also called an "unlock image" or "unlock image object") and unlock camera object 5068 (also called an "unlock camera image" or "unlock camera image object"). In some embodiments, unlock object 5066 and unlock camera object 5068 are displayed in opposite ends of virtual channel 5064. For example, as shown in FIG. 5G, unlock object 5066 is displayed at the left end of virtual channel 5064, and unlock camera object 5068 is displayed at the right end of virtual channel 5064.

In some embodiments, unlock object 5066 and unlock camera object 5068, respectively, may be dragged to a location in virtual channel 5064 adjacent to the respective other object. For example, FIG. 5G shows gesture 5070 detected on unlock object 5066. Gesture 5070 moves with movement 5072 toward the right end of virtual channel 5064. In response to the detection of gesture 5070 and corresponding movement 5072, unlock object 5066 moves within virtual channel 5064 toward unlock camera object 5068, up to a location adjacent to unlock camera object 5068, as shown in FIG. 5H.

Figure 5I:
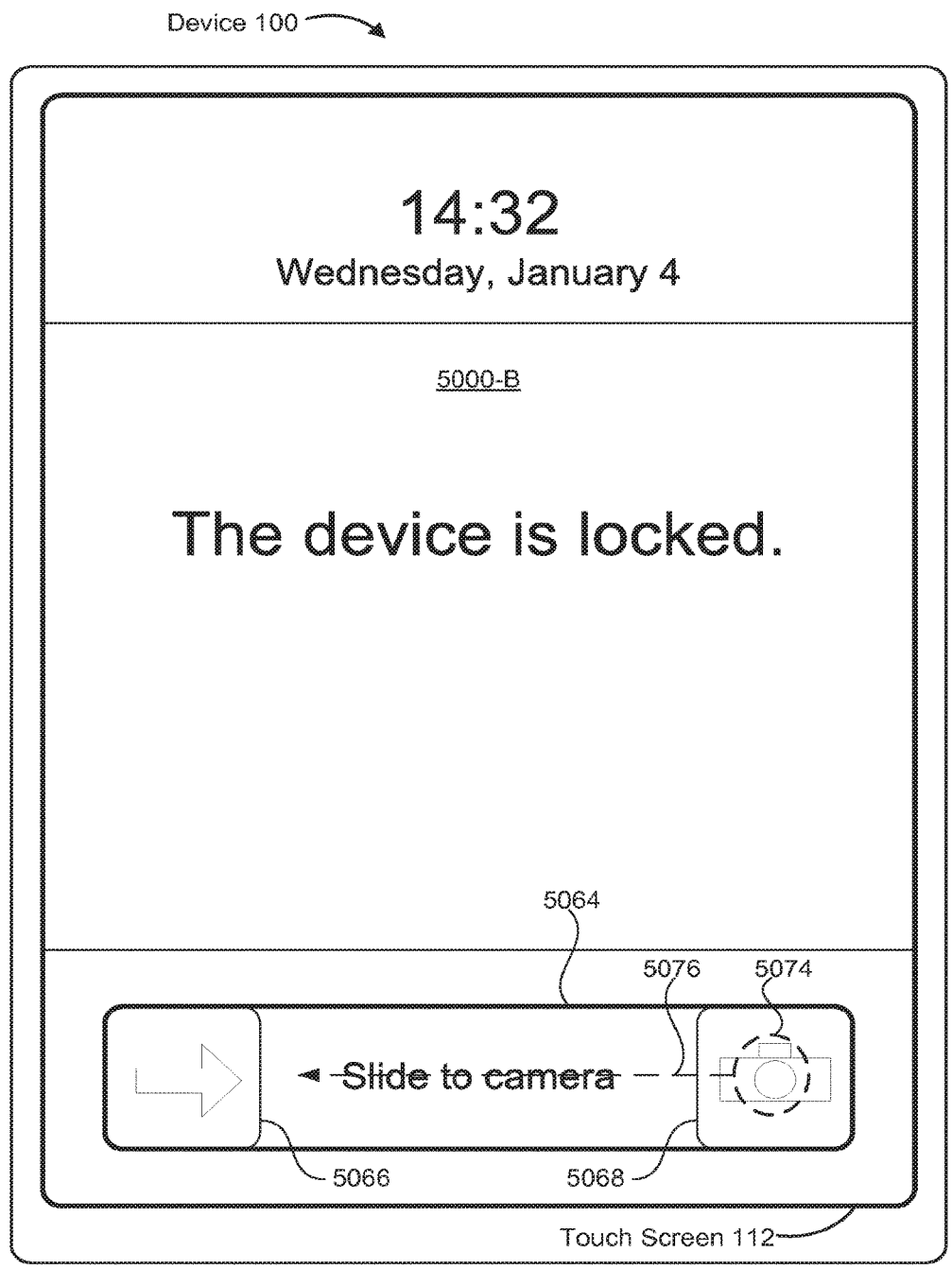

FIG. 5I shows gesture 5074 detected on unlock camera object 5068. Gesture 5074 moves with movement 5076 toward the left end of virtual channel 5064. In response to the detection of gesture 5074 and corresponding movement 5076, unlock camera object 5068 moves within virtual channel 5064 toward unlock object 5066, up to a location adjacent to unlock object 5066, as shown in FIG. 5J.

Gesture 5070 may be released while unlock object 5066 is adjacent to unlock camera object 5068, as shown in FIG. 5H. If device 100 is in a locked, passcode-protected state when gesture 5070 is released, in response to the release of gesture 5070, passcode entry user interface 5022 is displayed (as in FIG. 5C), and the user has to enter the correct passcode to unlock device 100. If device 100 is in a locked, not-passcode-protected state when gesture 5070 is released, in response to the release of gesture 5070, device 100 is unlocked, and a user interface that was being displayed when the device was put into the locked state (e.g., user interface 400, FIG. 4A) may be displayed on touch screen 112.

Figure 5J:
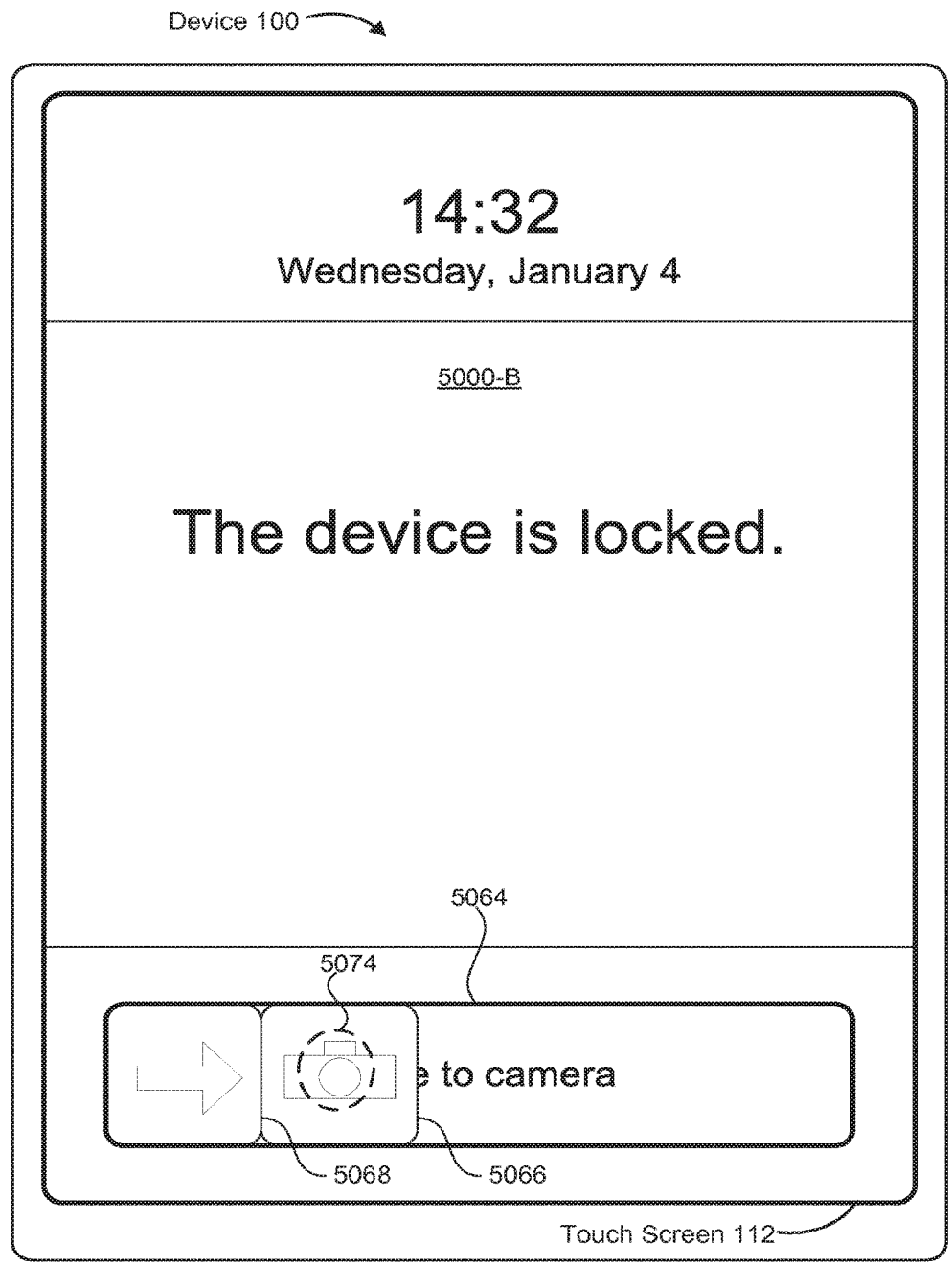

Similarly, gesture 5074 may be released while unlock camera object 5068 is adjacent to unlock object 5066, as shown in FIG. 5J. In response to the release of gesture 5074, if device 100 was in a locked, passcode-protected state, camera application 143 is started in a restricted session, and camera interface 5026 is displayed, as in FIG. 5D. If device 100 was in a locked, not-passcode-protected state, device 100 is unlocked, camera application 143 is started in an unrestricted session, and camera interface 5026 is displayed (as in FIG. 5D) without the restrictions of a restricted session.

Figure 5K:
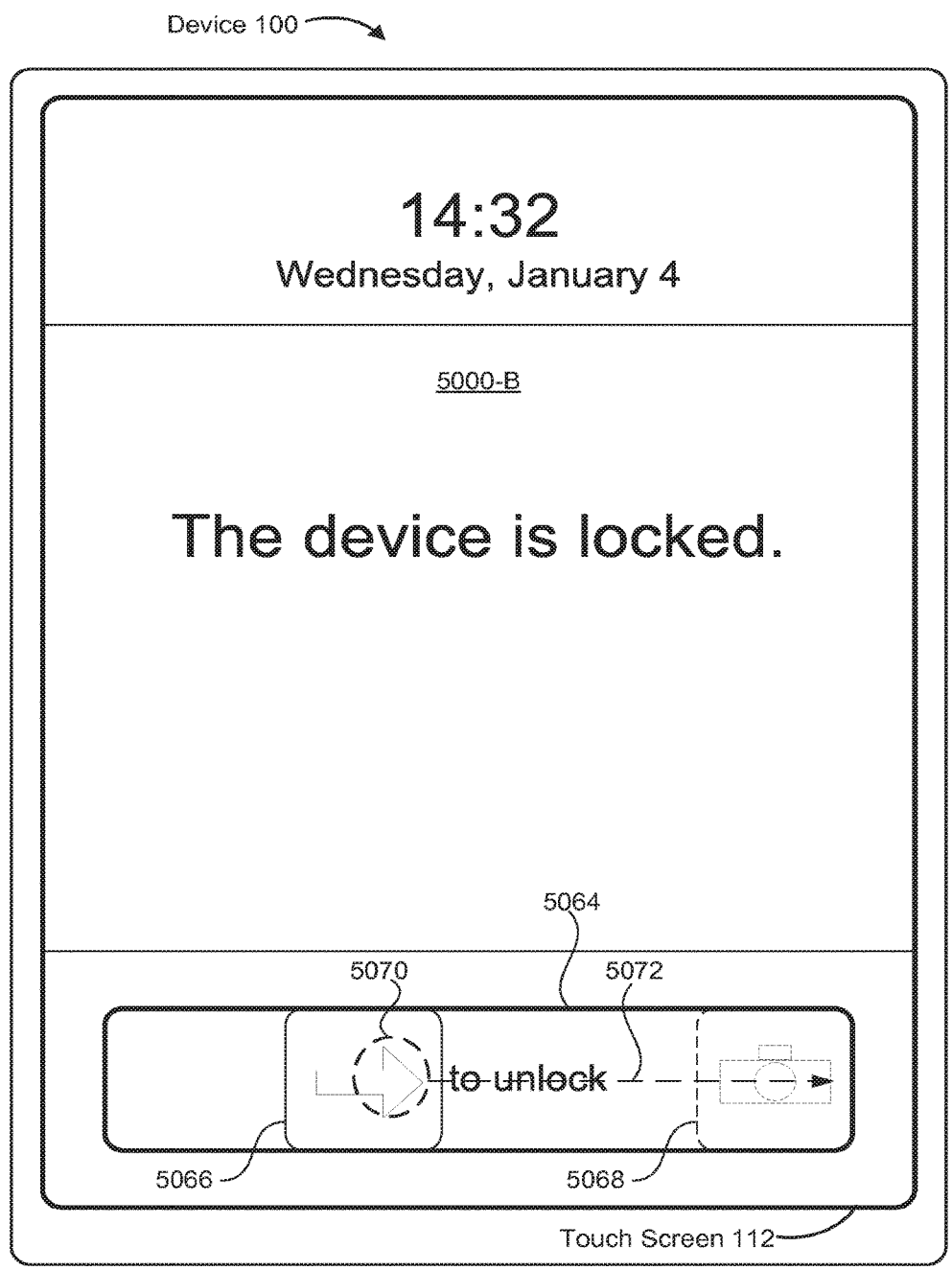
Figure 5L:
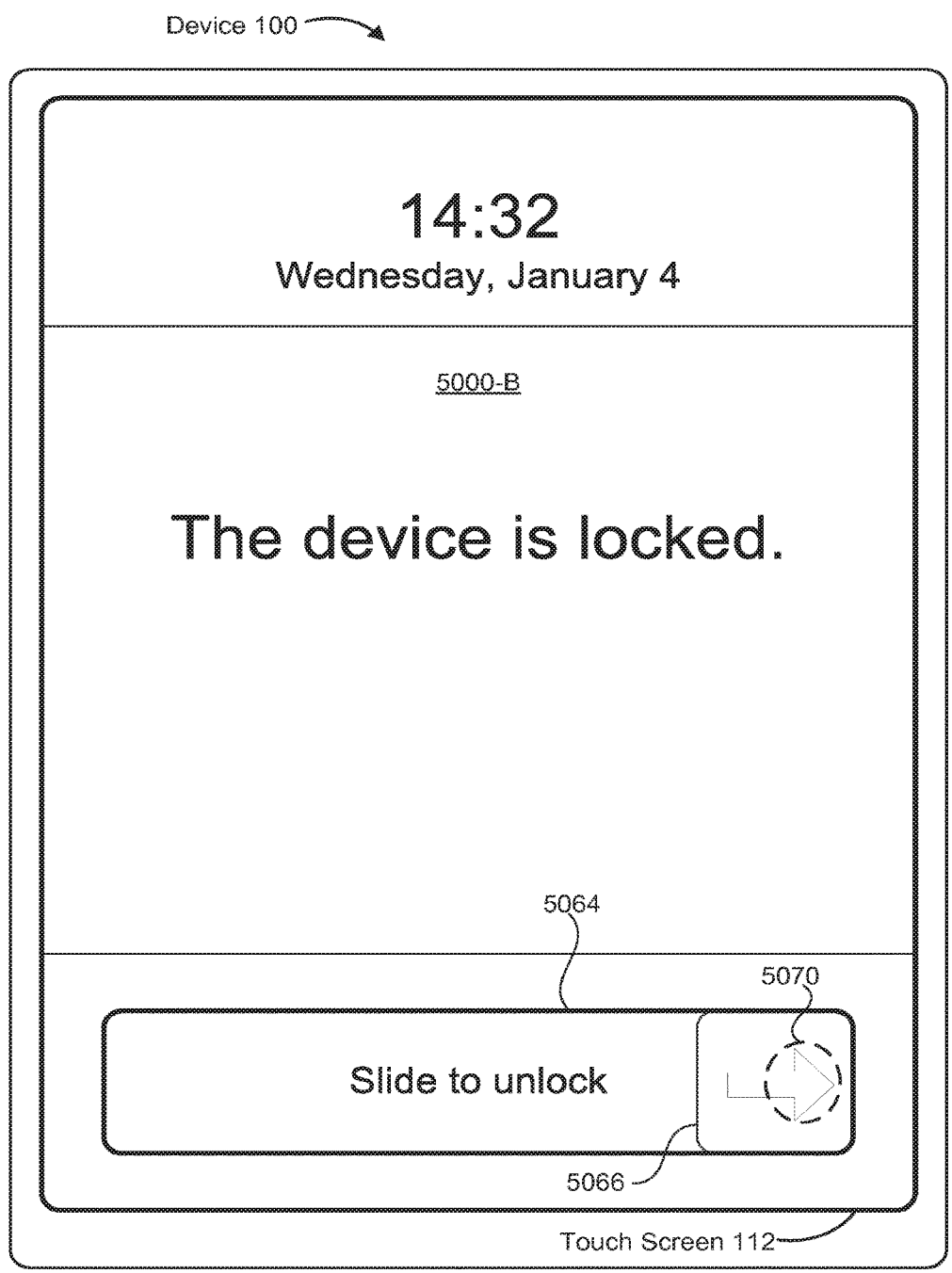
Figure 5M:
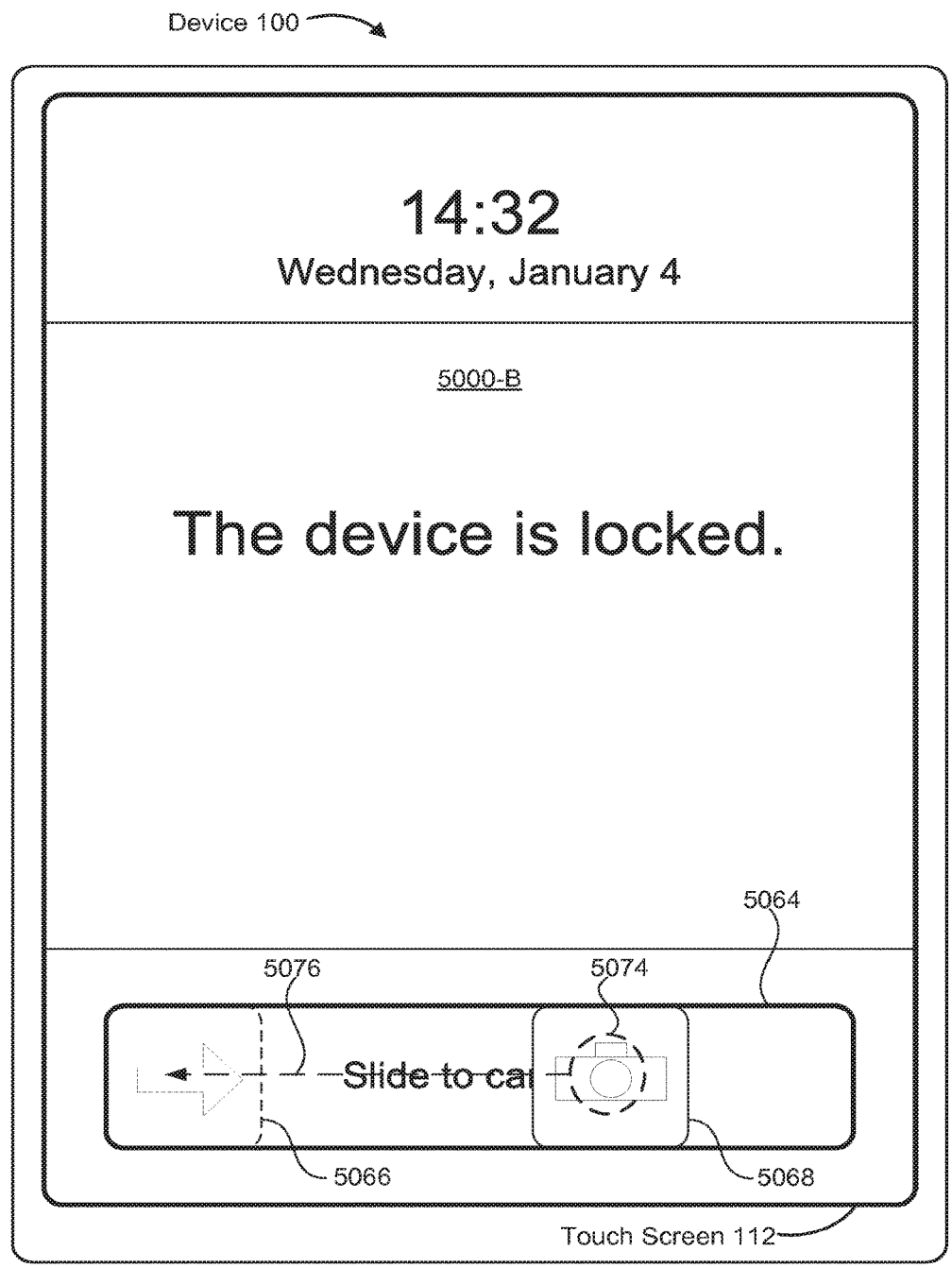
Figure 5N:
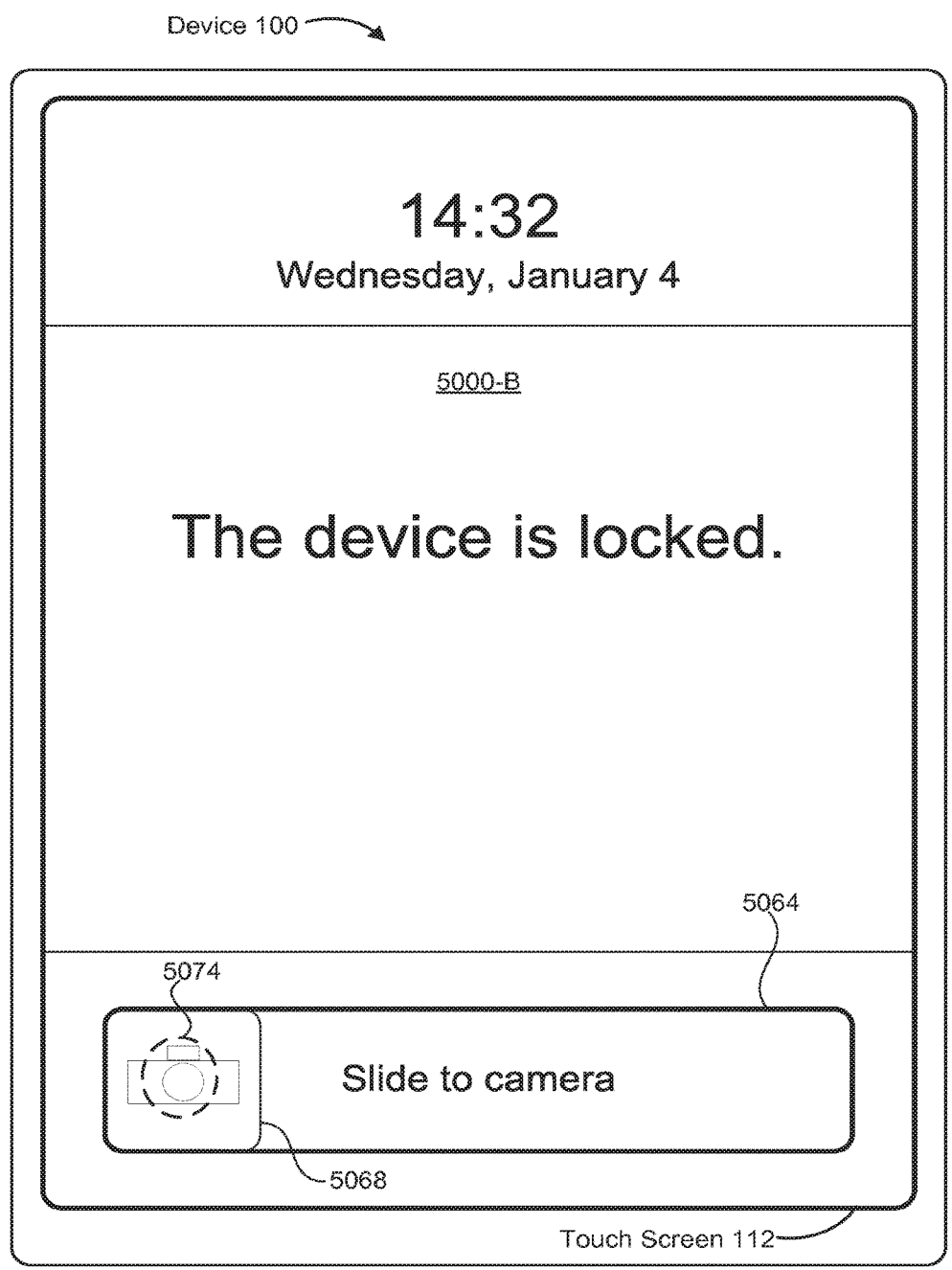

In some other embodiments, unlock object 5066 and unlock camera object 5068, respectively, may each be dragged to the location formerly occupied by the respective other object (with the respective other object ceasing to be displayed). For example, in response to the detection of gesture 5070 and corresponding movement 5072, unlock object 5066 moves within virtual channel 5064 toward unlock camera object 5068, up to the right end of virtual channel 5064 where unlock camera object 5068 was previously located, as shown in FIG. 5K-5L. Conversely, in response to the detection of gesture 5074 and corresponding movement 5076, unlock camera object 5068 moves within virtual channel 5064 toward unlock object 5066, up to the left end of virtual channel 5064 where unlock object 5066 was previously located, as shown in FIGS. 5M-5N.

In some embodiments, as gesture 5070 and movement 5072 are detected, unlock camera object 5068 fades out, as shown in FIG. 5K. Conversely, as gesture 5074 and movement 5076 are detected, unlock object 5066 fades out, as shown in FIG. 5M.

Figure 5O:
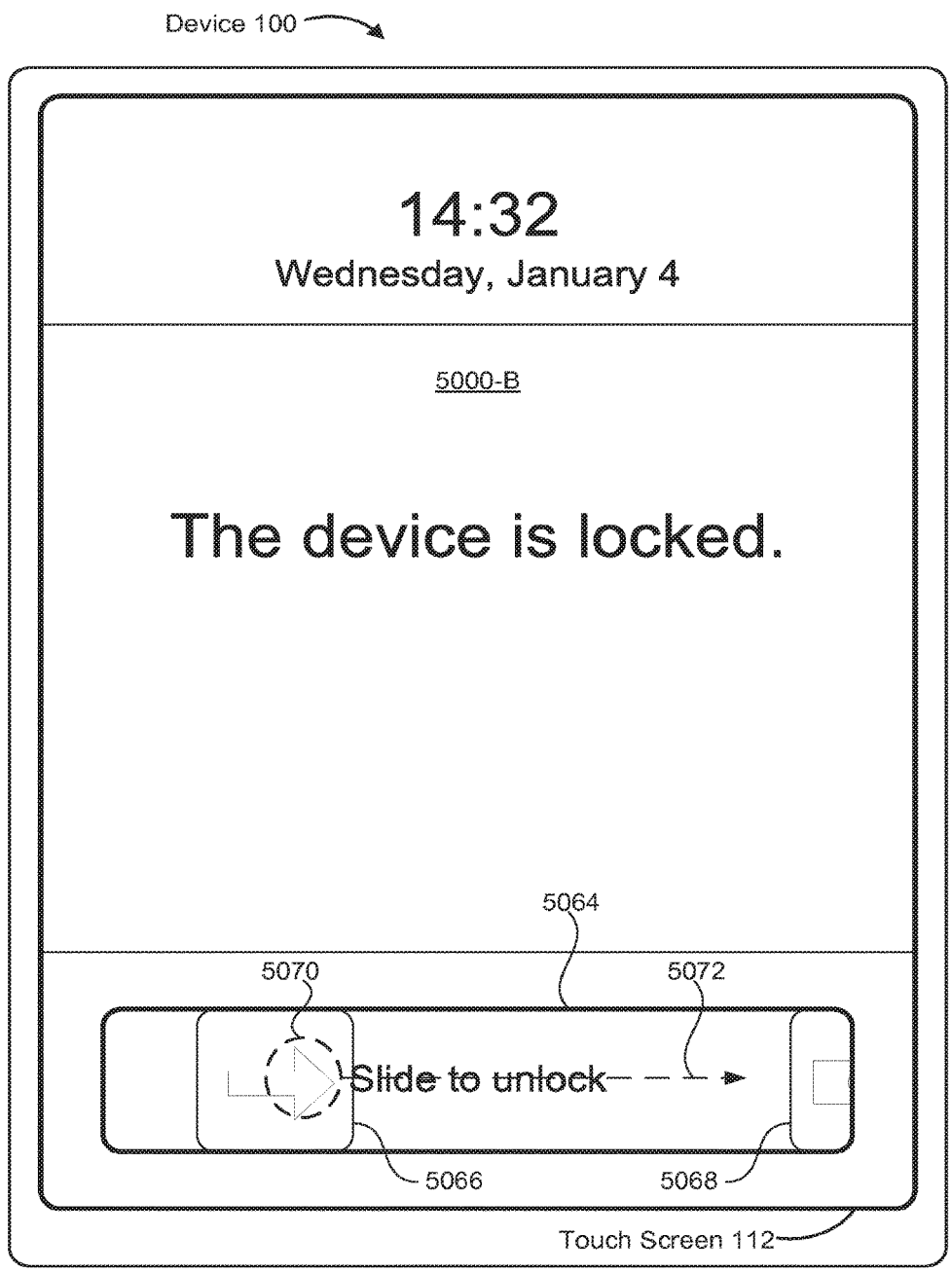
Figure 5P:
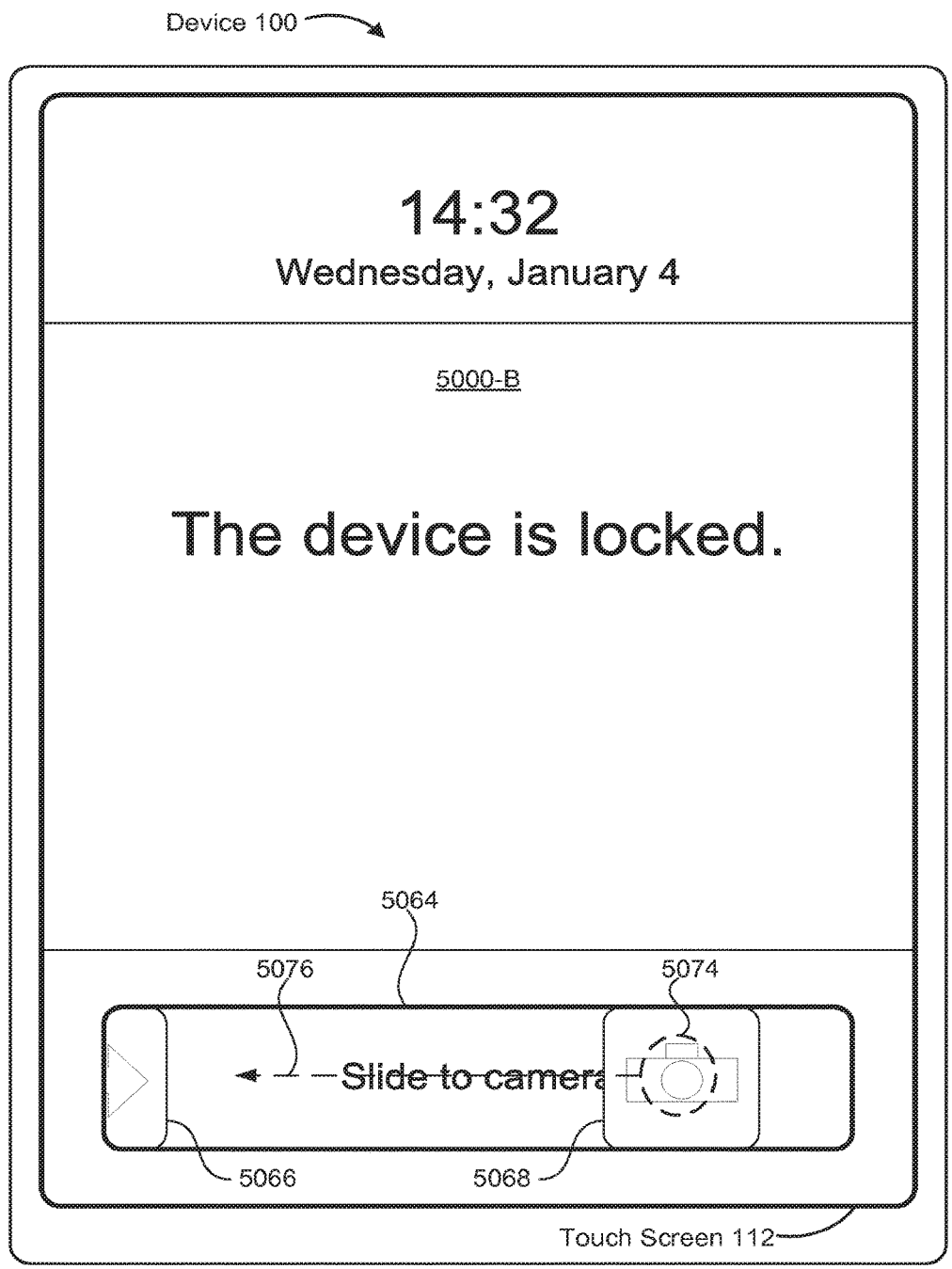

In some other embodiments, unlock object 5066 and unlock camera object 5068 move in unison. As unlock object 5066 moves to the right end of virtual channel 5064, unlock camera object 5068, instead of fading out, moves rightward, going under the boundary of virtual channel 5064 and out of view as unlock object 5066 moves rightward, as shown in FIG. 5O. Conversely, as unlock camera object 5068 moves to the left end of virtual channel 5064, unlock object 5066, instead of fading out, moves leftward, going under the boundary of virtual channel 5064 and out of view as unlock camera object 5068 moves leftward, as shown in FIG. 5P.

In some further embodiments, as unlock object 5066 moves to the right end of virtual channel 5064, unlock camera object 5068 stays in place and unlock object 5066 overlaps (and goes over) unlock camera object 5068 as unlock object 5066 moves to the right end of virtual channel 5064 (not shown). As unlock camera object 5068 moves to the left end of virtual channel 5064, unlock object 5066 stays in place and unlock camera object 5068 overlaps (and goes over) unlock object 5066 as unlock camera object 5068 moves to the left end of virtual channel 5064 (not shown).

Gesture 5070 may be released while unlock object 5066 is at the right end of virtual channel 5064, as shown in FIG. 5L. If device 100 is in a locked, passcode-protected state, in response to the release of gesture 5070, passcode entry user interface 5022 is displayed (as in FIG. 5C), and the user has to enter the correct passcode to unlock device 100. If device 100 is in a locked, not-passcode-protected state, in response to the release of gesture 5070, device 100 is unlocked, and a user interface that was being displayed when the device was put into the locked state (e.g., user interface 400, FIG. 4A) may be displayed on touch screen 112.

Gesture 5074 may be released while unlock camera object 5068 at the left end of virtual channel 5064, as shown in FIG. 5N. In response to the release of gesture 5074, if device 100 was in a locked, passcode-protected state, camera application 143 is started in a restricted session, and camera interface 5026 is displayed, as in FIG. 5D. If device 100 was in a locked, not-passcode-protected state, device 100 is unlocked, camera application 143 is started in an unrestricted session, and camera interface 5026 is displayed (as in FIG. 5D) without the restrictions of a restricted session.

From camera interface 5026, camera roll image viewer interface 5042 and camera roll thumbnails interface 5056 may be accessed, as described above with reference to FIGS. 5D-5F. For brevity, the details are not repeated here.

Figure 5Q:
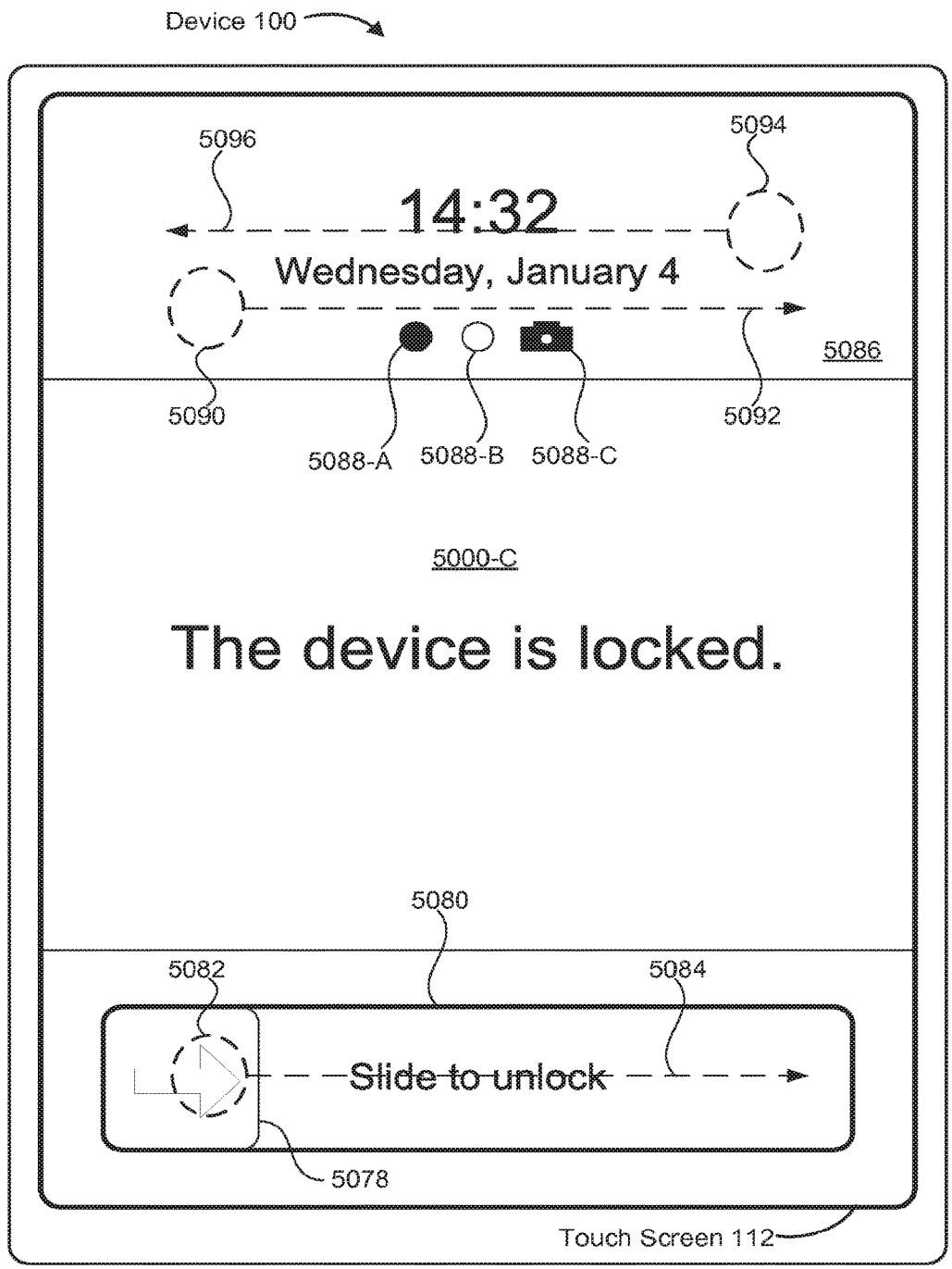

FIG. 5Q illustrates locked device interface 5000-C displayed on touch screen 112 while device 100 is in a locked state. In locked device interface 5000-C, virtual channel 5080 is displayed with unlock object 5078 displayed at the left end of virtual channel 5080. Gesture 5082 and its corresponding movement 5084 may be detected on unlock object 5078. In response to the detection of gesture 5082 and movement 5084, unlock object 5078 moves within virtual channel 5080 in accordance with the direction of movement 5084, up to the right end of virtual channel 5080.

Gesture 5082 may be released while unlock object 5078 is at the right end of virtual channel 5084. If device 100 is in a locked, passcode-protected state, in response to the release of gesture 5082, passcode entry user interface 5022 is displayed (as in FIG. 5C), and the user has to enter the correct passcode to unlock device 100. If device 100 is in a locked, not-passcode-protected state, in response to the release of gesture 5082, device 100 is unlocked, and a user interface that was being displayed when the device was put into the locked state (e.g., user interface 400, FIG. 4A) may be displayed on touch screen 112.

Locked device interface 5000-C also includes predefined region 5086. Multiple page indicators 5088 are displayed in region 5086. The page indicators 5088 indicate that the user may perform a gesture on region 5086 to switch between "pages." For example, the "page" displayed in FIG. 5Q is the second of three "pages"; indicator 5088-B is colored or highlighted differently from the other indicators 5088-A and 5088-C. In some embodiments, the second "page" includes information such as the current time and date, as shown in FIG. 5Q.

In some embodiments, one or more of the page indicators 5088 are shaped to indicate an association with a respective application. For example, indicator 5088-C is shaped like a camera, to indicate that the third "page" is associated with camera application 143 or camera functionality on device 100 in some way.

Figure 5R:
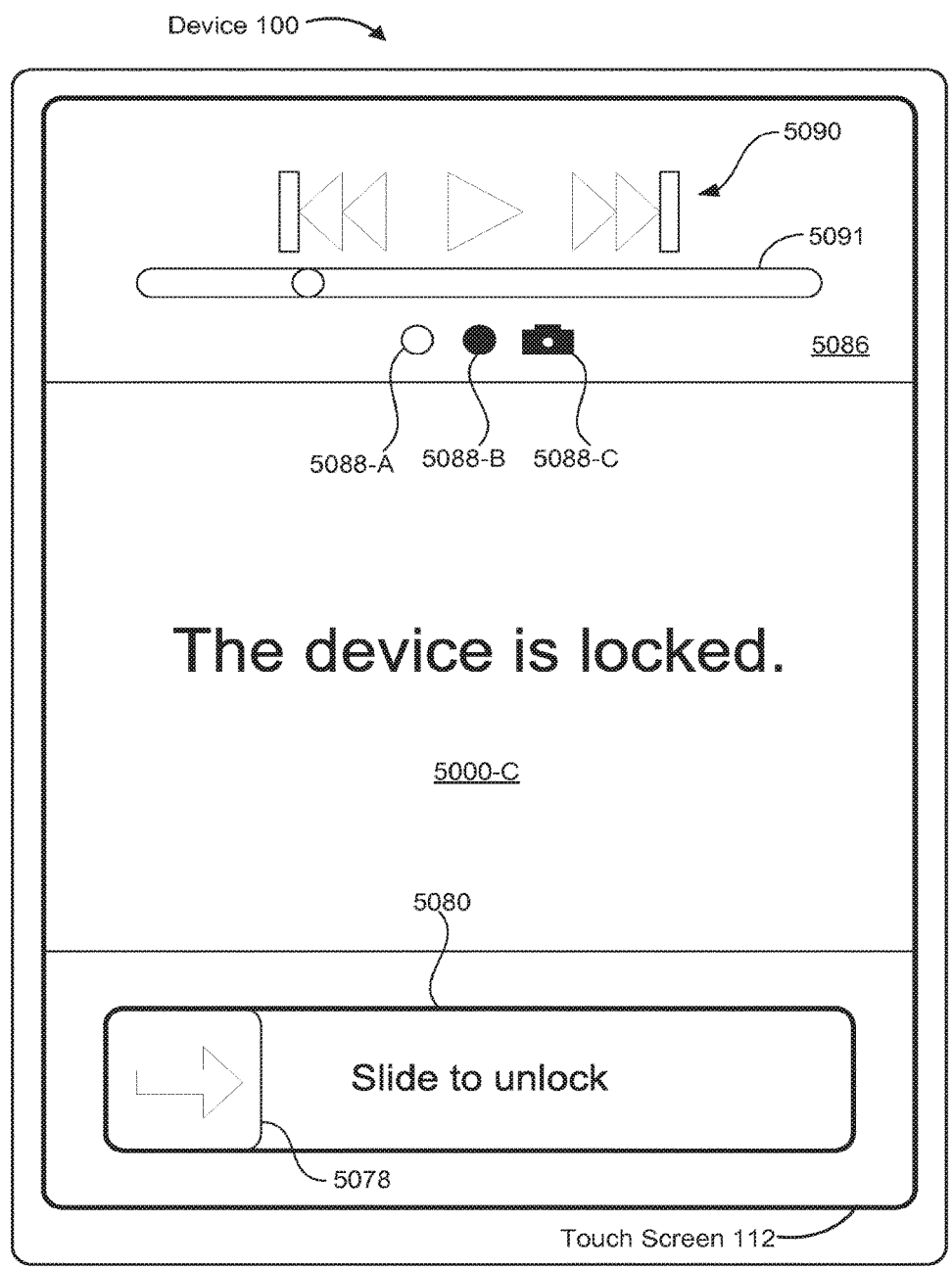

A substantially horizontally moving gesture may be detected on region 5086. For example, in FIG. 5Q, gesture 5090 with movement 5092 may be detected on region 5086 while the second "page" is displayed. In response to the detection of gesture 5090 and corresponding movement 5092, a first "page" is displayed on touch screen 112 in place of the second "page," as shown in FIG. 5R. In accordance with the page change, indicators 5088-A and 5088-B changes color or highlighting to indicate that the first "page" is currently displayed. In some embodiments, the first "page" includes media playback controls 5090 (e.g., play/pause, next track, previous track, etc.) and volume indicator bar 5091. While the first "page" is displayed, if a gesture that is similar to gesture 5090 but moving in a direction opposite of movement 5092 is detected, the second "page" is displayed in response.

Figure 5S:
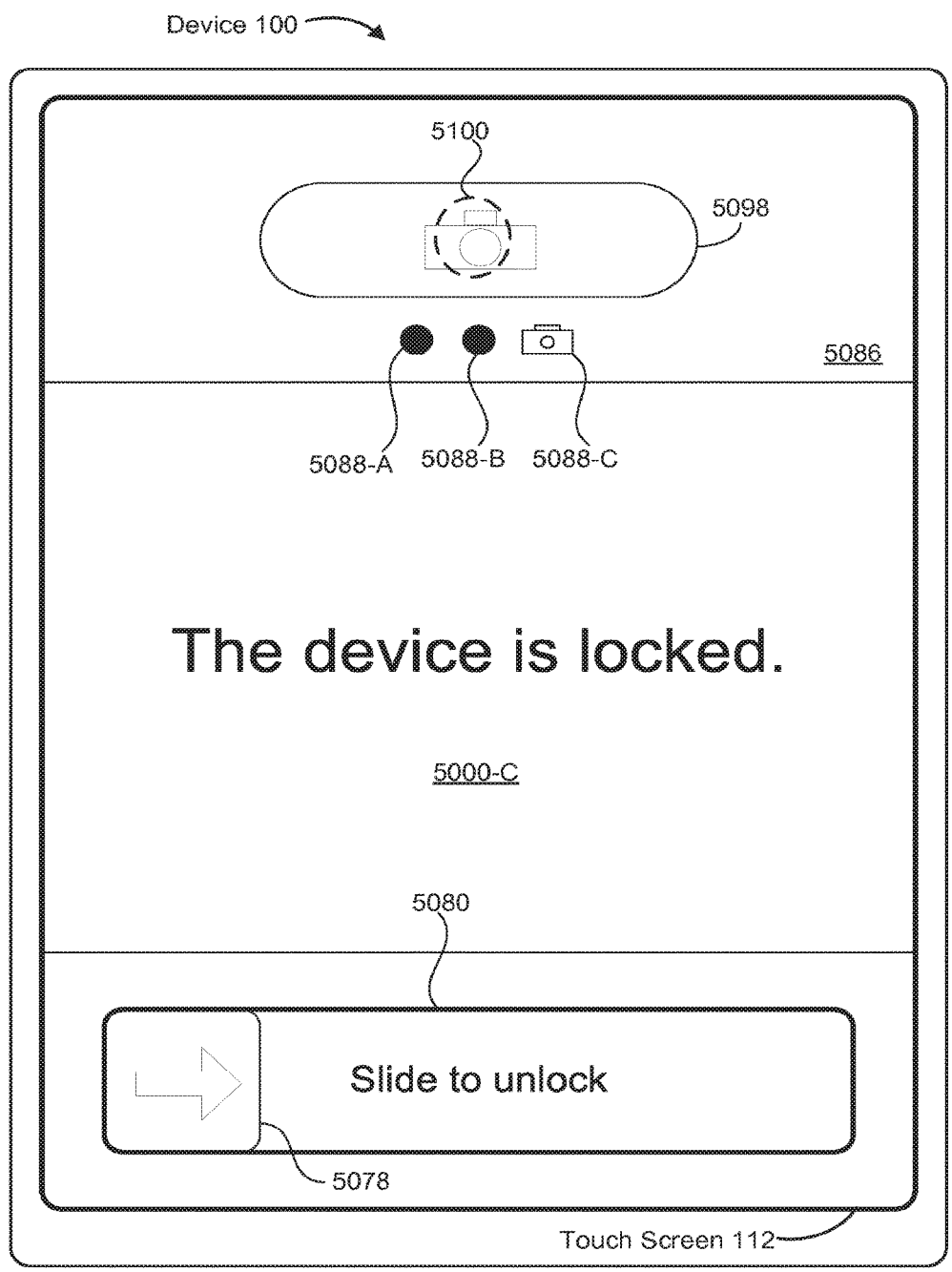
Figure 5T:
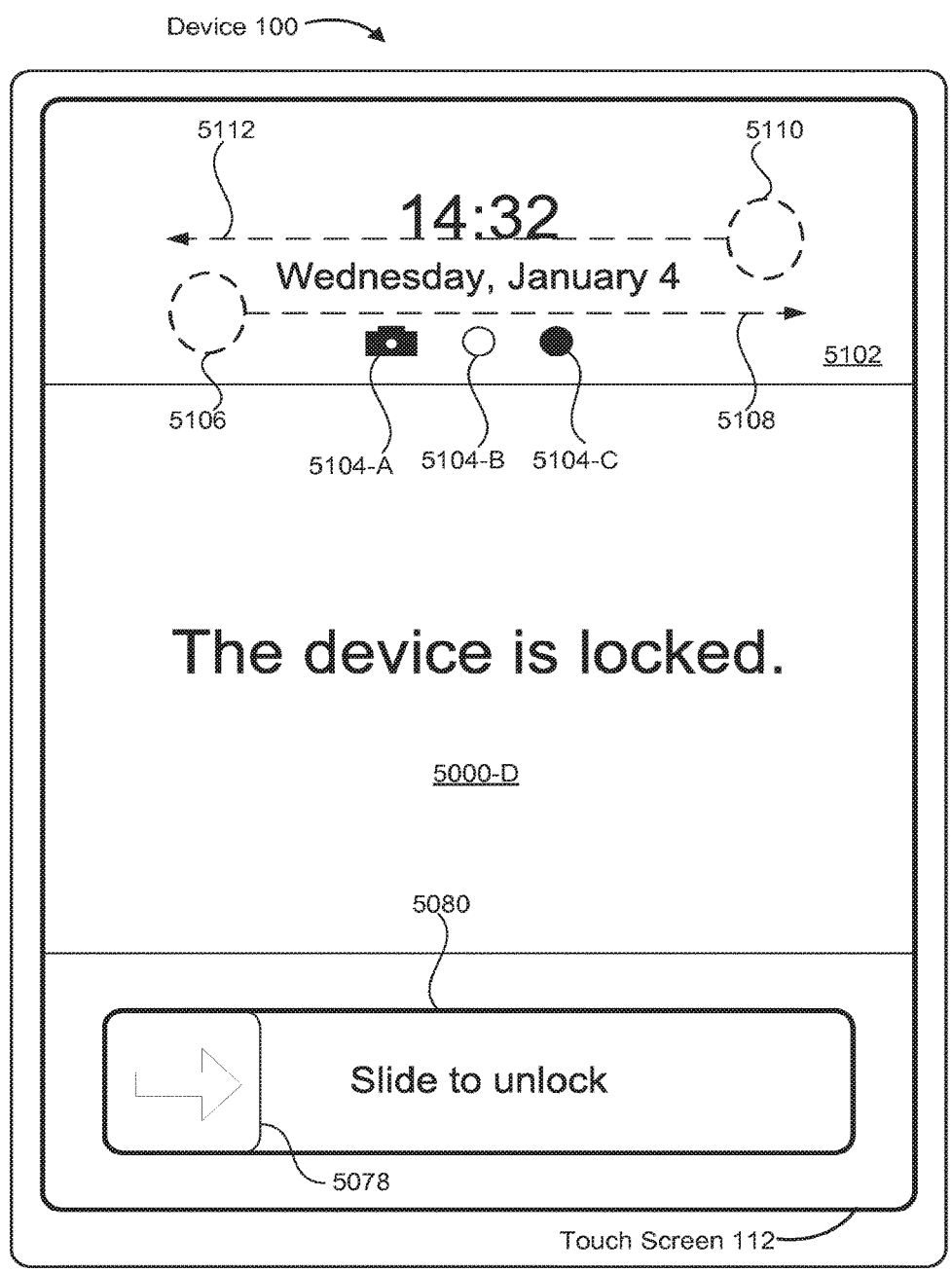

Returning to FIG. 5Q, gesture 5094 with movement 5096 may be detected on region 5086 while the second "page" is displayed. Movement 5096 has a direction opposite of movement 5090. In response to the detection of gesture 5094 and movement 5096, a third "page" is displayed in place of the second "page," as shown in FIG. 5S. In accordance with the page change, indicators 5088-B and 5088-C changes color or highlighting to indicate that the third "page" is currently displayed. While the third "page" is displayed, if a gesture that is similar to gesture 5094 but moving in a direction opposite of movement 5096 is detected, the second "page" is displayed in response.

The third "page" displayed on touch screen 112 includes camera icon 5098, as shown in FIG. 5S. A gesture (e.g., tap gesture 5100) may be detected on camera icon 5098. In response to the detection of gesture 5100 on icon 5098, if device 100 was in a locked, passcode-protected state, camera application 143 is started in a restricted session and camera interface 5026 is displayed, as in FIG. 5D. If device 100 was in a locked, not-passcode-protected state, device 100 is unlocked, camera application 143 is started in an unrestricted session, and camera interface 5026 is displayed (as in FIG. 5D) without the restrictions of a restricted session. From camera interface 5026, camera roll image viewer interface 5042 and camera roll thumbnails interface 5056 are accessible, as described above with reference to FIGS. 5D-5F. For brevity, these details are not repeated here.

FIG. 5T illustrates locked device interface 5000-D displayed on touch screen 112 while device 100 is in a locked state. In locked device interface 5000-D, virtual channel 5080 is displayed with unlock object 5078 displayed at the left end of virtual channel 5080. Unlock object 5078 may be interacted with using gestures (e.g., gesture 5082, FIG. 5Q) to unlock device 100. For brevity, the details are not repeated here.

Locked device interface 5000-D also includes predefined region 5102. Multiple page indicators 5104 are displayed in region 5102. The page indicators 5104 indicate that the user may perform a gesture on region 5102 to switch between "pages." For example, the "page" displayed in FIG. 5T is the second of three "pages"; indicator 5104-B is colored or highlighted differently from the other indicators 5104-A and 5104-C. In some embodiments, the second "page" includes information such as the current time and date, as shown in FIG. 5T.

In some embodiments, one or more of the page indicators 5104 are shaped to indicate an association with a respective application. For example, indicator 5104-A is shaped like a camera, to indicate that a first "page" is associated with camera application 143 or camera functionality on device 100 in some way.

A substantially horizontally moving gesture may be detected on region 5102. For example, in FIG. 5T, gesture 5106 with movement 5108 may be detected on region 5102 while the second "page" is displayed. In response to the detection of gesture 5106 and corresponding movement 5108, camera application 143 is started in a restricted session and camera interface 5026 is displayed, as in FIG. 5D, in place of locked device interface 5000-D. In some embodiments, while camera interface 5026 is displayed, if a gesture that is similar to gesture 5106 but moving in a direction opposite of movement 5108 is detected, in response the second "page" (i.e., locked device interface 5000-D as shown in FIG. 5T) is displayed.

Figure 5U:
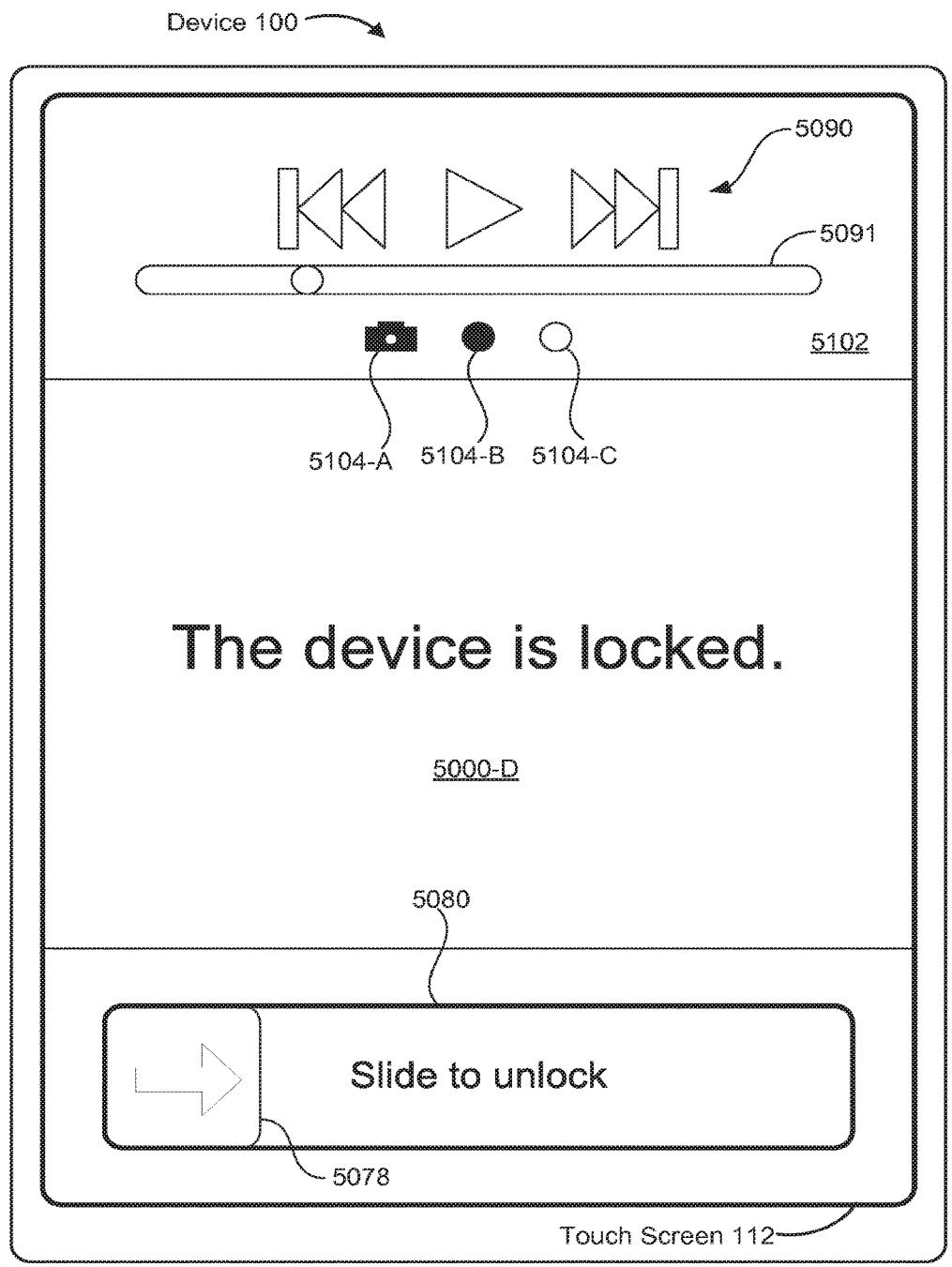

Returning to FIG. 5T, gesture 5110 with movement 5112 may be detected on region 5102 while the second "page" is displayed. In response to the detection of gesture 5110 and corresponding movement 5112, a third "page" is displayed on touch screen 112 in place of the second "page," as shown in FIG. 5U. In accordance with the page change, indicators 5104-B and 5104-C changes color or highlighting to indicate that the third "page" is currently displayed. In some embodiments, the third "page" includes media playback controls 5090 (e.g., play/pause, next track, previous track, etc.) and volume indicator bar 5091. While the third "page" is displayed, if a gesture that is similar to gesture 5110 but moving in a direction opposite of movement 5112 is detected, in response the second "page" is displayed.

Figure 5V:
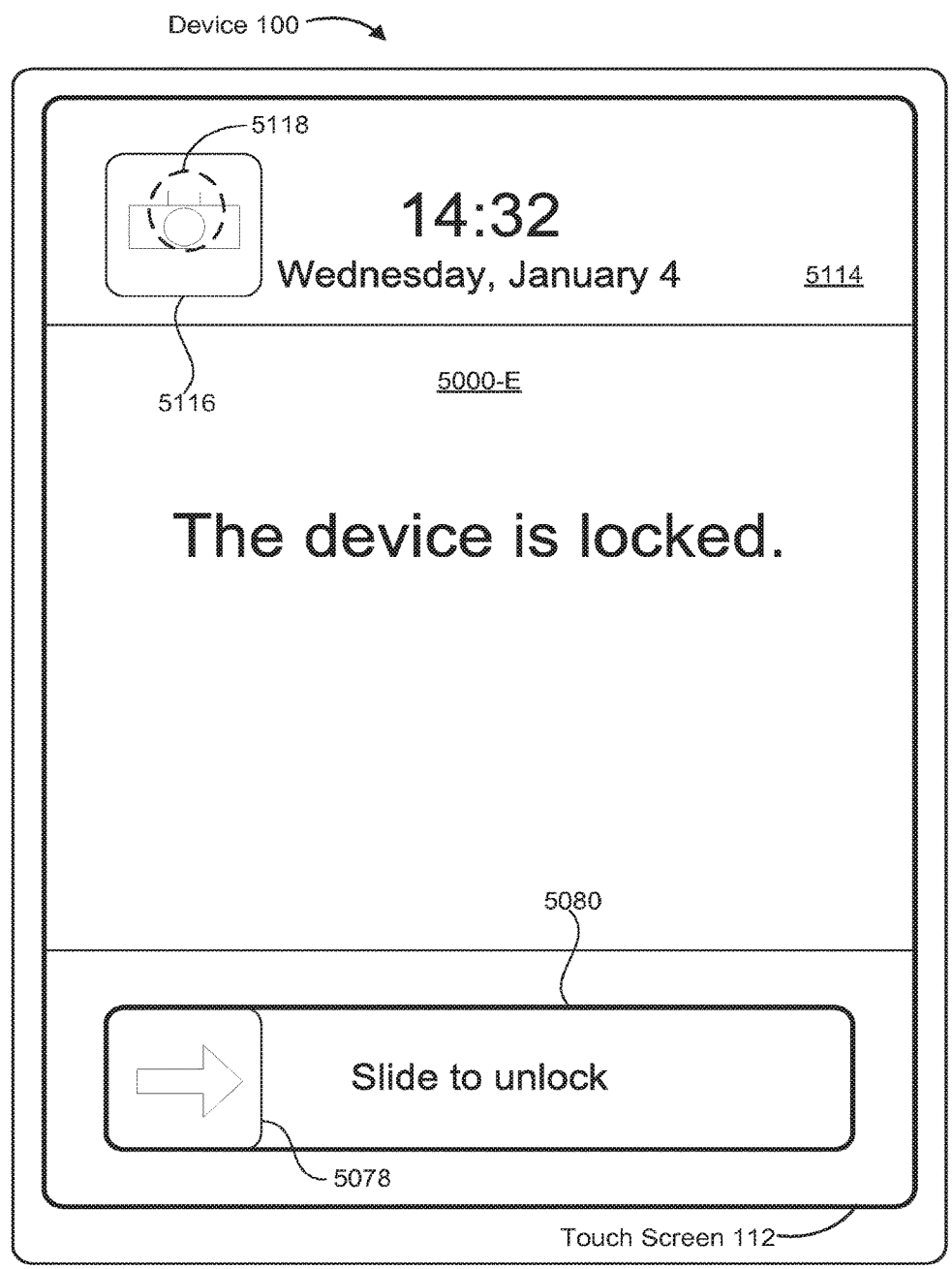

FIG. 5V illustrates locked device interface 5000-E displayed on touch screen 112. Locked device interface 5000-E includes unlock object 5078 and channel 5080, which are described above with reference to FIG. 5Q, and the details are not repeated here. Locked device interface 5000-E also includes region 5114, where information such as the current date and time may be displayed.

Figure 5W:
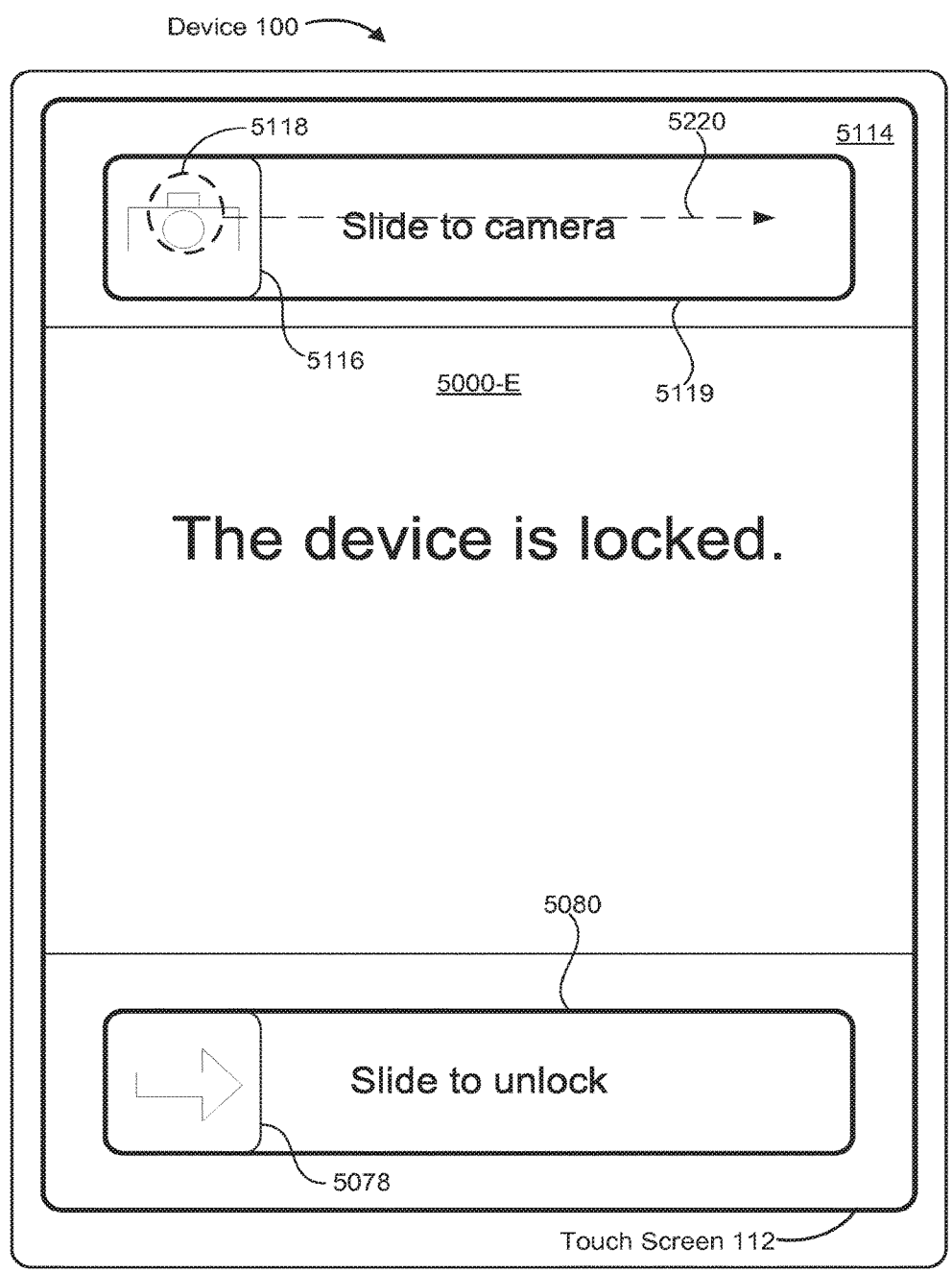

Region 5114 also includes unlock camera object 5116, as shown in FIG. 5V. FIG. 5V also shows a contact corresponding to gesture 5118 detected on unlock camera object 5116. In response to the detection of the contact corresponding to gesture 5118, virtual channel 5119 is displayed with unlock camera object 5116 at the left end, to indicate that unlock camera object 5116 may be dragged to the right end of channel 5119, as shown in FIG. 5W. In response to gesture 5118 moving in direction 5220 toward the right end of channel 51129, unlock camera object 5116 moves toward the right end of channel 5119 in accordance with movement 5220. When unlock camera object 5116 is at the right end of channel 5119 and gesture 5118 is released, if device 100 was in a locked, passcode-protected state, camera application 143 is started in a restricted session and camera interface 5026 is displayed, as in FIG. 5D. If device 100 was in a locked, not-passcode-protected state, device 100 is unlocked, camera application 143 is started in an unrestricted session, and camera interface 5026 is displayed (as in FIG. 5D) without the restrictions of a restricted session.

Figure 5X:
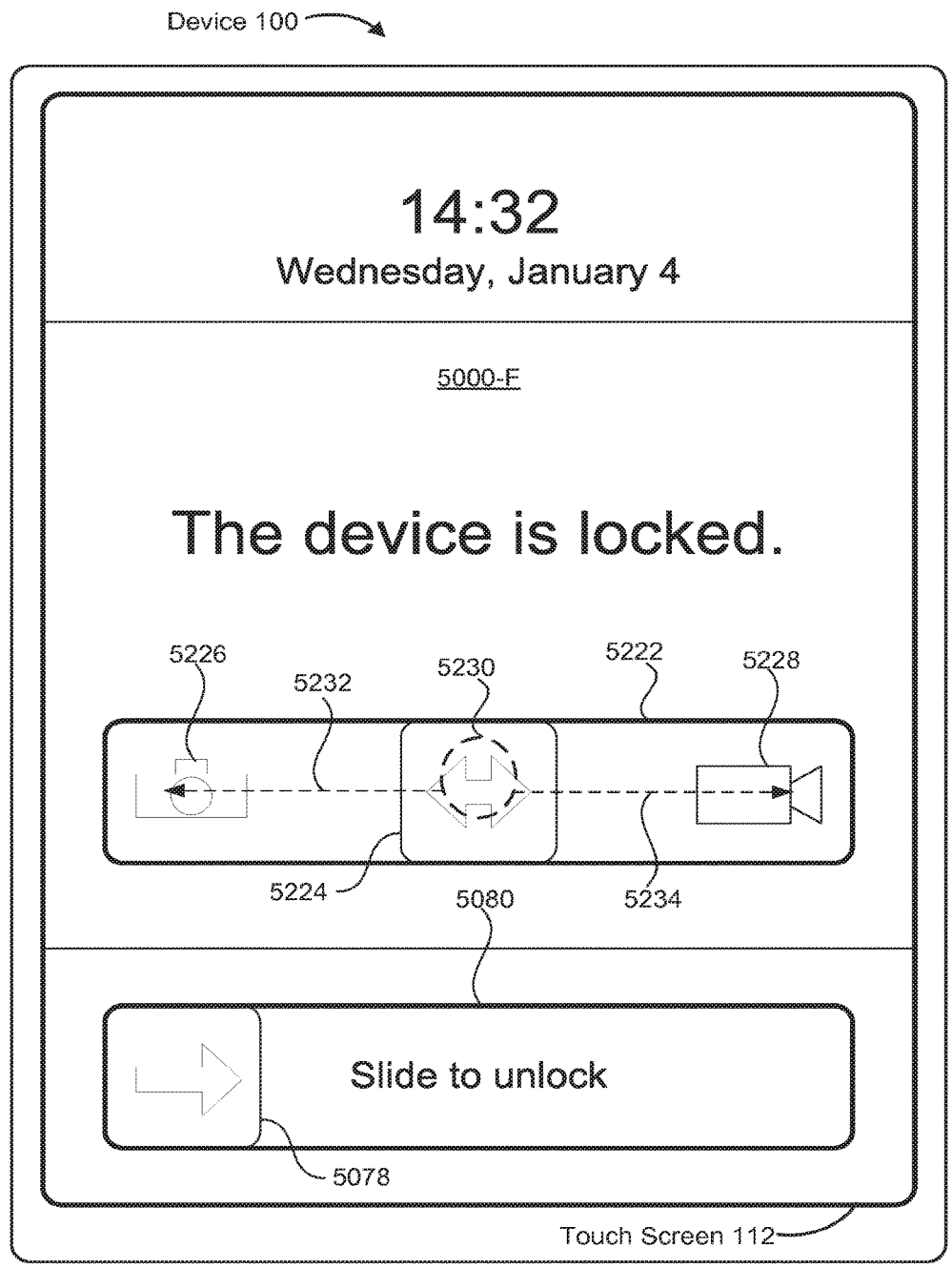

FIG. 5X illustrates locked device interface 5000-F. Locked device interface 5000-F includes unlock object 5078 and virtual channel 5080, as well as unlock camera object 5224 and virtual channel 5222. Unlock camera object 5224 is initially positioned near or at the center of channel 5222. At the ends of channel 5222 are still camera icon 5226 and video camera icon 5228, respectively. Still camera icon 5226 corresponds to a still image capture mode for camera application 143. Video camera icon 5228 corresponds to a video capture mode for camera application 143.

Gesture 5230 may be detected on unlock camera object 5224 and move either with movement 5232 toward still camera icon 5226 or with movement 5234 toward video camera icon 5228. In response to the detection of gesture 5230 and movement 5232, unlock camera object 5224 moves within channel 5222 toward still camera icon 5226 in accordance with movement 5232. In response to the detection of gesture 5230 and movement 5234, unlock camera object 5224 moves within channel 5222 toward video camera icon 5228 in accordance with movement 5234.

Gesture 5230 may be released when unlock camera object 5224 is located at either end of channel 5222. If gesture 5230 is released when unlock camera object 5224 is located at the end of channel 5222 that has still camera icon 5226 and device 100 was in a locked, passcode-protected state, camera application 143 is started in a restricted session and camera interface 5026 is displayed in still image capture mode, as in FIG. 5D. If gesture 5230 is released when unlock camera object 5224 is located at the end of channel 5222 that has still camera icon 5226 and device 100 was in a locked, not-passcode-protected state, device 100 is unlocked, camera application 143 is started in an unrestricted session, and camera interface 5026 is displayed (as in FIG. 5D) in still image capture mode without the restrictions of a restricted session. If gesture 5230 is released when unlock camera object 5224 is located at the end of channel 5222 that has video camera icon 5228 and device 100 was in a locked, passcode-protected state, camera application 143 is started in a restricted session and camera interface 5026 is displayed in video capture mode. If gesture 5230 is released when unlock camera object 5224 is located at the end of channel 5222 that has video camera icon 5228 and device 100 was in a locked, not-passcode-protected state, device 100 is unlocked, camera application 143 is started in an unrestricted session, and camera interface 5026 is displayed (as in FIG. 5D) in video capture mode without the restrictions of a restricted session.

Figure 5Y:
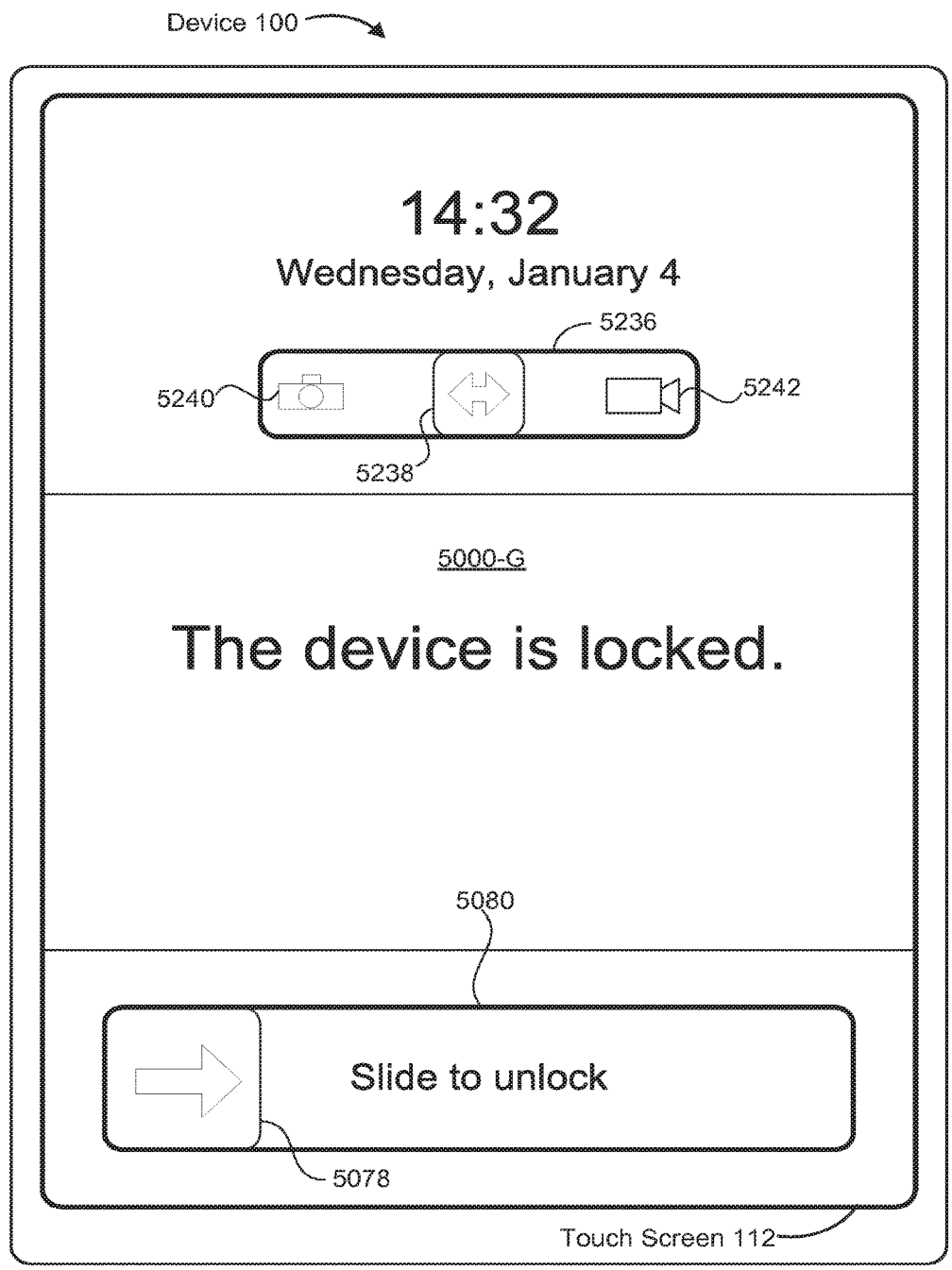

FIG. 5Y illustrates locked device interface 5000-G, which is similar to locked device interface 5000-F, but with a smaller unlock camera object 5238, channel 5236, still camera icon 5040, and video camera icon 5242. Unlock camera object 5238 may be interacted with in a similar manner as unlock camera object 5224 (FIG. 5X) to access camera interface 5026 in still image capture mode or video capture mode.

Figure 5Z:
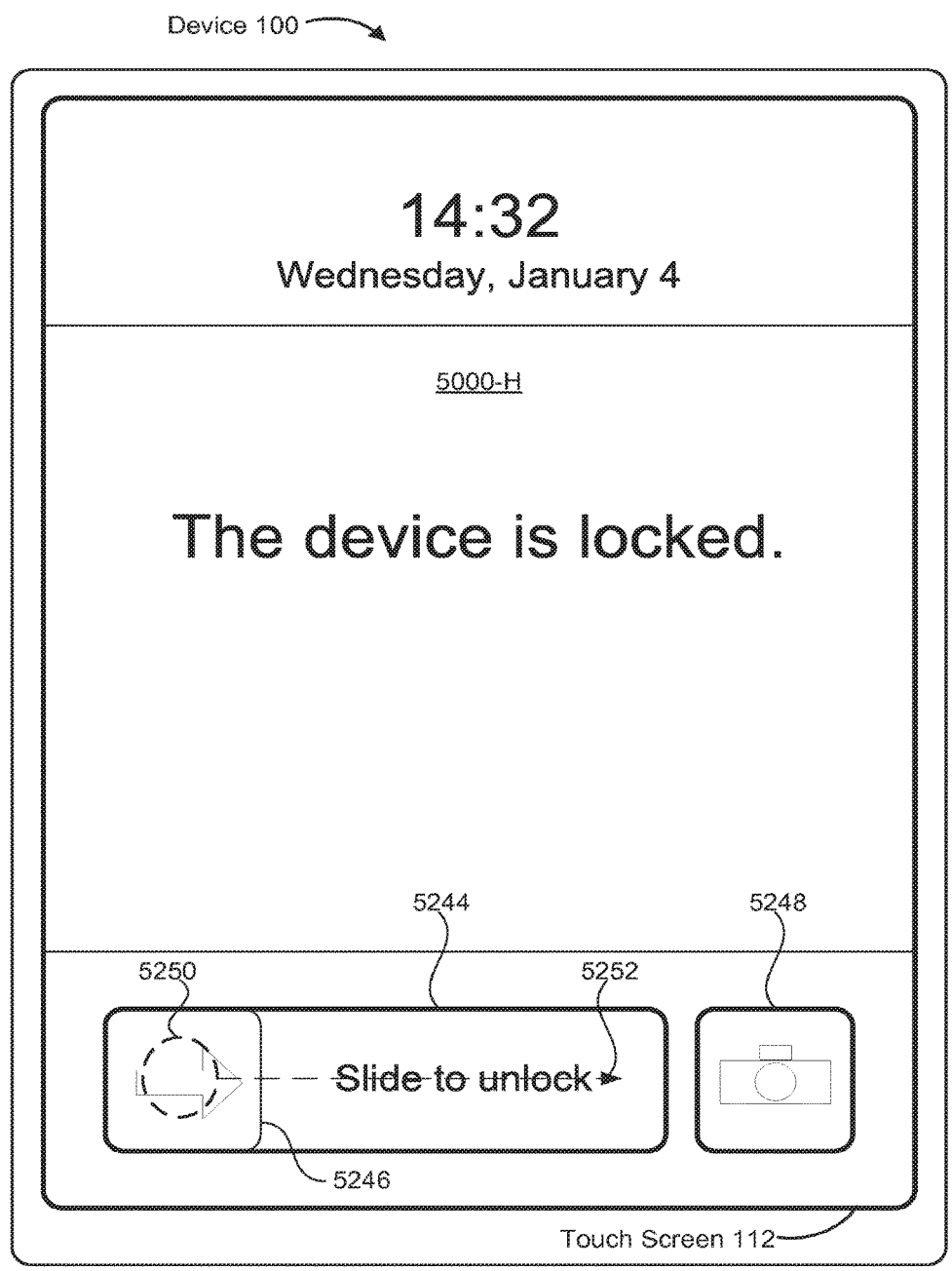
Figure 5A:
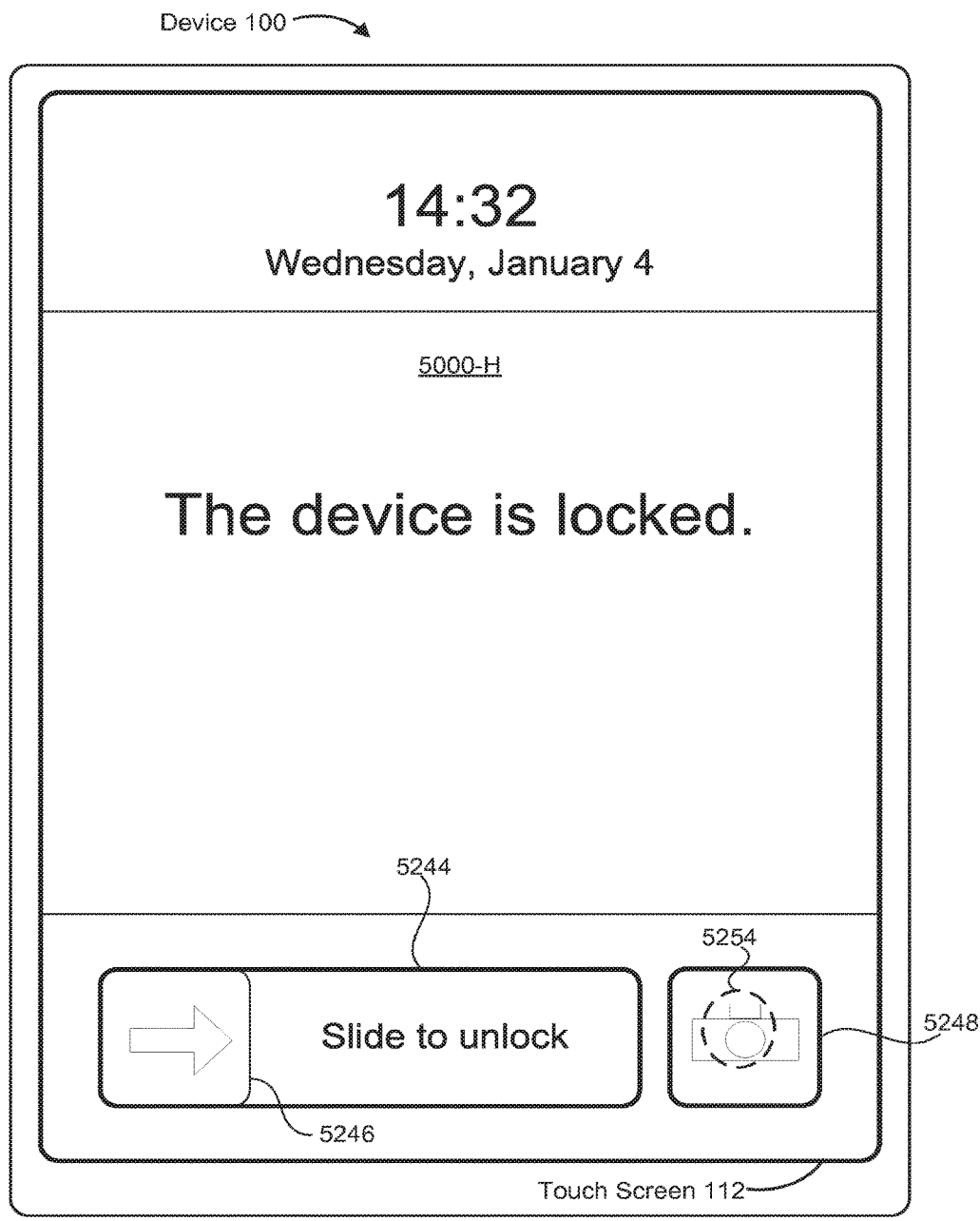
Figure 5B:
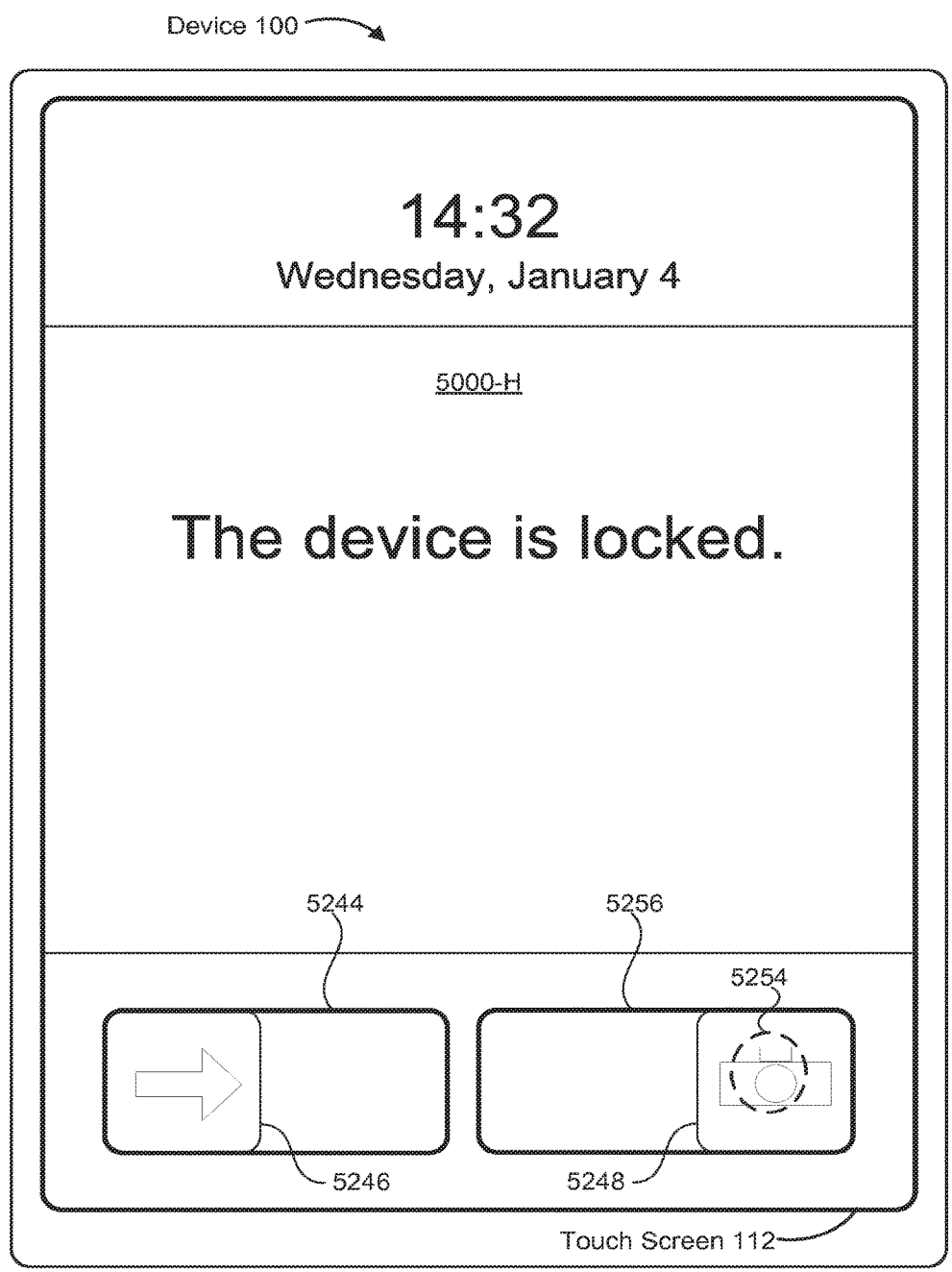
Figure 5C:
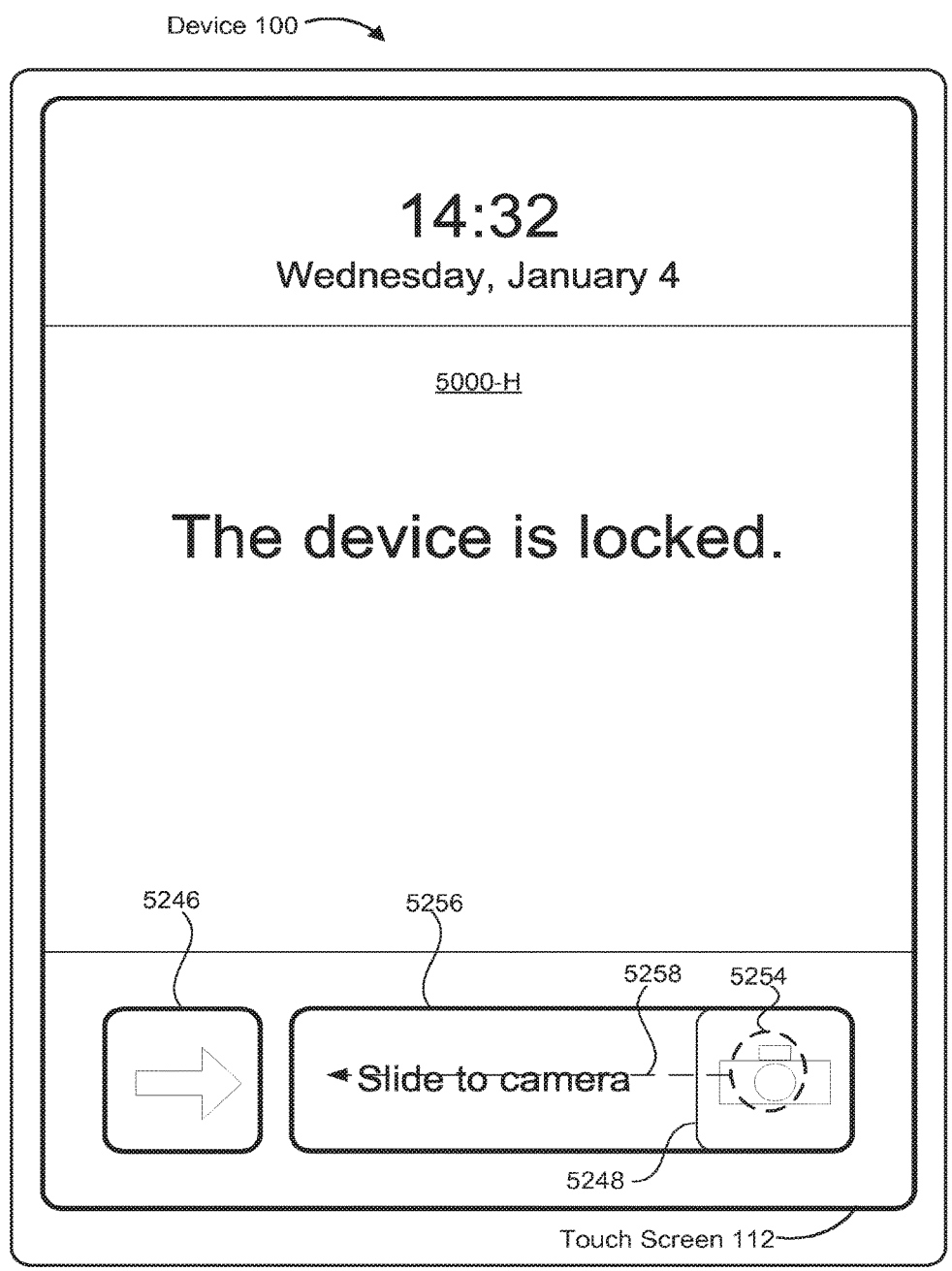
Figure 5D:
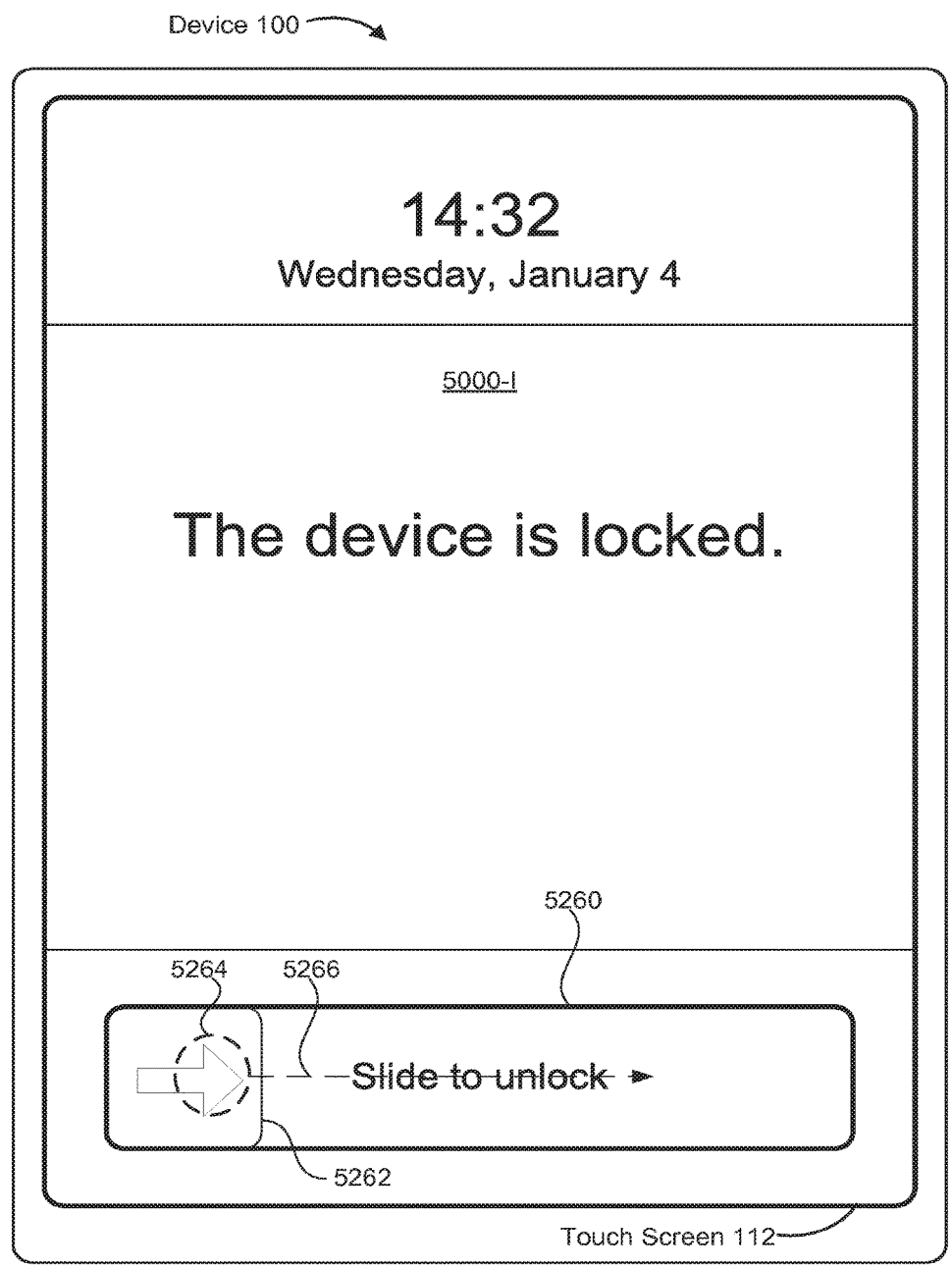
Figure 5E:
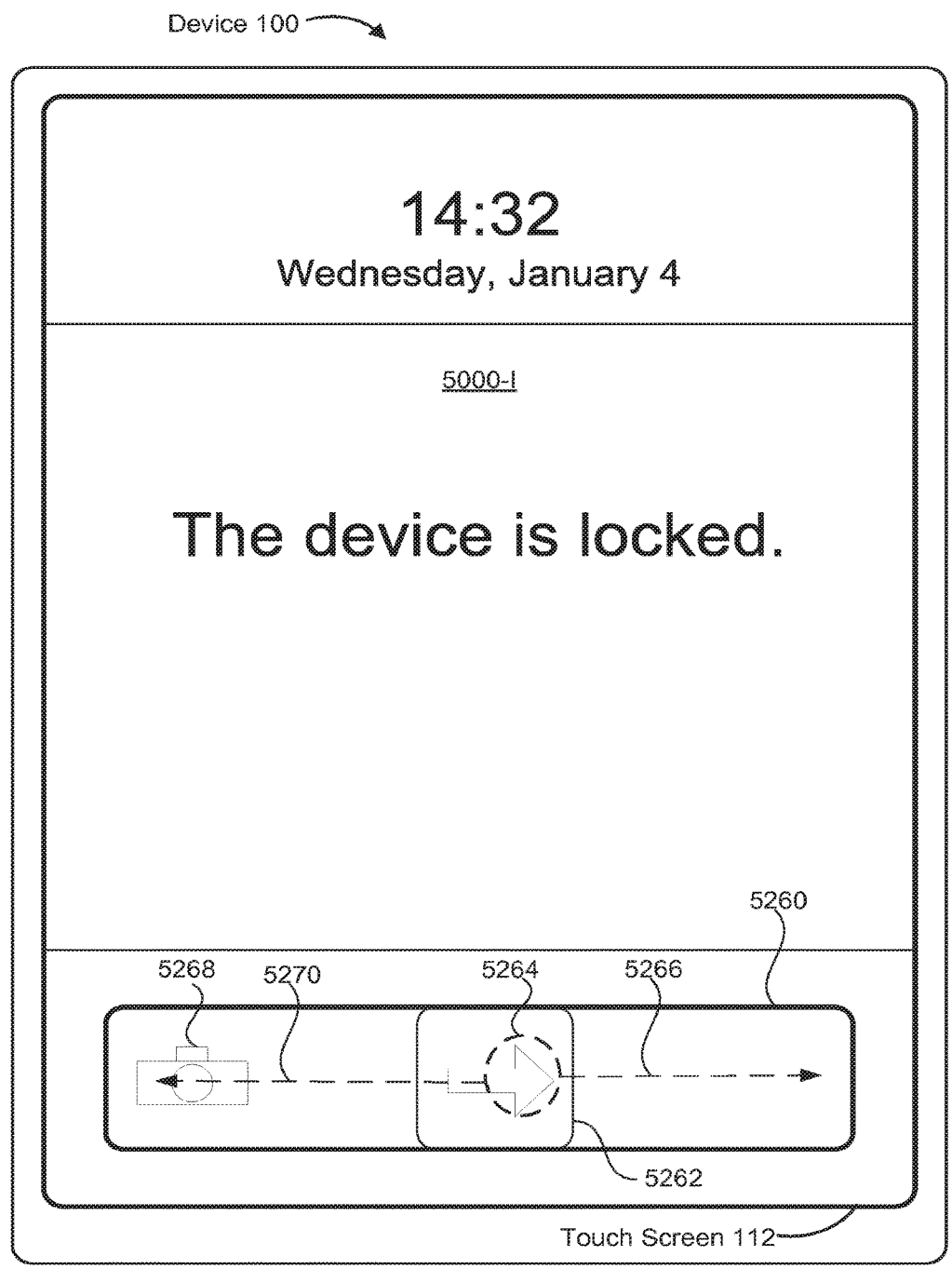
Figure 5F:
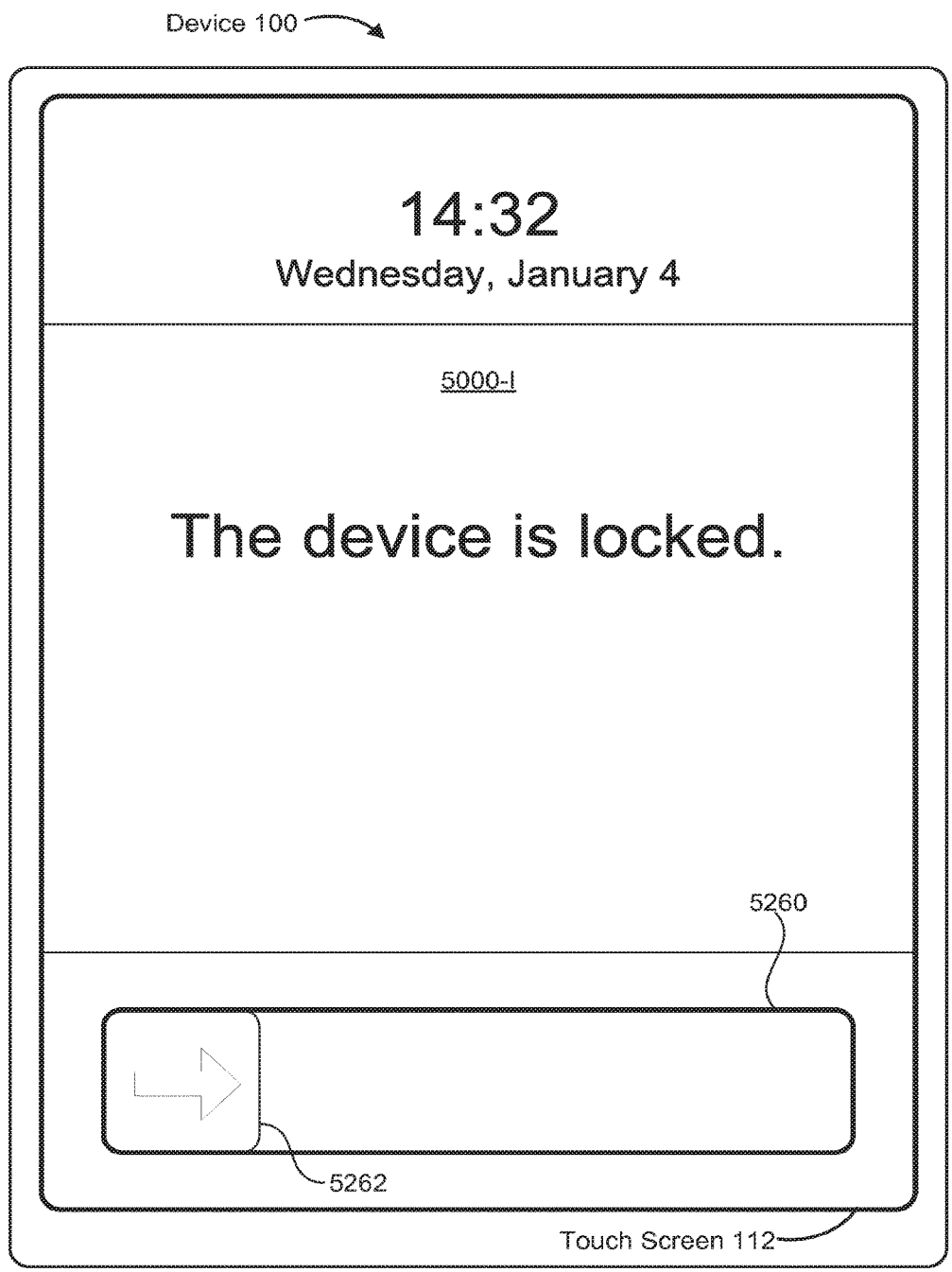
Figure 5G:
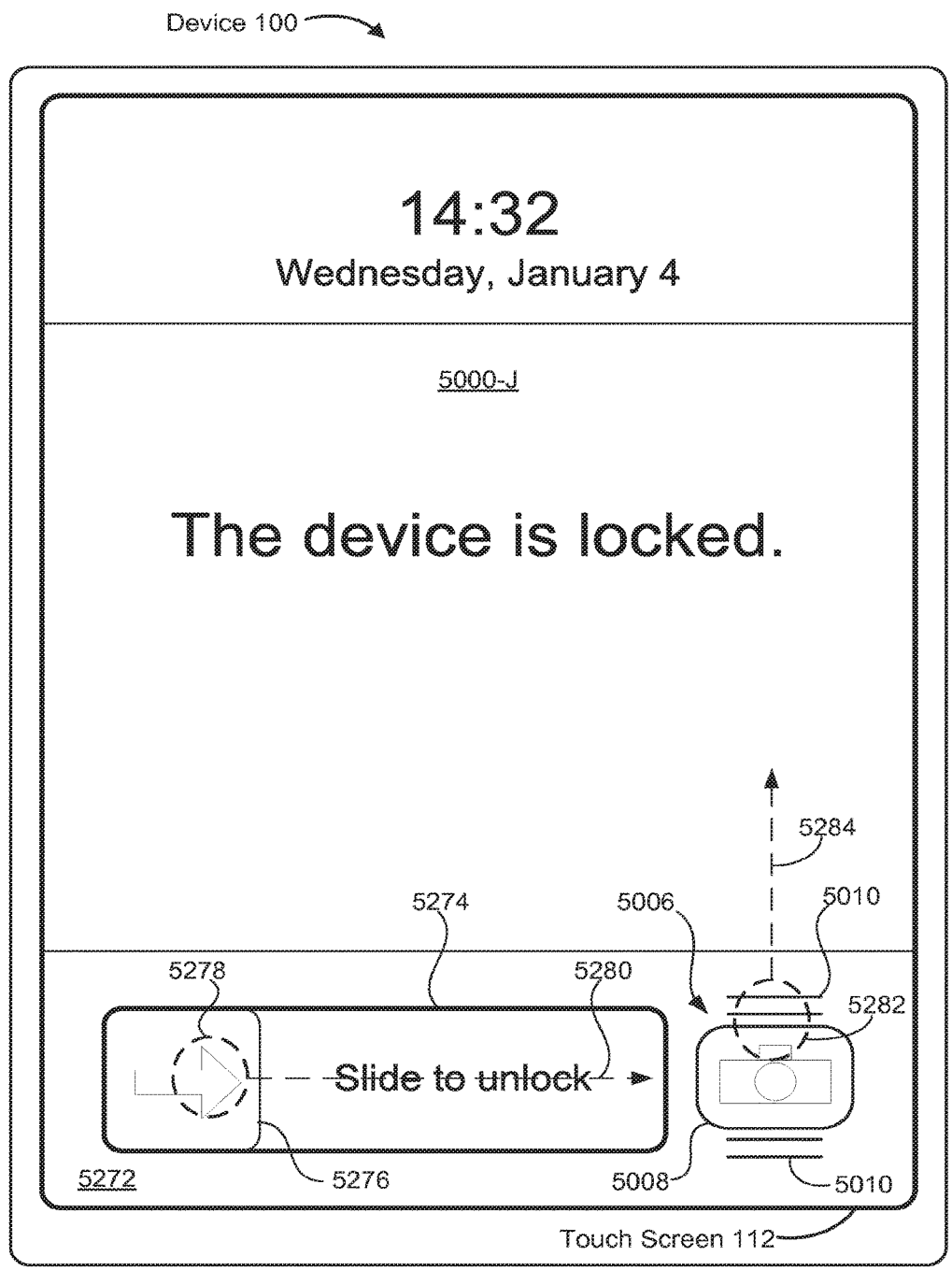
Figure 5H:
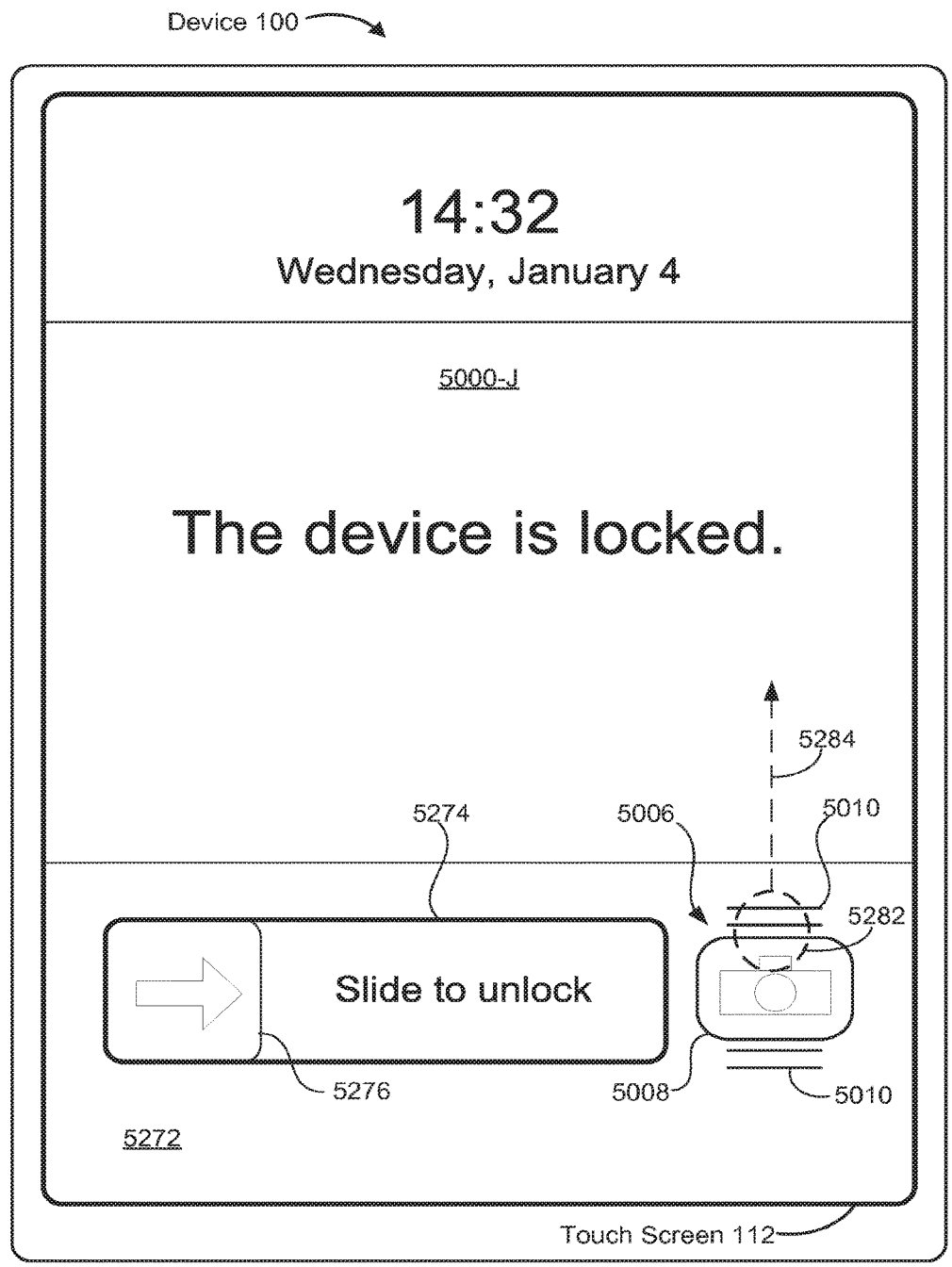
Figure 5I:
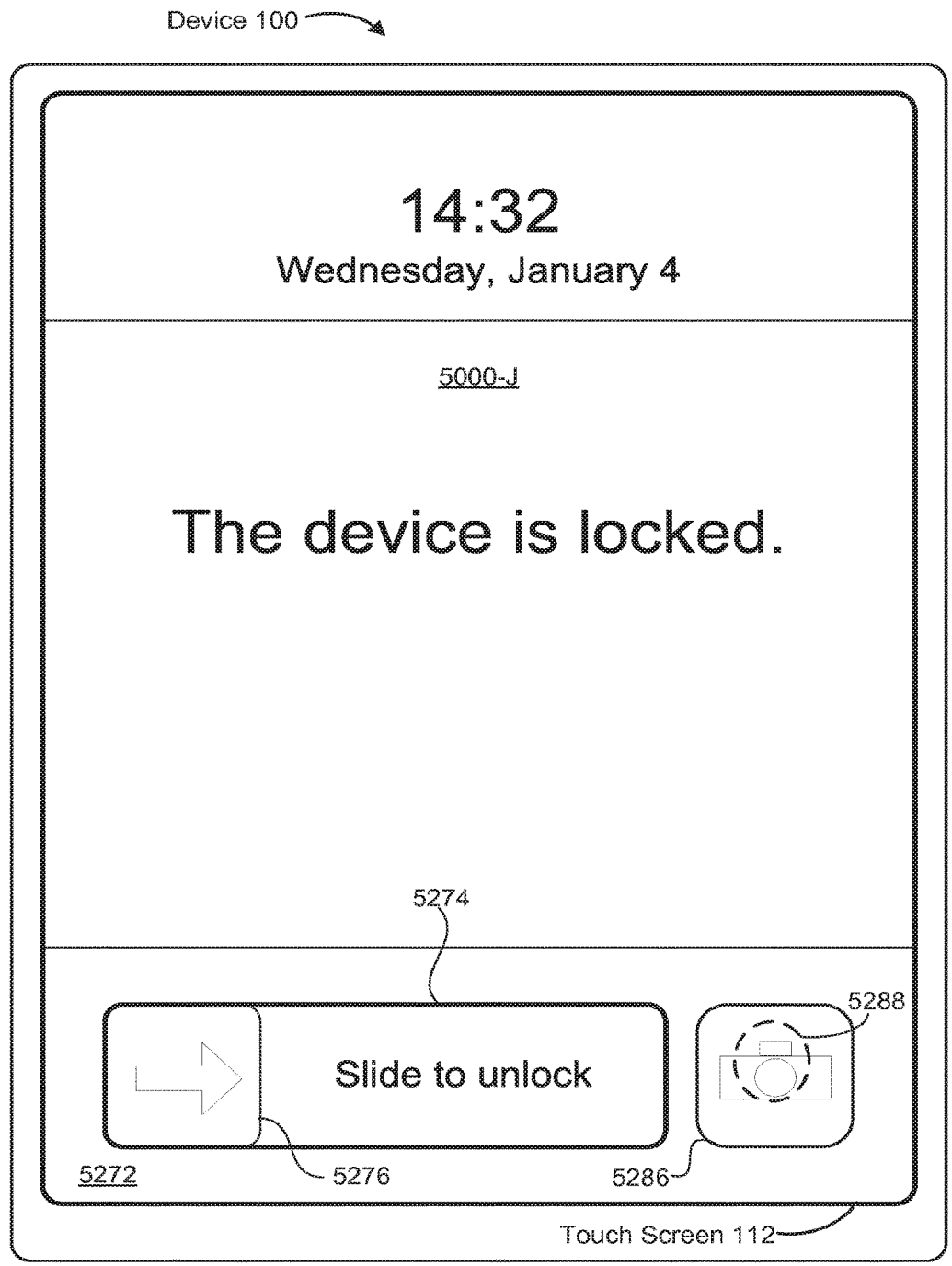
Figure 5J:
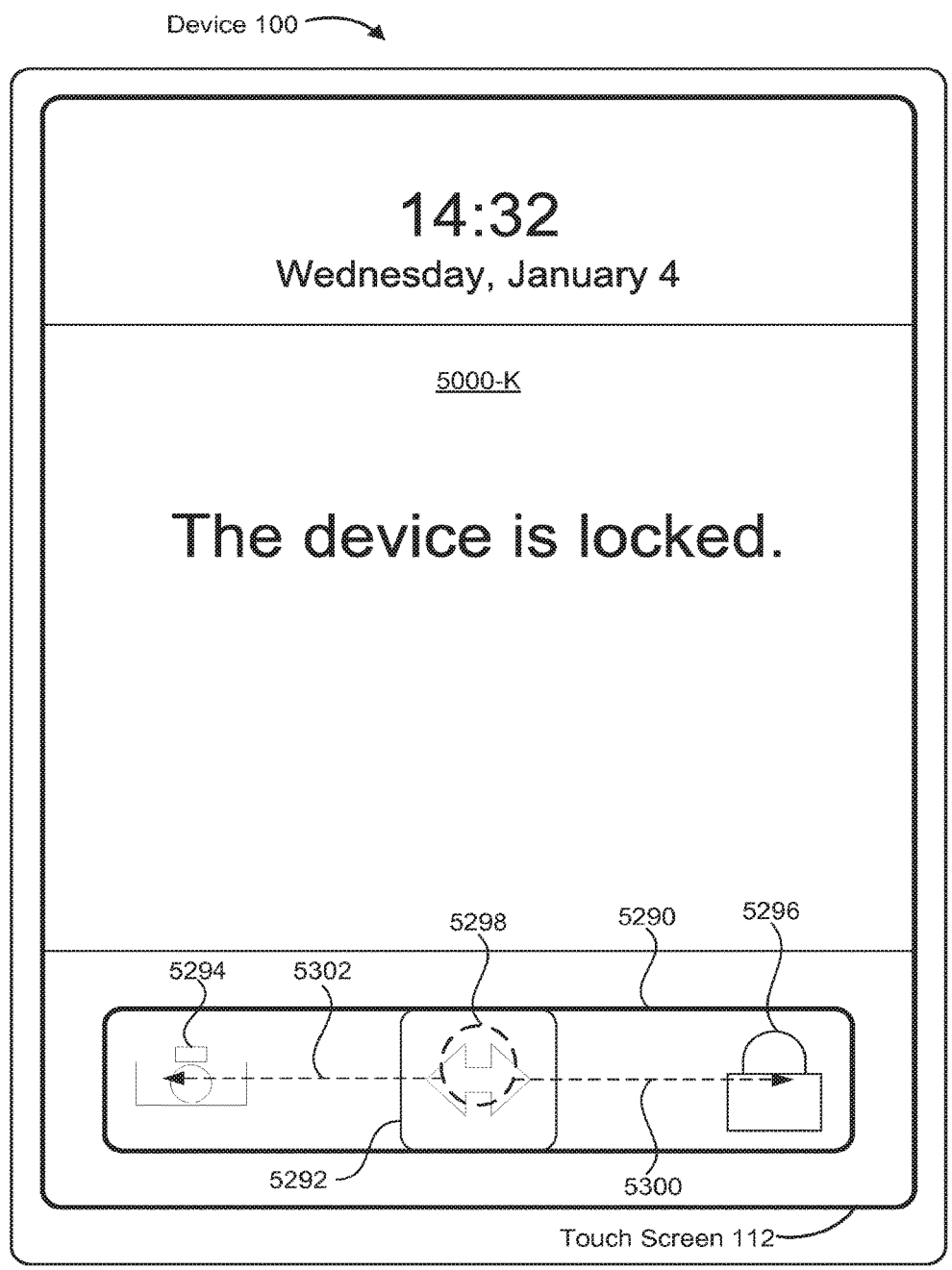
Figure 5K:
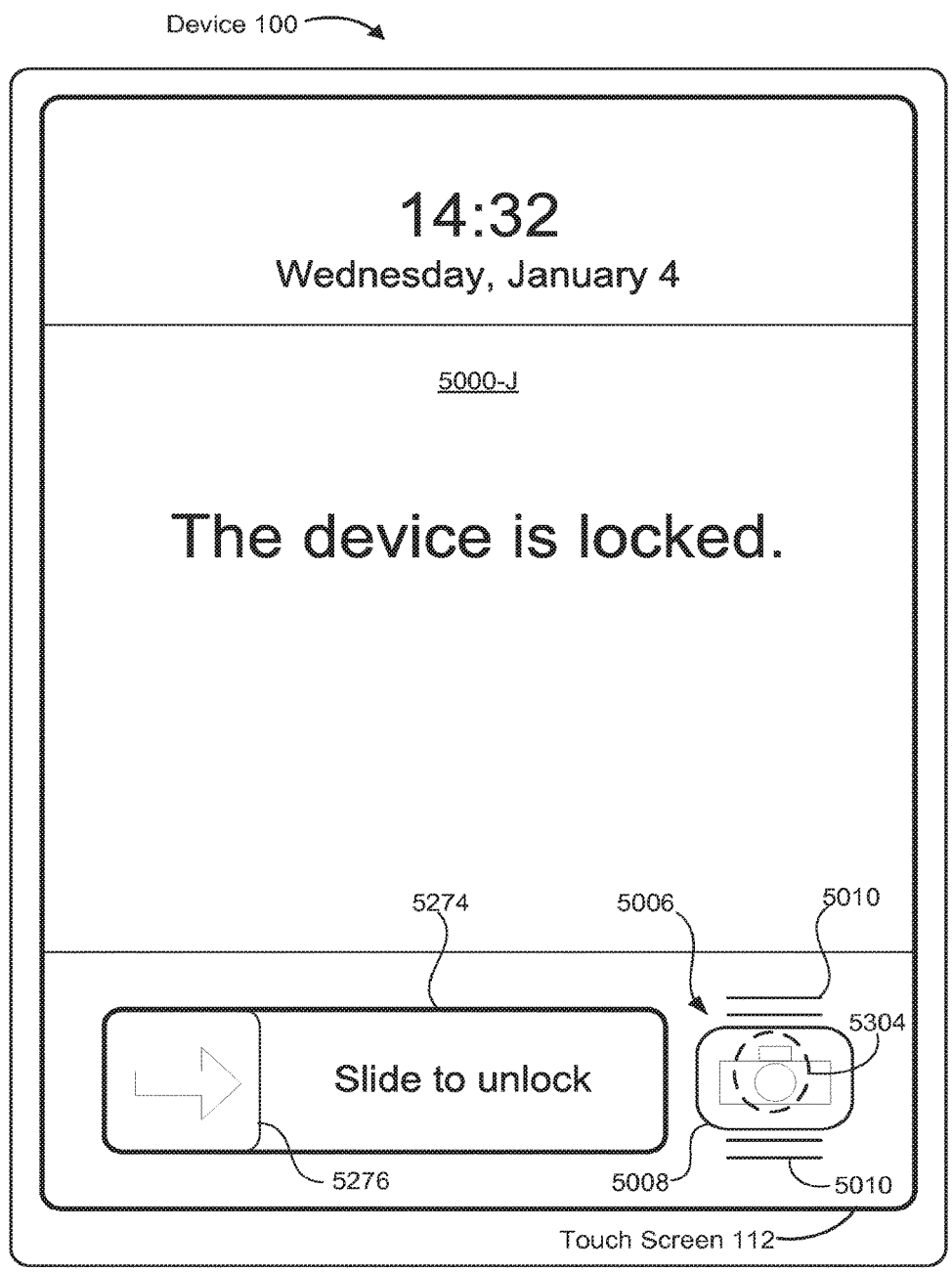
Figure 5L:
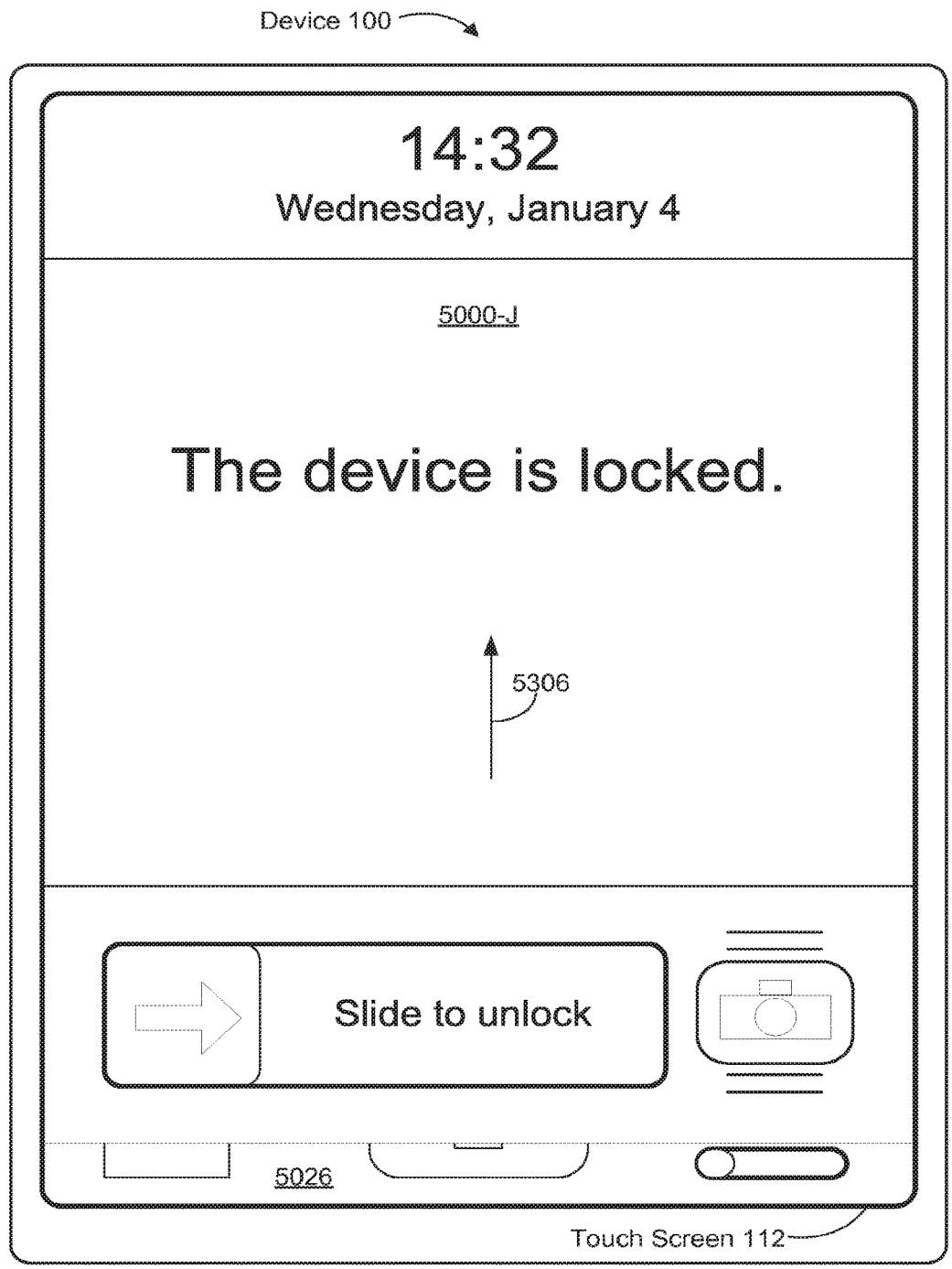
Figure 5M:
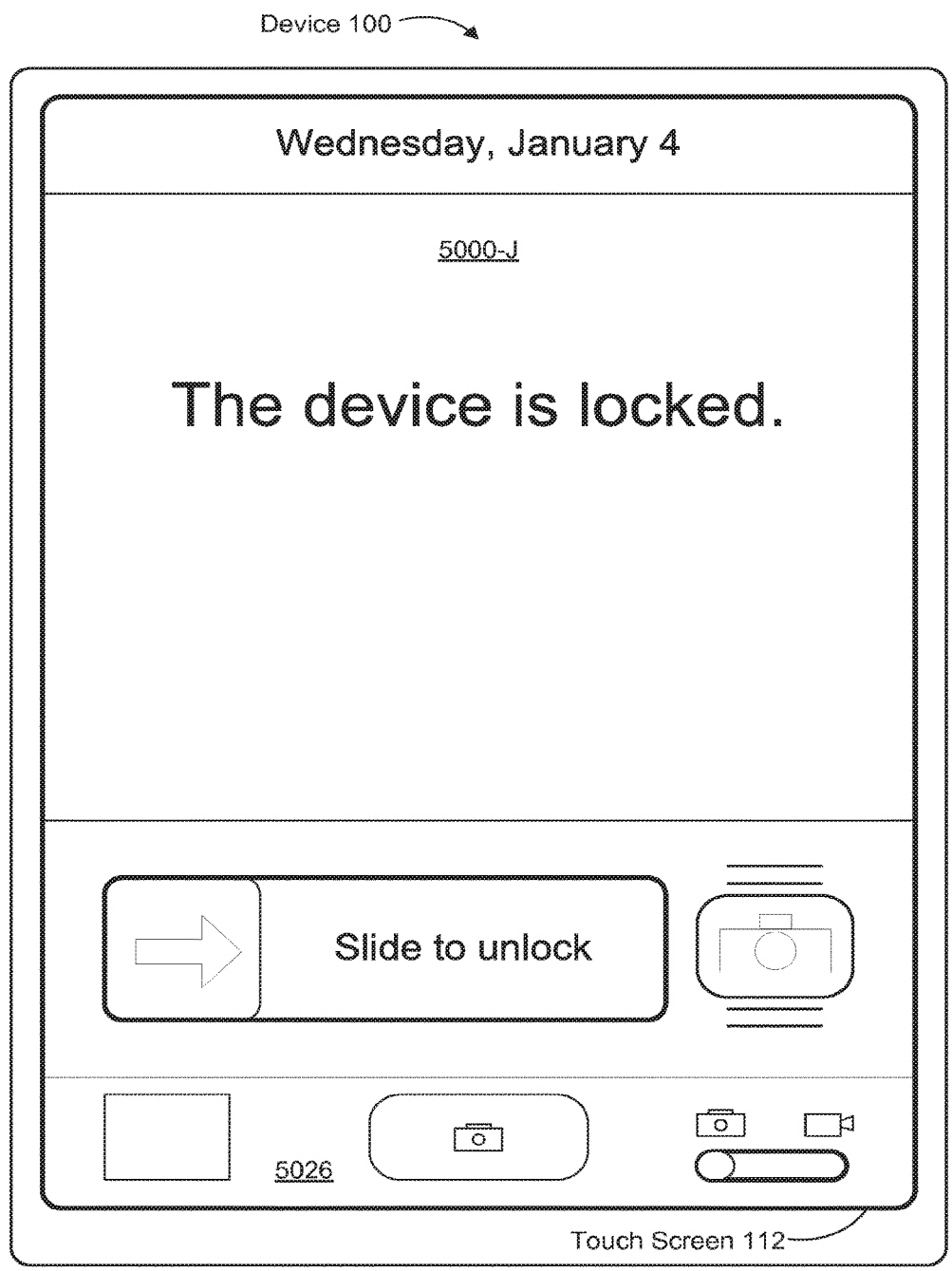
Figure 5N:
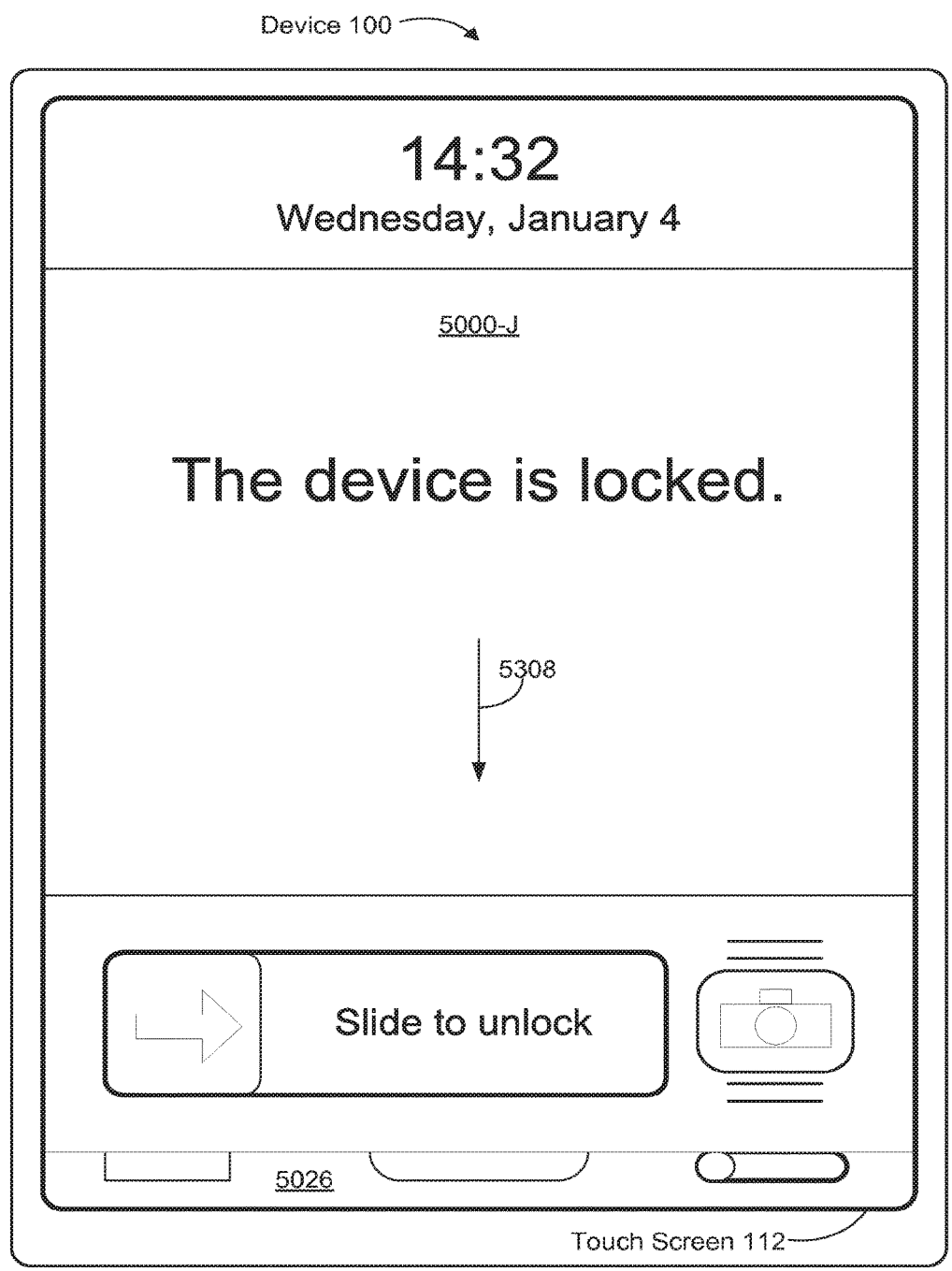
Figure 5O:
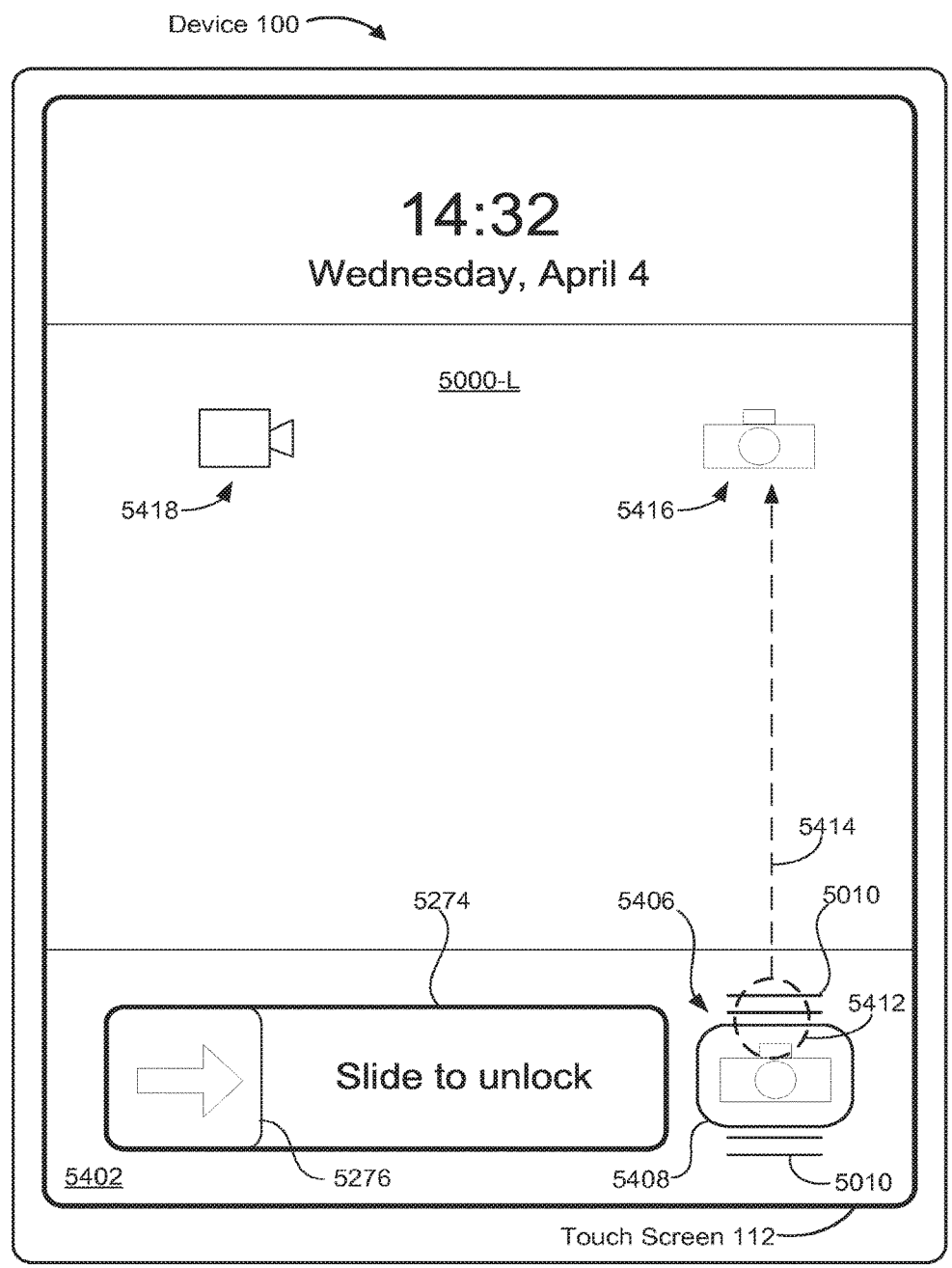
Figure 5P:
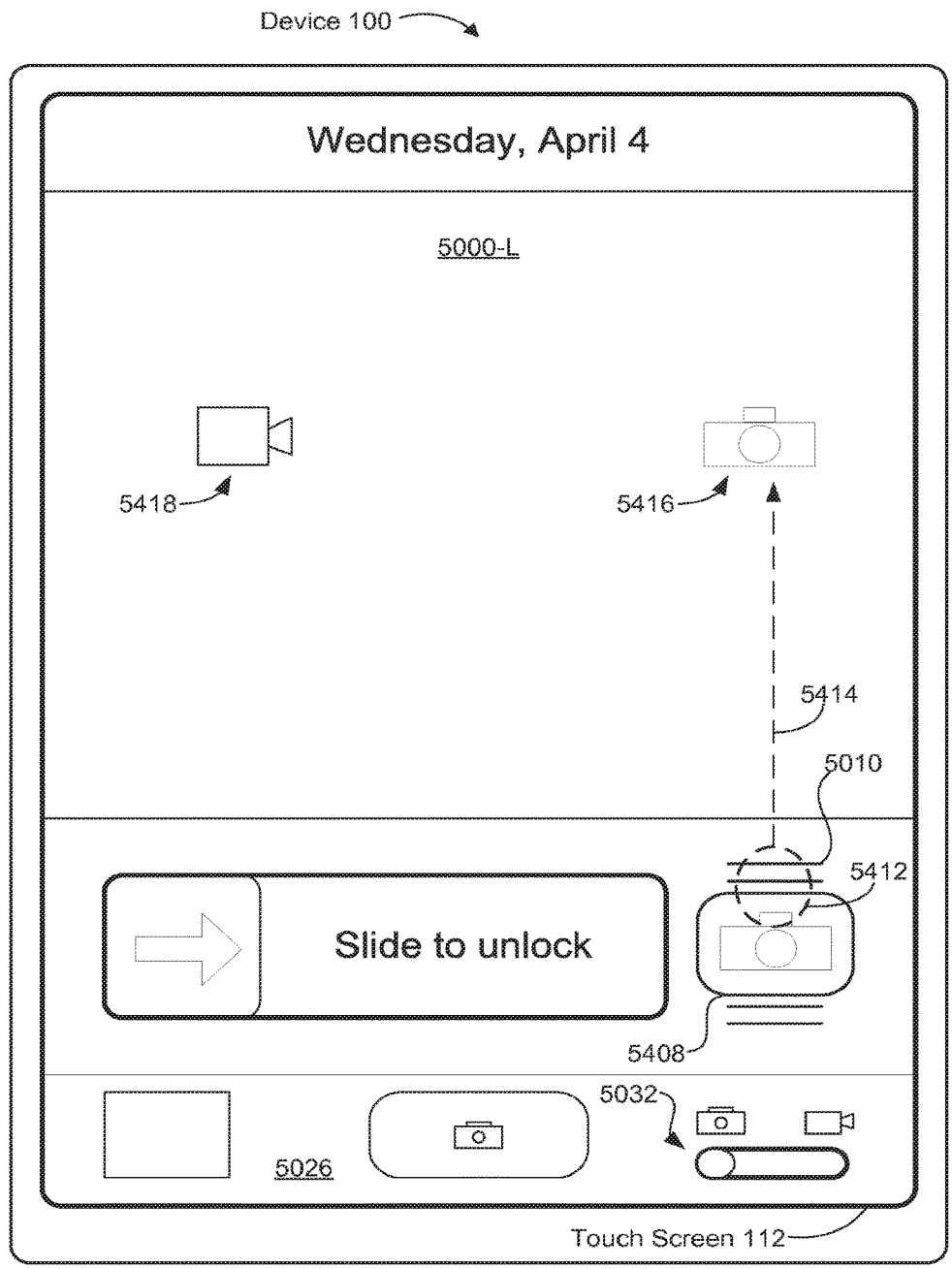
Figure 5Q:
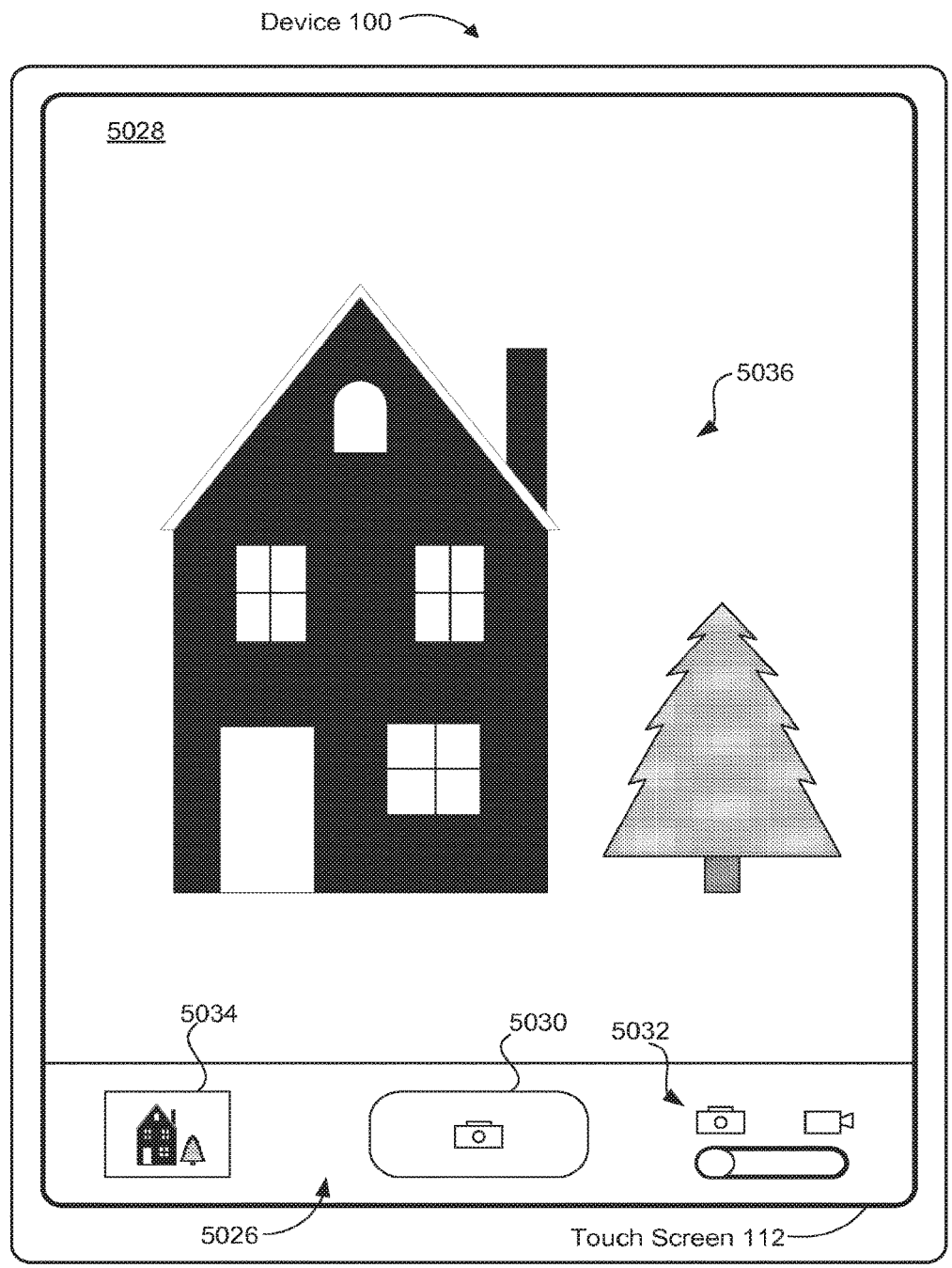
Figure 5R:
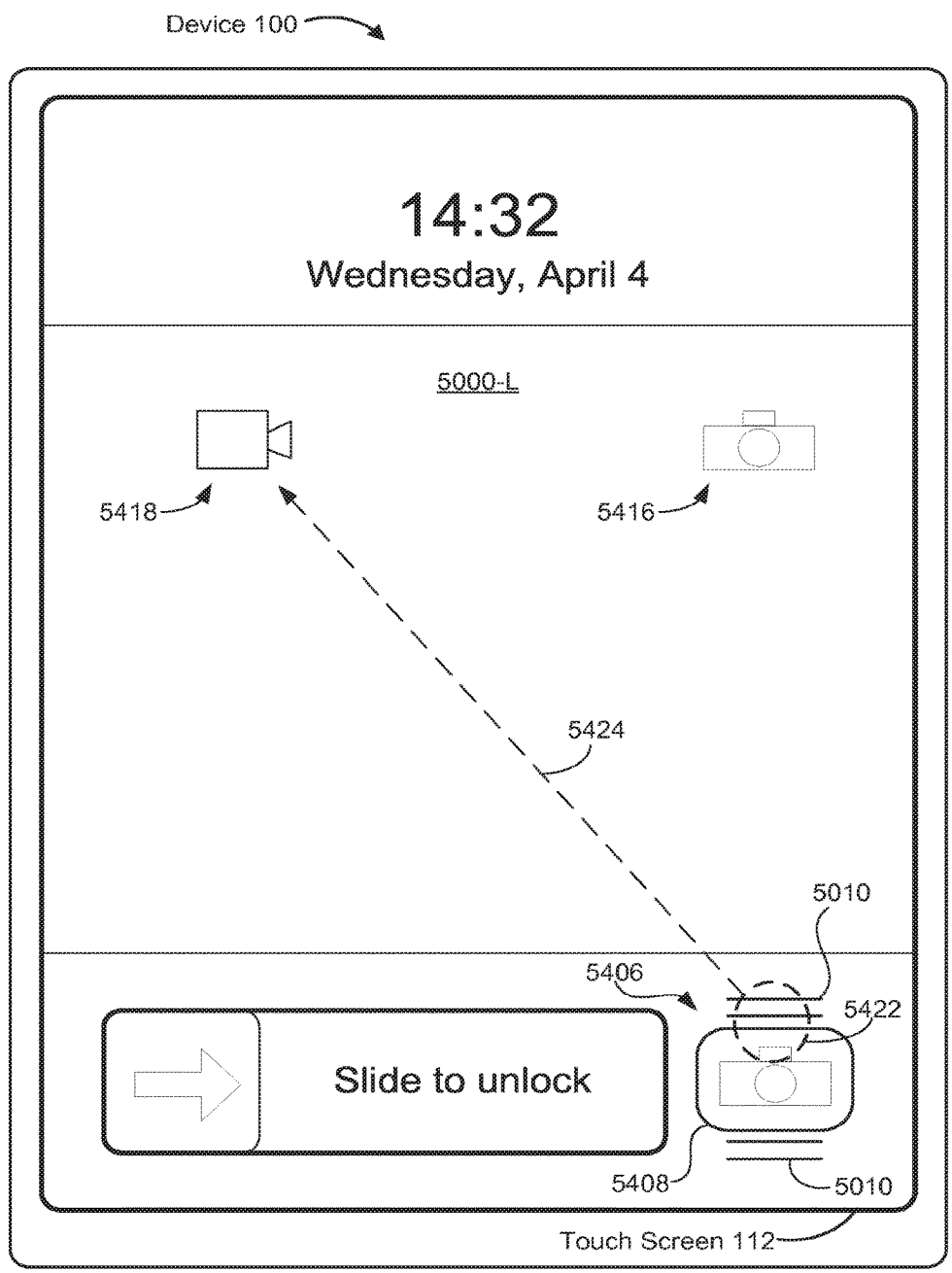
Figure 5S:
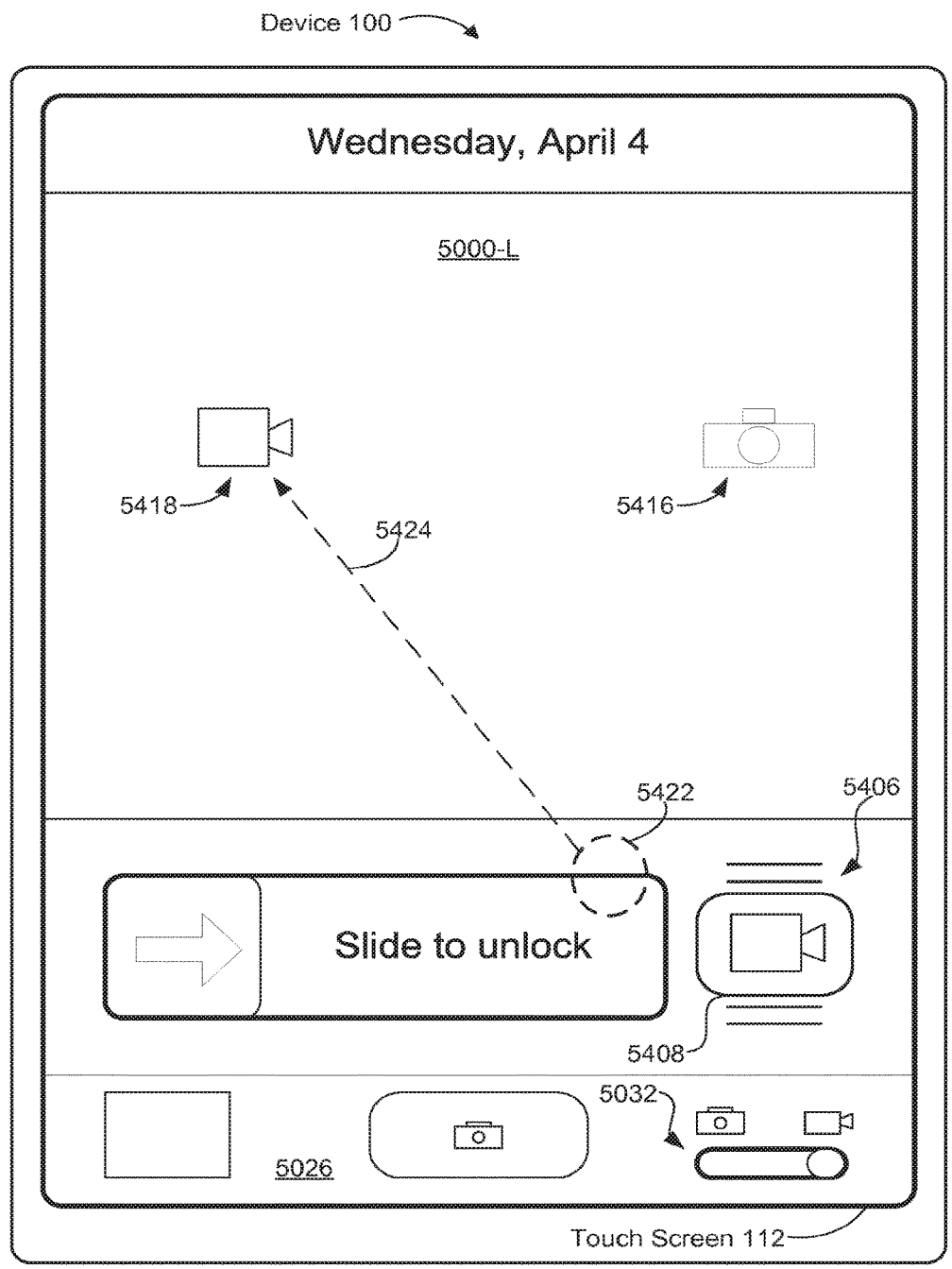
Figure 5T:
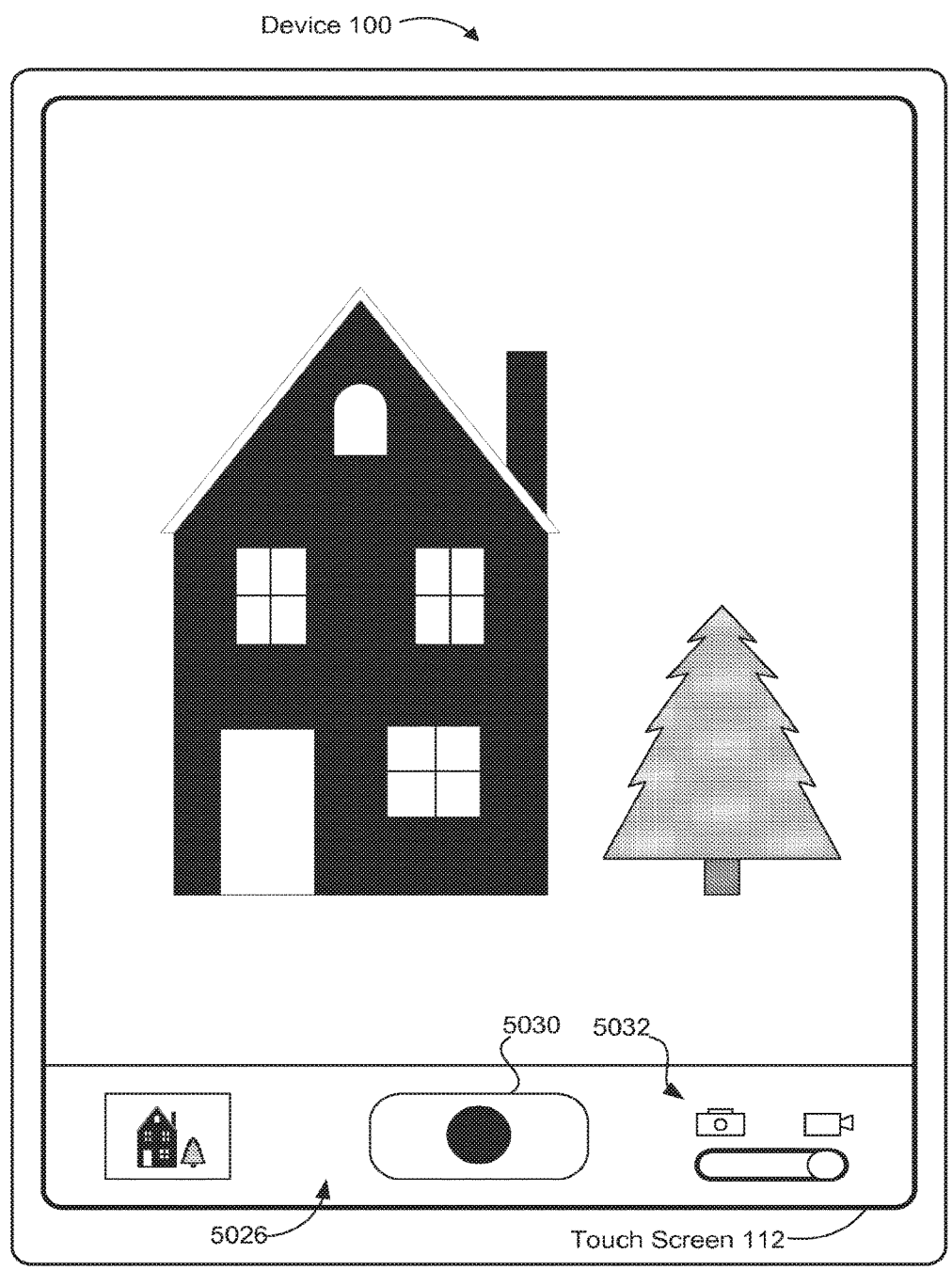
Figure 5U:
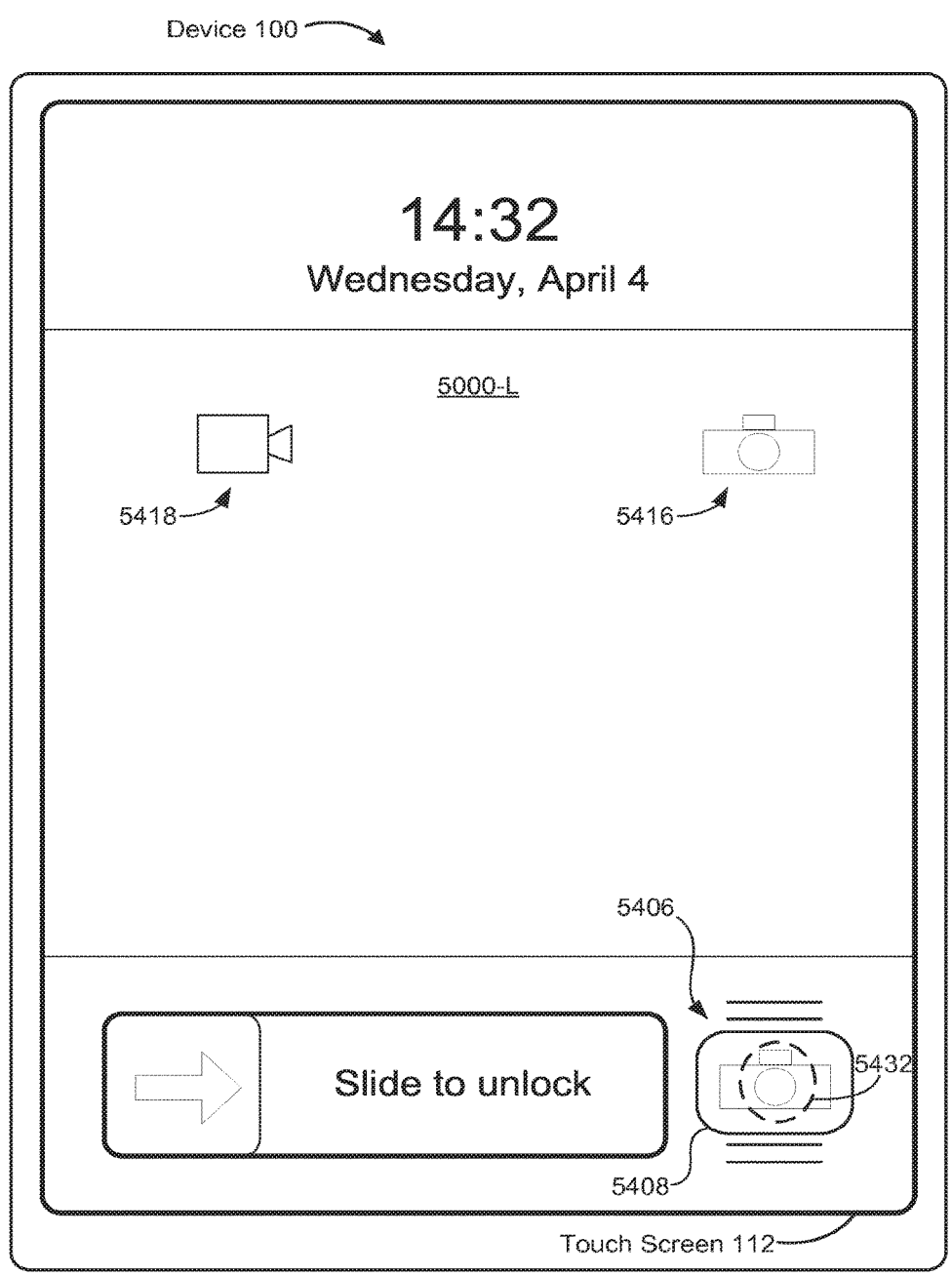
Figure 5V:
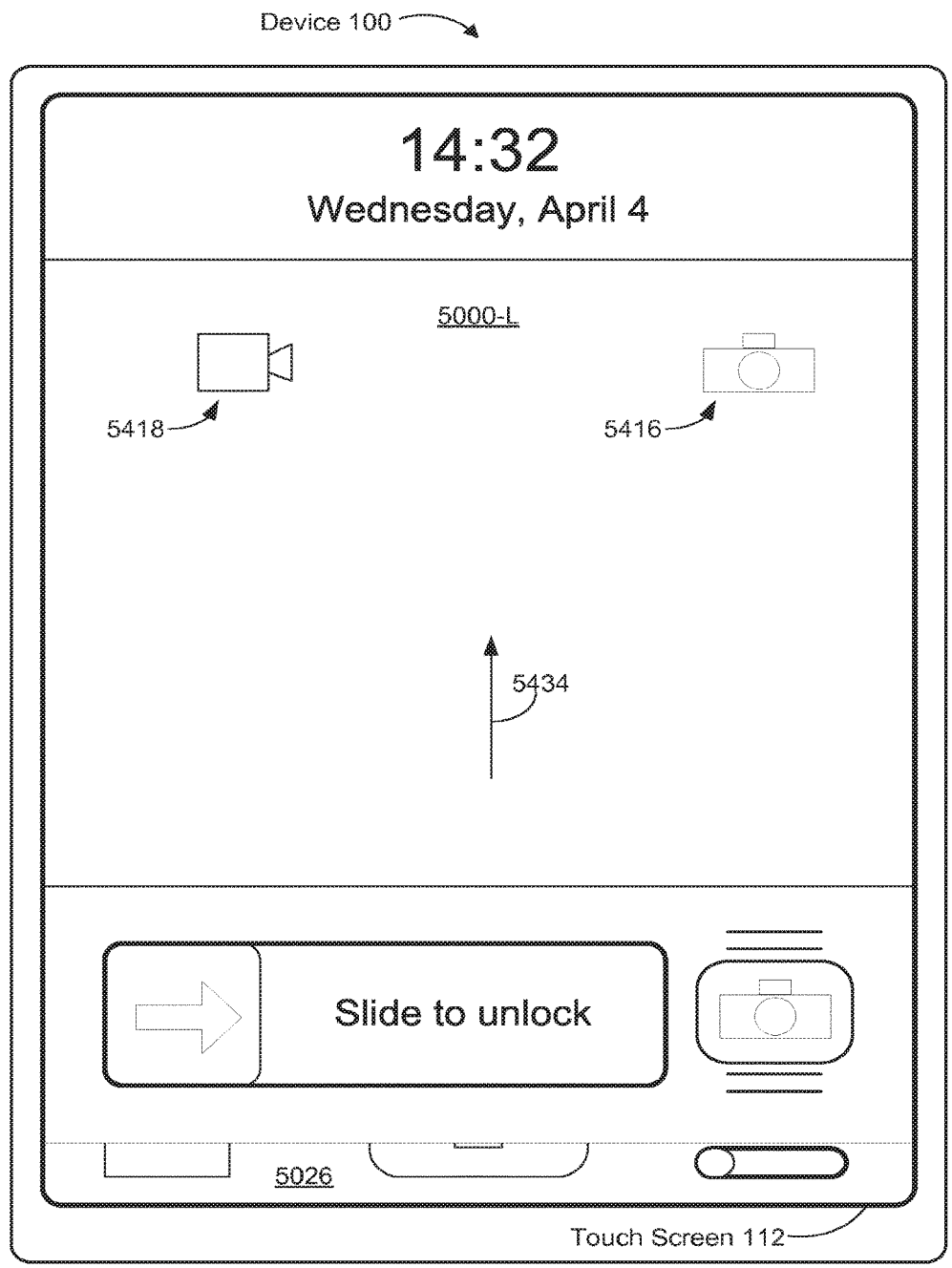
Figure 5W:
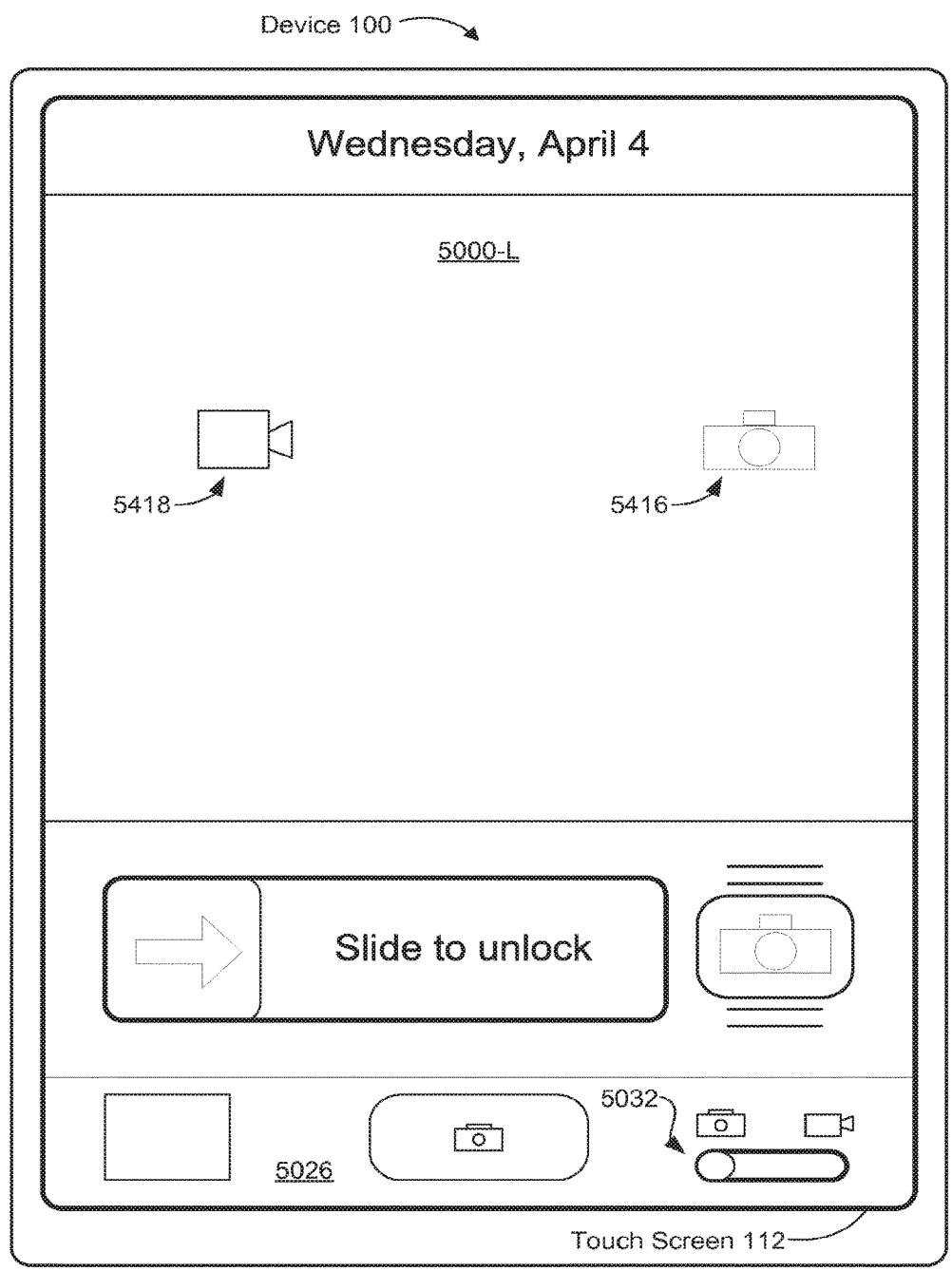
Figure 5X:
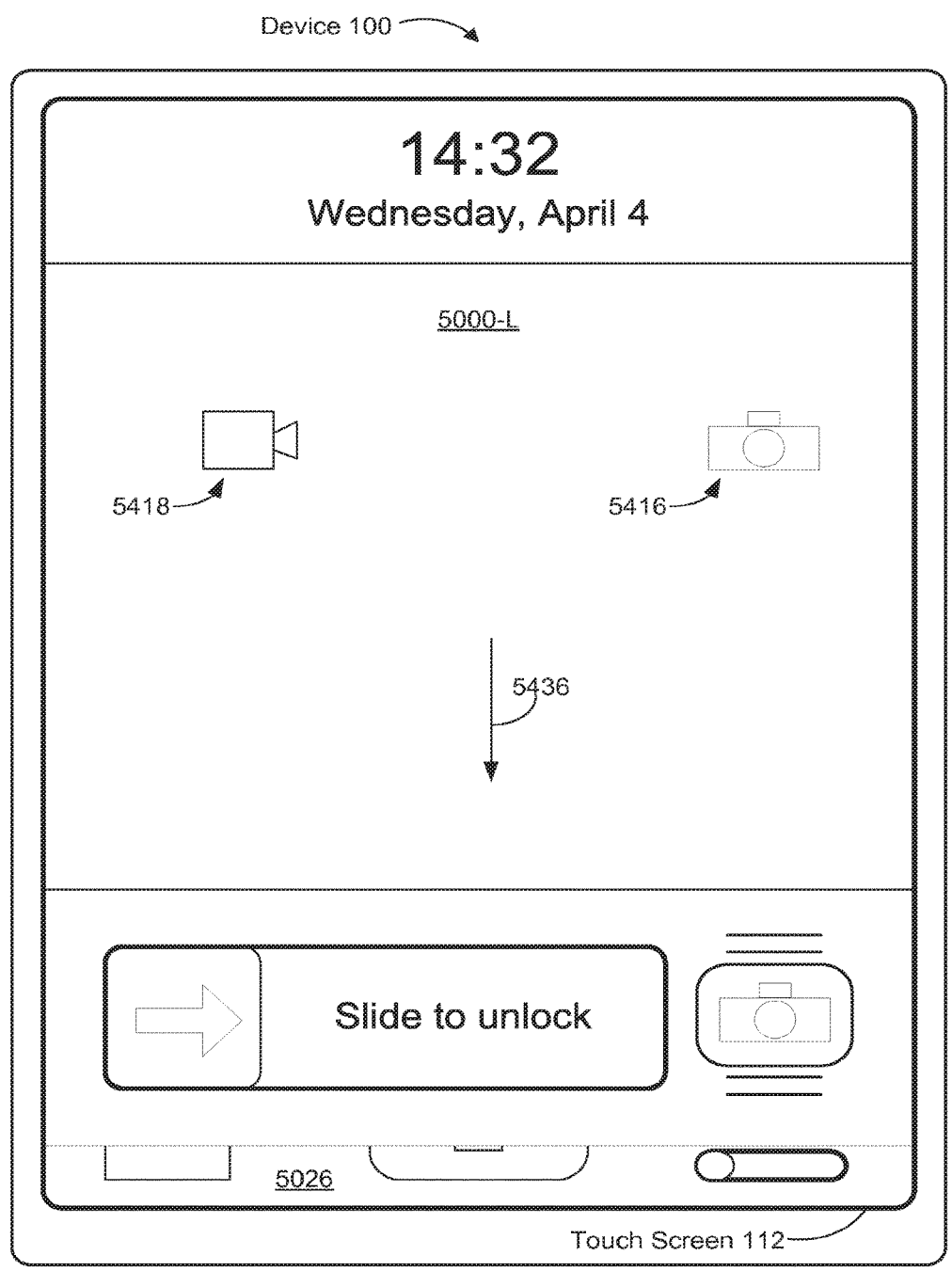
Figure 5Y:
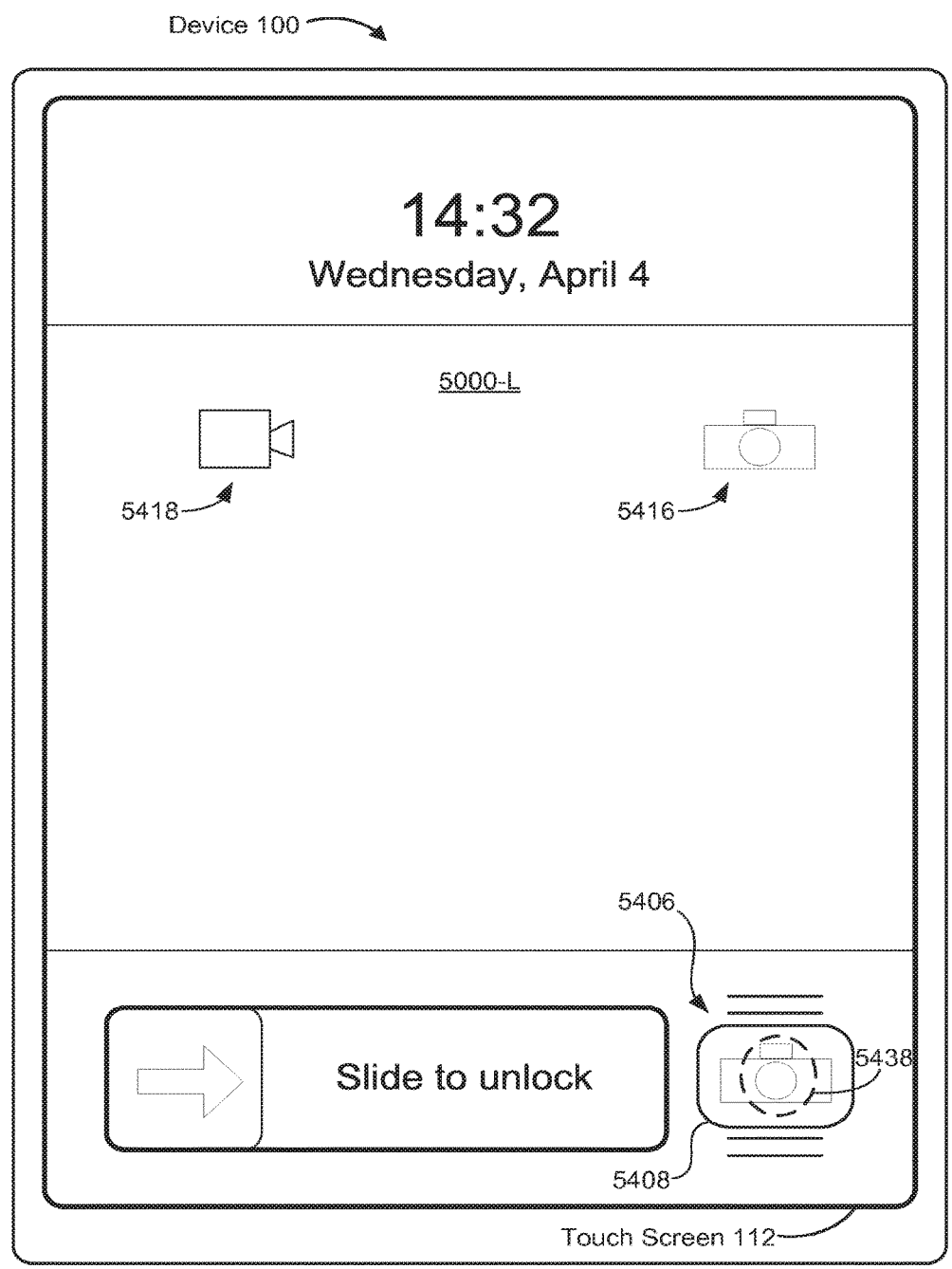
Figure 5Z:
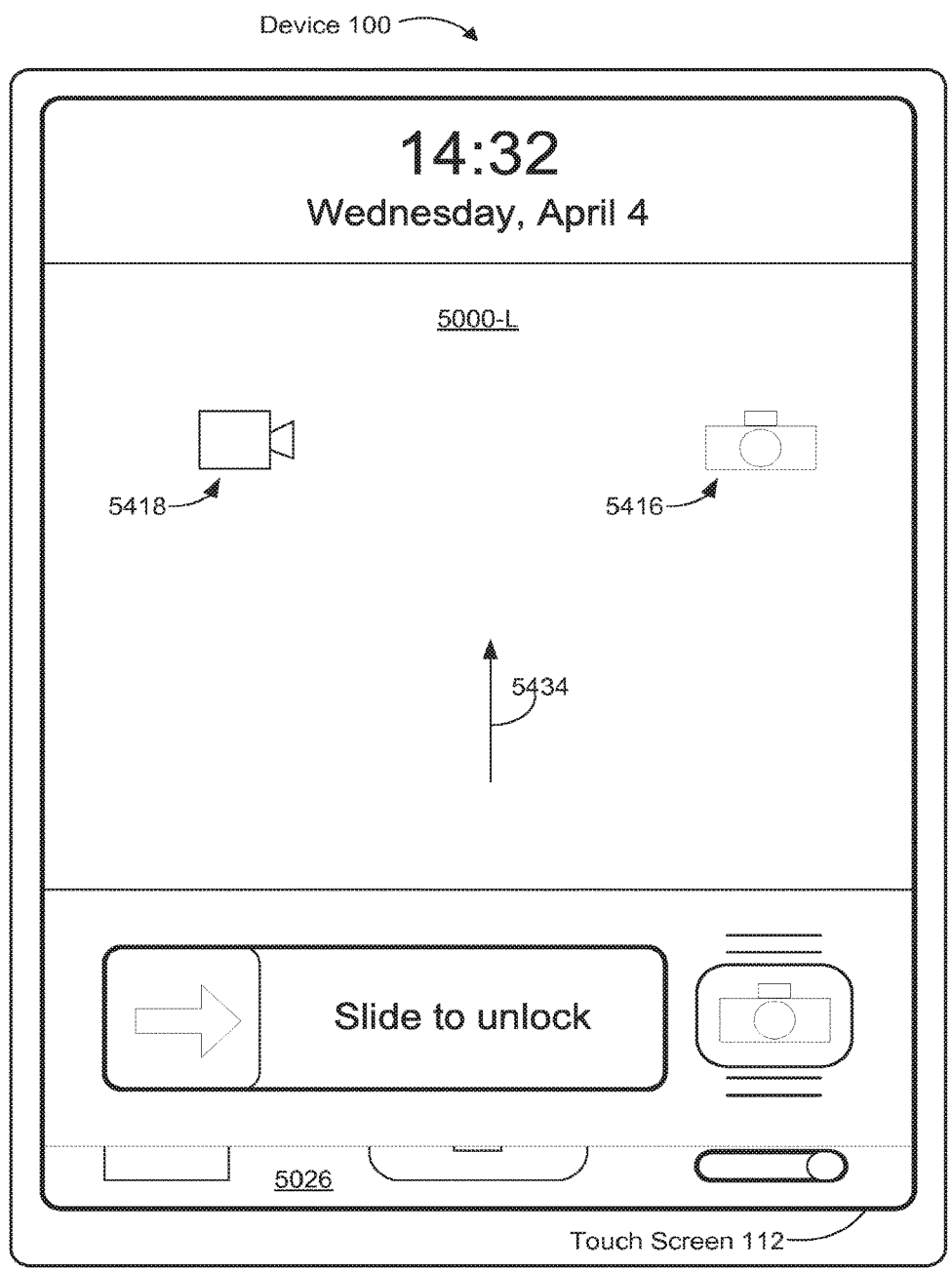

FIG. 5Z illustrates locked device interface 5000-H. Locked device 5000-H includes virtual channel 5244 and unlock object 5246 at the left end of virtual channel 5244, as well as unlock camera object 5248.

Gesture 5250, with corresponding movement 5252, may be detected on unlock object 5246. In response to the detection of gesture 5250 and movement 5252, unlock object 5246 moves toward the right end of channel 5244. When unlock object 5246 is at the right end of channel 5244 and gesture 5250 is released, if device 100 is in a locked passcode-protected state, passcode entry user interface 5022 is displayed, as in FIG. 5C.

Conversely, gesture 5254 may be detected on unlock camera object 5248, as shown in FIG. 5AA. In response to the detection of the contact corresponding to gesture 5254 on unlock camera object 5248, an animation showing channel 5244 decreasing in length and virtual channel 5256 appearing and lengthening may be displayed, an instant of which is illustrated in FIG. 5BB. The animation continues as long as the contact corresponding to gesture 5254 continues to be detected on unlock camera object 5248.

When the animation is complete, channel 5244 ceases to be displayed and channel 5256 is displayed at its full length, with unlock camera object 5248 at the right end of channel 5256, as shown in FIG. 5CC.

While gesture 5254 is detected on unlock camera object 5248, gesture 5254 may move toward the left end of channel 5256, as shown in FIG. 5CC. In response to the detection of movement 5258, unlock camera object 5248 moves toward the left end of channel 5256 in accordance with movement 5258. When unlock camera object 5248 is at the left end of channel 5256 and gesture 5254 is released, if device 100 was in a locked, passcode-protected state, camera application 143 is started in a restricted session and camera interface 5026 is displayed, as in FIG. 5D. If device 100 was in a locked, not-passcode-protected state, device 100 is unlocked, camera application 143 is started in an unrestricted session, and camera interface 5026 is displayed (as in FIG. 5D) without the restrictions of a restricted session.

FIG. 5DD illustrates locked device interface 5000-1 displayed on touch screen 112. Locked device interface 5000-1 includes virtual channel 5260 and unlock object 5262 located at the left end of virtual channel 5260.

Gesture 5264 and corresponding movement 5266 may be detected on unlock object 5262. In response to the detection of gesture 5264 and corresponding movement 5266, unlock object 5262 moves toward the right end of channel 5260 in accordance with movement 5266, as shown in FIG. 5EE.

When unlock object 5264 moves from the left end of channel 5260 to about the middle of channel 5260, camera icon 5268 may be displayed at the left end of channel 5260. At this point, gesture 5264 may continue to move with movement 5266 toward the right end of channel 5260 or reverse direction and move with movement 5270 toward the left end of channel 5260.

When unlock object 5264 is at the right end of channel 5260 after moving there in accordance with movement 5266 and then gesture 5264 is released, if device 100 is in a locked, passcode-protected state, passcode entry user interface 5022 is displayed, as in FIG. 5C.

When unlock object 5264 is back at the left end of channel 5260 after moving there in accordance with movement 5270 and then gesture 5264 is released (as shown in FIG. 5FF), if device 100 was in a locked, passcode-protected state, camera application 143 is started in a restricted session and camera interface 5026 is displayed, as in FIG. 5D. If device 100 was in a locked, not-passcode-protected state, device 100 is unlocked, camera application 143 is started in an unrestricted session, and camera interface 5026 is displayed (as in FIG. 5D) without the restrictions of a restricted session.

FIG. 5GG illustrates locked device interface 5000-J displayed on touch screen 112 of device 100. Locked device interface 5000-J, as with the other locked device interfaces 5000 described above, may be displayed when a physical button (e.g., push button 206, home or menu button 204) on device 100 is activated by a user while device 100 is in a locked state. Locked device interface 5000-J may include a message informing the user that the device is locked, as well as other information (e.g., current time and date).

Locked device interface 5000-J includes unlock object 5276 and virtual channel 5274, and camera access indicia 5006. Camera access indicia 5006 includes icons 5008 and 5010, which are described above with reference to FIG. 5A. Unlock object 5276, channel 5274, and camera access indicia 5006 may be displayed in predefined region 5272.

Gesture 5278 may be detected on unlock object 5276. Gesture 5278 moves with movement 5280. In response to the detection of gesture 5278 and corresponding movement 5280, unlock object 5276 moves within virtual channel 5274 toward the right end of channel 5274. When unlock object 5276 is moved to the right end of channel 5274 and then gesture 5278 is released, in response to the detection of the release of gesture 5278, if device 100 is in a locked, passcode-protected state, passcode entry user interface 5022 is displayed, as in FIG. 5C.

Gesture 5282 may be detected on camera access indicia 5006. Gesture 5282 moves with movement 5284. In response to the detection of gesture 5282 and a determination that gesture 5282 starts on camera access indicia 5006, if device 100 was in a locked, passcode-protected state, region 5272 expands (e.g., in an animation) in accordance with the direction of movement 5284, as shown in FIG. 5HH, and transitions into camera interface 5026 (FIG. 5D) of camera application 143 starting in a restricted session. When movement 5284 is complete (e.g., reaches the top of touch screen 112) and gesture 5282 is released, locked device interface 5000-J ceases to be displayed, and camera interface 5026 is displayed in a restricted session for camera application 143 on touch screen 112. In response to the detection of gesture 5282 and a determination that gesture 5282 starts on camera access indicia 5006, if device 100 was in a locked, not-passcode-protected state, region 5272 expands (e.g., in an animation) in accordance with the direction of movement 5284, as shown in FIG. 5HH, and transitions into camera interface 5026 (FIG. 5D) of camera application 143 starting in an unrestricted session. When movement 5284 is complete (e.g., reaches the top of touch screen 112) and gesture 5282 is released, locked device interface 5000-J ceases to be displayed, and camera interface 5026 is displayed in an unrestricted session for camera application 143 on touch screen 112.

In some embodiments, a gesture (e.g. tap gesture 5304, FIG. 5KK) may be performed on camera access indicia 5006 (FIG. 5KK). In response to the detection of a tap gesture on camera access indicia 5006, an animation of locked device interface 5000-J may be displayed (e.g., FIGS. 5LL-5NN). In the animation, locked device interface 5000-J moves or translates, as if it is bouncing off the bottom edge of touch screen 112, to partially reveal an interface corresponding to camera application 143 (e.g., camera interface 5026, FIG. 5MM) and then returns to its position prior to the animation. The partial reveal in response to detection of the gesture provides a user with an indication that the user may interact with camera access indicia 5006 (e.g., by performing gesture 5016 or 5282) to launch camera application 143.

Alternatively, locked camera interface 5000-J may include camera icon 5286 instead of camera access indicia 5006, as shown in FIG. 5II. In response to the detection of a gesture (e.g., tap gesture 5288) on camera icon 5286, if device 100 was in a locked, passcode-protected state, camera application 143 is started in a restricted session and camera interface 5026 is displayed, as in FIG. 5D. In response to the detection of a gesture (e.g., tap gesture 5288) on camera icon 5286, if device 100 was in a locked, not-passcode-protected state, device 100 is unlocked, camera application 143 is started in an unrestricted session, and camera interface 5026 is displayed (as in FIG. 5D) without the restrictions of a restricted session.

FIG. 5JJ illustrates locked device interface 5000-K displayed on touch screen 112. Locked device interface 5000-K includes virtual channel 5290 and unlock object 5292 located near or at the middle of channel 5290. At the ends of channel 5290 are camera icon 5294 and lock icon 5296, respectively.

Gesture 5298 may be detected on unlock object 5292 and move either with movement 5302 toward camera icon 5294 or with movement 5300 toward lock icon 5296. In response to the detection of gesture 5298 and movement 5302, unlock object 5292 moves within channel 5290 toward camera icon 5294 in accordance with movement 5302. In response to the detection of gesture 5298 and movement 5300, unlock object 5292 moves within channel 5290 toward lock icon 5296 in accordance with movement 5300.

Gesture 5298 may be released when unlock object 5292 is located at either end of channel 5290. If gesture 5298 is released when unlock object 5292 is located at the end of channel 5290 that has camera icon 5294 and device 100 was in a locked, passcode-protected state, camera application 143 is started in a restricted session and camera interface 5026 is displayed in still image capture mode, as in FIG. 5D. If gesture 5298 is released when unlock object 5292 is located at the end of channel 5290 that has camera icon 5294 and device 100 was in a locked, not-passcode-protected state, device 100 is unlocked, camera application 143 is started in an unrestricted session, and camera interface 5026 is displayed (as in FIG. 5D) without the restrictions of a restricted session. If gesture 5298 is released when unlock object 5292 is located at the end of channel 5290 that has lock icon 5296 and device 100 is in a locked, passcode-protected state, passcode entry user interface 5022 is displayed, as in FIG. 5C.

FIG. 5OO illustrates locked device interface 5000-L displayed on touch screen 112 of device 100. Locked device interface 5000-L, as with the other locked device interfaces 5000 described above, may be displayed when a physical button (e.g., push button 206, home or menu button 204) on device 100 is activated by a user while device 100 is in a locked state. Locked device interface 5000-L may include a message informing the user that the device is locked, as well as other information (e.g., current time and date).

Locked device interface 5000-L includes unlock object 5276 and virtual channel 5274, and application access indicia 5406. Application access indicia 5406 include icons 5408 and 5010. Icon 5408 indicates an application with which application access indicia 5406 are associated. For example, icon 5408 as shown in FIG. 5OO depicts a camera; application access indicia 5406 are associated with camera application 143. Other applications that may be associated with application access indicia 5406 include, for example, notifications application 165, email application 140, or phone application 138. Icons 5010 are described above with reference to FIG. 5A. Unlock object 5276, channel 5274, and application access indicia 5406 may be displayed in predefined region 5402. In some embodiments, camera icon 5416 and video icon 5418 are also displayed in locked device interface 5000-L.

FIG. 5OO shows gesture 5412 detected on touch screen 112. Gesture 5412 is detected as starting from application access indicia 5406. Gesture 5412 moves with movement 5414 toward icon 5416. In response to the detection of gesture 5412 and a determination that gesture 5412 starts on application access indicia 5406, locked device interface 5000-L ceases to be displayed. If device 100 was in a locked, passcode-protected state, camera application 143 (the application with which application access indicia 5406 is associated) is started in still image capture mode (as indicated by toggle switch 5032 set to still image mode) in a restricted session, and corresponding interface 5026 is displayed, as shown in FIG. 5QQ, and applications other than camera application 143 are maintained in the locked, passcode-protected state. If device 100 was in a locked, not-passcode-protected state, camera application 143 is started in still image mode in an unrestricted session, and corresponding interface 5026 is displayed. In some embodiments, interface 5026 may be revealed in an animation in which locked device interface 5000-L translates off-screen in accordance with the direction of movement 5414, and interface 5026 is revealed as more and more of interface 5000-L translates off-screen, as shown in FIG. 5OO-5QQ.

FIG. 5RR shows gesture 5422 detected on touch screen 112. Gesture 5422 is detected as starting from application access indicia 5406. Gesture 5422 moves with movement 5424 toward icon 5418. In response to the detection of gesture 5422 and a determination that gesture 5422 starts on application access indicia 5406, locked device interface 5000-L ceases to be displayed. If device 100 was in a locked, passcode-protected state, camera application 143 (the application with which application access indicia 5406 is associated) is started in video capture mode (as indicated by toggle switch 5032 set to video mode) in a restricted session, and corresponding interface 5026 is displayed, as shown in FIG. 5TT, and applications other than camera application 143 are maintained in the locked, passcode-protected state. For example, in FIG. 5TT, button 5030 in interface 5026 is now a video recording start/pause button. If device 100 was in a locked, not-passcode-protected state, camera application 143 is started in video mode in an unrestricted session, and corresponding interface 5026 is displayed. In some embodiments, interface 5026 may be revealed in an animation in which locked device interface 5000-L translates off-screen in accordance with the direction of movement 5424, and interface 5026 is revealed as more and more of interface 5000-L translates off-screen, as shown in FIG. 5RR-5TT.

In FIGS. 5OO-5TT, camera application 143 is started in different modes—still image mode in FIG. 5QQ and video mode in FIG. 5TT. The mode in which camera application 143 is started is determined by the type of gesture that is detected as starting on application access indicia 5406. Gesture 5412 (FIG. 5OO) and gesture 5422 (5RR) are different types of gestures. In some embodiments, the different types of gestures include different paths of movement of the contact in the gesture. For example, gesture 5412 includes movement 5414, which is a substantially vertical path, and gesture 5422 includes movement 5424, which has a diagonal path distinct from the substantially vertical path of movement 5414. In response to the determination that gesture 5412 is of the type with the vertical path, camera application 143 is started in still image mode. In response to the determination that gesture 5422 is of the type with the diagonal path, camera application 143 is started in video mode. As another example, movement 5414 of gesture 5412 may have a substantially vertical path as shown, and movement 5424 of gesture 5422 may have a substantially horizontal path (e.g., drag to the left or the right, depending on the specific implementation).

In some other embodiments, the different types of gestures include different locations where the movement of the contact in the gesture ends. For example, in gesture 5412 (FIGS. 5OO-5PP), the contact is shown as moving toward camera icon 5416, and gesture 5412 is complete when the contact ends at the area of camera icon 5416 (e.g., at a location of touch screen 112 over camera icon 5416). In gesture 5422 (FIGS. 5RR-5SS), the contact is shown as moving toward video icon 5418, and gesture 5422 is complete when the contact ends at the area of camera icon 5418 (e.g., at a location of touch screen 112 over camera icon 5418).

In some other embodiments, the different types of gestures include different numbers of contacts in the gesture. For example, gesture 5412 (FIGS. 5OO-5PP) includes one contact. On the other hand, gesture 5454 (FIGS. 5FFF-5GGG) includes two contacts, which move together in movement 5456. In response to the detection of gesture 5454 and a determination that gesture 5454 starts on application access indicia 5406, locked device interface 5000-L ceases to be displayed. If device 100 was in a locked, passcode-protected state, camera application 143 is started in video mode in a restricted session, and corresponding interface 5026 is displayed, as in FIG. 5TT, and applications other than camera application 143 are maintained in the locked, passcode-protected state. If device 100 was in a locked, not-passcode-protected state, camera application 143 is started in video mode in an unrestricted session, and corresponding interface 5026 is displayed. In some embodiments, interface 5026 may be revealed in an animation in which locked device interface 5000-L translates off-screen in accordance with the direction of movement 5454, and interface 5026 is revealed as more and more of interface 5000-L translates off-screen.

In some embodiments, icon 5408 may change appearance based on the type of gesture (e.g., the path of the movement of the contact in the gesture, number of contacts, etc.) detected on application access indicia 5406. For example, when one contact is detected on application access indicia 5406, as shown in FIG. 5OO, icon 5408 shows a still image camera (indicating that camera application 143 will start in still image mode if a gesture with the contact (e.g., gesture 5412) is detected). When two contacts are detected on application access indicia 5406, as shown in FIG. 5FFF, icon 5408 may be animated to show a video camera instead of a still image camera (indicating that camera application 143 will start video mode if a gesture with the contacts (e.g., gesture 5454) is detected). As another example, when movement 5424 of the contact is detected instead of contact 5414, icon 5408 changes appearance to show a video camera, as shown in FIGS. 5RR-5SS. The change in the appearance of icon 5408 may be animated.

FIG. 5UU shows gesture 5432 detected on application access indicia 5432. Gesture 5432 is a different type of gesture than gesture 5412 and gesture 5422. In some embodiments, gesture 5432 is a tap gesture. In response to the detection of gesture 5432 on application access indicia 5406, an animation of locked device interface 5000-L may be displayed (e.g., FIGS. 5VV-5XX). In the animation, locked device interface 5000-L moves or translates to partially reveal an interface corresponding to camera application 143 in a first mode (e.g., camera interface 5026 in still image mode) and then returns to its position prior to the animation. The partial reveal in response to detection of gesture 5432 provides a user with an indication that the user may interact with application access indicia 5406 (e.g., by performing gesture 5412) to launch camera application 143 in still image mode.

FIG. 5YY shows gesture 5438 detected on application access indicia 5406. Gesture 5438 is also a different type than gesture 5412 and gesture 5422, and may be of the same type as gesture 5432 (FIG. 5UU). In response to the detection of gesture 5438 on application access indicia 5406, an animation of locked device interface 5000-L may be displayed (e.g., FIGS. 5ZZ-5BBB). In the animation, locked device interface 5000-L moves or translates to partially reveal an interface corresponding to camera application 143 in a second mode (e.g., camera interface 5026 in video mode) and then returns to its position prior to the animation. The partial reveal in response to detection of gesture 5438 provides a user with an indication that the user may interact with application access indicia 5406 (e.g., by performing gesture 5422) to launch camera application 143 in video mode.

In some embodiments, the animation of locked device interface 5000-L includes translation of locked device interface 5000-L in one direction (e.g., movement 5434, FIG. VV or 5ZZ) to partially reveal interface 5026 and then movement in the opposite direction (e.g., movement 5436, FIG. 5XX or 5BBB) to hide interface 5026.

In some embodiments, alternating tap gestures on application access indicia 5406 partially reveal interface 5026 in, in alternating order, still image mode and video mode. For example, detection of gesture 5432 on application access indicia 5406 and a partial reveal of interface 5026 in still image mode in response may be followed by detection of gesture 5438 on application access indicia 5406 and a partial reveal of interface 5026 in video mode in response. Thus, tapping on application access indicia 5406 once partially reveals interface 5026 in still image mode, and then tapping on application access indicia 5406 a second time partially reveals interface 5026 in video mode. In some other embodiments, a tap gesture on application access indicia 5406 with one contact partially reveals interface 5026 in still image mode, and a tap gesture with multiple contacts (e.g., two contacts) on application access indicia 5406 partially reveals interface 5026 in video mode.

FIG. 5CCC shows gesture 5444 detected on application access indicia 5406. Gesture 5444 is a different type of gesture from gestures 5412 and 5422. In some embodiments, gesture 5444 is a tap-and-hold gesture. In response to detection of gesture 5444 on application access indicia 5406, visual indications 5446 and 5448 of gestures to start camera application 143 in still image mode (e.g., gesture 5412) and video mode (e.g., gesture 5414), respectively, are displayed. The visual indications 5446 and 5448 may include text, graphics (e.g., arrows), or any combination of these.

FIG. 5EEE shows gesture 5450 detected on unlock object 5276. Gesture 5450 moves with movement 5452. In response to the detection of gesture 5450 and corresponding movement 5452, unlock object 5276 moves within virtual channel 5274 toward the right end of channel 5274. When unlock object 5276 is moved to the right end of channel 5274 and then gesture 5450 is released, in response to the detection of the release of gesture 5450, if device 100 is in a locked, passcode-protected state, passcode entry user interface 5022 is displayed, as in FIG. 5C.

FIG. 5HHH illustrates locked device interface 5000-M displayed on touch screen 112 of device 100. Locked device interface 5000-M, as with the other locked device interfaces 5000 described above, may be displayed when a physical button (e.g., push button 206, home or menu button 204) on device 100 is activated by a user while device 100 is in a locked state. Locked device interface 5000-M may include a message informing the user that the device is locked, as well as other information (e.g., current time and date).

Locked device interface 5000-M includes unlock object 5276 and virtual channel 5274, first access indicia 5458, and second access indicia 5462. First access indicia 5458 include icons 5460 and 5010. First access indicia 5458 and second access indicia 5462 are both associated with an application. As shown, first access indicia 5458 and second access indicia 5462 are associated with camera application 143. Other applications that may be associated with first and second access indicia 5458, 5462 include, for example, notifications application 165, email application 140, or phone application 138. Icon 5460 indicates a first mode, of camera application 143, with which first access indicia 5406 are associated. For example, icon 5460 as shown in FIG. 5HHH depicts a still image camera; first access indicia 5406 are associated with a still image capture mode of camera application 143. Icons 5010 are described above with reference to FIG. 5A. Unlock object 5276, channel 5274, and application access indicia 5406 may be displayed in predefined region 5457. In some embodiments, camera icon 5416 and video icon 5418 are also displayed in locked device interface 5000-M. In some embodiments, camera icon 5416 and video icon 5418 are not displayed in locked device interface 5000-M.

FIG. 5HHH shows gesture 5466 detected on touch screen 112. Gesture 5466 is detected as starting from first access indicia 5458. Gesture 5466 moves with movement 5468. In response to the detection of gesture 5466 and a determination that gesture 5466 starts on first access indicia 5458, locked device interface 5000-M ceases to be displayed. If device 100 was in a locked, passcode-protected state, camera application 143 (the application with which first access indicia 5458 is associated) is started in still image capture mode (as indicated by toggle switch 5032 set to still image mode) in a restricted session, and corresponding interface 5026 is displayed, as shown in FIG. 5JJJ, and applications other than camera application 143 are maintained in the locked, passcode-protected state. If device 100 was in a locked, not-passcode-protected state, camera application 143 is started in still image mode in an unrestricted session, and corresponding interface 5026 is displayed. In some embodiments, interface 5026 may be revealed in an animation in which locked device interface 5000-M translates off-screen in accordance with the direction of movement 5468, and interface 5026 is revealed as more and more of interface 5000-M translates off-screen, as shown in FIG. 5HHH-5JJJ.

FIG. 5KKK shows gesture 5470 detected on touch screen 112. Gesture 5470 is detected as starting from second access indicia 5462. Gesture 5470 moves with movement 5472. In response to the detection of gesture 5470 and a determination that gesture 5470 starts on second access indicia 5462, locked device interface 5000-M ceases to be displayed. If device 100 was in a locked, passcode-protected state, camera application 143 (the application with which application access indicia 5406 is associated) is started in video capture mode (as indicated by toggle switch 5032 set to video mode)

in a restricted session, and corresponding interface 5026 is displayed, as shown in FIG. 5MMM, and applications other than camera application 143 are maintained in the locked, passcode-protected state. If device 100 was in a locked, not-passcode-protected state, camera application 143 is started in video mode in an unrestricted session, and corresponding interface 5026 is displayed. In some embodiments, interface 5026 may be revealed in an animation in which locked device interface 5000-M translates off-screen in accordance with the direction of movement 5472, and interface 5026 is revealed as more and more of interface 5000-M translates off-screen, as shown in FIG. 5KKK-5MMM.

In FIGS. 5HHH-5MMM, camera application 143 is started in different modes—still image mode in FIG. 5JJJ and video mode in FIG. 5MMM. The mode in which camera application 143 is started is determined by the access indicia from which the detected gesture starts. Gesture 5466 (FIG. 5HHH) starts from first access indicia 5458, and accordingly camera application 143 is started in still image mode. Gesture 5470 (5KKK) starts from second access indicia 5462, and accordingly camera application 143 is started in video mode.

FIG. 5NNN illustrates another example for starting camera application 143 in video mode with a gesture detected on second access indicia 5462. FIG. 5NNN shows gesture 5470, which starts on second access indicia 5462, with movement 5474 that is substantially horizontal, instead of the substantially vertical movement 5472. In response to detection of gesture 5470 with movement 5474, locked device interface 5000-M ceases to be displayed. If device 100 was in a locked, passcode-protected state, camera application 143 (the application with which application access indicia 5406 is associated) is started in video capture mode (as indicated by toggle switch 5032 set to video mode) in a restricted session, and corresponding interface 5026 is displayed, as in FIG. 5MMM, and applications other than camera application 143 are maintained in the locked, passcode-protected state. If device 100 was in a locked, not-passcode-protected state, camera application 143 is started in video mode in an unrestricted session, and corresponding interface 5026 is displayed. In some embodiments, interface 5026 may be revealed in an animation in which locked device interface 5000-M translates off-screen in accordance with the direction of movement 5472, and interface 5026 is revealed as more and more of interface 5000-M translates off-screen, as shown in FIG. 5OOO.

Gestures 5466 and 5470 may be of different types. In some embodiments, the different types of gestures include different paths of movement of the contact in the gesture. For example, gesture 5470 as shown in FIG. 5NNN includes a substantially horizontal movement 5472, and gesture 5466 includes a substantially vertical movement 5468.

In some other embodiments, the different types of gestures include different locations where the movement of the contact in the gesture ends. For example, in gesture 5466 (FIGS. 5HHH-5III), the contact is shown as moving toward camera icon 5416, and gesture 5466 is complete when the contact ends at the area of camera icon 5416 (e.g., at a location of touch screen 112 over camera icon 5416). In gesture 5470 (FIGS. 5KKK-5LLL), the contact is shown as moving toward video icon 5418, and gesture 5470 is complete when the contact ends at the area of camera icon 5418 (e.g., at a location of touch screen 112 over camera icon 5418).

In some other embodiments, the different types of gestures include different numbers of contacts in the gesture. For example, gesture 5466 (FIG. 5PPP) includes one contact. On the other hand, gesture 5478 (FIG. 5PPP) includes two contacts, which move together in movement 5478. Camera application 143 is started, and interface 5026 is displayed, in video mode in response to the detection of gesture 5476 in a similar manner as in response to gesture 5470 (FIG. 5KKK).

FIG. 5QQQ illustrates gesture 5480, which is detected on first access indicia 5458. Gesture 5480 is a different type of gesture from gesture 5466. In some embodiments, gesture 5480 is a tap gesture. In response to the detection of gesture 5480 on first access indicia 5458, an animation of locked device interface 5000-M may be displayed (e.g., FIG. 5RRR). In the animation, locked device interface 5000-M moves or translates in one direction (e.g., direction 5484) to partially reveal an interface corresponding to camera application 143 in a first mode (e.g., camera interface 5026 in still image mode) and then in the opposite direction (e.g., direction 5486) to return to its position prior to the animation. The partial reveal in response to detection of gesture 5480 provides a user with an indication that the user may interact with first access indicia 5458 (e.g., by performing gesture 5466) to launch camera application 143 in still image mode.

FIG. 5QQQ also illustrates gesture 5482, which is detected on second access indicia 5462. Gesture 5482 is a different type of gesture from gesture 5470 or 5476.

In some embodiments, gesture 5482 is a tap gesture. In response to the detection of gesture 5482 on second access indicia 5462, an animation of locked device interface 5000-M may be displayed (e.g., FIG. 5SSS). In the animation, locked device interface 5000-M moves or translates in one direction (e.g., direction 5488) to partially reveal an interface corresponding to camera application 143 in a second mode (e.g., camera interface 5026 in video mode) and then in the opposite direction (e.g., direction 5490) to return to its position prior to the animation. In some embodiments, direction 5488 is orthogonal to direction 5484, and direction 5490 is orthogonal to direction 5486. The partial reveal in response to detection of gesture 5482 provides a user with an indication that the user may interact with second access indicia 5462 (e.g., by performing gesture 5470) to launch camera application 143 in video mode.

FIG. 5TTT shows gesture 5492 detected on unlock object 5276. Gesture 5492 moves with movement 5494. In response to the detection of gesture 5492 and corresponding movement 5494, unlock object 5276 moves within virtual channel 5274 toward the right end of channel 5274. When unlock object 5276 is moved to the right end of channel 5274 and then gesture 5492 is released, in response to the detection of the release of gesture 5492, if device 100 is in a locked, passcode-protected state, passcode entry user interface 5022 is displayed, as in FIG. 5C.

In FIGS. 5OO-5TTT described above, application access indicia 5406, first access indicia 5458, and second access indicia 5462 are associated with camera application 143. It should be appreciated that in some embodiments, these access indicia may be associated with other applications, such as notifications application 165, email application 140, or phone application 138. In embodiments where the access indicia are associated with notification application 165, the first mode may be an incoming messages notifications mode, in which notifications of incoming messages (e.g., text messages, emails, voicemails, missed calls) are displayed; and the second mode may be an aggregate notifications mode, in which the notifications of incoming messages and other notifications (e.g., calendar appointments, tasks, reminders, notifications from other applications) are displayed.

In embodiments where the access indicia are associated with email application 140, the first mode may be an inbox mode, in which received email messages in one or more email inboxes are displayed; and the second mode may be an email composition mode, in which an interface for composing an email message is displayed.

In embodiments where the access indicia are associated with phone application 138, the first mode may be a keypad mode, in which a keypad for entering a phone number for dialing is displayed; and the second mode may be a recent calls listing or call log mode, in which a log of received, dialed, and missed calls is displayed. Alternatively, the second mode may be a voicemail mode, in which a listing of voicemails are displayed and the voicemails may be played back.

Figure 6A:
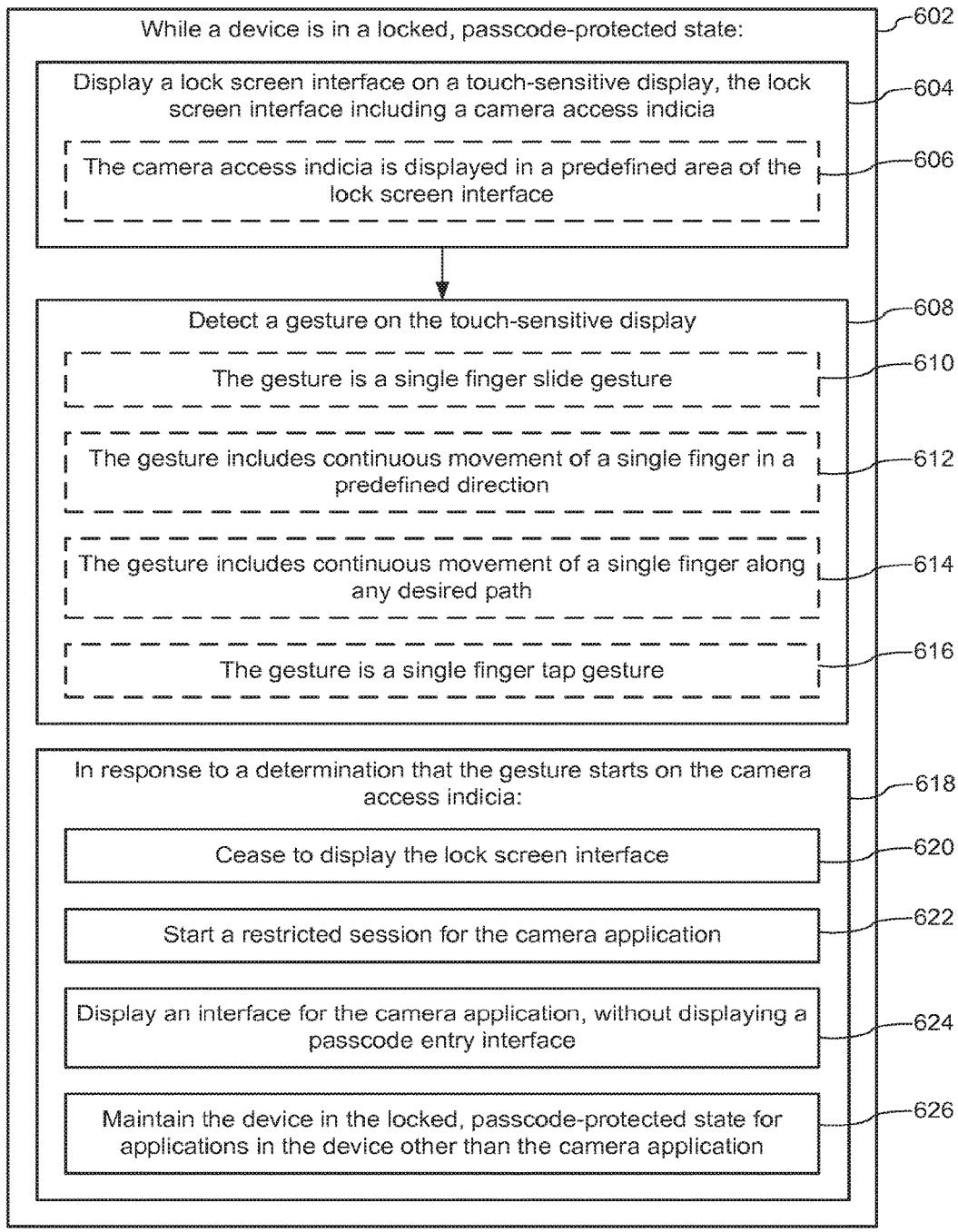
FIGS. 6A-6B are flow diagrams illustrating a method of accessing a camera application in a locked device in accordance with some embodiments.
Figure 6B:
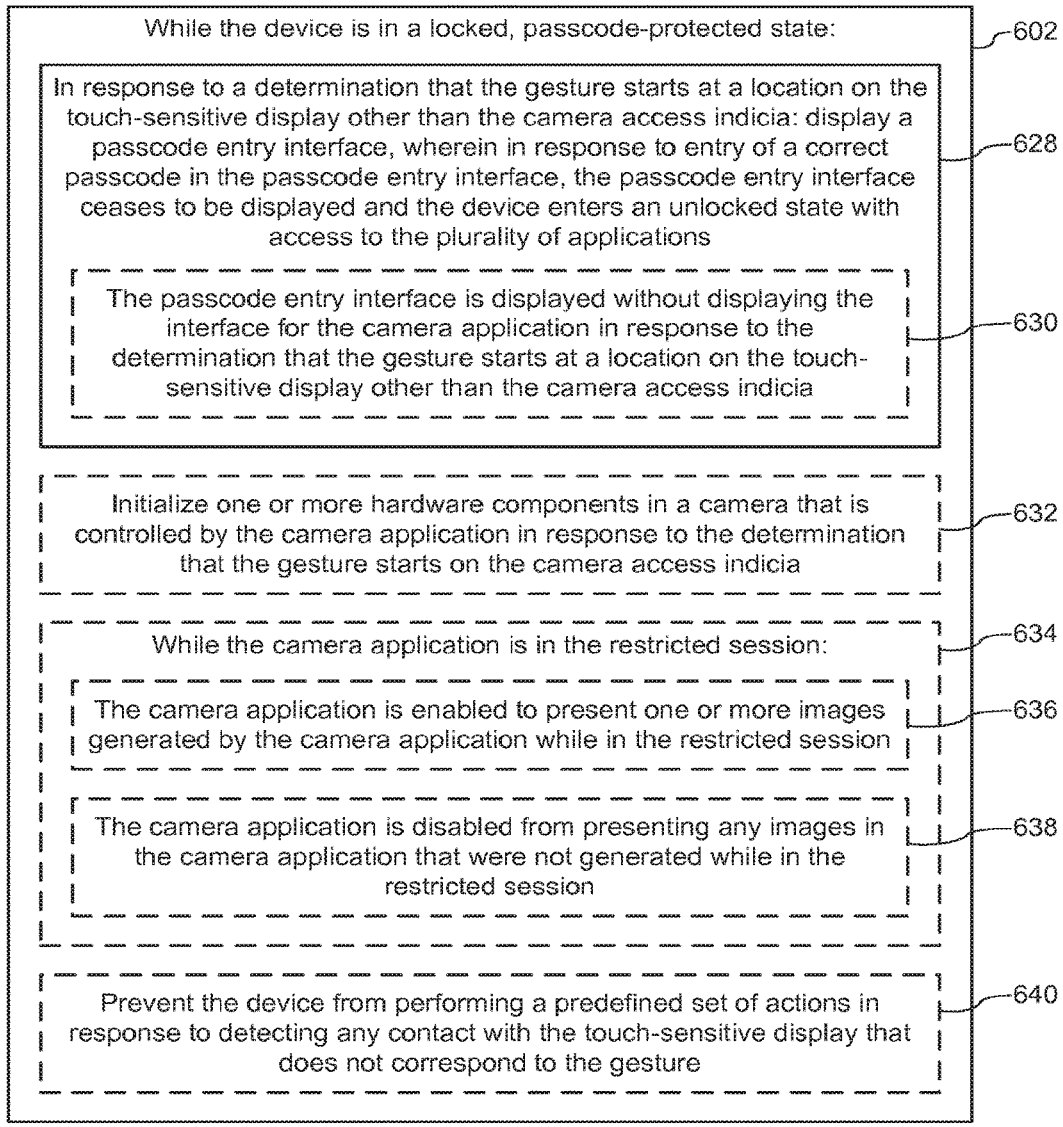

FIGS. 6A-6B are flow diagrams illustrating a method 600 of accessing a camera application in a locked device in accordance with some embodiments. The method 600 is performed at a portable multifunction device (e.g., device 300, FIG. 3, or portable multifunction device 100, FIG. 1) with a display, a touch-sensitive surface, and a plurality of applications, including a camera application. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 provides an intuitive way to quickly access a camera application in a locked device. The method reduces the cognitive burden on a user when accessing a camera application in a locked device, thereby creating a more efficient human-machine interface. For battery-operated electronic devices, enabling a user to access a camera application in a locked device faster and more efficiently conserves power and increases the time between battery charges.

While the device is in a locked, passcode-protected state (602), the device displays (604) a lock screen interface on the touch-sensitive display, the lock screen interface including a camera access indicia (e.g., an icon or other graphic indicative of the camera application, such as indicia 5006 in FIG. 5A). For example, while device 100 is in a locked, passcode-protected state, locked device interface 5000-A is displayed on touch screen 112, as shown in FIG. 5A. Locked device interface 5000-A includes camera access indicia 5006.

In some embodiments, the camera access indicia is displayed in a predefined area of the lock screen interface (606). For example, as shown in FIG. 5A, camera access indicia 5006 is displayed in region 5012 in locked device interface 5000-A.

The device detects (608) a gesture on the touch-sensitive display. For example, in FIG. 5A, a gesture (gesture 5014 or 5018, which are gestures of the same type with the same direction of movement, but which start from different locations) is detected.

In some embodiments, the gesture is a single finger slide gesture (610). For example, gesture 5014 moving with movement 5016 (FIG. 5A) may be a single finger slide gesture.

In some embodiments, the gesture includes continuous movement of a single finger in a predefined direction (612). Gesture 5014 (FIG. 5A), for example, is a gesture with continuous movement 5016 of a single finger in a predefined direction (vertically upward on display 112).

In some embodiments, the gesture includes continuous movement of a single finger along any desired path (614).

In some embodiments, the gesture is a single finger tap gesture (616). For example, instead of gesture 5014 with movement 5016 or gesture 5018 with movement 5020, the gesture may be a single finger tap gesture on camera access indicia 5006 or away from camera access indicia 5006 (not shown).

In response to a determination that the gesture starts on the camera access indicia (or, in some embodiments, on a hidden hit region for the camera access indicia, such as a hidden hit region that surrounds the camera access indicia) (618), the device ceases (620) to display the lock screen interface, starts (622) a restricted session for the camera application, displays (624) an interface for the camera application, without displaying a passcode entry interface, and maintains (626) the device in the locked, passcode-protected state for applications in the device other than the camera application. Returning to FIG. 5A, for example, in response to a determination that the gesture (gesture 5014) starts on camera access indicia 5006, if device 100 was in a locked, passcode-protected state, camera application 143 is started in a restricted session and locked device interface 5000-A is replaced with camera interface 5026 without displaying passcode entry user interface 5022 (FIG. 5C). The other applications on device 100 (e.g., notes 153, browser 147, etc.) are maintained in a locked, passcode-protected state.

In some embodiments, ceasing to display the lock screen interface and displaying the interface for the camera application includes an animated transition, such as: sliding the lock screen interface off screen to reveal the interface for the camera application, sliding the lock screen interface off screen while sliding the interface for the camera application on screen, or flipping the lock screen interface around into the interface for the camera application. For, example, an animation showing region 5012 expanding (FIG. 5B) and transitioning into camera interface 5026 may be displayed.

In response to a determination that the gesture starts at a location on the touch-sensitive display other than the camera access indicia, the device displays (628) a passcode entry interface. In response to entry of a correct passcode in the passcode entry interface, the passcode entry interface ceases to be displayed and the device enters an unlocked state with access to the plurality of applications. Returning to FIG. 5A, for example, in response to a determination that the gesture (e.g., gesture 5018) starts on a location other than camera access indicia 5006, if device 100 was in a locked, passcode-protected state, passcode entry user interface 5022 is displayed (FIG. 5C). Device 100 is unlocked if the correct passcode is entered in passcode entry user interface 5022.

Thus, the same gesture will produce two different results, depending on the starting location of the gesture. For example, single finger slide gesture 5014 (FIG. 5A), which starts on camera access indicia 5006, bypasses the passcode entry interface and results in immediate display of the camera application in a restricted session. Conversely, single finger slide gesture 5018 (FIG. 5A), which starts away from camera access indicia 5006, results in immediate display of the passcode entry interface.

In some embodiments, the passcode entry interface is displayed without displaying the interface for the camera application in response to the determination that the gesture starts at a location on the touch-sensitive display other than the camera access indicia (630). In response to the detection of gesture 5018 (FIG. 5A), for example, passcode entry user interface 5022 is displayed without displaying camera interface 5026.

In some embodiments, the device initializes (632) one or more hardware components in a camera that is controlled by the camera application in response to the determination that the gesture starts on the camera access indicia. For example, in response to the detection of gesture 5014 on camera access indicia 5006, hardware components for the camera on device 100 (e.g., optical sensor(s) 164) may be initialized.

In some embodiments, while the camera application is in the restricted session (634), the camera application is enabled to present one or more images generated by the camera application while in the restricted session (636), and the camera application is disabled from presenting any images in the camera application that were not generated while in the restricted session (638). While camera application 143 is in a restricted session, images and videos captured during the restricted session may be viewed in the interface for camera application 143 (e.g., in camera roll image viewer interface 5042), whereas images and videos captured outside of the restricted session (e.g., captured while device 100 is unlocked) may not be viewed.

In some embodiments, while the device is in the locked, passcode-protected state, the device prevents (640) the device from performing a predefined set of actions (e.g., performing actions using the applications on the device) in response to detecting any contact with the touch-sensitive display that does not correspond to the gesture.

It should be understood that the particular order in which the operations in FIGS. 6A-6B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to methods 700, 800, 900, 1000, and 1100 (e.g., FIGS. 7-9, 10A-10C, 11A-11C) are also applicable in an analogous manner to method 600 described above with respect to FIGS. 6A-6B. For brevity, these details are not repeated here.

Figure 7:
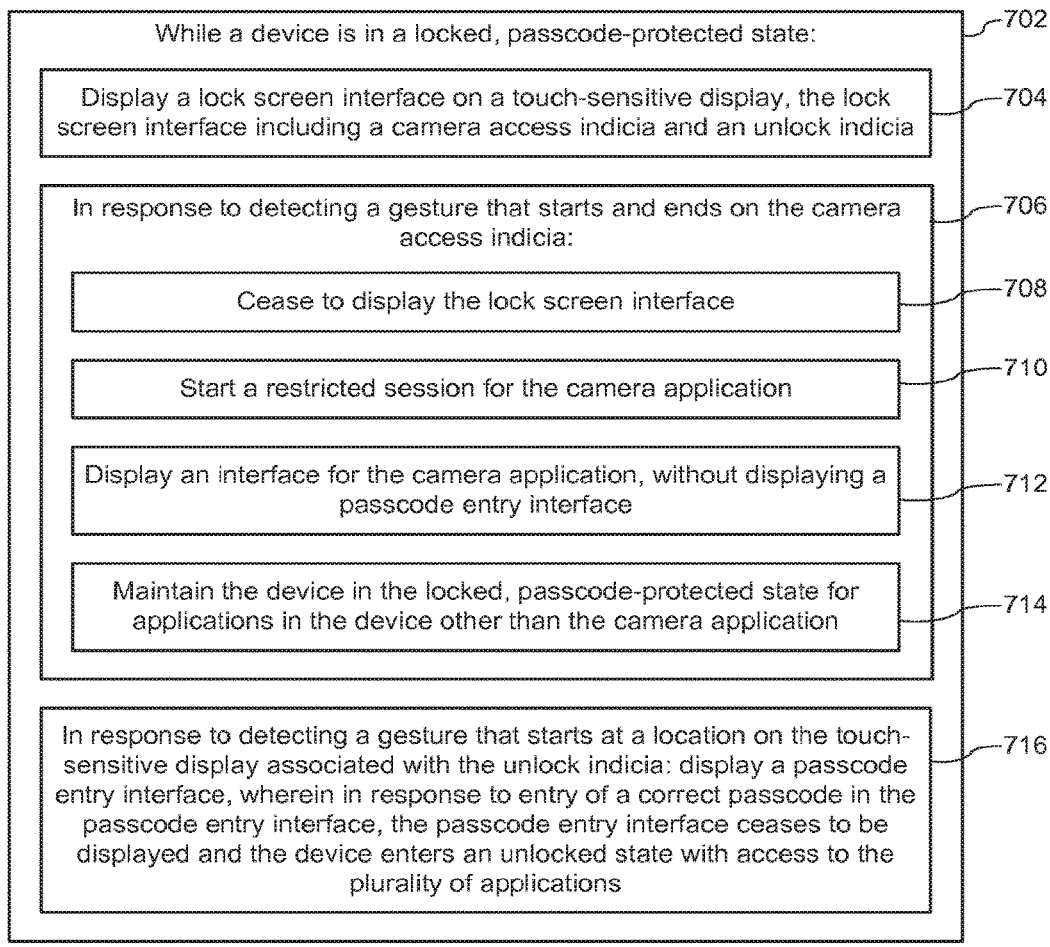
FIG. 7 is a flow diagram illustrating a method of accessing a camera application in a locked device in accordance with some embodiments.

FIG. 7 is a flow diagram illustrating a method 700 of accessing a camera application in a locked device in accordance with some embodiments. The method 700 is performed at a portable multifunction device (e.g., device 300, FIG. 3, or portable multifunction device 100, FIG. 1) with a display, a touch-sensitive surface, and a plurality of applications, including a camera application. In some embodiments, the display is a touch screen display and the touch-sensitive surface is on the display. In some embodiments, the display is separate from the touch-sensitive surface. Some operations in method 700 may be combined and/or the order of some operations may be changed.

As described below, the method 700 provides an intuitive way to quickly access a camera application in a locked device. The method reduces the cognitive burden on a user when accessing a camera application in a locked device, thereby creating a more efficient human-machine interface. For battery-operated electronic devices, enabling a user to access a camera application in a locked device faster and more efficiently conserves power and increases the time between battery charges.

While the device is in a locked, passcode-protected state (702), the device displays (704) a lock screen interface on the touch-sensitive display, the lock screen interface including a camera access indicia (e.g., an icon or other graphic indicative of the camera application, such as unlock camera object 5068 in FIG. 5G or camera icon 5286 in FIG. 5II) and an unlock indicia (e.g., an icon or other graphic indicative of a device unlocking functionality, such as unlock object 5066 in FIG. 5G). For example, while device 100 is in a locked, passcode-protected state, locked device interface 5000-B is displayed on touch screen 112, as shown in FIG. 5G. Locked device interface 5000-B includes unlock object 5066 and unlock camera object 5068.

In response to detecting a gesture that starts and ends on the camera access indicia (or, in some embodiments, on a hidden hit region for the camera access indicia, such as a hidden hit region that surrounds the camera access indicia) (706), the device ceases (708) to display the lock screen interface, starts (710) a restricted session for the camera application, displays (712) an interface for the camera application, without displaying a passcode entry interface, and maintains (714) the device in the locked, passcode-protected state for applications in the device other than the camera application. In some embodiments, the gesture that starts and ends on the camera access indicia is a tap gesture on the camera access indicia. In some embodiments, the gesture that starts and ends on the camera access indicia is a drag gesture on the camera access indicia that moves the camera access indicia, either by itself or with other objects on the lock screen.

For example, in FIG. 5I, in response to the detection of gesture 5074 and corresponding gesture movement 5076 (i.e., gesture starting) on unlock camera object 5068, and a release of gesture 5074 from (i.e., gesture ending on) unlock camera object 5068 after unlock camera object 5068 is moved to a predefined location (e.g., adjacent to unlock object 5066 (FIG. 5) or to the left end of channel 5064 (FIG. 5N)), if device 100 was in a locked, passcode-protected state, camera application 143 is started in a restricted session and locked device interface 5000-B is replaced with camera interface 5026 without displaying passcode entry user interface 5022 (FIG. 5D). The other applications on device 100 (e.g., notes 153, browser 147, etc.) are maintained in a locked, passcode-protected state.

As another example, in FIG. 5II, in response to the detection of tap gesture 5288 on camera icon 5286, if device 100 was in a locked, passcode-protected state, camera application 143 is started in a restricted session and locked device interface 5000-J is replaced with camera interface 5026 without displaying passcode entry user interface 5022 (FIG. 5D). The other applications on device 100 (e.g., notes 153, browser 147, etc.) are maintained in a locked, passcode-protected state.

In some embodiments, ceasing to display the lock screen interface and displaying the interface for the camera application includes an animated transition, such as: sliding the lock screen interface off screen to reveal the interface for the camera application, sliding the lock screen interface off screen while sliding the interface for the camera application on screen, or flipping the lock screen interface around into the interface for the camera application.

In response to detecting a gesture that starts at a location on the touch-sensitive display associated with the unlock indicia, the device displays (716) a passcode entry interface. In response to entry of a correct passcode in the passcode entry interface, the passcode entry interface ceases to be displayed and the device enters an unlocked state with access to the plurality of applications.

For example, returning to FIGS. 5G-5N, in response to the detection of gesture 5070 (i.e., starting) on unlock object 5066 and subsequent release of gesture 5070 after unlock object 5066 is moved to a predefined location (e.g., right end of channel 5064, FIG. 5L, or adjacent to unlock camera object 5068, FIG. 5H), if device 100 was in a locked, passcode-protected state, passcode entry user interface 5022 is displayed (FIG. 5C). Device 100 is unlocked if the correct passcode is entered in passcode entry user interface 5022. (An analogous response occurs for a gesture on unlock object 5276 in FIG. 5II.)

Thus, single finger slide gesture 5074 (FIG. 5I), which starts and ends on unlock camera icon 5068, bypasses the passcode entry interface and results in immediate display of the camera application in a restricted session. Conversely, single finger slide gesture 5070 (FIG. 5G), which starts on unlock object 5066, results in immediate display of the passcode entry interface.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to methods 600, 800, 900, 1000, and 1100 (e.g., FIGS. 6A-6B, 8-9, 10A-10C, 11A-11C) are also applicable in an analogous manner to method 700 described above with respect to FIG. 7. For example, the locked device interface 5000-B described above with reference to method 700 may have one or more of the characteristics of the locked device interface 5000-A described herein with reference to methods 600. For brevity, these details are not repeated here.

Figure 8:
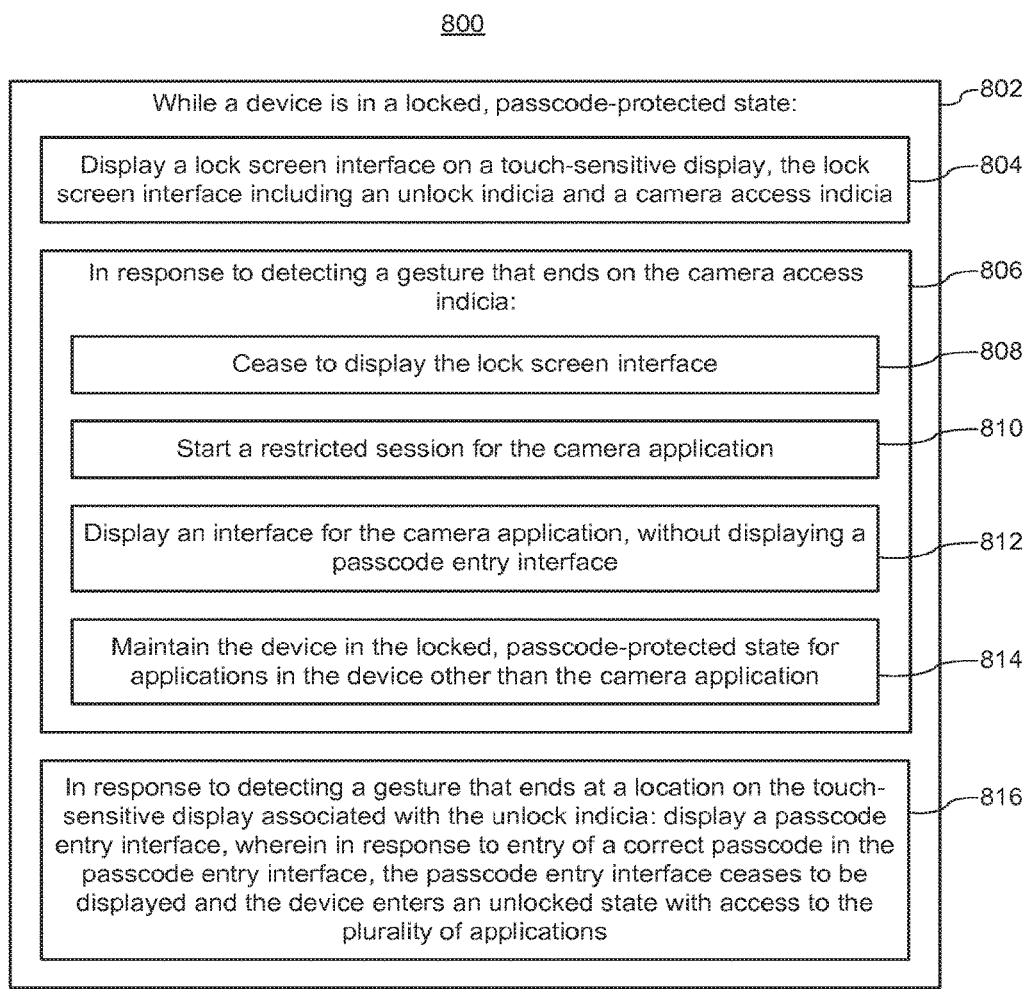
FIG. 8 is a flow diagram illustrating a method of accessing a camera application in a locked device in accordance with some embodiments.

FIG. 8 is a flow diagram illustrating a method 800 of accessing a camera application in a locked device in accordance with some embodiments. The method 800 is performed at a portable multifunction device (e.g., device 300, FIG. 3, or portable multifunction device 100, FIG. 1) with a display, a touch-sensitive surface, and a plurality of applications, including a camera application. In some embodiments, the display is a touch screen display and the touch-sensitive surface is on the display. In some embodiments, the display is separate from the touch-sensitive surface. Some operations in method 800 may be combined and/or the order of some operations may be changed.

As described below, the method 800 provides an intuitive way to quickly access a camera application in a locked device. The method reduces the cognitive burden on a user when accessing a camera application in a locked device, thereby creating a more efficient human-machine interface. For battery-operated electronic devices, enabling a user to access a camera application in a locked device faster and more efficiently conserves power and increases the time between battery charges.

While the device is in a locked, passcode-protected state (802), the device displays (804) a lock screen interface on the touch-sensitive display, the lock screen interface including a camera access indicia (e.g., an icon or other graphic indicative of the camera application, such as camera icon 5294 in FIG. 5JJ) and an unlock indicia (e.g., an icon or other graphic indicative of a device unlocking functionality, such as unlock icon 5296 in FIG. 5JJ). For example, while device 100 is in a locked, passcode-protected state, locked device interface 5000-K is displayed on touch screen 112, as shown in FIG. 5JJ. Locked device interface 5000-K includes camera icon 5294 and unlock icon 5296.

In response to detecting a gesture that ends on the camera access indicia (or, in some embodiments, on a hidden hit region for the camera access indicia, such as a hidden hit region that surrounds the camera access indicia) (806), the device ceases (808) to display the lock screen interface, starts (810) a restricted session for the camera application, displays (812) an interface for the camera application, without displaying a passcode entry interface, and maintains (814) the device in the locked, passcode-protected state for applications in the device other than the camera application. In FIG. 5JJ, for example, gesture 5298 is detected on unlock object 5292. Gesture 5298 may move with movement 5302 toward camera icon 5294. In response to the detection of movement 5302, unlock object 5292 moves toward camera icon 5294. In response to a release of gesture 5298 from unlock object 5292 after unlock object 5292 is moved to the location of (i.e., gesture ends on) camera icon 5294, if device 100 was in a locked, passcode-protected state, camera application 143 is started in a restricted session and locked device interface 5000-K is replaced with camera interface 5026 without displaying passcode entry user interface 5022 (FIG. 5D). The other applications on device 100 (e.g., notes 153, browser 147, etc.) are maintained in a locked, passcode-protected state.

In some embodiments, ceasing to display the lock screen interface and displaying the interface for the camera application includes an animated transition, such as: sliding the lock screen interface off screen to reveal the interface for the camera application, sliding the lock screen interface off screen while sliding the interface for the camera application on screen, or flipping the lock screen interface around into the interface for the camera application.

In response to detecting a gesture that ends at a location on the touch-sensitive display associated with the unlock indicia, the device displays (816) a passcode entry interface. In response to entry of a correct passcode in the passcode entry interface, the passcode entry interface ceases to be displayed and the device enters an unlocked state with access to the plurality of applications. Returning to FIG. 5JJ, Gesture 5298 may move with movement 5300 toward unlock icon 5296. In response to the detection of movement 5300, unlock object 5292 moves toward unlock icon 5296. In response to a release of gesture 5298 from unlock object 5292 after unlock object 5292 is moved to the location of (i.e., gesture ends on) unlock icon 5296, if device 100 was in a locked, passcode-protected state, passcode entry user interface 5022 is displayed (FIG. 5C). Device 100 is unlocked if the correct passcode is entered in passcode entry user interface 5022.

Thus, single finger slide gesture 5298 moving with movement 5302 (FIG. 5JJ), which ends on camera icon 5294, bypasses the passcode entry interface and results in immediate display of the camera application in a restricted session. Conversely, single finger slide gesture 5298 moving with movement 5300 (FIG. 5JJ), which ends on unlock icon 5296, results in immediate display of the passcode entry interface.

It should be understood that the particular order in which the operations in FIG. 8 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to methods 600, 700, 900, 1000, and 1100 (e.g., FIGS. 6A-6B, 7, 9, 10A-10C, 11A-11C) are also applicable in an analogous manner to method 800 described above with respect to FIG. 8. For example, the locked device interface 5000-K described above with reference to method 800 may have one or more of the characteristics of the locked device interface 5000-A described herein with reference to method 600. For brevity, these details are not repeated here.

Figure 9:
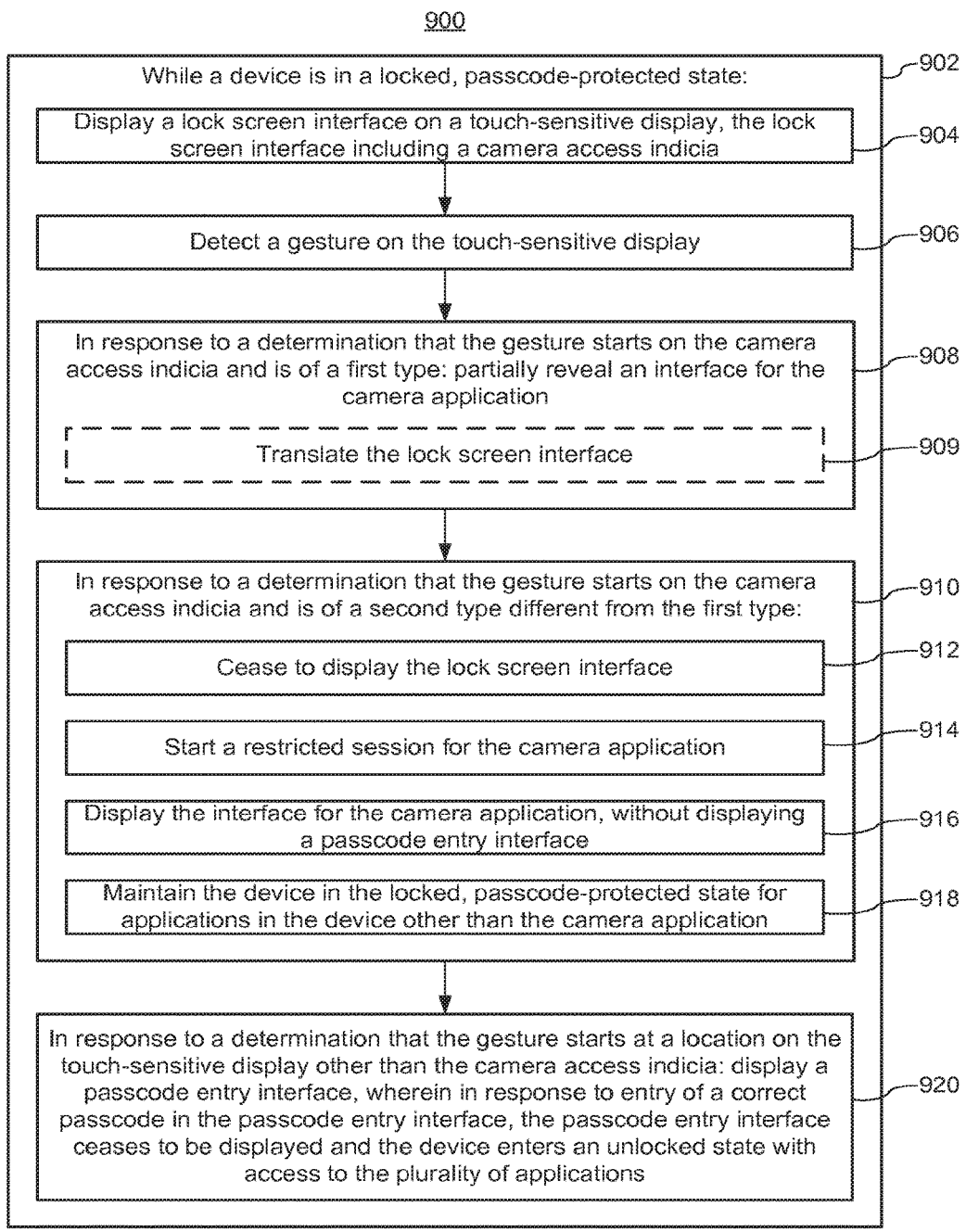
FIG. 9 is a flow diagram illustrating a method of accessing a camera application in a locked device in accordance with some embodiments.

FIG. 9 is a flow diagram illustrating a method 900 of accessing a camera application in a locked device in accordance with some embodiments. The method 900 is performed at a portable multifunction device (e.g., device 300, FIG. 3, or portable multifunction device 100, FIG. 1) with a display, a touch-sensitive surface, and a plurality of applications, including a camera application. In some embodiments, the display is a touch screen display and the touch-sensitive surface is on the display. In some embodiments, the display is separate from the touch-sensitive surface. Some operations in method 900 may be combined and/or the order of some operations may be changed.

As described below, the method 900 provides an intuitive way to quickly access a camera application in a locked device. The method reduces the cognitive burden on a user when accessing a camera application in a locked device, thereby creating a more efficient human-machine interface. For battery-operated electronic devices, enabling a user to access a camera application in a locked device faster and more efficiently conserves power and increases the time between battery charges.

While the device is in a locked, passcode-protected state (902), the device displays (904) a lock screen interface on the touch-sensitive display, the lock screen interface including a camera access indicia (e.g., an icon or other graphic indicative of the camera application, such as indicia 5006 in FIG. 5KK). For example, while device 100 is in a locked, passcode-protected state, locked device interface 5000-J is displayed on touch screen 112, as shown in FIG. 5KK. Locked device interface 5000-J includes camera access indicia 5006.

The device detects (906) a gesture on the touch-sensitive display. For example, in FIG. 5GG, gesture 5278 or 5282 is detected, and in FIG. 5KK, gesture 5304 is detected.

In response to a determination that the gesture starts on the camera access indicia (or, in some embodiments, on a hidden hit region for the camera access indicia, such as a hidden hit region that surrounds the camera access indicia) and is of a first type (e.g., a tap gesture), the device partially reveals an interface for the camera application (908). In some embodiments, in response to the determination that the gesture starts on the camera access indicia and is of a first type, the device translates the lock screen interface (e.g., to partially reveal the an interface for the camera application (909). For example, in FIG. 5KK, in response to a determination that the gesture (gesture 5304) starts on camera access indicia 5006 and is of a first type (e.g., a tap gesture), lock screen interface 5000-J translates upward 5306, revealing a portion of camera interface 5026, as shown in FIG. 5LL. The upward translation of lock screen interface 5000-J reaches a peak, as shown in FIG. 5MM, and lock screen interface 5000-J translates downward 5308 back toward its original position on display 112, as shown in FIG. 5NN. The upward and downward translation may be part of an animation of lock screen interface 5000-J bouncing off the bottom edge of display 112, for example.

In some embodiments, the device translates the lock screen interface in a first direction to partially reveal the interface for the camera application and then translates the lock screen interface in a direction opposite the first direction to eliminate display of the partially revealed interface of the camera application. This movement gives the user a peek at the interface for the camera application, and indicates (hints) that a drag or swipe gesture on the camera access indicia will give the user immediate access to the camera application.

In response to a determination that the gesture starts on the camera access indicia (or, in some embodiments, on a hidden hit region for the camera access indicia, such as a hidden hit region that surrounds the camera access indicia) and is of a second type different from the first type (e.g., a drag or swipe gesture) (910), the device ceases (912) to display the lock screen interface, starts (914) a restricted session for the camera application, displays (916) the interface for the camera application, without displaying a passcode entry interface, and maintains (918) the device in the locked, passcode-protected state for applications in the device other than the camera application. Returning to FIG. 5GG, for example, in response to a determination that the gesture (gesture 5282) starts on camera access indicia 5006 and is of a second type different from the first type (for example, gesture 5282 being a drag or swipe gesture, compared to gesture 5304 being a tap gesture), if device 100 was in a locked, passcode-protected state, camera application 143 is started in a restricted session and locked device interface 5000-J is replaced with camera interface 5026 without displaying passcode entry user interface 5022 (FIG. 5C). The other applications on device 100 (e.g., notes 153, browser 147, etc.) are maintained in a locked, passcode-protected state.

In response to a determination that the gesture starts at a location on the touch-sensitive display other than the camera access indicia (e.g., a drag or swipe gesture starting on an unlock object), the device displays (920) a passcode entry interface. In response to entry of a correct passcode in the passcode entry interface, the passcode entry interface ceases to be displayed and the device enters an unlocked state with access to the plurality of applications. Returning to FIG. 5GG, for example, in response to a determination that the gesture (e.g., gesture 5278) starts on a location other than camera access indicia 5006 (e.g., on unlock object 5276), if device 100 was in a locked, passcode-protected state, passcode entry user interface 5022 is displayed (FIG. 5C). Device 100 is unlocked if the correct passcode is entered in passcode entry user interface 5022.

It should be understood that the particular order in which the operations in FIG. 9 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to methods 600, 700, 800, 1000, and 1100 (e.g., FIGS. 6A-6B, 7, 8, 10A-10C, 11A-11C) are also applicable in an analogous manner to method 900 described above with respect to FIG. 9. For example, the locked device interface 5000-J described above with reference to method 900 may have one or more of the characteristics of the locked device interface 5000-A described herein with reference to method 600. For brevity, these details are not repeated here.

Figure 10A:
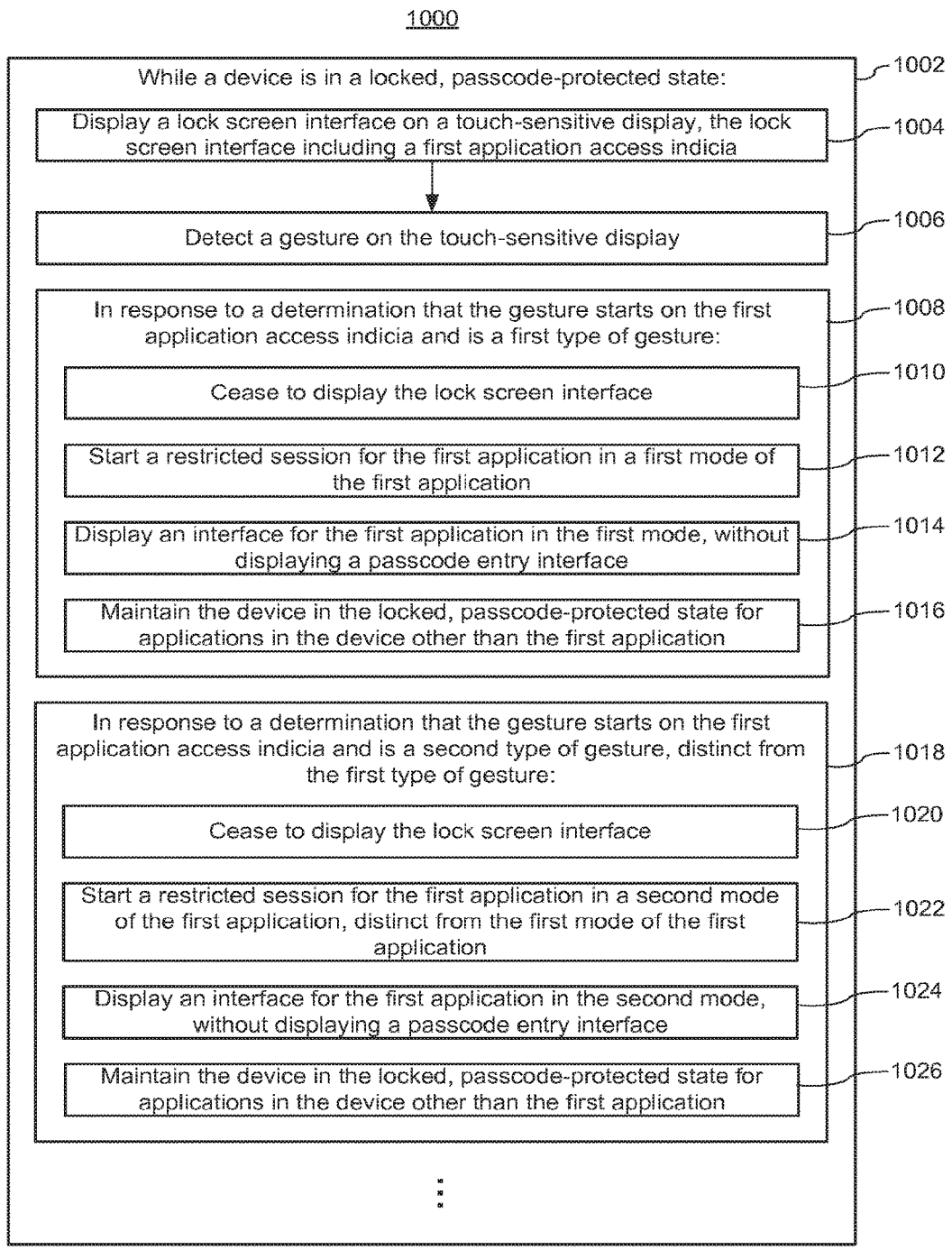
FIGS. 10A-10C are flow diagrams illustrating a method of accessing different modes of an application in a locked device in accordance with some embodiments.
Figure 10B:
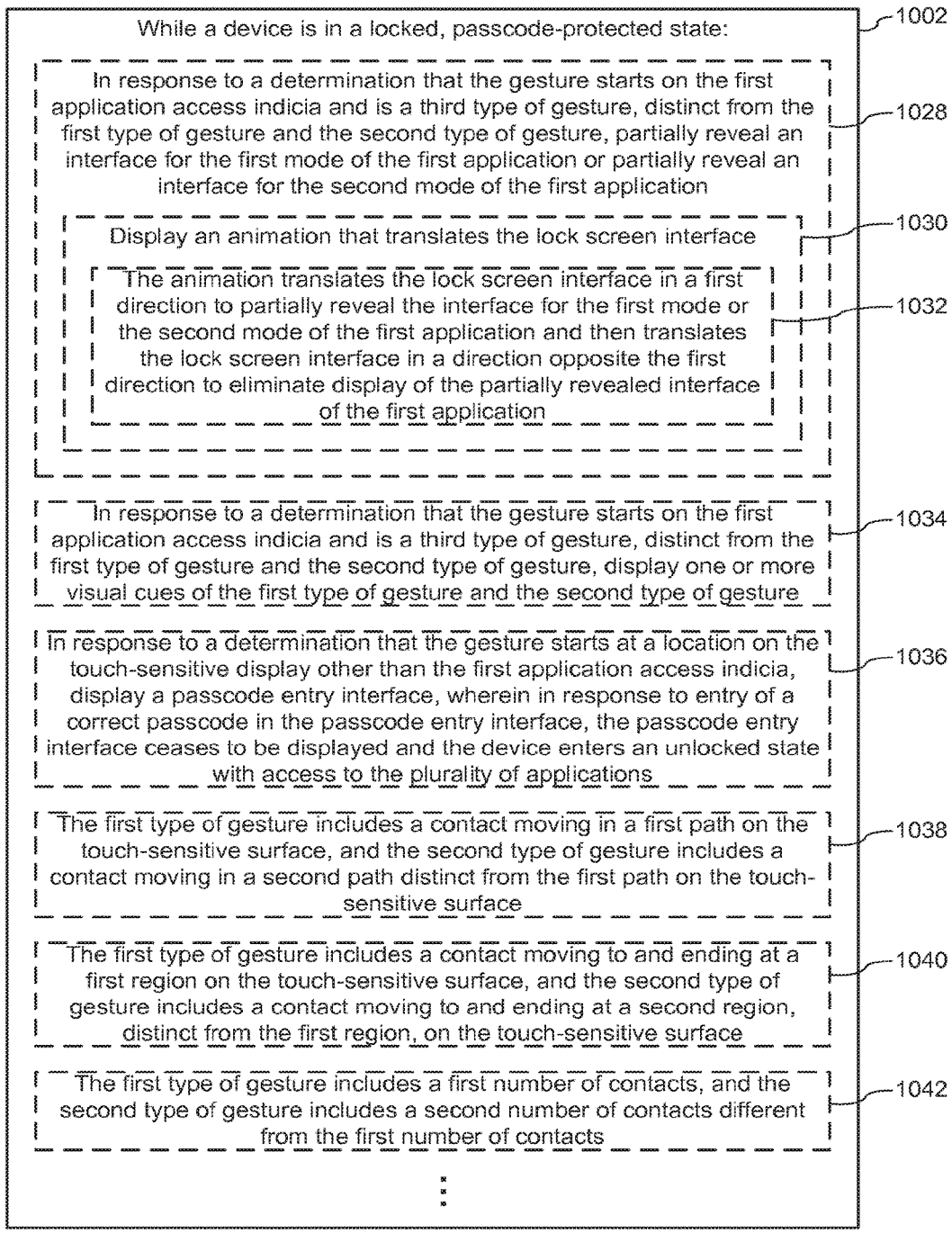
Figure 10C:
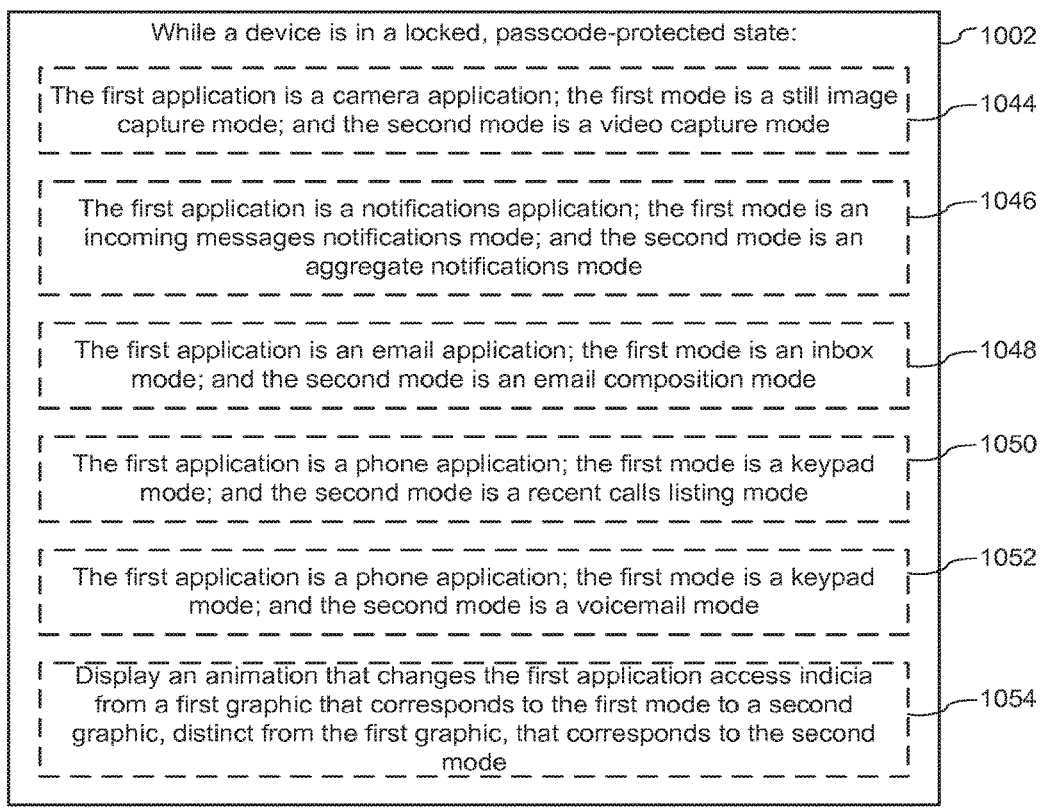

FIGS. 10A-10C are flow diagrams illustrating a method 1000 of accessing different modes of an application in a locked device in accordance with some embodiments. The method 1000 is performed at a portable multifunction device (e.g., device 300, FIG. 3, or portable multifunction device 100, FIG. 1) with a display, a touch-sensitive surface, and a plurality of applications, including a first application. In some embodiments, the display is a touch screen display and the touch-sensitive surface is on the display. In some embodiments, the display is separate from the touch-sensitive surface. Some operations in method 1000 may be combined and/or the order of some operations may be changed.

As described below, the method 1000 provides an intuitive way to quickly access different modes of an application in a locked device. The method reduces the cognitive burden on a user when accessing different modes of an application in a locked device, thereby creating a more efficient human-machine interface. For battery-operated electronic devices, enabling a user to access different modes of an application in a locked device faster and more efficiently conserves power and increases the time between battery charges.

While the device is in a locked, passcode-protected state (1002), the device displays a lock screen interface on the touch-sensitive display, the lock screen interface including a first application access indicia (e.g., an icon or other graphic element that a user interacts with to access the first application) (1004). For example, FIG. 5OO shows application access indicia 5406 displayed in locked device interface 5000-L.

The device detects a gesture on the touch-sensitive display (1006). FIGS. 5OO and 5RR show gestures 5412 and 5422, respectively, detected on touch screen 112.

In response to a determination that the gesture starts on the first application access indicia and is a first type of gesture (e.g., vertical swipe gesture 5412 in FIG. 5OO, or a leftward swipe gesture 5230 with movement 5232 in FIG. 5X)) (1008), the device ceases to display the lock screen interface (1010), starts a restricted session for the first application in a first mode of the first application (1012), displays an interface for the first application in the first mode, without displaying a passcode entry interface (1014), and maintains the device in the locked, passcode-protected state for applications in the device other than the first application (1016). For example, in response to detection of gesture 5412 and a determination that gesture 5412 starts on application access indicia 5406 and is a first type of gesture, lock screen interface 5000-L ceases to be displayed, camera application 143 is started in still image mode in a restricted session and corresponding interface 5026 is displayed in still image mode, and the passcode-protected state are maintained for the other applications in the device, as shown in FIGS. 5OO-5QQ.

In response to a determination that the gesture starts on the first application access indicia and is a second type of gesture, distinct from the first type of gesture (e.g., horizontal swipe gesture, diagonal swipe gesture 5422 in FIG. 5RR, or a rightward swipe gesture (e.g., gesture 5230 with movement 5234 in FIG. 5X)) (1018), the device ceases to display the lock screen interface (1020), starts a restricted session for the first application in a second mode of the first application, distinct from the first mode of the first application (1022), displays an interface for the first application in the second mode, without displaying a passcode entry interface (1024), and maintains the device in the locked, passcode-protected state for applications in the device other than the first application (1026). For example, in response to detection of gesture 5422 (or gesture 5454, FIGS. 5FFF-5GGG) and a determination that gesture 5422 (or gesture 5454) starts on application access indicia 5406 and is a second type of gesture different from the first type of gesture, lock screen interface 5000-L ceases to be displayed, camera application 143 is started in video mode in a restricted session and corresponding interface 5026 is displayed in video mode, and the passcode-protected state are maintained for the other applications in the device, as shown in FIGS. 5RR-5TT (or FIGS. 5FFF-5GGG).

In some embodiments, in response to a determination that the gesture starts on the first application access indicia and is a third type of gesture (e.g., a tap gesture), distinct from the first type of gesture and the second type of gesture, the device partially reveals an interface for the first mode of the first application or partially reveals an interface for the second mode of the first application (1028). For example, in response to detection of tap gestures 5432 and 5438, interface 5026 is partially revealed in the still image mode and in the video mode, respectively, as shown in FIGS. 5UU-5BBB.

In some embodiments, partially revealing an interface for the first mode of the first application or partially revealing an interface for the second mode of the first application includes displaying an animation that translates the lock screen interface (1030). As shown in FIGS. 5UU-5BBB, for example, partial revealing of interface 5026 may include an animation of locked device interface 5000-L translating.

In some embodiments, the animation translates the lock screen interface in a first direction to partially reveal the interface for the first mode or the second mode of the first application and then translates the lock screen interface in a direction opposite the first direction to eliminate display of the partially revealed interface of the first application (1032). As shown in FIGS. 5UU-5BBB, for example, partial revealing of interface 5026 may include an animation of locked device interface 5000-L translating in direction 5434 and then in the opposite direction 5436.

In some embodiments, in response to a determination that the gesture starts on the first application access indicia and is a third type of gesture (e.g., a tap-and-hold gesture), distinct from the first type of gesture and the second type of gesture, the device displays one or more visual cues of the first type of gesture and the second type of gesture (1034). The visual cue(s) provide hints or reminders to the user of the first type of gesture and the second type of gesture. The visual cues may be textual, graphical or any combination thereof. For example, FIGS. 5CCC-5DDD show visual indicators 5446 and 5448 of gestures displayed in response to detection of gesture 5444 (e.g., a tap-and-hold gesture) on application access indicia 5406.

In response to a determination that the gesture starts at a location on the touch-sensitive display other than the first application access indicia, the device displays a passcode entry interface, wherein in response to entry of a correct passcode in the passcode entry interface, the passcode entry interface ceases to be displayed and the device enters an unlocked state with access to the plurality of applications (1036). For example, in response to detection of gesture 5450 with movement 5452 on unlock object 5276, as shown in FIG. 5EEE, passcode entry user interface 5022 (FIG. 5C) is displayed.

In some embodiments, the first type of gesture includes a contact moving in a first path on the touch-sensitive surface, and the second type of gesture includes a contact moving in a second path distinct from the first path on the touch-sensitive surface (1038). For example, gesture 5412 (FIG. 5OO) has a substantially vertical path, and gesture 5422 (FIG. 5RR) has a diagonal path.

In some embodiments, the first type of gesture includes a contact moving to and ending at a first region on the touch-sensitive surface, and the second type of gesture includes a contact moving to and ending at a second region, distinct from the first region, on the touch-sensitive surface (1040). For example, in some embodiments, gesture 5412 ends on camera icon 5416, and gesture 5422 ends on video icon 5418.

In some embodiments, the first type of gesture includes a first number of contacts, and the second type of gesture includes a second number of contacts different from the first number of contacts (1042). For example, gesture 5412 (FIG. 5OO) has one contact, and gesture 5454 (FIG. 5FFF) has two contacts.

In some embodiments, the first application is a camera application, the first mode is a still image capture mode, and the second mode is a video capture mode (1044). For example, FIGS. 5OO-5GGG show interface 5026 for camera application 143 displayed in still image mode and video mode.

In some embodiments, the first application is a notifications application, the first mode is an incoming messages notifications mode, and the second mode is an aggregate notifications mode (1046). The application associated with application access indicia 5406 may be notifications application 165, and the different modes accessible from locked device interface 5000-L may include an incoming messages notifications mode and an aggregate notifications mode.

In some embodiments, the first application is an email application, the first mode is an inbox mode, and the second mode is an email composition mode (1048). The application associated with application access indicia 5406 may be email application 140, and the different modes accessible from locked device interface 5000-L may include an inbox mode and an email composition mode.

In some embodiments, the first application is a phone application, the first mode is a keypad mode, and the second mode is a recent calls listing mode (1050). The application associated with application access indicia 5406 may be phone application 138, and the different modes accessible from locked device interface 5000-L may include a keypad mode and a recent calls listing (e.g., call log) mode.

In some embodiments, the first application is a phone application, the first mode is a keypad mode, and the second mode is a voicemail mode (1052). The application associated with application access indicia 5406 may be phone application 138, and the different modes accessible from locked device interface 5000-L may include a keypad mode and a voicemail mode.

In some embodiments, the device displays an animation that changes the first application access indicia from a first graphic that corresponds to the first mode to a second graphic, distinct from the first graphic, that corresponds to the second mode (e.g., an animation that changes a camera indicia from a still camera graphic to a video camera graphic, as shown in FIGS. 5RR-5SS) (1054).

It should be understood that the particular order in which the operations in FIG. 10 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to methods 600, 700, 800, 900, and 1100 (e.g., FIGS. 6A-6B, 7-9, 11A-11C) are also applicable in an analogous manner to method 1000 described above with respect to FIG. 10. For example, the locked device interface 5000-L described above with reference to method 1000 may have one or more of the characteristics of the locked device interface 5000-A described herein with reference to method 600. For brevity, these details are not repeated here.

Figure 11A:
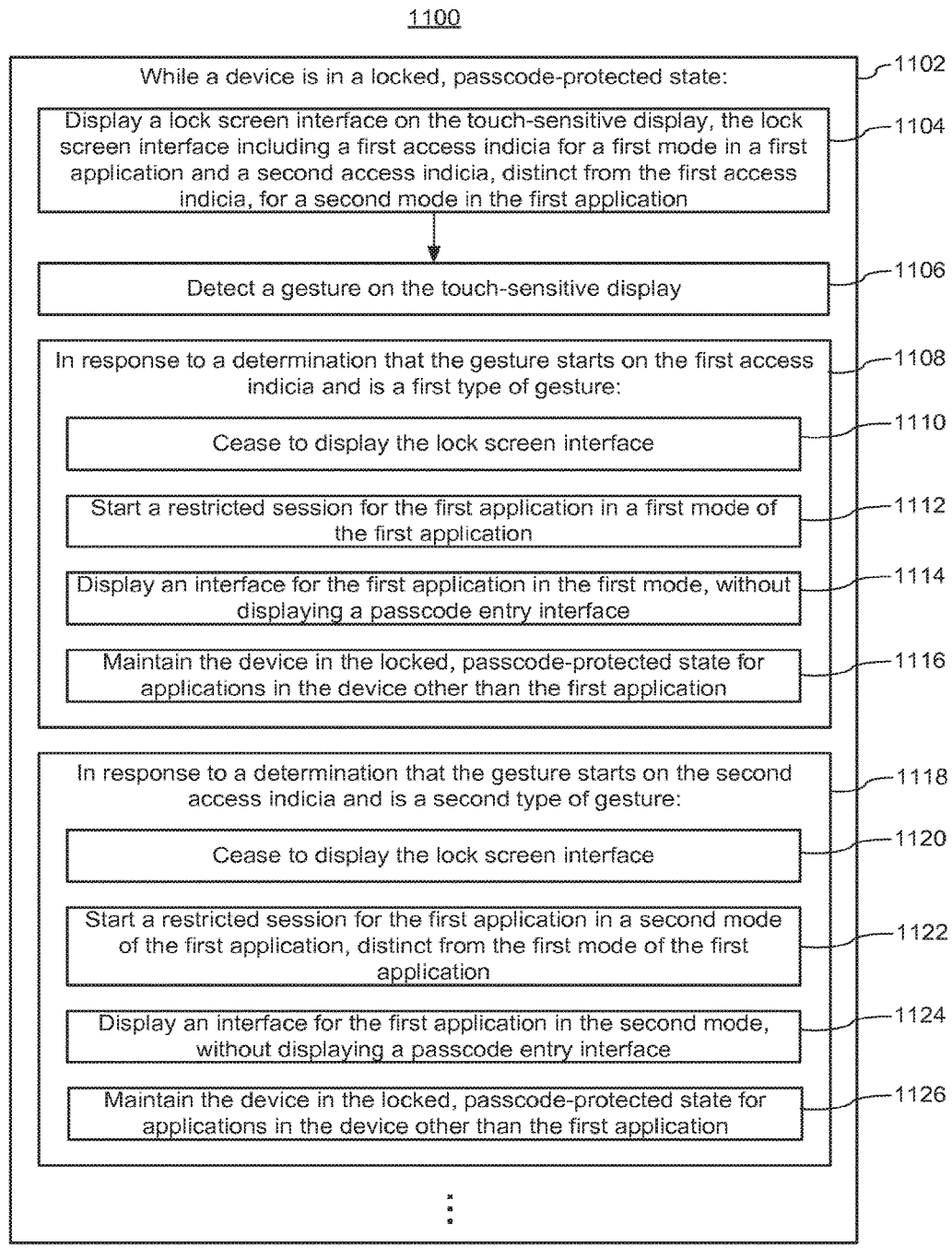
FIGS. 11A-11C are flow diagrams illustrating a method of accessing different modes of an application in a locked device in accordance with some embodiments.
Figure 11B:
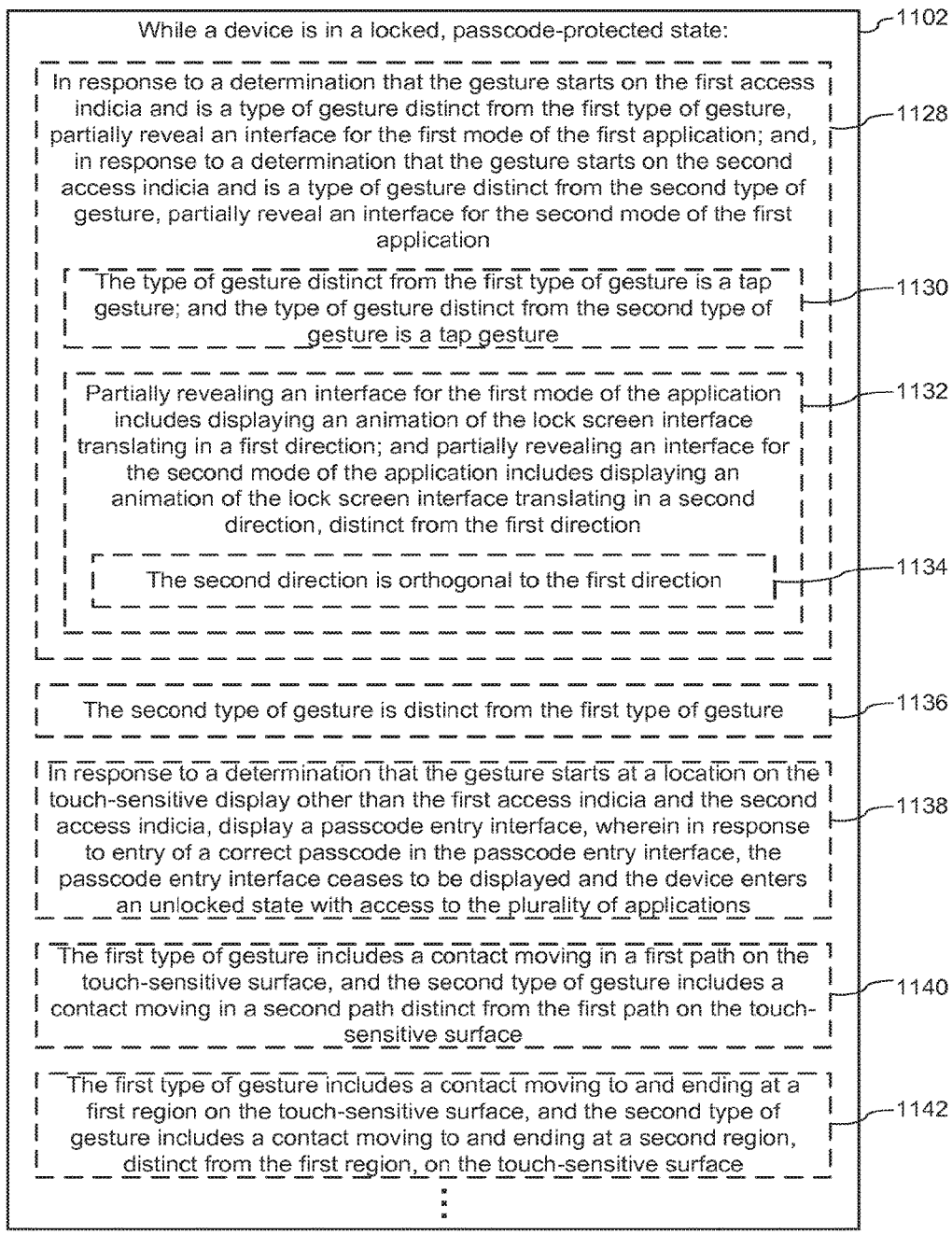
Figure 11C:
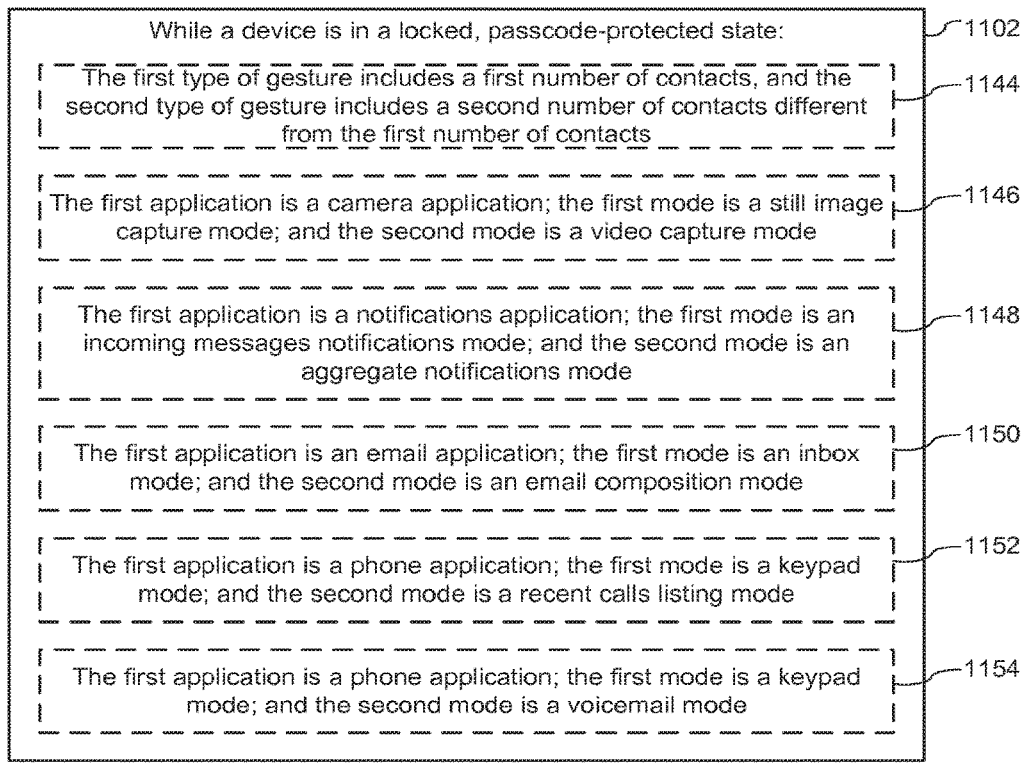

FIGS. 11A-11C are flow diagrams illustrating a method 1100 of accessing different modes of an application in a locked device in accordance with some embodiments. The method 1100 is performed at a portable multifunction device (e.g., device 300, FIG. 3, or portable multifunction device 100, FIG. 1) with a display, a touch-sensitive surface, and a plurality of applications, including a first application. In some embodiments, the display is a touch screen display and the touch-sensitive surface is on the display. In some embodiments, the display is separate from the touch-sensitive surface. Some operations in method 1100 may be combined and/or the order of some operations may be changed.

As described below, the method 1100 provides an intuitive way to quickly access different modes of an application in a locked device. The method reduces the cognitive burden on a user when accessing different modes of an application in a locked device, thereby creating a more efficient human-machine interface. For battery-operated electronic devices, enabling a user to access different modes of an application in a locked device faster and more efficiently conserves power and increases the time between battery charges.

While the device is in a locked, passcode-protected state (1102), the device displays a lock screen interface on the touch-sensitive display, the lock screen interface including a first access indicia for a first mode in a first application (e.g., an icon or other graphic element that a user interacts with to access the first mode in the first application) and a second access indicia, distinct from the first access indicia, for a second mode in the first application (e.g., an icon or other graphic element that a user interacts with to access the second mode in the first application) (1104). For example, FIG. 5HHH shows first access indicia 5458 and second access indicia 5462 displayed in locked device interface 5000-M.

The device detects a gesture on the touch-sensitive display (1106). FIGS. 5HHH, 5KKK, and 5NNN show gestures 5466 and 5470, respectively, detected on touch screen 112.

In response to a determination that the gesture starts on the first access indicia and is a first type of gesture (e.g., vertical swipe gesture 5466 in FIG. 5HHH or 5PPP, or a leftward swipe gesture (e.g., gesture 5230 with movement 5232 in FIG. 5X)) (1108), the device ceases to display the lock screen interface (1110), starts a restricted session for the first application in a first mode of the first application (1112), displays an interface for the first application in the first mode, without displaying a passcode entry interface (1114), and maintains the device in the locked, passcode-protected state for applications in the device other than the first application (1116). For example, in response to detection of gesture 5466 and a determination that gesture 5466 starts on first access indicia 5458 and is a first type of gesture, lock screen interface 5000-M ceases to be displayed, camera application 143 is started in still image mode in a restricted session and corresponding interface 5026 is displayed in still image mode, and the passcode-protected state are maintained for the other applications in the device, as shown in FIGS. 5HHH-5JJJ, 5PPP.

In response to a determination that the gesture starts on the second application access indicia and is a second type of gesture (e.g., vertical swipe gesture 5470 in FIG. 5KKK, horizontal swipe gesture 5470 in FIG. 5NNN, two-contact vertical swipe gesture 5476 in FIG. 5PPP, or a rightward swipe gesture (e.g., gesture 5230 with movement 5234 in FIG. 5X)) (1118), the device ceases to display the lock screen interface (1120), starts a restricted session for the first application in a second mode of the first application, distinct from the first mode of the first application (1122), displays an interface for the first application in the second mode, without displaying a passcode entry interface (1124), and maintains the device in the locked, passcode-protected state for applications in the device other than the first application (1126). For example, in response to detection of gesture 5470 (FIG. 5KKK or 5NNN) or 5476 (FIG. 5PPP) and a determination that gesture 5470 or 5476 starts on second access indicia 5464 and is a second type of gesture, lock screen interface 5000-M ceases to be displayed, camera application 143 is started in video mode in a restricted session and corresponding interface 5026 is displayed in video mode, and the passcode-protected state is maintained for the other applications in the device, as shown in FIGS. 5KKK-5PPP.

In some embodiments, in response to a determination that the gesture starts on the first access indicia and is a type of gesture (e.g., a tap gesture) distinct from the first type of gesture, the device partially reveals an interface for the first mode of the first application; and, in response to a determination that the gesture starts on the second access indicia and is a type of gesture (e.g., a tap gesture) distinct from the second type of gesture, the device partially reveals an interface for the second mode of the first application (1128). For example, in response to detection of tap gesture 5480, interface 5026 is partially revealed in still image mode by translating locked device interface 5000-M in direction 5484, as shown in FIGS. 5QQQ-5RRR. In response to detection of tap gesture 5482, interface 5026 is partially revealed in video mode by translating locked device interface 5000-M in direction 5488, as shown in FIGS. 5QQQ and 5SSS.

In some embodiments, the type of gesture distinct from the first type of gesture is a tap gesture, and the type of gesture distinct from the second type of gesture is a tap gesture (1130). For example, gestures 5480 and 5482 may both be tap gestures.

In some embodiments, partially revealing an interface for the first mode of the application includes displaying an animation of the lock screen interface translating in a first direction, and partially revealing an interface for the second mode of the application includes displaying an animation of the lock screen interface translating in a second direction, distinct from the first direction (1132). As shown in FIG. 5RRR, for example, partial revealing of interface 5026 in still image mode may include an animation of locked device interface 5000-M translating in direction 5484. As shown in FIG. 5SSS, for example, partial revealing of interface 5026 in video mode may include an animation of locked device interface 5000-M translating in direction 5488, which is different from direction 5484.

In some embodiments, the second direction is orthogonal to the first direction (1134). For example, directions 5484 (FIG. 5RRR) and 5488 (FIG. 5SSS) are orthogonal to each other.

In some embodiments, the second type of gesture is distinct from the first type of gesture (1136). For example, gesture 5466 (5HHH) and gesture 5470 (FIG. 5NNN) are different types of gestures—gesture 5466 is a vertical swipe gesture, and gesture 5470 in FIG. 5NNN is a horizontal swipe gesture.

In some embodiments, in response to a determination that the gesture starts at a location on the touch-sensitive display other than the first access indicia and the second access indicia, the device displays a passcode entry interface, wherein in response to entry of a correct passcode in the passcode entry interface, the passcode entry interface ceases to be displayed and the device enters an unlocked state with access to the plurality of applications (1138). For example, in response to detection of gesture 5492 with movement 5494 on unlock object 5276, as shown in FIG. 5TTT, passcode entry user interface 5022 (FIG. 5C) is displayed.

In some embodiments, the first type of gesture includes a contact moving in a first path on the touch-sensitive surface, and the second type of gesture includes a contact moving in a second path distinct from the first path on the touch-sensitive surface (1140). For example, gesture 5466 has a substantially vertical path, and gesture 5470 in FIG. 5NNN has a horizontal path.

In some embodiments, the first type of gesture includes a contact moving to and ending at a first region on the touch-sensitive surface, and the second type of gesture includes a contact moving to and ending at a second region, distinct from the first region, on the touch-sensitive surface (1142). For example, in some embodiments, gesture 5466 in FIGS. 5HHH-5III ends on camera icon 5416, and gesture 5470 in FIGS. 5KKK-5LLL ends on video icon 5418.

In some embodiments, the first type of gesture includes a first number of contacts, and the second type of gesture includes a second number of contacts different from the first number of contacts (1144). For example, gesture 5466 has one contact, and gesture 5476 (FIG. 5PPP) has two contacts.

In some embodiments, the first application is a camera application, the first mode is a still image capture mode, and the second mode is a video capture mode (1146). For example, FIGS. 5HHH-5TTT show interface 5026 for camera application 143 displayed in still image mode and video mode.

In some embodiments, the first application is a notifications application, the first mode is an incoming messages notifications mode, and the second mode is an aggregate notifications mode (1148). For example, the application associated with first access indicia 5458 and second access indicia 5462 may be notifications application 165, and the different modes accessible from locked device interface 5000-M may include an incoming messages notifications mode and an aggregate notifications mode.

In some embodiments, the first application is an email application, the first mode is an inbox mode, and the second mode is an email composition mode (1150). For example, the application associated with first access indicia 5458 and second access indicia 5462 may be email application 140, and the different modes accessible from locked device interface 5000-M may include an inbox mode and an email composition mode.

In some embodiments, the first application is a phone application, the first mode is a keypad mode, and the second mode is a recent calls listing mode (1152). For example, the application associated with first access indicia 5458 and second access indicia 5462 may be phone application 138, and the different modes accessible from locked device interface 5000-M may include a keypad mode and a recent calls listing (e.g., call log) mode.

In some embodiments, the first application is a phone application, the first mode is a keypad mode, and the second mode is a voicemail mode (1154). For example, the application associated with first access indicia 5458 and second access indicia 5462 may be phone application 138, and the different modes accessible from locked device interface 5000-M may include a keypad mode and a voicemail mode.

It should be understood that the particular order in which the operations in FIG. 11 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to methods 600, 700, 800, 900, and 1000 (e.g., FIGS. 6A-6B, 7-9, 10A-10C) are also applicable in an analogous manner to method 1000 described above with respect to FIG. 11. For example, the locked device interface 5000-M described above with reference to method 1000 may have one or more of the characteristics of the locked device interface 5000-A described herein with reference to method 600. For brevity, these details are not repeated here.

Figure 12:
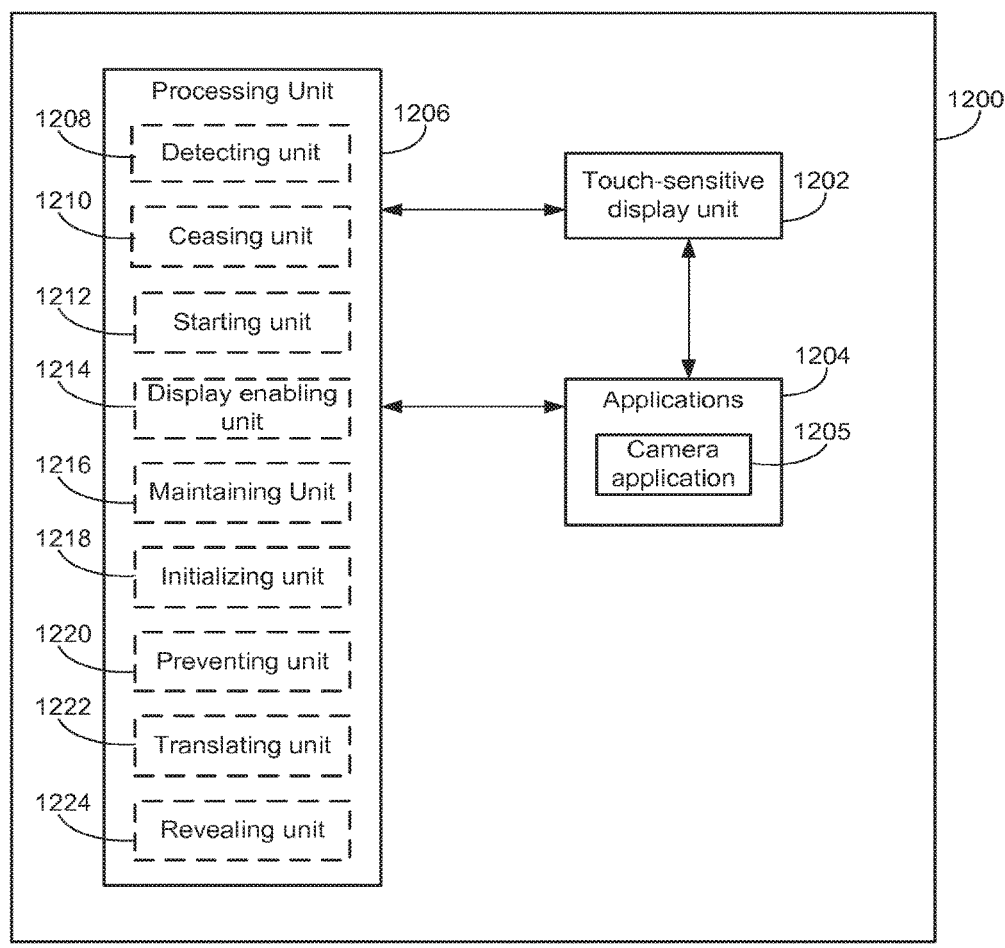
FIG. 12 is a functional block diagram of an electronic device in accordance with some embodiments.

In accordance with some embodiments, FIG. 12 shows a functional block diagram of an electronic device 1200 configured in accordance with the principles of the invention as described above. The functional blocks of the device may be implemented by hardware, software, or a combination of hardware and software to carry out the principles of the invention. It is understood by persons of skill in the art that the functional blocks described in FIG. 12 may be combined or separated into sub-blocks to implement the principles of the invention as described above. Therefore, the description herein may support any possible combination or separation or further definition of the functional blocks described herein.

As shown in FIG. 12, an electronic device 1200 includes a touch-sensitive display unit 1202 configured to display, while the device is in a locked, passcode-protected state, a lock screen interface, the lock screen interface including a camera access indicia, and receive gestures; a plurality of applications 1204, including a camera application 1205; and a processing unit 1206 coupled to the touch-sensitive display unit 1202 and the plurality of applications 1204. In some embodiments, the processing unit includes a detecting unit 1208, a ceasing unit 1210, a starting unit 1212, a display enabling unit 1214, a maintaining unit 1216, an initializing unit 1218, and a preventing unit 1220.

The processing unit 1206 is configured to: while the device is in the locked, passcode-protected state: detect a gesture on the touch-sensitive display unit (e.g., with the detecting unit 1208); in response to a determination that the gesture starts on the camera access indicia: cease to display the lock screen interface (e.g., with the ceasing unit 1210), start a restricted session for the camera application (e.g., with the starting unit 1212), enable display of an interface for the camera application, without displaying a passcode entry interface (e.g., with the display enabling unit 1214), and maintain the device in the locked, passcode-protected state for applications in the device other than the camera application (e.g., with the maintaining unit 1216); and in response to a determination that the gesture starts at a location on the touch-sensitive display unit other than the camera access indicia, enable display of a passcode entry interface (e.g., with the display enabling unit 1214), wherein in response to entry of a correct passcode in the passcode entry interface, the passcode entry interface ceases to be displayed and the device enters an unlocked state with access to the plurality of applications.

In some embodiments, the camera access indicia is displayed in a predefined area of the lock screen interface.

In some embodiments, the gesture is a single finger slide gesture.

In some embodiments, the gesture includes continuous movement of a single finger in a predefined direction.

In some embodiments, the gesture includes continuous movement of a single finger along any desired path.

In some embodiments, the gesture is a single finger tap gesture.

In some embodiments, the processing unit is configured to initialize one or more hardware components in a camera that is controlled by the camera application in response to the determination that the gesture starts on the camera access indicia (e.g., with the initializing unit 1218).

In some embodiments, while the camera application is in the restricted session, the camera application is enabled to present one or more images generated by the camera application while in the restricted session, and the camera application is disabled from presenting any images in the camera application that were not generated while in the restricted session.

In some embodiments, the passcode entry interface is displayed without displaying the interface for the camera application in response to the determination that the gesture starts at a location on the touch-sensitive display unit other than the camera access indicia.

In some embodiments, the processing unit is configured to, while the device is in the locked, passcode-protected state, prevent the device from performing a predefined set of actions in response to detecting any contact with the touch-sensitive display unit that does not correspond to the gesture (e.g., with the preventing unit 1220).

In some other embodiments, an electronic device 1200 includes a touch-sensitive display unit 1202 configured to display, while the device is in a locked, passcode-protected state, a lock screen interface, the lock screen interface including a camera access indicia and an unlock indicia, and receive gestures; a plurality of applications 1204, including a camera application 1205; and a processing unit 1206 coupled to the touch-sensitive display unit 1202 and the plurality of applications 1204. In some embodiments, the processing unit includes a detecting unit 1208, a ceasing unit 1210, a starting unit 1212, a display enabling unit 1214, and a maintaining unit 1216.

The processing unit 1206 is configured to: while the device is in the locked, passcode-protected state: in response to detecting a gesture that starts and ends on the camera access indicia (e.g., with the detecting unit 1208), cease to display the lock screen interface (e.g., with the ceasing unit 1210), start a restricted session for the camera application (e.g., with the starting unit 1212), enable display of an interface for the camera application, without displaying a passcode entry interface (e.g., with the display enabling unit 1214), and maintain the device in the locked, passcode-protected state for applications in the device other than the camera application (e.g., with the maintaining unit 1216); and in response to detecting a gesture that starts at a location on the touch-sensitive display unit associated with the unlock indicia (e.g., with the detecting unit 1208), display a passcode entry interface (e.g., with the display enabling unit 1214), wherein in response to entry of a correct passcode in the passcode entry interface, the passcode entry interface ceases to be displayed and the device enters an unlocked state with access to the plurality of applications.

In some other embodiments, an electronic device 1200 includes a touch-sensitive display unit 1202 configured to display, while the device is in a locked, passcode-protected state, a lock screen interface, the lock screen interface including a camera access indicia and an unlock indicia, and receive gestures; a plurality of applications 1204, including a camera application 1205; and a processing unit 1206 coupled to the touch-sensitive display unit 1202 and the plurality of applications 1204. In some embodiments, the processing unit includes a detecting unit 1208, a ceasing unit 1210, a starting unit 1212, a display enabling unit 1214, and a maintaining unit 1216.

The processing unit 1206 is configured to: while the device is in the locked, passcode-protected state: in response to detecting a gesture that ends on the camera access indicia (e.g., with the detecting unit 1208): cease to display the lock screen interface (e.g., with the ceasing unit 1210), start a restricted session for the camera application (e.g., with the starting unit 1212), enable display of an interface for the camera application, without displaying a passcode entry interface (e.g., with the display enabling unit 1214), and maintain the device in the locked, passcode-protected state for applications in the device other than the camera application (e.g., with the maintaining unit 1216); and in response to detecting a gesture that ends at a location on the touch-sensitive display unit associated with the unlock indicia (e.g., with the detecting unit 1208), display a passcode entry interface (e.g., with the display enabling unit 1214), wherein in response to entry of a correct passcode in the passcode entry interface, the passcode entry interface ceases to be displayed and the device enters an unlocked state with access to the plurality of applications.

In some other embodiments, an electronic device 1200 includes a touch-sensitive display unit 1202 configured to display, while the device is in a locked, passcode-protected state, a lock screen interface, the lock screen interface including a camera access indicia, and receive gestures; a plurality of applications 1204, including a camera application 1205; and a processing unit 1206 coupled to the touch-sensitive display unit 1202 and the plurality of applications 1204. In some embodiments, the processing unit includes a detecting unit 1208, a ceasing unit 1210, a starting unit 1212, a display enabling unit 1214, a maintaining unit 1216, a translating unit 1222, and a revealing unit 1224.

The processing unit 1206 is configured to: while the device is in the locked, passcode-protected state: detect a gesture on the touch-sensitive display unit (e.g., with the detecting unit 1208); in response to a determination that the gesture starts on the camera access indicia and is of a first type, partially reveal an interface for the camera application (e.g., with the revealing unit 1224); in response to a determination that the gesture starts on the camera access indicia and is of a second type different from the first type: cease to display the lock screen interface (e.g., with the ceasing unit 1210), start a restricted session for the camera application (e.g., with the starting unit 1212), enable display of an interface for the camera application, without displaying a passcode entry interface (e.g., with the display enabling unit 1214), and maintain the device in the locked, passcode-protected state for applications in the device other than the camera application (e.g., with the maintaining unit 1216); and in response to a determination that the gesture starts at a location on the touch-sensitive display unit other than the camera access indicia, enable display of a passcode entry interface (e.g., with the display enabling unit 1214), wherein in response to entry of a correct passcode in the passcode entry interface, the passcode entry interface ceases to be displayed and the device enters an unlocked state with access to the plurality of applications.

In some embodiments, the processing unit is configured to: in response to the determination that the gesture starts on the camera access indicia and is of a first type, translate the lock screen interface (e.g., with the translating unit 1222).

Figure 13:
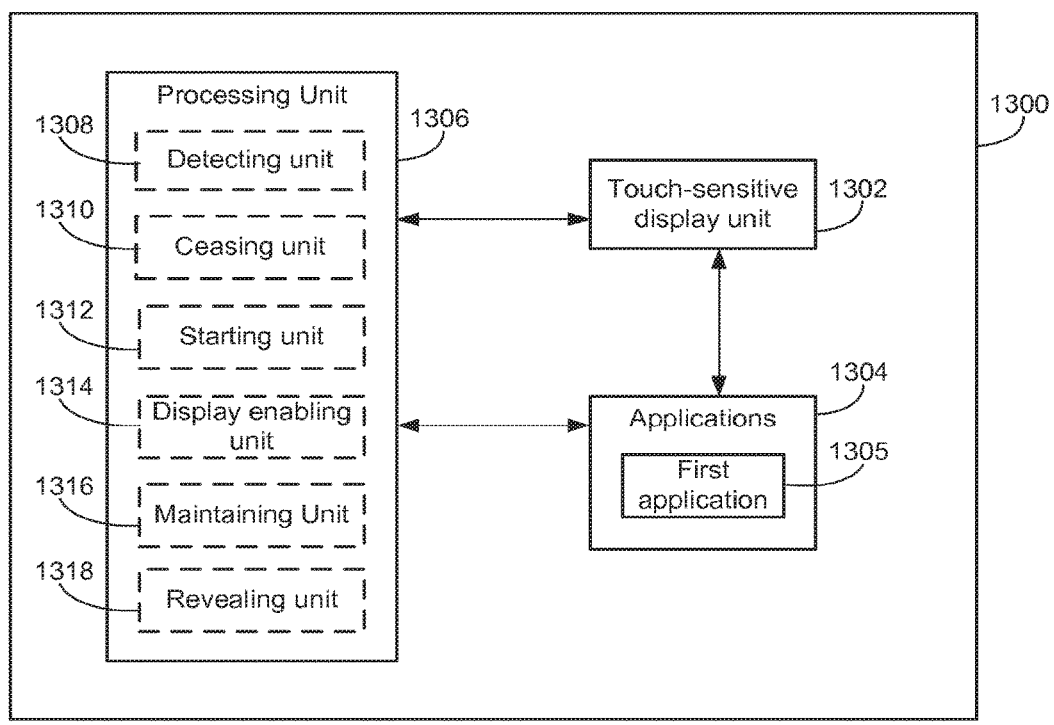
FIG. 13 is a functional block diagram of an electronic device in accordance with some embodiments.

In accordance with some embodiments, FIG. 13 shows a functional block diagram of an electronic device 1300 configured in accordance with the principles of the invention as described above. The functional blocks of the device may be implemented by hardware, software, or a combination of hardware and software to carry out the principles of the invention. It is understood by persons of skill in the art that the functional blocks described in FIG. 13 may be combined or separated into sub-blocks to implement the principles of the invention as described above. Therefore, the description herein may support any possible combination or separation or further definition of the functional blocks described herein.

As shown in FIG. 13, an electronic device 1300 includes a touch-sensitive display unit 1302 configured to display, while the device is in a locked, passcode-protected state, a lock screen interface, the lock screen interface including a first application access indicia, and receive gestures; a plurality of applications 1304, including a first application 1305; and a processing unit 1306 coupled to the touch-sensitive display unit 1302 and the plurality of applications 1304. In some embodiments, the processing unit 1306 includes a detecting unit 1308, a ceasing unit 1310, a starting unit 1312, a display enabling unit 1314, a maintaining unit 1316, and a revealing unit 1318.

The processing unit 1306 is configured to: while the device is in a locked, passcode-protected state: detect a gesture on the touch-sensitive display unit 1302 (e.g., with the detecting unit 1308); in response to a determination that the gesture starts on the first application access indicia and is a first type of gesture, cease display of the lock screen interface (e.g., with the ceasing unit 1310), start a restricted session for the first application 1305 in a first mode of the first application 1305 (e.g., with the starting unit 1312), enable display of an interface for the first application 1305 in the first mode, without displaying a passcode entry interface (e.g., with the display enabling unit 1314), and maintain the device in the locked, passcode-protected state for applications 1304 in the device other than the first application 1305 (e.g., with the maintaining unit 1316); and in response to a determination that the gesture starts on the first application access indicia and is a second type of gesture, distinct from the first type of gesture, cease display of the lock screen interface (e.g., with the ceasing unit 1310), start a restricted session for the first application 1305 in a second mode of the first application 1305, distinct from the first mode of the first application 1305 (e.g., with the starting unit 1312), enable display of an interface for the first application 1305 in the second mode, without displaying a passcode entry interface (e.g., with the display enabling unit 1314), and maintain the device in the locked, passcode-protected state for applications 1304 in the device other than the first application 1305 (e.g., with the maintaining unit 1316).

In some embodiments, the processing unit 1306 is configured to: in response to a determination that the gesture starts on the first application access indicia and is a third type of gesture, distinct from the first type of gesture and the second type of gesture, partially reveal an interface for the first mode of the first application 1305 or partially reveal an interface for the second mode of the first application 1305 (e.g., with the revealing unit 1318).

In some embodiments, partially revealing an interface for the first mode of the first application 1305 or partially revealing an interface for the second mode of the first application 1305 includes displaying an animation that translates the lock screen interface.

In some embodiments, the animation translates the lock screen interface in a first direction to partially reveal the interface for the first mode or the second mode of the first application 1305 and then translates the lock screen interface in a direction opposite the first direction to eliminate display of the partially revealed interface of the first application 1305.

In some embodiments, the processing unit 1306 is configured to: in response to a determination that the gesture starts on the first application access indicia and is a third type of gesture, distinct from the first type of gesture and the second type of gesture, enable display of one or more visual cues of the first type of gesture and the second type of gesture (e.g., with the display enabling unit 1314).

In some embodiments, the processing unit 1306 is configured to: in response to a determination that the gesture starts at a location on the touch-sensitive display other than the first application access indicia, enable display of a passcode entry interface (e.g., with the display enabling unit 1314), wherein in response to entry of a correct passcode in the passcode entry interface, the passcode entry interface ceases to be displayed and the device enters an unlocked state with access to the plurality of applications 1304.

In some embodiments, the first type of gesture includes a contact moving in a first path on the touch-sensitive surface, and the second type of gesture includes a contact moving in a second path distinct from the first path on the touch-sensitive surface.

In some embodiments, the first type of gesture includes a contact moving to and ending at a first region on the touch-sensitive surface, and the second type of gesture includes a contact moving to and ending at a second region, distinct from the first region, on the touch-sensitive surface.

In some embodiments, the first type of gesture includes a first number of contacts, and the second type of gesture includes a second number of contacts different from the first number of contacts.

In some embodiments, the first application 1305 is a camera application, the first mode is a still image capture mode, and the second mode is a video capture mode.

In some embodiments, the first application 1305 is a notifications application, the first mode is an incoming messages notifications mode, and the second mode is an aggregate notifications mode.

In some embodiments, the first application 1305 is an email application, the first mode is an inbox mode, and the second mode is an email composition mode.

In some embodiments, the first application 1305 is a phone application, the first mode is a keypad mode, and the second mode is a recent calls listing mode.

In some embodiments, the first application 1305 is a phone application, the first mode is a keypad mode, and the second mode is a voicemail mode.

In some embodiments, the processing unit 1306 is configured to: enable display of an animation that changes the first application access indicia from a first graphic that corresponds to the first mode to a second graphic, distinct from the first graphic, that corresponds to the second mode (e.g., with the display enabling unit 1314).

In some other embodiments, an electronic device 1300 includes a touch-sensitive display unit 1302 configured to display, while the device is in a locked, passcode-protected state, a lock screen interface, the lock screen interface including a first access indicia for a first mode in a first application 1305 and a second access indicia, distinct from the first access indicia, for a second mode in the first application 1305, and receive gestures; a plurality of applications 1304, including a first application 1305; and a processing unit 1306 coupled to the touch-sensitive display unit 1302 and the plurality of applications 1304. In some embodiments, the processing unit 1306 includes a detecting unit 1308, a ceasing unit 1310, a starting unit 1312, a display enabling unit 1314, a maintaining unit 1316, and a revealing unit 1318.

The processing unit 1306 is configured to: while the device is in a locked, passcode-protected state: detect a gesture on the touch-sensitive display (e.g., with the detecting unit 1308); in response to a determination that the gesture starts on the first access indicia and is a first type of gesture, cease to display the lock screen interface (e.g., with the ceasing unit 1310), start a restricted session for the first application 1305 in a first mode of the first application 1305 (e.g., with the starting unit 1312), enable display of an interface for the first application 1305 in the first mode, without displaying a passcode entry interface (e.g., with the display enabling unit 1314), and maintain the device in the locked, passcode-protected state for applications 1304 in the device other than the first application 1305 (e.g., with the maintaining unit 1316); and in response to a determination that the gesture starts on the second access indicia and is a second type of gesture: cease to display the lock screen interface (e.g., with the ceasing unit 1310), start a restricted session for the first application 1305 in a second mode of the first application 1305, distinct from the first mode of the first application 1305 (e.g., with the starting unit 1312), enable display of an interface for the first application 1305 in the second mode, without displaying a passcode entry interface (e.g., with the display enabling unit 1314), and maintain the device in the locked, passcode-protected state for applications 1304 in the device other than the first application 1305 (e.g., with the maintaining unit 1316).

In some embodiments, the processing unit 1306 is configured to: in response to a determination that the gesture starts on the first access indicia and is a type of gesture distinct from the first type of gesture, partially reveal an interface for the first mode of the first application 1305 (e.g., with the revealing unit 1318), and, in response to a determination that the gesture starts on the second access indicia and is a type of gesture distinct from the second type of gesture, partially reveal an interface for the second mode of the first application 1305 (e.g., with the revealing unit 1318).

In some embodiments, the type of gesture distinct from the first type of gesture is a tap gesture, and the type of gesture distinct from the second type of gesture is a tap gesture.

In some embodiments, partially revealing an interface for the first mode of the application includes displaying an animation of the lock screen interface translating in a first direction, and partially revealing an interface for the second mode of the application includes displaying an animation of the lock screen interface translating in a second direction, distinct from the first direction.

In some embodiments, the second direction is orthogonal to the first direction.

In some embodiments, the second type of gesture is distinct from the first type of gesture.

In some embodiments, the processing unit 1306 is configured to: in response to a determination that the gesture starts at a location on the touch-sensitive display other than the first access indicia and the second access indicia, enable display of a passcode entry interface (e.g., with the display enabling unit 1314), wherein in response to entry of a correct passcode in the passcode entry interface, the passcode entry interface ceases to be displayed and the device enters an unlocked state with access to the plurality of applications 1304.

In some embodiments, the first type of gesture includes a contact moving in a first path on the touch-sensitive surface, and the second type of gesture includes a contact moving in a second path distinct from the first path on the touch-sensitive surface.

In some embodiments, the first type of gesture includes a contact moving to and ending at a first region on the touch-sensitive surface, and the second type of gesture includes a contact moving to and ending at a second region, distinct from the first region, on the touch-sensitive surface.

In some embodiments, the first type gesture includes a first number of contacts, and the second type of gesture includes a second number of contacts different from the first number of contacts.

In some embodiments, the first application 1305 is a camera application, the first mode is a still image capture mode, and the second mode is a video capture mode.

In some embodiments, the first application 1305 is a notifications application, the first mode is an incoming messages notifications mode, and the second mode is an aggregate notifications mode.

In some embodiments, the first application 1305 is an email application, the first mode is an inbox mode, and the second mode is an email composition mode.

In some embodiments, the first application 1305 is a phone application, the first mode is a keypad mode, and the second mode is a recent calls listing mode.

In some embodiments, the first application 1305 is a phone application, the first mode is a keypad mode, and the second mode is a voicemail mode.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A and 3) are all included within the scope of protection of the invention.

The operations described above with reference to FIGS. 6A-6B, 7-9, 10A-10C, 11A-11C may be implemented by components depicted in FIGS. 1A-1B. For example, detection operation 608, ceasing operation 620, starting operation 622, displaying operation 624, and maintaining operation 626 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A portable multifunction device, comprising:
   a touch-sensitive display;
   one or more processors;
   memory;
   a plurality of applications, including a camera application; and
   one or more programs, wherein the one or more programs are stored in the memory and configured to be executed by the one or more processors, the one or more programs including instructions for:
      while the device is in a locked, passcode-protected state:
         displaying a lock screen interface on the touch-sensitive display, the lock screen interface including a camera access indicia;
         detecting a first gesture on the touch-sensitive display;
         in response to a determination that the first gesture starts on the camera access indicia and is of a first type:
            displaying, on the touch-sensitive display, an indication of a second type of gesture required to access a restricted session for the camera application;
         in response to a determination that the first gesture starts on the camera access indicia and is of the second type:
            ceasing to display the lock screen interface;
            starting the restricted session for the camera application;
            displaying the interface for the camera application, without displaying a passcode entry interface; and
            maintaining the device in the locked, passcode-protected state for at least one application in the device other than the camera application; and
         in response to a determination that the first gesture starts at a location on the touch-sensitive display other than the camera access indicia:
            forgoing displaying the indication of the second type of gesture required to access the restricted session for the camera application.

2. The device of claim 1, wherein displaying an indication of a second type of gesture required to access a restricted session for the camera application comprises displaying an animation that includes revealing and then hiding a portion of an interface for the camera application.

3. The device of claim 2, wherein the animation includes:
   translating the lock screen interface from a first location to a second location to partially reveal the portion of the interface for the camera application; and
   translating the lock screen interface back to the first location to hide the portion of the interface for the camera application.

4. The device of claim 2, wherein during the animation, the lock screen interface appears to bounce.

5. The device of claim 1, including instructions for: in response to the determination that the first gesture starts on the camera access indicia and is of the first type, maintaining display of at least a portion of the lock screen interface.

6. The device of claim 1, including instructions for:
   while the device is in a locked, passcode-protected state:
      detecting a second gesture on the touch-sensitive display; and
      in response to a determination that the second gesture starts at a location on the touch-sensitive display associated with unlocking the device that is distinct from the camera access indicia:
displaying a passcode entry interface, wherein in response to entry of a correct passcode in the passcode entry interface, the passcode entry interface ceases to be displayed and the device enters an unlocked state with access to the at least one application in the device other than the camera application.

7. The device of claim 6, wherein the determination that the second gesture starts at a location on the touch-sensitive display associated with unlocking the device that is distinct from the camera access indicia comprises a determination that the second gesture is of the second type.

8. The device of claim 2, wherein displaying the interface for the camera application in response to a determination that the first gesture starts on the camera access indicia and is of a second type includes:
transitioning from displaying the lock screen interface to displaying the interface for the camera application by revealing the portion of the interface for the camera application and then revealing a remaining portion of the interface for the camera application.

9. The device of claim 8, including instructions for:
in response to a determination that the first gesture starts on the camera access indicia and is of a third type that is different from the first type and the second type:
expanding display of the interface for the camera application in accordance with the gesture, wherein the expansion begins with expanding display of the portion of the interface for the camera application;
in response to a determination that the first gesture is released after reaching a predefined location:
ceasing to display the lock screen interface;
starting a restricted session for the camera application;
displaying the interface for the camera application, without displaying a passcode entry interface; and
in response to a determination that the first gesture is released before reaching a predefined location, ceasing to display the interface for the camera application.

10. A method comprising:
at an electronic device with a touch-sensitive display a plurality of applications, including a camera application:
while the device is in a locked, passcode-protected state:
displaying a lock screen interface on the touch-sensitive display, the lock screen interface including a camera access indicia;
detecting a first gesture on the touch-sensitive display;
in response to a determination that the first gesture starts on the camera access indicia and is of a first type:
displaying, on the touch-sensitive display, an indication of a second type of gesture required to access a restricted session for the camera application;
in response to a determination that the first gesture starts on the camera access indicia and is of the second type:
ceasing to display the lock screen interface;
starting the restricted session for the camera application;
displaying the interface for the camera application, without displaying a passcode entry interface; and maintaining the device in the locked, passcode-protected state for at least one application in the device other than the camera application; and
in response to a determination that the first gesture starts at a location on the touch-sensitive display other than the camera access indicia:
forgoing displaying the indication of the second type of gesture required to access the restricted session for the camera application.

11. The method of claim 10, wherein displaying an indication of a second type of gesture required to access a restricted session for the camera application comprises displaying an animation that includes revealing and then hiding a portion of an interface for the camera application.

12. The method of claim 11, wherein the animation includes:
translating the lock screen interface from a first location to a second location to partially reveal the portion of the interface for the camera application; and
translating the lock screen interface back to the first location to hide the portion of the interface for the camera application.

13. The method of claim 11, wherein during the animation, the lock screen interface appears to bounce.

14. The method of claim 10, further comprising: in response to the determination that the first gesture starts on the camera access indicia and is of the first type, maintaining display of at least a portion of the lock screen interface.

15. The method of claim 10, further comprising:
while the device is in a locked, passcode-protected state:
detecting a second gesture on the touch-sensitive display; and
in response to a determination that the second gesture starts at a location on the touch-sensitive display associated with unlocking the device that is distinct from the camera access indicia:
displaying a passcode entry interface, wherein in response to entry of a correct passcode in the passcode entry interface, the passcode entry interface ceases to be displayed and the device enters an unlocked state with access to the at least one application in the device other than the camera application.

16. The method of claim 15, wherein the determination that the second gesture starts at a location on the touch-sensitive display associated with unlocking the device that is distinct from the camera access indicia comprises a determination that the second gesture is of the second type.

17. The method of claim 11, wherein displaying the interface for the camera application in response to a determination that the first gesture starts on the camera access indicia and is of a second type includes:
transitioning from displaying the lock screen interface to displaying the interface for the camera application by revealing the portion of the interface for the camera application and then revealing a remaining portion of the interface for the camera application.

18. The method of claim 17, further comprising:
in response to a determination that the first gesture starts on the camera access indicia and is of a third type that is different from the first type and the second type:
expanding display of the interface for the camera application in accordance with the gesture, wherein the expansion begins with expanding display of the portion of the interface for the camera application;
in response to a determination that the first gesture is released after reaching a predefined location:

ceasing to display the lock screen interface;
starting a restricted session for the camera application;
displaying the interface for the camera application, without displaying a passcode entry interface; and
in response to a determination that the first gesture is released before reaching a predefined location, ceasing to display the interface for the camera application.

19. A non-transitory computer readable storage medium storing one or more programs, the one or more programs comprising instructions, which when executed by an electronic device with a touch-sensitive display and a plurality of applications, including a camera application, cause the device to perform a method comprising:
while the device is in a locked, passcode-protected state:
displaying a lock screen interface on the touch-sensitive display, the lock screen interface including a camera access indicia;
detecting a first gesture on the touch-sensitive display;
in response to a determination that the first gesture starts on the camera access indicia and is of a first type:
displaying, on the touch-sensitive display, an indication of a second type of gesture required to access a restricted session for the camera application;
in response to a determination that the first gesture starts on the camera access indicia and is of the second type:
ceasing to display the lock screen interface;
starting the restricted session for the camera application;
displaying the interface for the camera application, without displaying a passcode entry interface; and
maintaining the device in the locked, passcode-protected state for at least one application in the device other than the camera application; and
in response to a determination that the first gesture starts at a location on the touch-sensitive display other than the camera access indicia:
forgoing displaying the indication of the second type of gesture required to access the restricted session for the camera application.

20. The computer readable storage medium of claim 19, wherein displaying an indication of a second type of gesture required to access a restricted session for the camera application comprises displaying an animation that includes revealing and then hiding a portion of an interface for the camera application.

21. The computer readable storage medium of claim 20, wherein the animation includes:
translating the lock screen interface from a first location to a second location to partially reveal the portion of the interface for the camera application; and
translating the lock screen interface back to the first location to hide the portion of the interface for the camera application.

22. The computer readable storage medium of claim 20, wherein during the animation, the lock screen interface appears to bounce.

23. The computer readable storage medium of claim 19, wherein the method further comprises: in response to the determination that the first gesture starts on the camera access indicia and is of the first type, maintaining display of at least a portion of the lock screen interface.

24. The computer readable storage medium of claim 19, wherein the method further comprises:
while the device is in a locked, passcode-protected state:
detecting a second gesture on the touch-sensitive display; and
in response to a determination that the second gesture starts at a location on the touch-sensitive display associated with unlocking the device that is distinct from the camera access indicia:
displaying a passcode entry interface, wherein in response to entry of a correct passcode in the passcode entry interface, the passcode entry interface ceases to be displayed and the device enters an unlocked state with access to the at least one application in the device other than the camera application.

25. The computer readable storage medium of claim 24, wherein the determination that the second gesture starts at a location on the touch-sensitive display associated with unlocking the device that is distinct from the camera access indicia comprises a determination that the second gesture is of the second type.

26. The computer readable storage medium of claim 20, wherein displaying the interface for the camera application in response to a determination that the first gesture starts on the camera access indicia and is of a second type includes:
transitioning from displaying the lock screen interface to displaying the interface for the camera application by revealing the portion of the interface for the camera application and then revealing a remaining portion of the interface for the camera application.

27. The computer readable storage medium of claim 26, wherein the method further comprises:
in response to a determination that the first gesture starts on the camera access indicia and is of a third type that is different from the first type and the second type:
expanding display of the interface for the camera application in accordance with the gesture, wherein the expansion begins with expanding display of the portion of the interface for the camera application;
in response to a determination that the first gesture is released after reaching a predefined location:
ceasing to display the lock screen interface;
starting a restricted session for the camera application;
displaying the interface for the camera application, without displaying a passcode entry interface; and
in response to a determination that the first gesture is released before reaching a predefined location, ceasing to display the interface for the camera application.

* * * * *